(12) United States Patent
Fujiwara et al.

(10) Patent No.: US 8,250,490 B2
(45) Date of Patent: Aug. 21, 2012

(54) DISPLAY IMAGE CONTROL APPARATUS

(75) Inventors: Masato Fujiwara, Kawasaki (JP);
Naoto Kagaya, Yokohama (JP); Toru Kikuchi, Hino (JP); Masaji Munekuni, Kawasaki (JP); Katsumi Nagano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1240 days.

(21) Appl. No.: 11/956,523

(22) Filed: Dec. 14, 2007

(65) Prior Publication Data

US 2008/0147664 A1 Jun. 19, 2008

(30) Foreign Application Priority Data

Dec. 18, 2006 (JP) ................................. 2006-340572
Dec. 18, 2006 (JP) ................................. 2006-340573

(51) Int. Cl.
*G06F 13/00* (2006.01)
*G06F 15/00* (2006.01)
(52) U.S. Cl. ....................................................... 715/851
(58) Field of Classification Search .......... 715/763–765, 715/976–977, 851–853, 837–840
See application file for complete search history.

(56) References Cited

U.S. PATENT DOCUMENTS

| 6,943,842 B2 | 9/2005 | Stavely et al. ............ 348/333.05 |
| 7,363,591 B2 * | 4/2008 | Goldthwaite et al. ........ 715/763 |
| 7,590,948 B2 | 9/2009 | Narita et al. |
| 7,930,650 B2 * | 4/2011 | Brodersen et al. ............ 715/838 |
| 2006/0024021 A1 | 2/2006 | Utsuki et al. |

FOREIGN PATENT DOCUMENTS

| JP | 04-347772 A | 12/1992 |
| JP | 06-209451 | 7/1994 |
| JP | 2006-086612 | 3/1996 |
| JP | 09-037181 | 2/1997 |
| JP | 2003-202952 | 7/2003 |
| JP | 2004-297176 A | 10/2004 |
| JP | 2006-033776 | 2/2006 |
| JP | 2007-122496 A | 5/2007 |

OTHER PUBLICATIONS

Office Action which issued on Feb. 13, 2012 in counterpart Japanese Application No. 2006-340572.
Office Action which issued on Feb. 13, 2012 in counterpart Japanese Application No. 2006-340573.

* cited by examiner

*Primary Examiner* — Cao "Kevin" Nguyen
(74) *Attorney, Agent, or Firm* — Fitzpatrick Cella Harper & Scinto

(57) ABSTRACT

A plurality of object arrays in which a plurality of objects are sorted under a plurality of order conditions are generated. A display image is generated by sorting the objects in an order for each object array to line up in the first direction for each of the plurality of object arrays, selecting one object of a first object array of the plurality of object arrays as a reference object, and sorting the objects for each of the plurality of object arrays so that the reference object and objects corresponding to the reference object included in the object arrays other than the first object array line up in the second direction.

13 Claims, 125 Drawing Sheets

FIG. 1
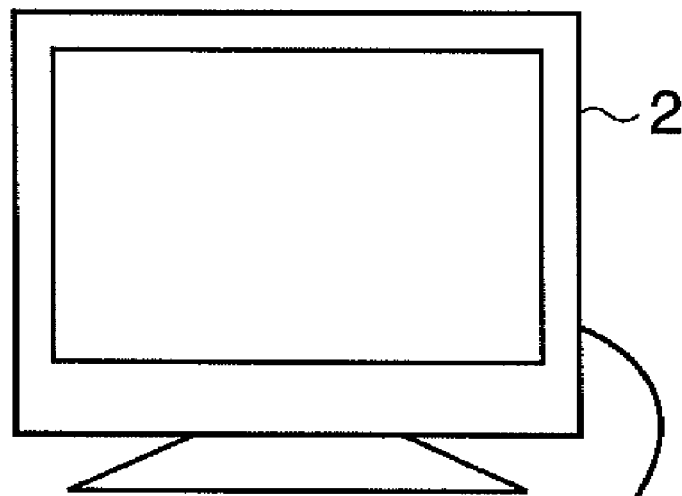
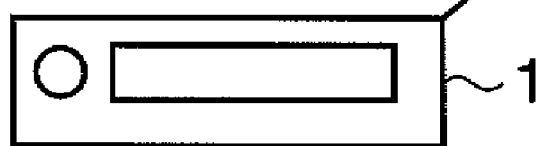
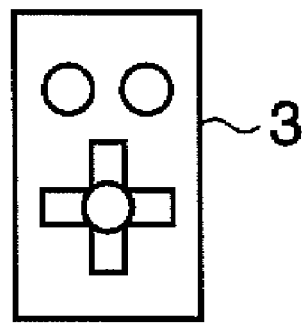

FIG. 4

| CONTENTS | DATE AND TIME | LOCATION | PERSON | EVENT |
|---|---|---|---|---|
| . | . | . | . | . |
| . | . | . | . | . |
| . | . | . | . | . |
| . | . | . | . | . |
| . | . | . | . | . |
| . | . | . | . | . |
| Img_0997.jpg | 2006/6/9 12:08 | Yokohama | Takuma | Zoo |
| Img_0998.jpg | 2006/6/12 13:57 | Tokyo | Kazuma | Tennis |
| Img_0999.jpg | 2006/6/15 15:46 | Oita | Yumiko | Trip |
| Img_1000.jpg | 2006/6/18 17:35 | Tokyo | Kazuma | Tennis |
| Img_1001.jpg | 2006/6/21 19:24 | Kawasaki | Takuma | Party |
| Img_1002.jpg | 2006/6/24 21:13 | Tokyo | Masato | Business |
| Img_1003.jpg | 2006/6/27 23:02 | Sydeny | Masato | Business |
| Img_1004.jpg | 2006/7/1 0:51 | Shizuoka | Masato | Golf |
| Img_1005.jpg | 2006/7/4 2:40 | Shizuoka | Takuma | Baseball |
| . | . | . | . | . |
| . | . | . | . | . |
| . | . | . | . | . |
| . | . | . | . | . |
| . | . | . | . | . |
| . | . | . | . | . |

FIG. 5

EVENT ORDER ~201

| EVENT | CONTENTS |
|---|---|
| . | . |
| Business | Img_0483.jpg |
| Business | Img_1002.jpg |
| Business | Img_1003.jpg |
| . | . |
| Golf | Img_0685.jpg |
| Golf | Img_0764.jpg |
| Golf | Img_0843.jpg |
| Party | Img_0922.jpg |
| Party | Img_1001.jpg |
| Party | Img_1080.jpg |
| Party | Img_1159.jpg |
| Party | Img_1238.jpg |
| Party | Img_1317.jpg |
| . | . |
| Tennis | . |
| Tennis | . |
| Tennis | . |
| . | . |
| Trip | . |
| Trip | . |
| Trip | . |

PERSON ORDER ~202

| PERSON | CONTENTS |
|---|---|
| . | . |
| Kazuma | . |
| Kazuma | . |
| Kazuma | . |
| . | . |
| Masato | Img_0596.jpg |
| Masato | Img_1002.jpg |
| Masato | Img_1003.jpg |
| Takuma | Img_0985.jpg |
| Takuma | Img_0989.jpg |
| Takuma | Img_0993.jpg |
| Takuma | Img_0997.jpg |
| Takuma | Img_1001.jpg |
| Takuma | Img_1005.jpg |
| Takuma | Img_1009.jpg |
| Takuma | Img_1013.jpg |
| Takuma | Img_1017.jpg |
| . | . |
| Yoshihiro | . |
| Yoshihiro | . |
| Yoshihiro | . |
| . | . |
| Yumiko | . |
| Yumiko | . |
| Yumiko | . |

LOCATION ORDER ~203

| LOCATION | CONTENTS |
|---|---|
| . | . |
| Chiba | . |
| Chiba | . |
| Chiba | . |
| . | . |
| Niigata | Img_669.jpg |
| Niigata | Img_902.jpg |
| Niigata | Img_935.jpg |
| Kawasaki | Img_968.jpg |
| Kawasaki | Img_1001.jpg |
| Kawasaki | Img_1004.jpg |
| Kawasaki | Img_1057.jpg |
| Kawasaki | Img_1100.jpg |
| Kawasaki | Img_1133.jpg |
| Tokyo | Img_1000.jpg |
| Tokyo | Img_1002.jpg |
| Tokyo | Img_1498.jpg |
| . | . |
| Yokohama | . |
| Yokohama | . |
| Yokohama | . |

200 ~ 210

DATE AND TIME ORDER ~204

| DATE AND TIME | CONTENTS |
|---|---|
| . | . |
| 2006/6/9 12:06 | Img_0997.jpg |
| 2006/6/12 13:57 | Img_0998.jpg |
| 2006/6/15 15:45 | Img_0999.jpg |
| 2006/6/18 17:35 | Img_1000.jpg |
| 2006/6/21 18:24 | Img_1001.jpg |
| 2006/6/24 21:13 | Img_1002.jpg |
| 2006/6/27 23:02 | Img_1003.jpg |
| 2006/7/1 0:51 | Img_1004.jpg |
| 2006/7/4 2:40 | Img_1005.jpg |

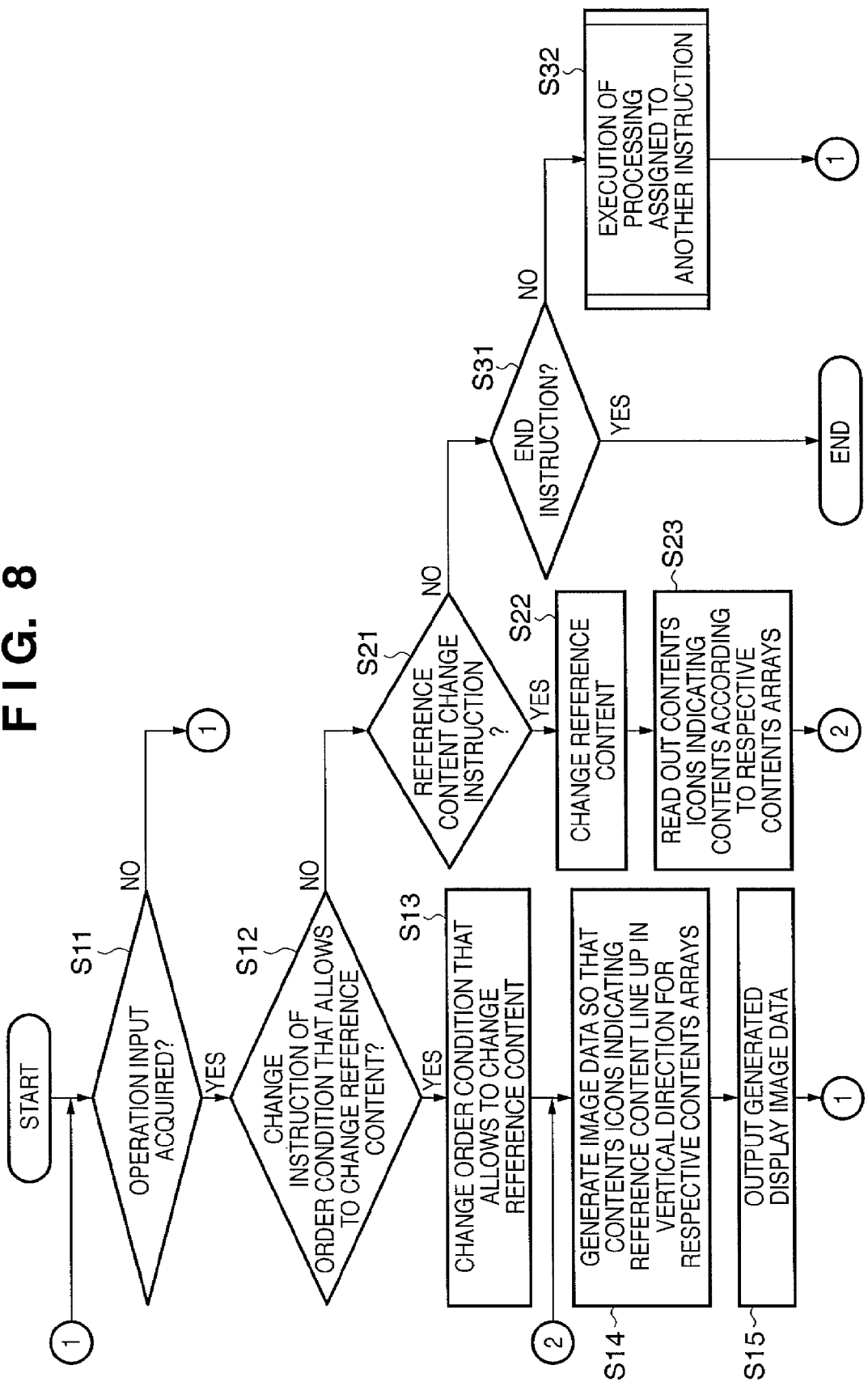

FIG. 9

| CONTENTS | DATE AND TIME | LOCATION | PEOPLE | EVENT |
|---|---|---|---|---|
| · | · | · | · | · |
| · | · | · | · | · |
| · | · | · | · | · |
| · | · | · | · | · |
| · | · | · | · | · |
| · | · | · | · | · |
| Img_0997.jpg | 2006/6/9 12:08 | Yokohama | Takuma | Zoo |
| Img_0998.jpg | 2006/6/12 13:57 | Tokyo | Kazuma | Tennis |
| Img_0999.jpg | 2006/6/15 15:46 | Oita | Yumiko | Trip |
| Img_1000.jpg | 2006/6/18 17:35 | Tokyo | Kazuma | Tennis |
| Img_1001.jpg | 2006/6/21 19:24 | Kawasaki | Takuma | Party |
| Img_1002.jpg | 2006/6/24 21:13 | Tokyo | Masato | Business |
| Img_1003.jpg | 2006/6/27 23:02 | Sydney | Masato | Business |
| Img_1004.jpg | 2006/7/1 0:51 | Shizuoka | Masato | Golf |
| Img_1005.jpg | 2006/7/4 2:40 | Shizuoka | Takuma | Baseball |
| · | · | · | · | · |
| · | · | · | · | · |
| · | · | · | · | · |
| · | · | · | · | · |
| · | · | · | · | · |

| DATE AND TIME ORDER | |
|---|---|
| DATE AND TIME | CONTENTS |
| · | · |
| 2006/6/9 12:06 | Img_0997.jpg |
| 2006/6/12 13:57 | Img_0998.jpg |
| 2006/6/15 15:45 | Img_0999.jpg |
| 2006/6/18 17:35 | Img_1000.jpg |
| 2006/6/21 18:24 | Img_1001.jpg |
| 2006/6/24 21:13 | Img_1002.jpg |
| 2006/6/27 23:02 | Img_1003.jpg |
| 2006/7/1 0:51 | Img_1004.jpg |
| 2006/7/4 2:40 | Img_1005.jpg |
| · | · |

| LOCATION ORDER | |
|---|---|
| LOCATION | CONTENTS |
| · | · |
| Chiba | |
| Chiba | |
| Chiba | |
| · | · |
| Niigata | |
| Niigata | |
| Niigata | |
| · | · |
| Kawasaki | Img_869.jpg |
| Kawasaki | Img_902.jpg |
| Kawasaki | Img_935.jpg |
| Kawasaki | Img_968.jpg |
| Kawasaki | Img_1001.jpg |
| Kawasaki | Img_1034.jpg |
| Kawasaki | Img_1057.jpg |
| Kawasaki | Img_1100.jpg |
| Kawasaki | Img_1133.jpg |
| · | · |
| Tokyo | Img_1000.jpg |
| Tokyo | Img_1002.jpg |
| Tokyo | Img_1498.jpg |
| Yokohama | |
| Yokohama | |
| Yokohama | |
| · | · |

| PEOPLE ORDER | |
|---|---|
| PEOPLE | CONTENTS |
| · | · |
| Kazuma | |
| Kazuma | |
| Kazuma | |
| · | · |
| Masato | Img_0555.jpg |
| Masato | Img_1002.jpg |
| Masato | Img_1003.jpg |
| Takuma | Img_0985.jpg |
| Takuma | Img_0989.jpg |
| Takuma | Img_0993.jpg |
| Takuma | Img_0997.jpg |
| Takuma | Img_1001.jpg |
| Takuma | Img_1005.jpg |
| Takuma | Img_1059.jpg |
| Takuma | Img_1013.jpg |
| Takuma | Img_1017.jpg |
| · | · |
| Yoshihiro | |
| Yoshihiro | |
| Yoshihiro | |
| Yumiko | |
| Yumiko | |
| Yumiko | |
| · | · |

| EVENT ORDER | |
|---|---|
| EVENT | CONTENTS |
| · | · |
| Business | Img_0483.jpg |
| Business | Img_1002.jpg |
| Business | Img_1003.jpg |
| · | · |
| Golf | |
| Golf | |
| Golf | |
| Party | Img_0585.jpg |
| Party | Img_0764.jpg |
| Party | Img_0843.jpg |
| Party | Img_0922.jpg |
| Party | Img_1001.jpg |
| Party | Img_1080.jpg |
| Party | Img_1159.jpg |
| Party | Img_1238.jpg |
| Party | Img_1317.jpg |
| · | · |
| Tennis | |
| Tennis | |
| Tennis | |
| Trip | |
| Trip | |
| Trip | |
| · | · |

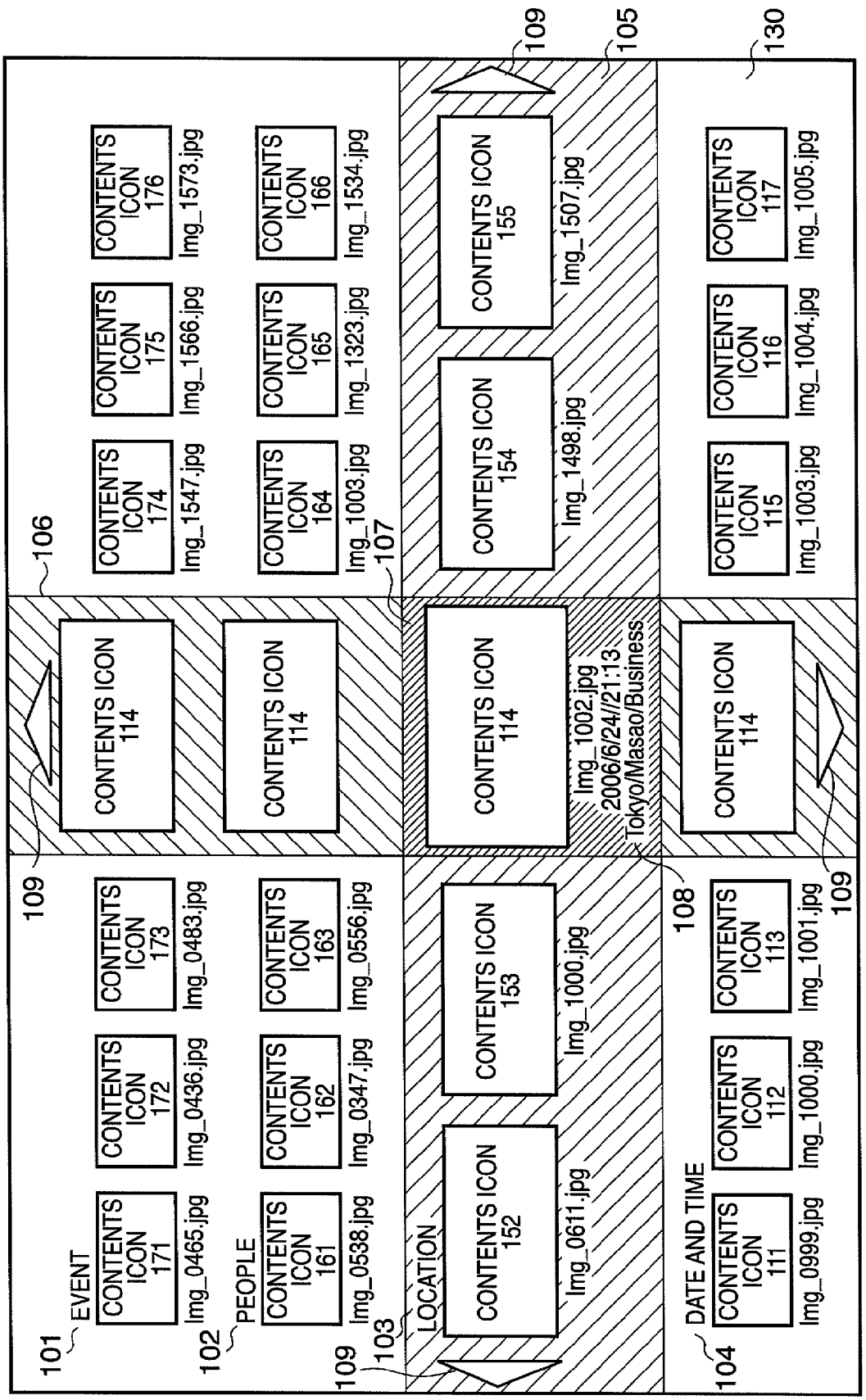

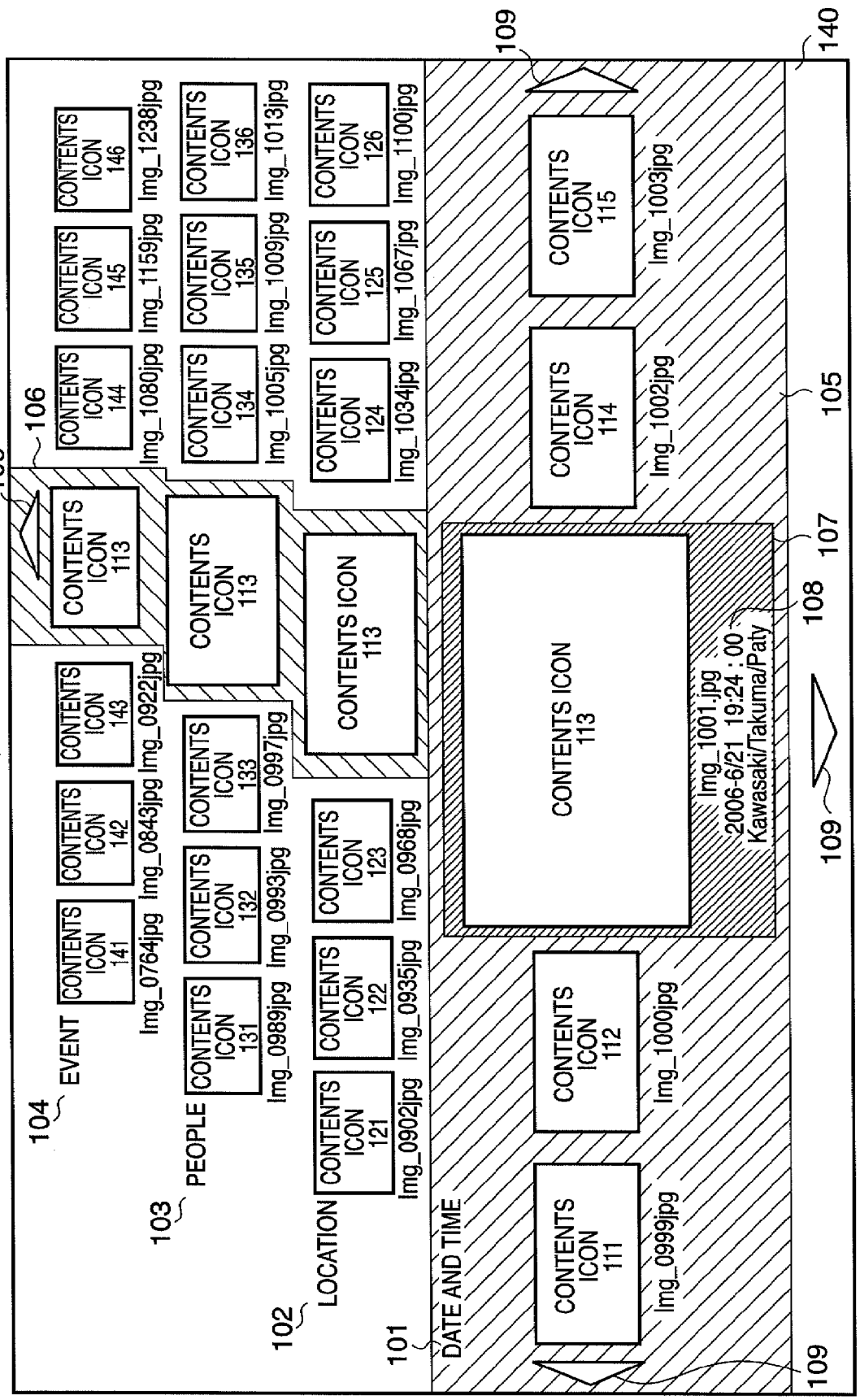

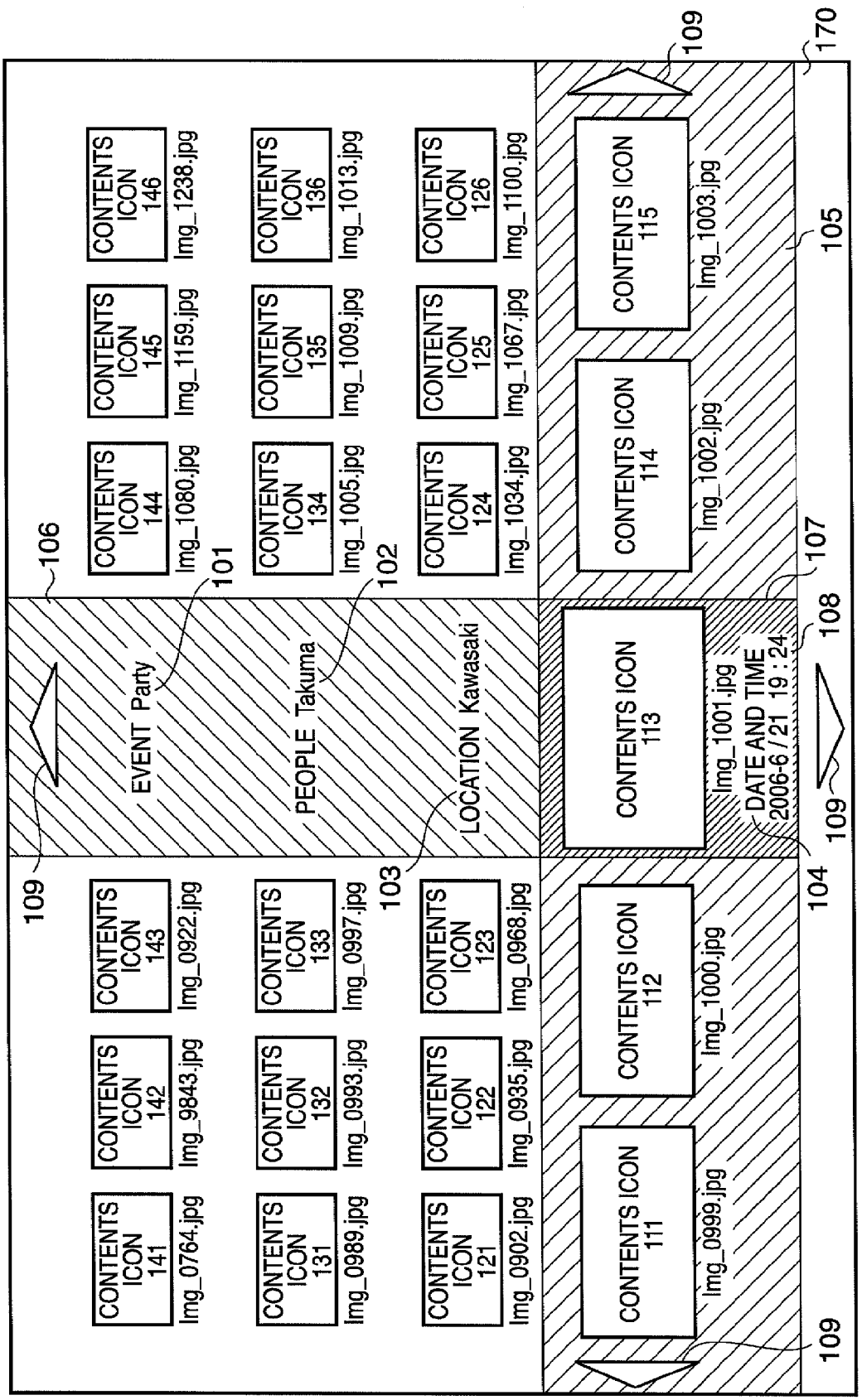

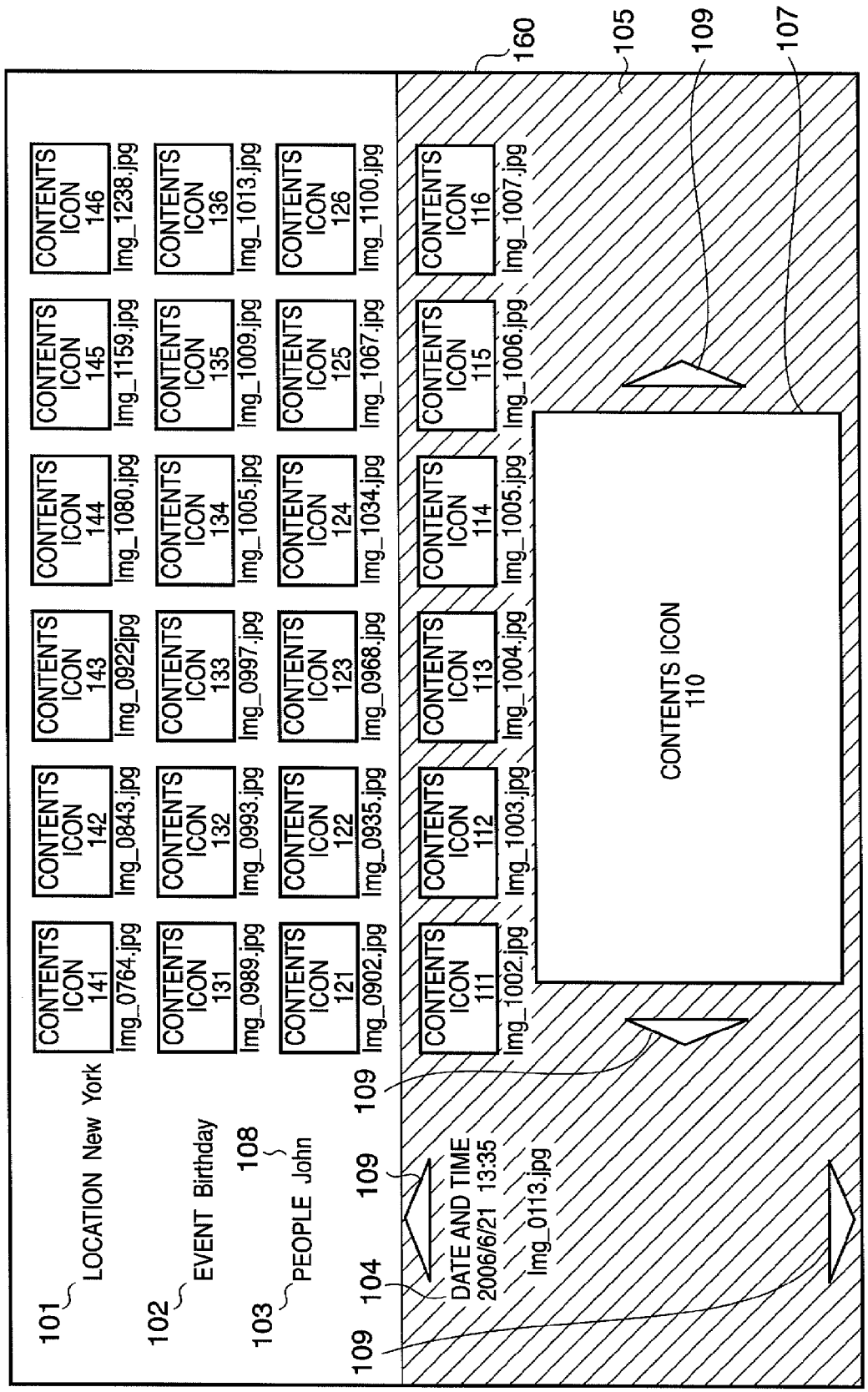

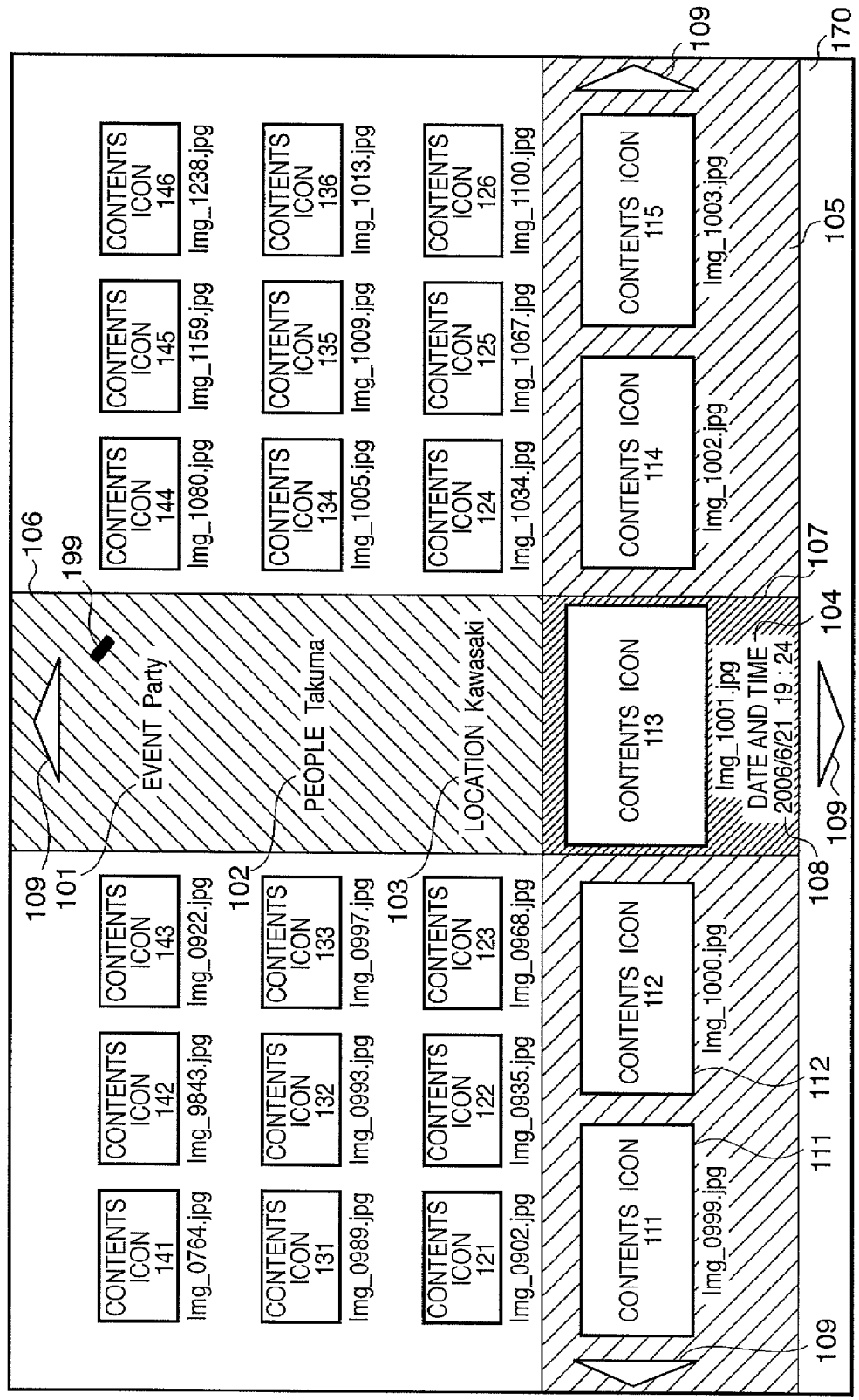

FIG. 18

PERSON ORDER

| EVENT | PERSON | CONTENTS |
|---|---|---|
| . | . | . |
| . | . | . |
| Business | Kazuma | . |
| . | . | |
| Business | Masato | . |
| . | . | |
| Business | Yumiko | . |
| . | . | . |
| . | . | . |
| Golf | Masato | Img_0842.jpg |
| Golf | Masato | Img_1004.jpg |
| Golf | Masato | Img_1168.jpg |
| Golf | Masato | Img_1331.jpg |
| Golf | Masato | Img_1494.jpg |
| Golf | Masato | Img_1837.jpg |
| Golf | Masato | Img_1820.jpg |
| Golf | Niwa | Img_0989.jpg |
| Golf | Niwa | Img_0993.jpg |
| Golf | Niwa | Img_0997.jpg |
| Golf | Niwa | Img_1001.jpg |
| Golf | Niwa | Img_1005.jpg |
| Golf | Niwa | Img_1009.jpg |
| Golf | Niwa | Img_1013.jpg |
| Golf | Niwa | Img_1017.jpg |
| Golf | Niwa | Img_1021.jpg |
| Golf | Niwa | Img_1025.jpg |
| Golf | Niwa | Img_1029.jpg |
| Golf | Yumiko | Img_0387.jpg |
| Golf | Yumiko | Img_1038.jpg |
| Golf | Yumiko | Img_1509.jpg |
| . | . | . |
| . | . | . |
| Party | Masato | . |
| . | . | . |
| Party | Takuma | . |
| . | . | . |
| Party | Yumiko | . |
| . | . | . |
| . | . | . |

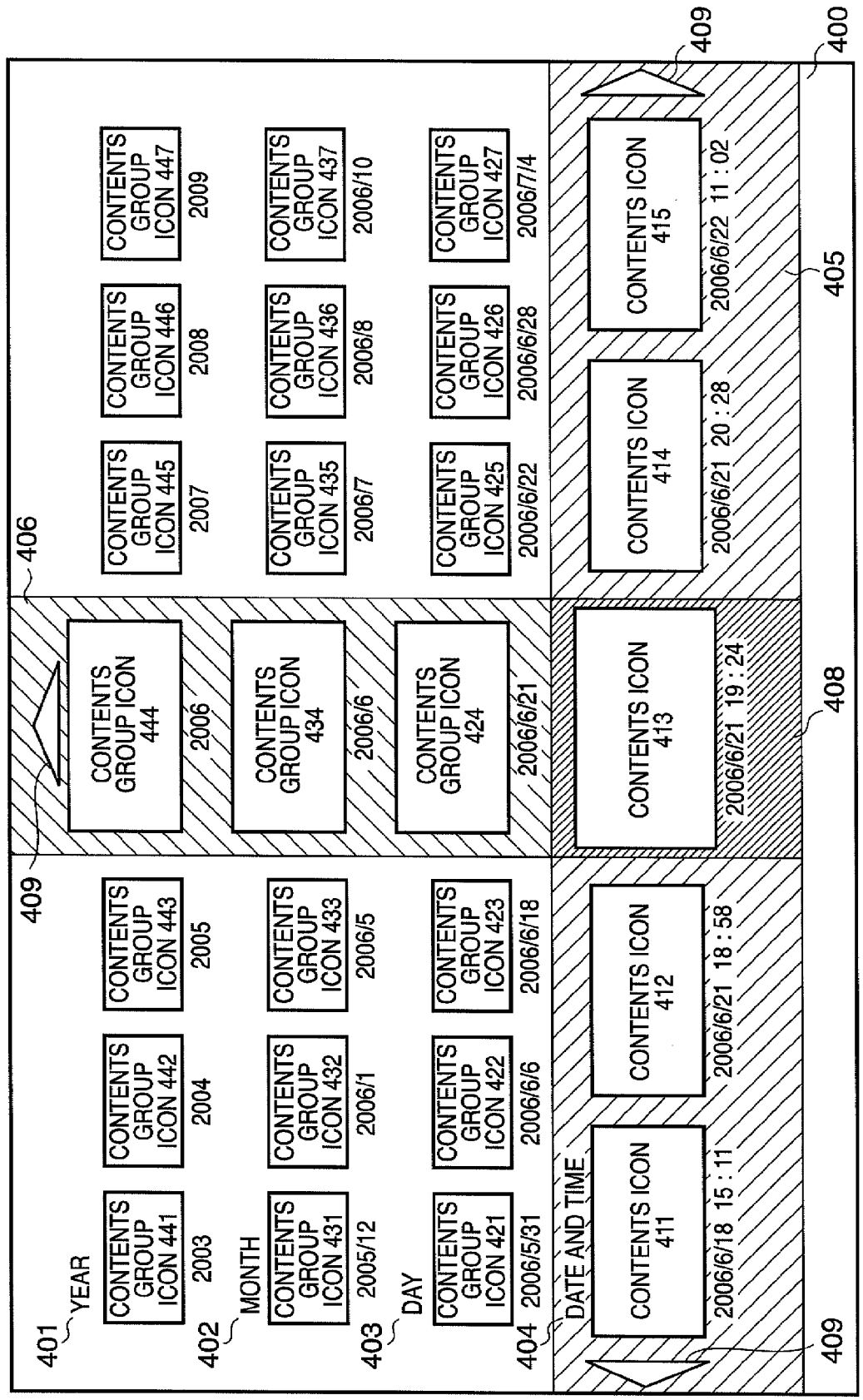

FIG. 20

| CONTENTS | DATE AND TIME |
|---|---|
| • | • |
| • | • |
| • | 2006/5/31 16:57 |
| • | • |
| • | • |
| • | 2006/6/6 18:06 |
| • | • |
| • | • |
| • | 2006/5/18 9:13 |
| • | • |
| • | • |
| Img_0997.jpg | 2006/6/16 15:11 |
| Img_0998.jpg | 2006/6/21 18:58 |
| Img_0999.jpg | 2006/6/21 19:24 |
| Img_1000.jpg | 2006/6/21 20:28 |
| Img_1001.jpg | 2006/6/22 11:02 |
| Img_1002.jpg | 2006/6/22 11:35 |
| Img_1003.jpg | 2006/6/22 11:38 |
| Img_1004.jpg | 2006/6/22 11:40 |
| Img_1005.jpg | 2006/6/22 14:15 |
| • | • |
| • | • |
| • | 2006/6/28 9:44 |
| • | • |
| • | • |
| • | 2006/7/4 11:32 |
| • | • |
| • | • |
| • | 2006/7/7 1:22 |
| • | • |
| • | • |

FIG. 21

| CONTENTS ARRAY 504 | | CONTENTS GROUP ARRAY 1 503 | | CONTENTS GROUP ARRAY 2 502 | | CONTENTS GROUP ARRAY 3 501 | |
|---|---|---|---|---|---|---|---|
| DATE AND TIME | CONTENTS | DAY | CONTENTS | MONTH | CONTENTS | YEAR | CONTENTS |
| . | . | . | . | . | . | . | . |
| . | . | . | . | . | . | 2005 | . |
| . | . | . | . | . | . | | . |
| . | . | . | . | . | . | | . |
| . | . | . | . | . | . | | . |
| 2006/5/13 18:57 | . | | . | 2006/6/5 | . | | . |
| . | . | 2006/5/31 | . | | . | | . |
| . | . | | . | | . | | . |
| 2006/6/6 18:06 | . | | . | | . | | . |
| . | . | 2006/6/6 | . | | . | | . |
| . | . | | . | | . | | . |
| 2006/6/18 9:13 | . | | . | | . | | . |
| . | . | 2006/6/18 | . | | . | | . |
| . | . | | . | | . | | . |
| 2006/6/18 15:11 | Img_0997.jpg | | Img_0997.jpg | | Img_0997.jpg | | Img_0997.jpg |
| 2006/6/21 18:58 | Img_0998.jpg | | Img_0998.jpg | | Img_0998.jpg | | Img_0998.jpg |
| 2006/6/21 19:24 | Img_0999.jpg | 2006/6/21 | Img_1099.jpg | | Img_0999.jpg | | Img_1099.jpg |
| 2006/6/21 20:28 | Img_1000.jpg | | Img_1000.jpg | 2006/6/6 | Img_1000.jpg | | Img_1000.jpg |
| 2006/6/22 11:02 | Img_1001.jpg | | Img_1001.jpg | | Img_1001.jpg | 2006 | Img_1001.jpg |
| 2006/6/22 11:35 | Img_1002.jpg | | Img_1002.jpg | | Img_1002.jpg | | Img_1002.jpg |
| 2006/6/22 11:38 | Img_1003.jpg | | Img_1003.jpg | | Img_1003.jpg | | Img_1003.jpg |
| 2006/6/22 11:40 | Img_1004.jpg | 2006/6/22 | Img_1004.jpg | | Img_1004.jpg | | Img_1004.jpg |
| 2006/6/22 14:15 | Img_1005.jpg | | Img_1005.jpg | | Img_1005.jpg | | Img_1005.jpg |
| . | . | | . | | . | | . |
| . | . | | . | | . | | . |
| 2006/6/28 9:44 | . | | . | | . | | . |
| . | . | 2006/6/28 | . | | . | | . |
| . | . | | . | | . | | . |
| 2006/7/4 11:32 | . | | . | | . | | . |
| . | . | 2006/7/4 | . | | . | | . |
| . | . | | . | 2006/6/7 | . | | . |
| 2006/7/7 17:22 | . | 2006/7/17 | . | | . | | . |
| . | . | . | . | . | . | | . |
| . | . | . | . | . | . | | . |
| . | . | . | . | . | . | | . |
| . | . | . | . | . | . | 2007 | . |
| . | . | . | . | . | . | | . |
| . | . | . | . | . | . | 2008 | . |
| . | . | . | . | . | . | | . |
| . | . | . | . | . | . | 2009 | . |
| . | . | . | . | . | . | | . |
| . | . | . | . | . | . | 2010 | . |

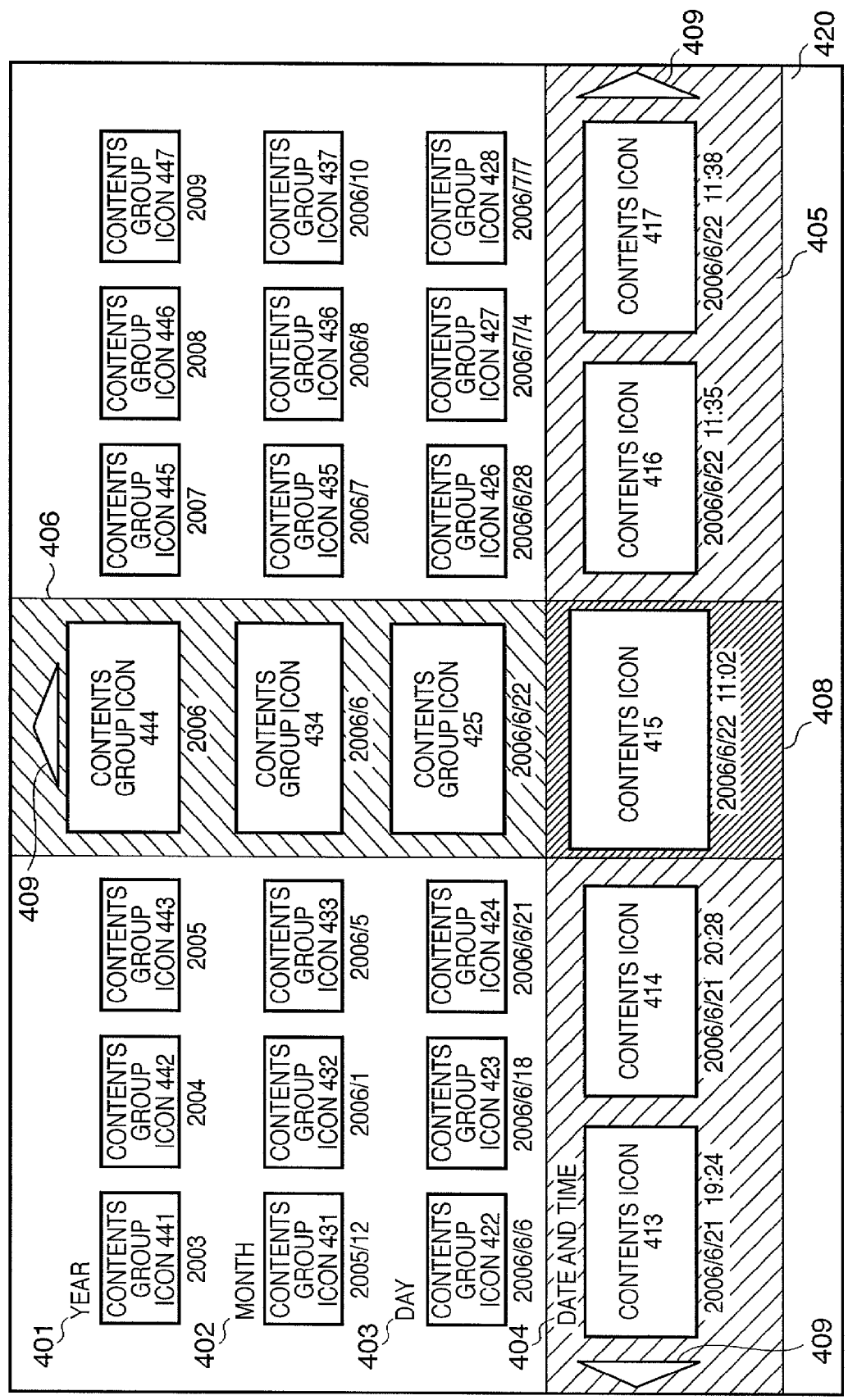

FIG. 26

| CONTENTS ARRAY 404 | | CONTENTS GROUP ARRAY 1 403 | | CONTENTS GROUP ARRAY 2 402 | | CONTENTS GROUP ARRAY 3 401 | |
|---|---|---|---|---|---|---|---|
| DATE AND TIME | CONTENTS | DAY | CONTENTS | MONTH | CONTENTS | YEAR | CONTENTS |
| . | . | . | . | . | . | . | . |
| . | . | . | . | . | . | 2005 | . |
| . | . | . | . | . | . | . | . |
| . | . | . | . | . | . | . | . |
| 2006/5/13 18:57 | . | . | . | 2006/6/5 | . | . | . |
| . | . | 2006/5/31 | . | . | . | . | . |
| . | . | . | . | . | . | . | . |
| 2006/6/6 18:06 | . | . | . | . | . | . | . |
| . | . | 2006/6/6 | . | . | . | . | . |
| . | . | . | . | . | . | . | . |
| 2006/6/18 9:13 | . | . | . | . | . | . | . |
| . | . | . | . | . | . | . | . |
| . | . | 2006/6/18 | . | . | . | . | . |
| 2006/6/18 15:11 | Img_0997.jpg | | Img_0997.jpg | | Img_0997.jpg | | Img_0997.jpg |
| 2006/6/21 18:58 | Img_0998.jpg | | Img_0998.jpg | | Img_0998.jpg | | Img_0998.jpg |
| 2006/6/21 19:24 | Img_0999.jpg | 2006/6/21 | Img_1099.jpg | | Img_0999.jpg | | Img_1099.jpg |
| 2006/6/21 20:28 | Img_1000.jpg | | Img_1000.jpg | | Img_1000.jpg | | Img_1000.jpg |
| 2006/6/22 11:02 | Img_1001.jpg | | Img_1001.jpg | 2006/6/6 | Img_1001.jpg | 2006 | Img_1001.jpg |
| 2006/6/22 11:35 | Img_1002.jpg | | Img_1002.jpg | | Img_1002.jpg | | Img_1002.jpg |
| 2006/6/22 11:38 | Img_1003.jpg | | Img_1003.jpg | | Img_1003.jpg | | Img_1003.jpg |
| 2006/6/22 11:40 | Img_1004.jpg | 2006/6/22 | Img_1004.jpg | | Img_1004.jpg | | Img_1004.jpg |
| 2006/6/22 14:15 | Img_1005.jpg | | Img_1005.jpg | | Img_1005.jpg | | Img_1005.jpg |
| . | . | . | . | . | . | . | . |
| . | . | . | . | . | . | . | . |
| 2006/6/28 9:44 | . | . | . | . | . | . | . |
| . | . | 2006/6/28 | . | . | . | . | . |
| . | . | . | . | . | . | . | . |
| 2006/7/4 11:32 | . | . | . | . | . | . | . |
| . | . | 2006/7/4 | . | . | . | . | . |
| . | . | . | . | 2006/6/7 | . | . | . |
| 2006/7/7 17:22 | . | . | . | . | . | . | . |
| . | . | 2006/7/17 | . | . | . | . | . |
| . | . | . | . | . | . | . | . |
| . | . | . | . | . | . | . | . |
| . | . | . | . | . | . | . | . |
| . | . | . | . | . | . | 2007 | . |
| . | . | . | . | . | . | . | . |
| . | . | . | . | . | . | 2008 | . |
| . | . | . | . | . | . | . | . |
| . | . | . | . | . | . | 2009 | . |
| . | . | . | . | . | . | . | . |
| . | . | . | . | . | . | 2010 | . |

520

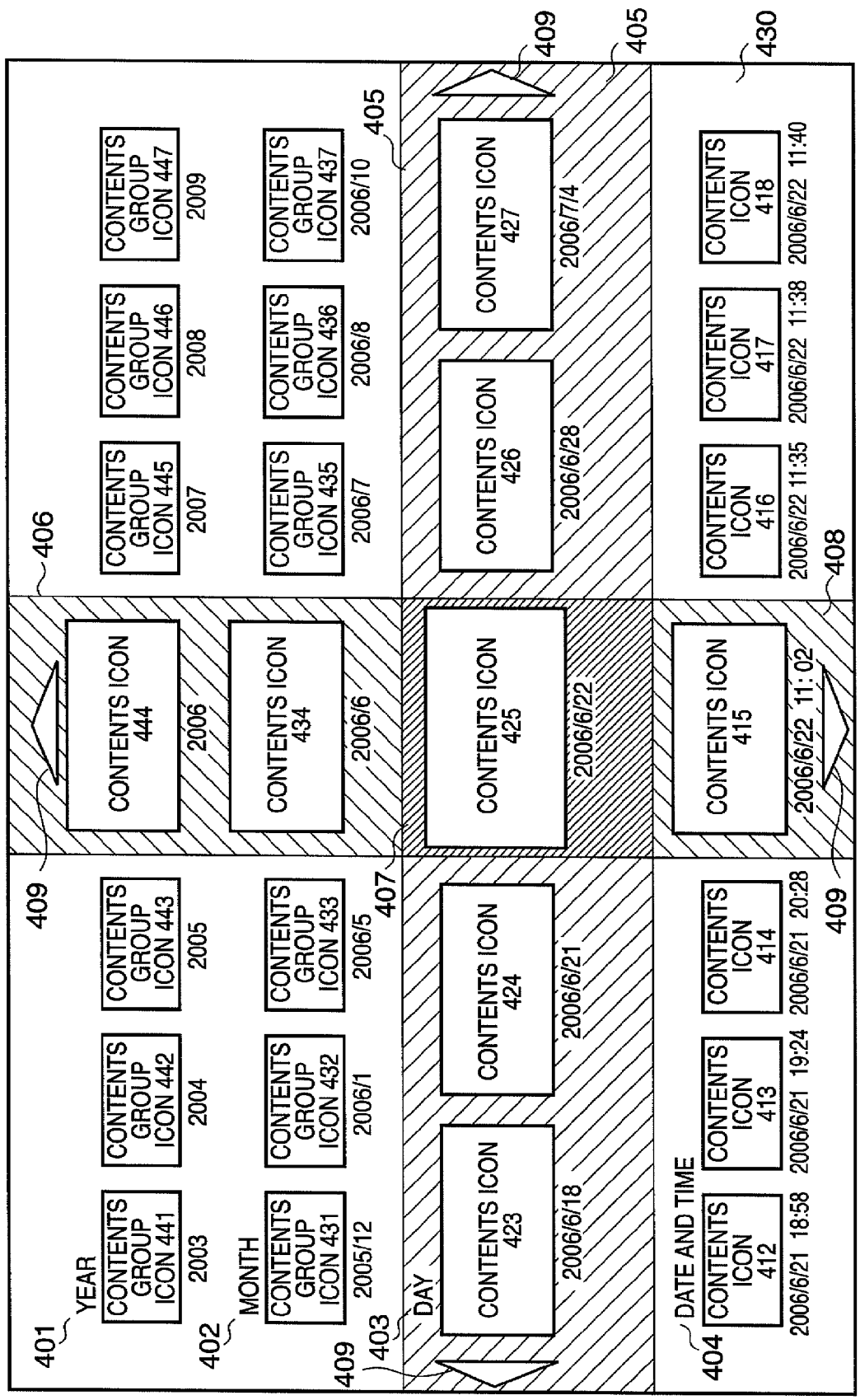

FIG. 28

| CONTENTS ARRAY 404 | | CONTENTS GROUP ARRAY 1 403 | | CONTENTS GROUP ARRAY 2 402 | | CONTENTS GROUP ARRAY 3 401 | |
|---|---|---|---|---|---|---|---|
| DATE AND TIME | CONTENTS | DAY | CONTENTS | MONTH | CONTENTS | YEAR | CONTENTS |
| . | . | . | . | . | . | . | . |
| . | . | . | . | . | . | 2005 | . |
| . | . | . | . | . | . | . | . |
| . | . | . | . | . | . | . | . |
| . | . | . | . | . | . | . | . |
| 2006/5/13 18:57 | . | . | . | 2006/6/5 | . | . | . |
| . | . | 2006/5/31 | . | . | . | . | . |
| . | . | . | . | . | . | . | . |
| 2006/6/6 18:06 | . | . | . | . | . | . | . |
| . | . | 2006/6/6 | . | . | . | . | . |
| . | . | . | . | . | . | . | . |
| 2006/6/18 9:13 | . | . | . | . | . | . | . |
| . | . | . | . | . | . | . | . |
| . | . | 2006/6/18 | . | . | . | . | . |
| . | . | . | . | . | . | . | . |
| 2006/6/18 15:11 | Img_0997.jpg | | Img_0997.jpg | | Img_0997.jpg | | Img_0997.jpg |
| 2006/6/21 18:58 | Img_0998.jpg | | Img_0998.jpg | | Img_0998.jpg | | Img_0998.jpg |
| 2006/6/21 19:24 | Img_0999.jpg | 2006/6/6/21 | Img_1099.jpg | | Img_0999.jpg | | Img_1099.jpg |
| 2006/6/21 20:28 | Img_1000.jpg | | Img_1000.jpg | | Img_1000.jpg | | Img_1000.jpg |
| 2006/6/22 11:02 | Img_1001.jpg | | Img_1001.jpg | 2006/6/6 | Img_1001.jpg | 2006 | Img_1001.jpg |
| 2006/6/22 11:35 | Img_1002.jpg | | Img_1002.jpg | | Img_1002.jpg | | Img_1002.jpg |
| 2006/6/22 11:38 | Img_1003.jpg | | Img_1003.jpg | | Img_1003.jpg | | Img_1003.jpg |
| 2006/6/22 11:40 | Img_1004.jpg | 2006/6/22 | Img_1004.jpg | | Img_1004.jpg | | Img_1004.jpg |
| 2006/6/22 14:15 | Img_1005.jpg | | Img_1005.jpg | | Img_1005.jpg | | Img_1005.jpg |
| . | . | . | . | . | . | . | . |
| . | . | . | . | . | . | . | . |
| 2006/6/28 9:44 | Img_2000.jpg | | Img_2000.jpg | | Img_2000.jpg | | Img_2000.jpg |
| . | . | 2006/6/28 | . | . | . | . | . |
| . | . | . | . | . | . | . | . |
| 2006/7/4 11:32 | . | . | . | . | . | . | . |
| . | . | 2006/7/4 | . | . | . | . | . |
| . | . | . | . | 2006/6/7 | . | . | . |
| 2006/7/7 17:22 | . | 2006/7/17 | . | . | . | . | . |
| . | . | . | . | . | . | . | . |
| . | . | . | . | . | . | . | . |
| . | . | . | . | . | . | . | . |
| . | . | . | . | . | . | 2007 | . |
| . | . | . | . | . | . | . | . |
| . | . | . | . | . | . | 2008 | . |
| . | . | . | . | . | . | . | . |
| . | . | . | . | . | . | 2009 | . |
| . | . | . | . | . | . | . | . |
| . | . | . | . | . | . | 2010 | . |
| . | . | . | . | . | . | . | . |

| CONTENTS NAME | DATE | PERSON | LOCATION | EVENT | CONTENTS FILE NAME | THUMBNAIL FILE NAME |
|---|---|---|---|---|---|---|
| "photo1" | "2006-01-15" | "Taro" | = | = | | = |
| "photo2" | "2006-01-10" | "Yoshi" | = | = | = | = |
| "photo3" | "2006-02-23" | "Hanako" | = | "Golf" | = | = |
| "photo4" | "2006-03-18" | "Yoshi" | = | = | = | = |
| "photo5" | "2006-05-03" | "Hanako" | = | = | = | = |
| ... | ... | ... | ... | ... | ... | ... |
| "video1" | "2006-01-20" | "Taro" | = | = | = | = |
| "video2" | "2006-01-11" | "Hanako" | = | "Travel" | = | = |
| "video3" | "2006-02-10" | "Yoshi" | = | = | = | = |
| "video4" | "2006-04-01" | "Hanako" | = | = | = | = |
| "video5" | "2006-04-17" | "Taro" | "Yokohama" | = | = | = |
| ... | ... | ... | ... | ... | ... | ... |

| MOVING IMAGE FILE NAME | CONTENTS NAME | POSITION | THUMBNAIL FILE NAME |
|---|---|---|---|
| | " | " " | " |
| " | " | " " | " " |
| " | " | " " | " " |
| " | " | " " | " " |
| | " | " " | " " |
| " | " | " " | " " |
| " | " | " " | " " |
| " | " | " " | " " |
| " | " | " " | " " |
| " | " | " " | " " |
| " | " | " " | " " |
| " | " | " " | " " |
| " | " | " " | " " |
| " | " | " " | " " |
| " | " | " " | " " |
| ⋮ | ⋮ | ⋮ | ⋮ |

5300

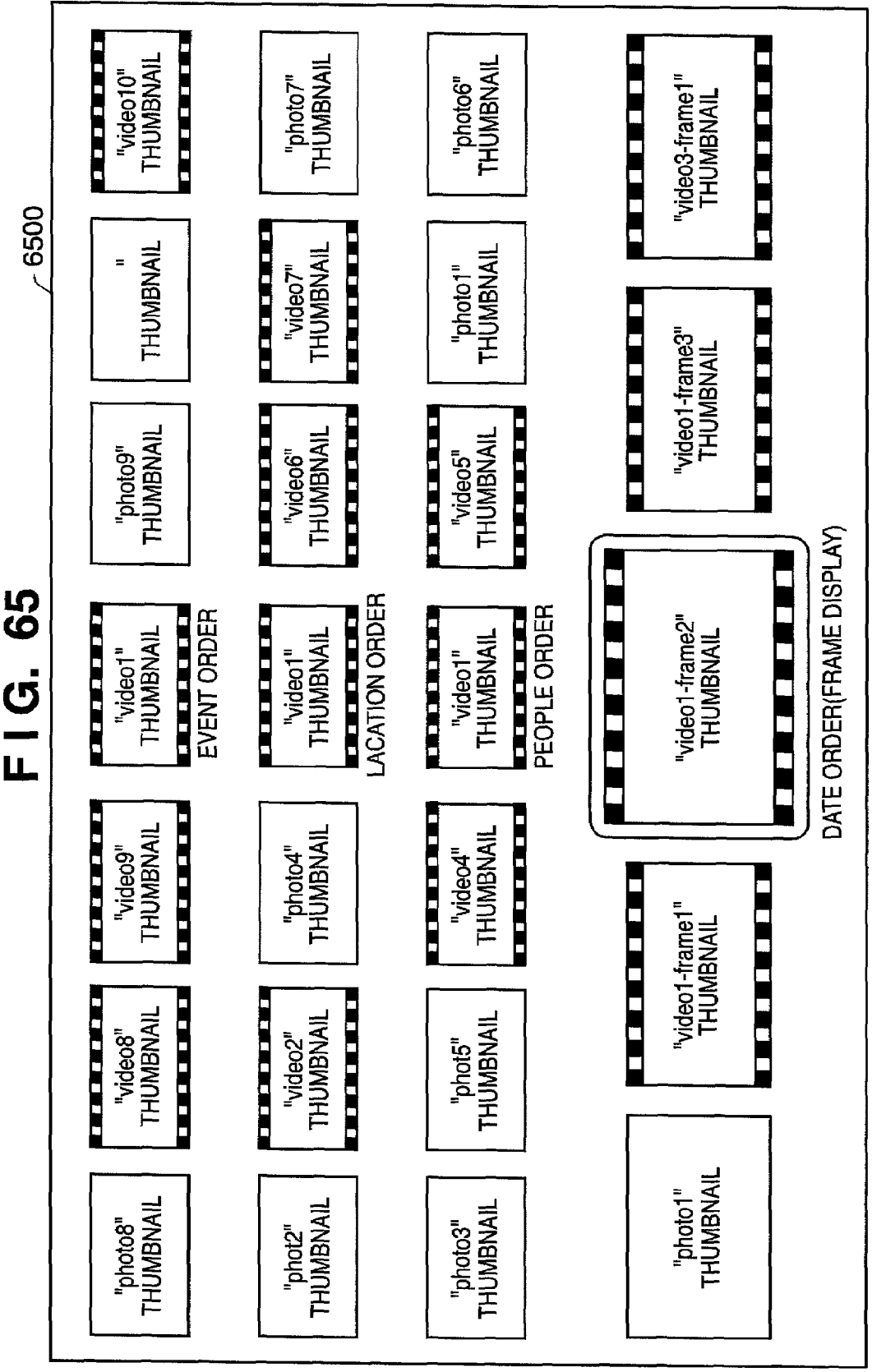

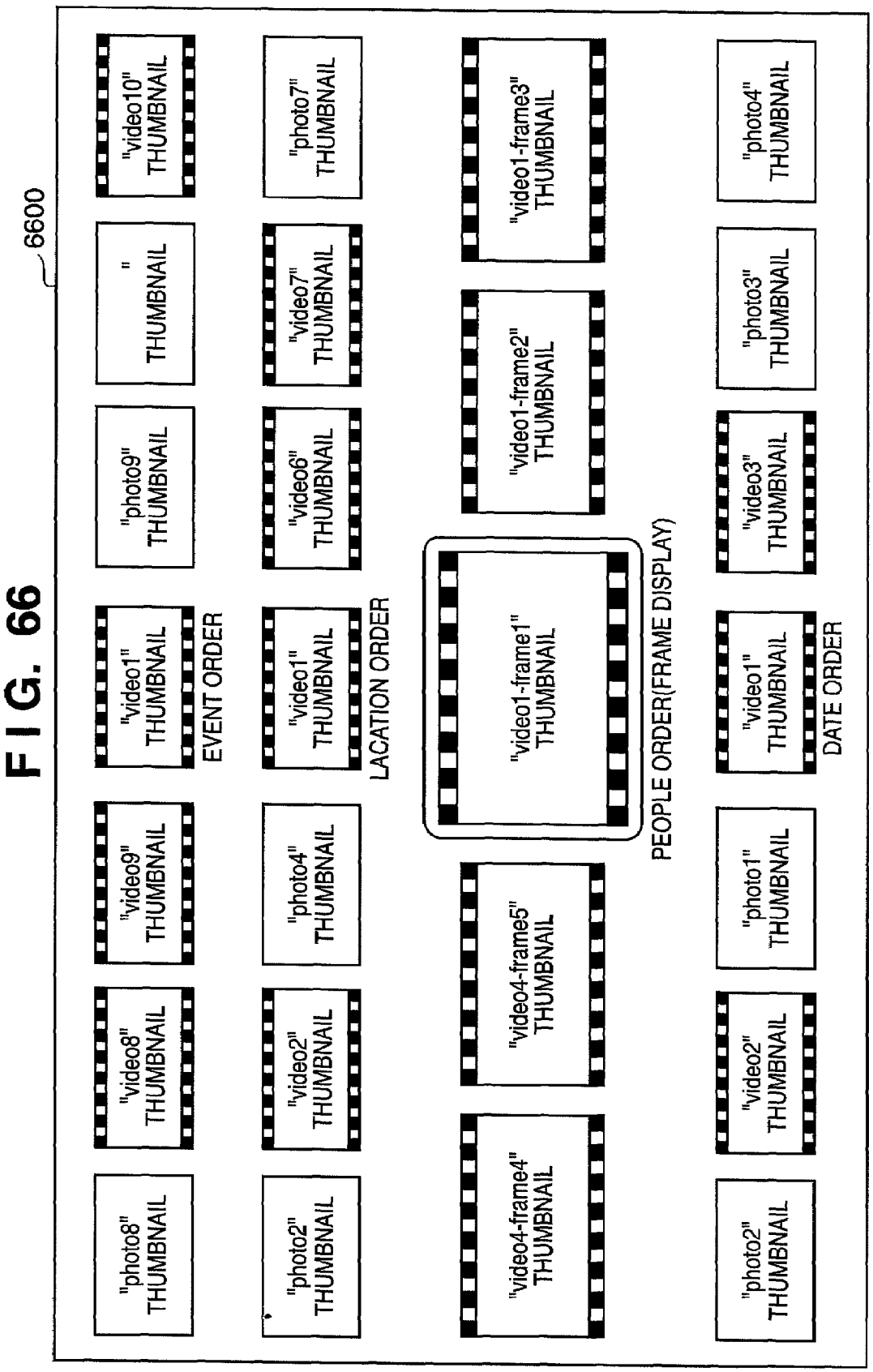

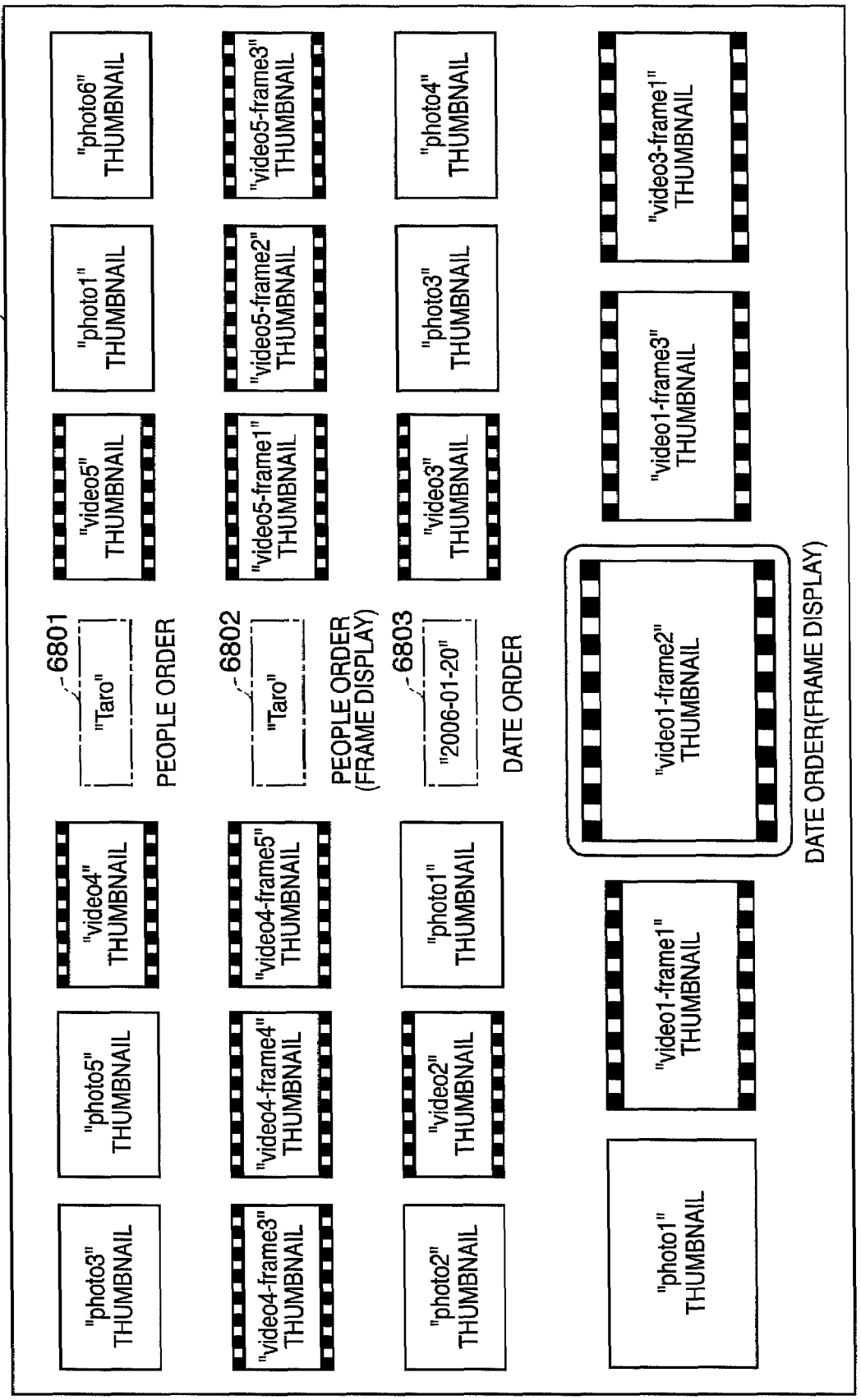

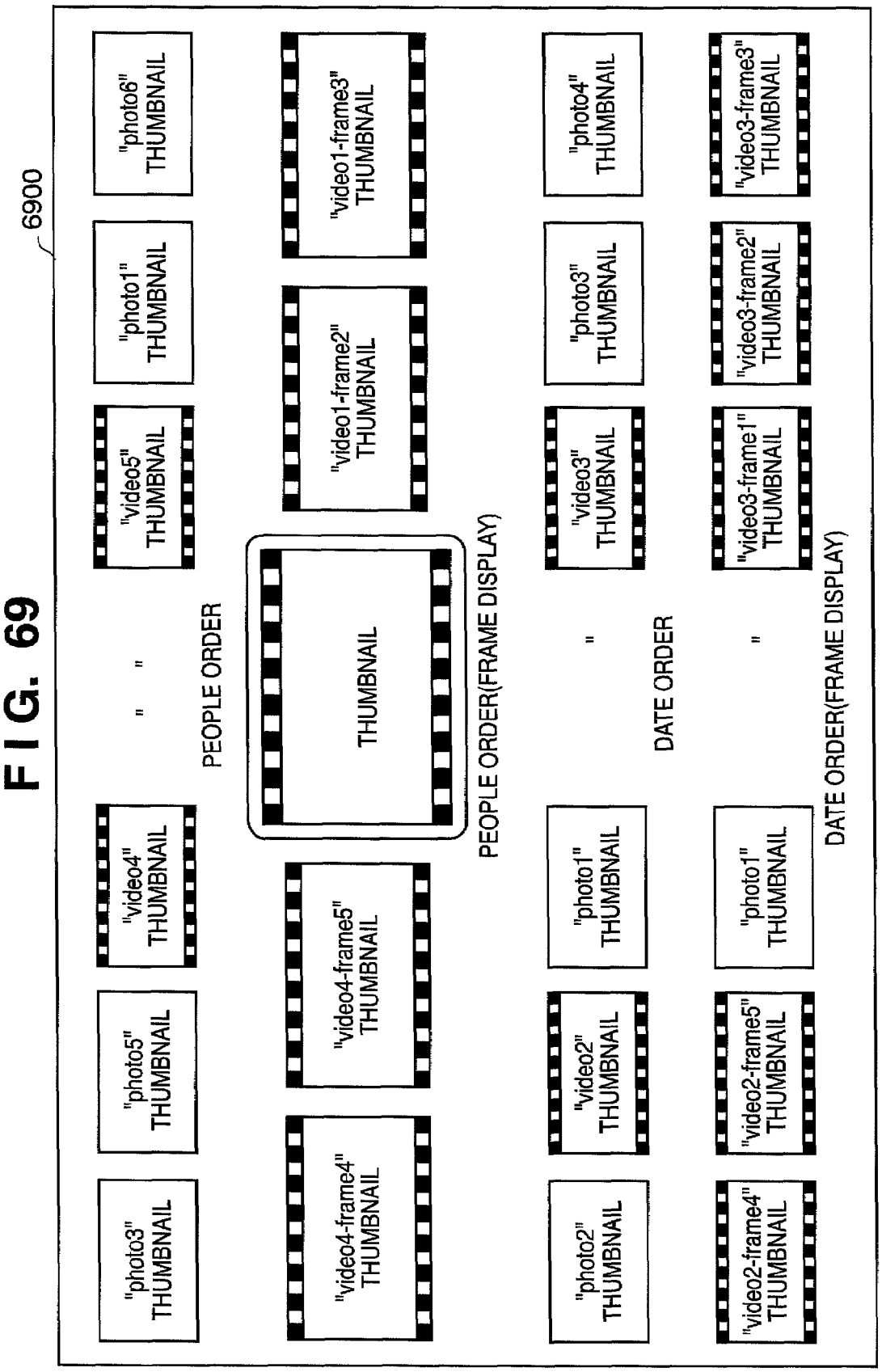

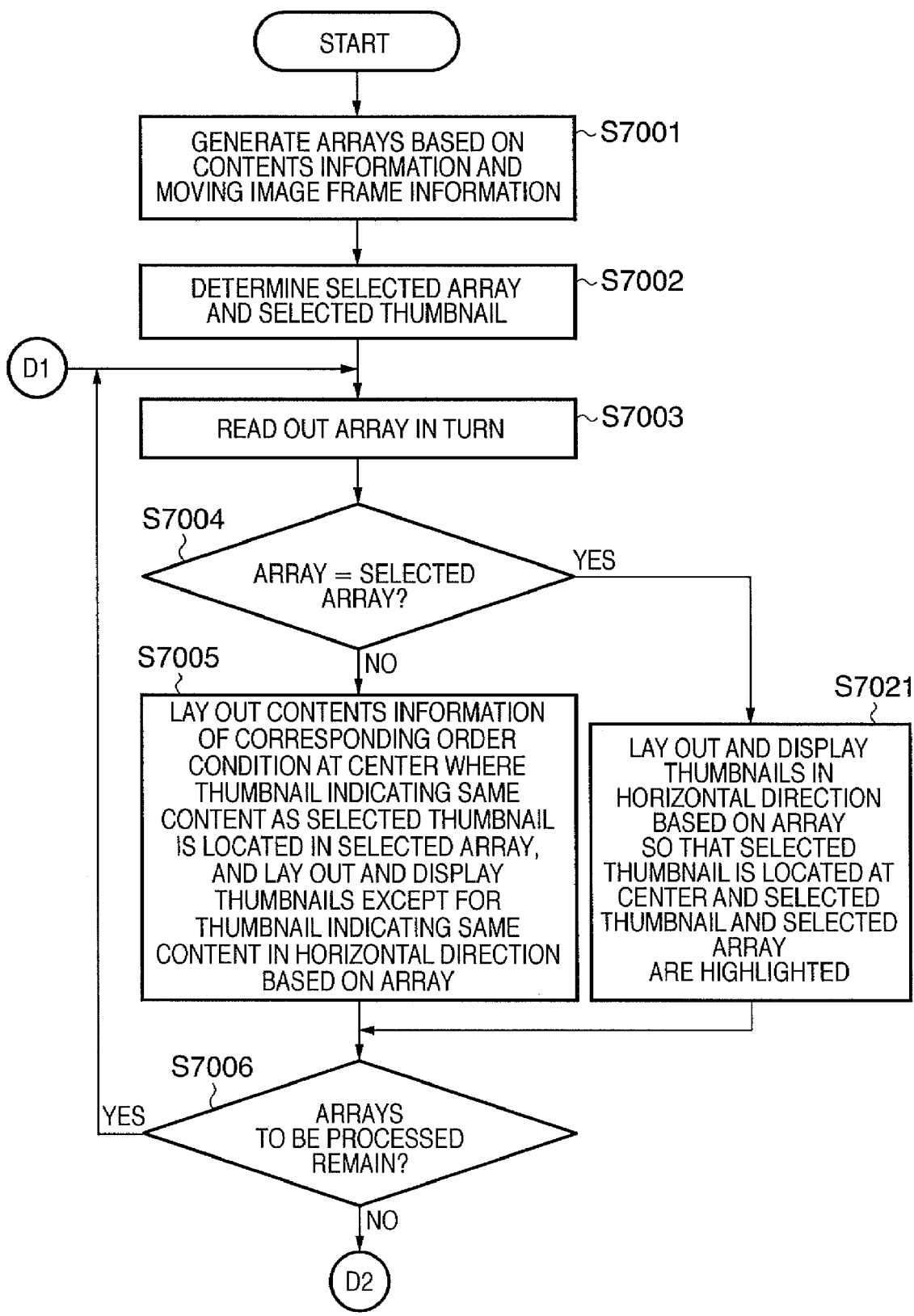

F I G. 71
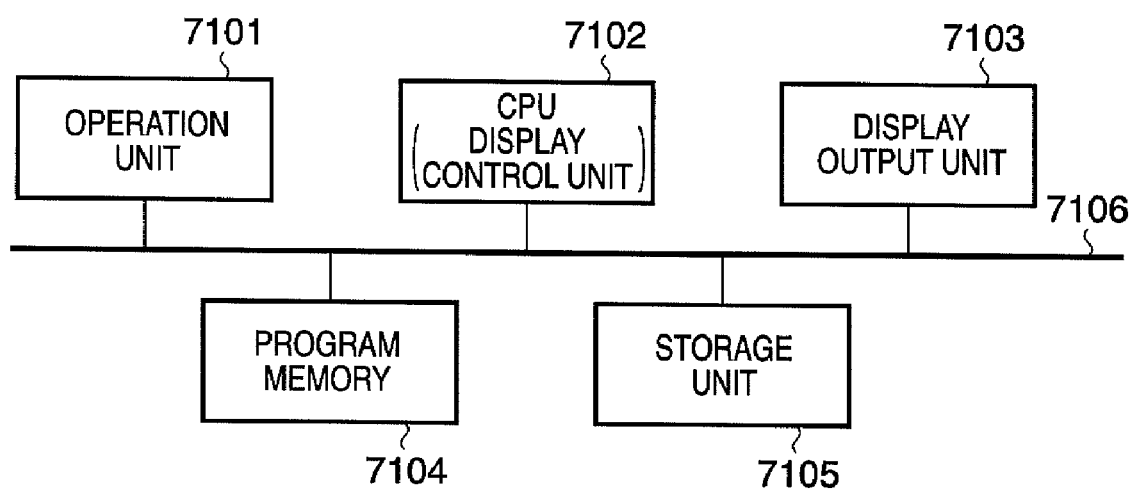

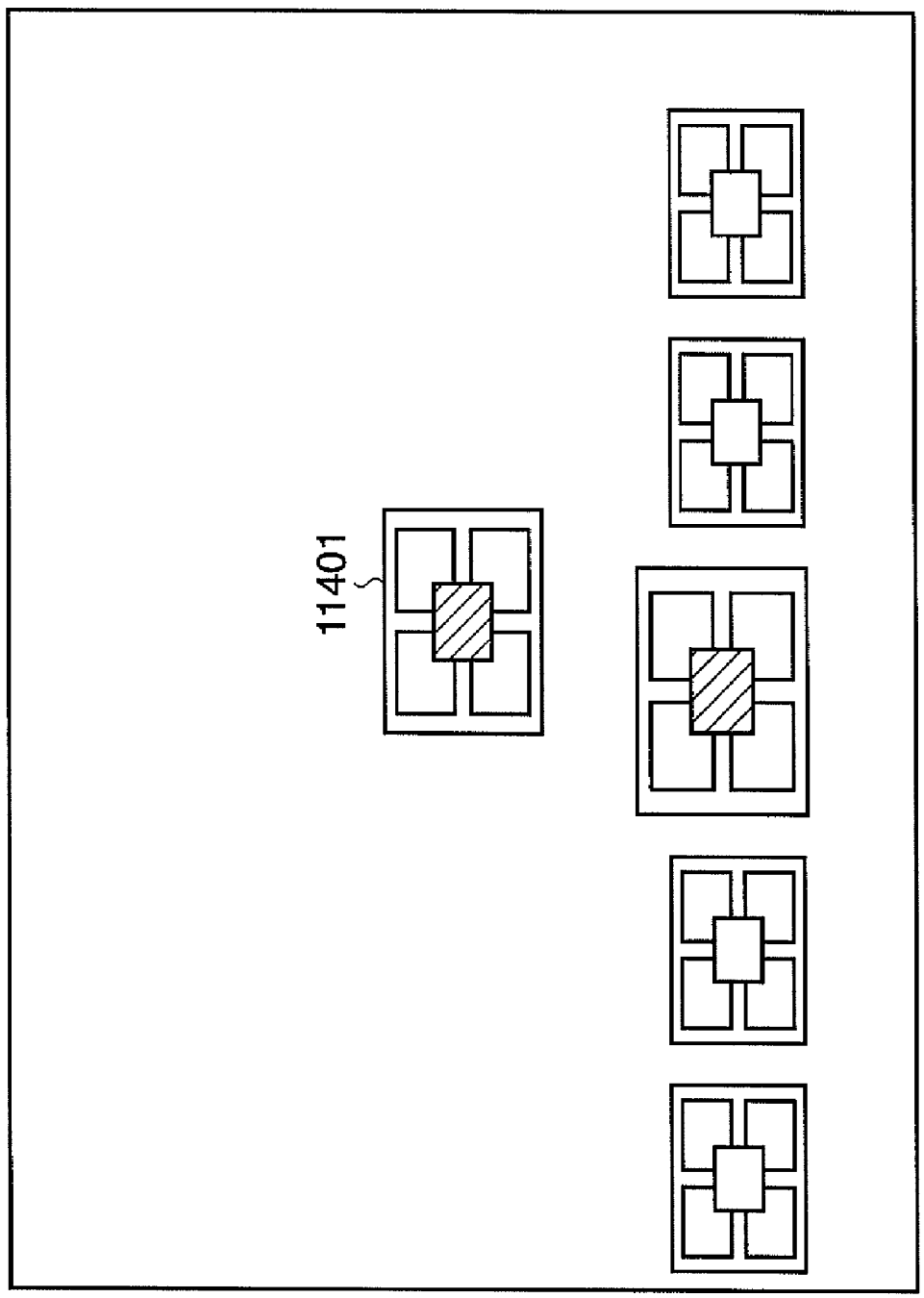
F I G. 114

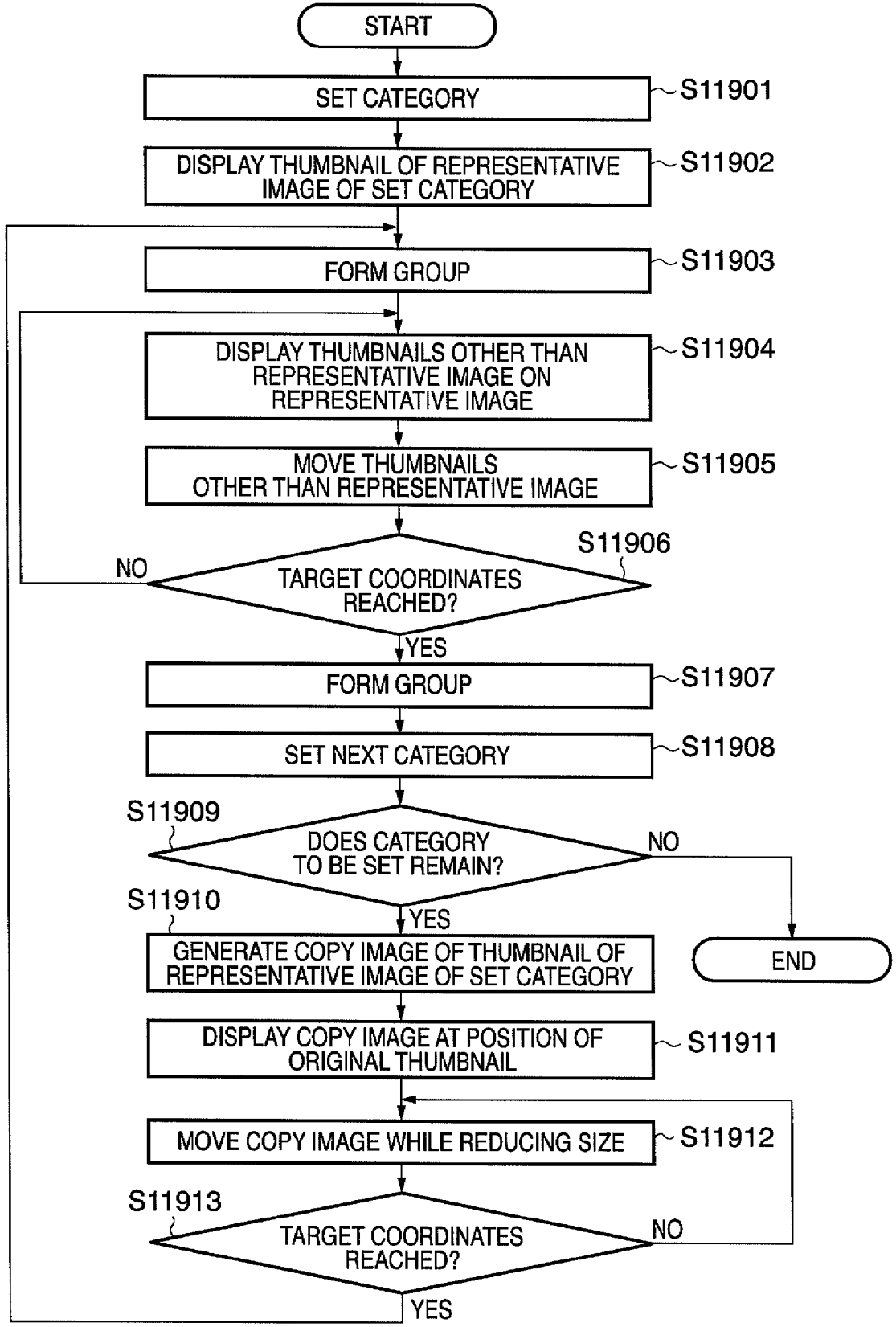

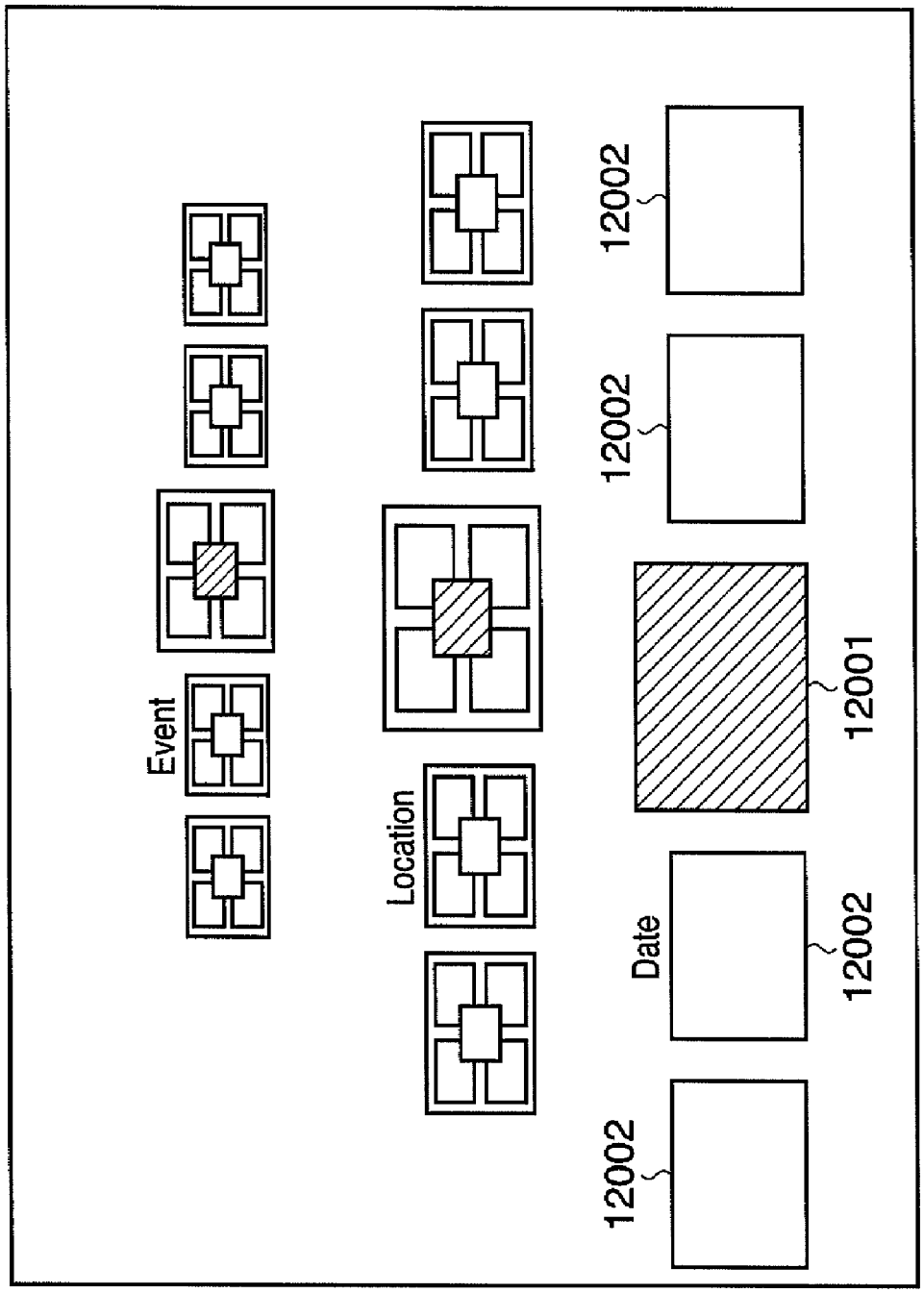

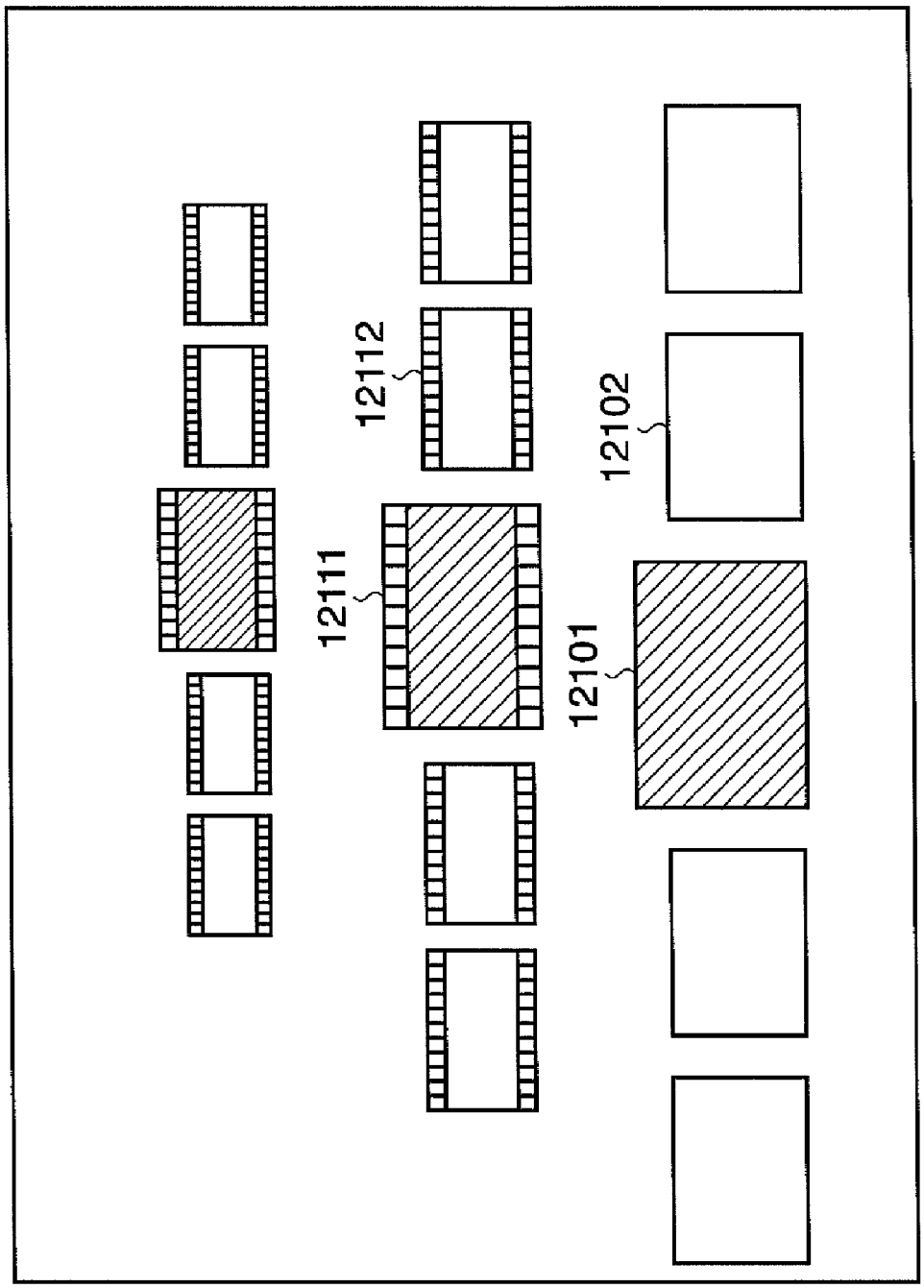

ature is DISPLAY IMAGE CONTROL APPARATUS

BACKGROUND OF THE INVENTION

1. Field of the Invention

The present invention relates to a technique for generating a display window using icon arrays of a plurality of contents.

2. Description of the Related Art

In recent years, digital contents can be searched and browsed on a television screen. Upon displaying an operation window on the television screen, higher visibility and easier operability are required than that on a personal computer (PC) or the like.

Hence, the Windows® Media Center (WMC) simplifies a conventional file access function, and allows the user to access contents by tracing the hierarchical structure using arrow keys of a remote controller. Also, the XrossMediaBar® (XMB®) lays out media icons and contents icons in a cross pattern to allow intuitive contents selection.

The aforementioned WMC and XMB improve the access method to a desired content, but they do not allow the user to recognize contents associated with the selected content. Hence, the user is forced to operate thinking of the best search method after the next content to be browsed occurs to him or her.

The XMB allows the user to access a content included in a different hierarchy group by changing the instruction method of the remote controller. However, since the user must press different keys, he or she must pay attention to the operation, and a key used to designate the depth direction is required in addition to the arrow keys, resulting in a complicated key layout of the remote controller. Furthermore, upon expressing another hierarchy, a display failure occurs.

SUMMARY OF THE INVENTION

An embodiment of the present invention is directed to a display image control apparatus that allows the user not only to easily and intuitively reach a desired content but also to easily access related contents.

Another embodiment of the present invention is directed to a display image control apparatus that improves the operability until contents access, and allows the user to easily access a particular content while recognizing contents that exist near the desired content as a whole by flexibly expressing hierarchies.

According to one aspect of the present invention, there is provided a display image control apparatus comprising: an object array generation unit configured to generate a plurality of object arrays in which a plurality of objects are sorted under a plurality of order conditions; and a display image generation unit configured to generate a display image by sorting the objects in an order for each object array to line up in a first direction for each of the plurality of object arrays, selecting one object of a first object array of the plurality of object arrays as a reference object, and sorting the objects for each of the plurality of object arrays so that the reference object and objects corresponding to the reference object included in the object arrays other than the first object array line up in a second direction.

According to another aspect of the present invention, there is provided a display method for a display image control apparatus, comprising: generating a plurality of object arrays in which a plurality of objects are sorted under a plurality of order conditions; and generating a display image by sorting the objects in an order for each object array to line up in a first direction for each of the plurality of object arrays, selecting one object of a first object array of the plurality of object arrays as a reference object, and sorting the objects for each of the plurality of object arrays so that the reference object and objects corresponding to the reference object included in the object arrays other than the first object array line up in a second direction.

Further features of the present invention will become apparent from the following description of exemplary embodiments with reference to the attached drawings.

BRIEF DESCRIPTION OF THE DRAWINGS

FIG. 1 is a view showing an example of the arrangement of a contents display apparatus system according to the first embodiment;

FIG. 4 shows an example of data sets of contents to be handled by the contents display apparatus according to the first embodiment;

FIG. 5 shows an example of contents arrays generated from the data sets of the contents shown in FIG. 4;

FIG. 8 is a flowchart showing an example of the processing of the contents display apparatus 1 based on operation inputs according to the first embodiment;

FIG. 9 shows data sets of contents after pressing of a right button 304 according to the first embodiment;

FIG. 10 shows an example of contents arrays generated from the data sets of the contents shown in FIG. 9;

FIG. 13 shows an example of a display window when the order condition displayed on the display apparatus 2 is changed in the first modification of the first embodiment;

FIG. 14 shows an example of a display window displayed on the display apparatus 2 in the second modification of the first embodiment;

FIG. 15 shows an example of a display window displayed on the display apparatus 2 in the third modification of the first embodiment;

FIG. 16 shows an example of a display window displayed on the display apparatus 2 in the fourth modification of the first embodiment;

FIG. 17 shows an example of a display window after filtering displayed on the display apparatus 2 in the fifth modification of the first embodiment;

FIG. 18 shows a contents array determined upon pressing of a filter button 307;

FIG. 19 shows an example of a display window displayed on a display apparatus 2 in a contents display apparatus system according to the second embodiment;

FIG. 20 shows an example of data sets of contents to be handled by a contents display apparatus according to the second embodiment;

FIG. 21 shows an example of a contents array and contents group arrays generated from the data sets of the contents shown in FIG. 20;

FIG. 25 shows a display window displayed upon pressing the right button 304 another once in the state of a display window 410 shown in FIG. 24;

FIG. 26 shows an example of a contents icon array and contents group icon arrays upon pressing the right button 304 twice;

FIG. 27 shows an example of a display window 430 displayed upon pressing of an up button 301 from the state of a display window 420 shown in FIG. 25;

FIG. 28 shows an example of a contents array, contents group arrays, and reference content upon pressing of the right button 304 once from the display state shown in FIG. 27;

FIG. 52 shows an example of contents information according to the fourth embodiment;

FIG. 53 shows an example of moving image frame information according to the fourth embodiment;

FIG. 65 shows an example of a user interface window in the first modification of the fourth embodiment;

FIG. 66 shows an example of a user interface window after a user interface window 6500 is vertically shifted;

FIG. 68 shows an example of a user interface window in the second modification of the fourth embodiment;

FIG. 69 shows an example of a user interface window after a user interface window 6800 is vertically shifted;

FIGS. 70A and 70B are flowcharts showing the processing in the second modification of the fourth embodiment;

FIG. 71 is a block diagram showing an example of the hardware arrangement of a contents display apparatus according to the fifth embodiment;

FIG. 114 is a view for explaining a state wherein the window configurations of the second modification of fifth embodiment are sequentially displayed using dynamic animations;

FIG. 119 is a flowchart showing the window display processing in the second modification of the fifth embodiment;

FIG. 120 shows an example of the configurations of contents display windows in the third modification of the fifth embodiment; and FIG. 121 shows an example of the configurations of contents display windows in the fourth modification of the fifth embodiment.

DESCRIPTION OF THE EMBODIMENTS

Figure 2:
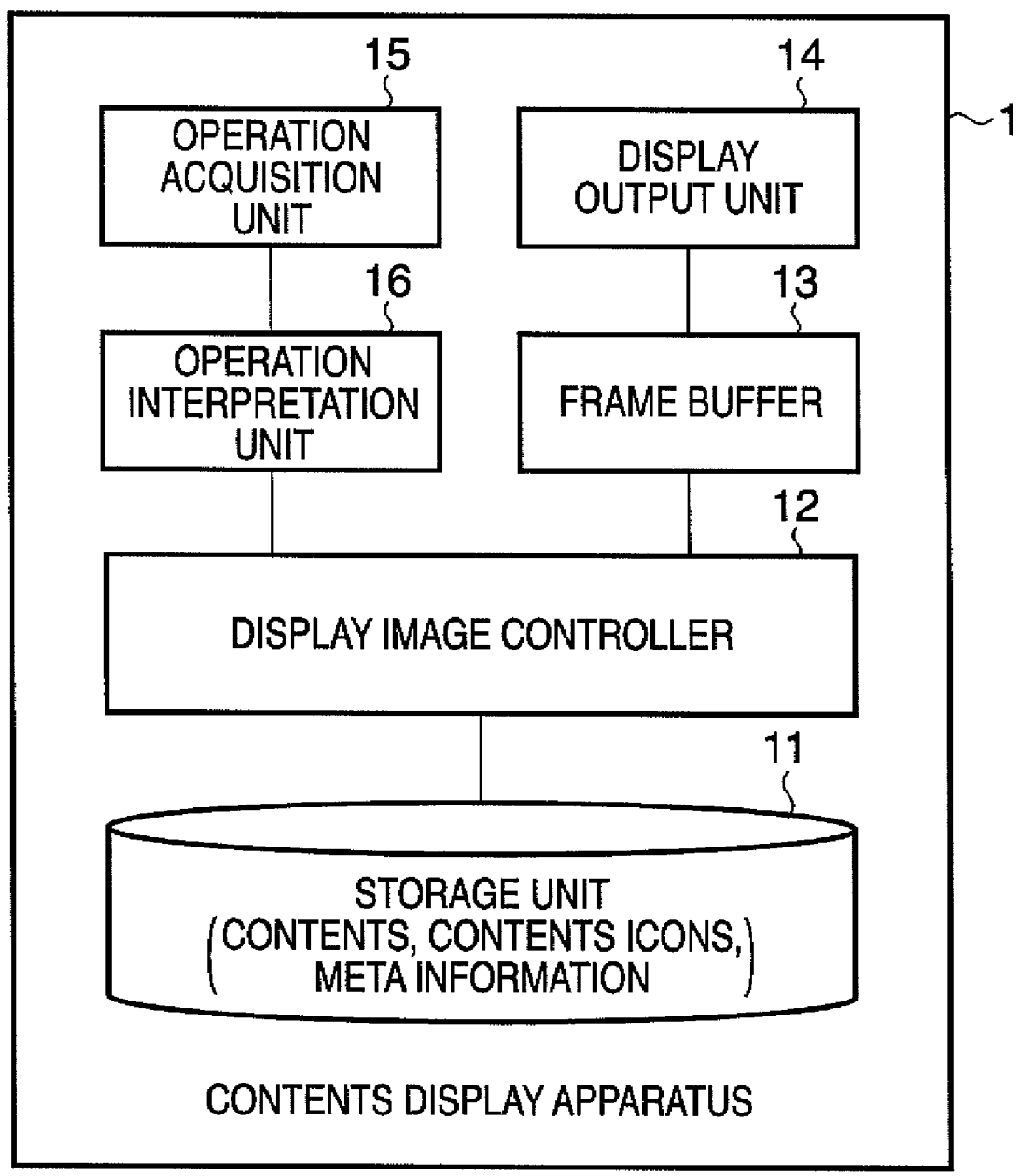
FIG. 2 is a block diagram showing an example of the arrangement of a contents display apparatus 1 shown in FIG. 1.

The best mode of carrying out the invention will be described in detail hereinafter with reference to the accompanying drawings.

First Embodiment

FIG. 1 shows an example of the arrangement of a contents display apparatus system according to the first embodiment. Referring to FIG. 1, reference numeral 1 denotes a contents display apparatus according to the present invention. Reference numeral 2 denotes a display apparatus represented by a television monitor, which displays a display image output from the contents display apparatus 1. Reference numeral 3 denotes an operation input apparatus represented by a remote controller, which is used by the user to operate the contents display apparatus 1.

Note that the operation input apparatus 3 and contents display apparatus 1 communicate with each other using short-distance wireless communications such as Bluetooth®, infrared communications, and the like.

FIG. 2 shows an example of the arrangement of the contents display apparatus 1 shown in FIG. 1. Referring to FIG. 2, reference numeral 11 denotes a storage unit which stores contents, contents icons, and meta information attached to contents. Note that the storage unit 11 will be explained as an internal component of the contents display apparatus 1 for the sake of convenience, but may be configured as an external storage device as long as information can be acquired via a communication line or wireless LAN.

Note that a contents icon is icon data used as display window data indicating a content, and such contents icon is generated and stored in advance for the sake of simplicity in the first embodiment. However, in practice, the icon data generation timing and whether or not the icon data are stored in advance are not particularly limited.

Reference numeral 12 denotes a display image controller, which reads out a stored contents icon from the storage unit 11 in accordance with an operation from the operation input apparatus 3, and generates display image data to be displayed on the display apparatus 2. Reference numeral 13 denotes a frame buffer, which temporarily stores the display image data generated by the display image controller 12. Reference numeral 14 denotes a display output unit, which outputs, to the display apparatus 2, the display image data temporarily stored in the frame buffer 13.

Reference numeral 15 denotes an operation acquisition unit, which receives an operation input signal from the operation input apparatus 3. Reference numeral 16 denotes an operation interpretation unit, which interprets the operation input signal received by the operation acquisition unit 15. The interpretation result of the operation interpretation unit 16 is sent to the display image controller 12. The display image controller 12 generates the display image data according to the interpreted operation input.

Figure 3:
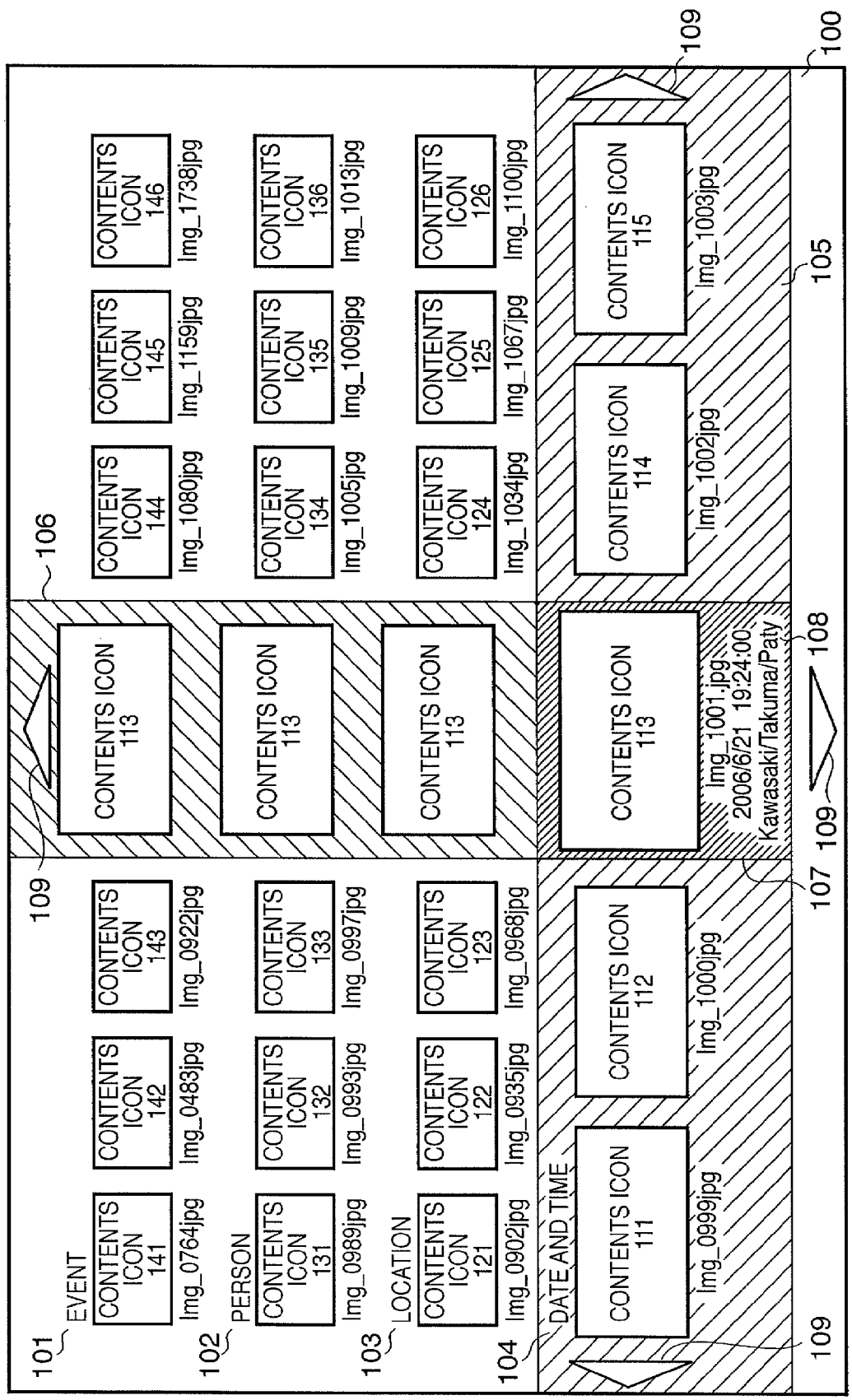
FIG. 3 shows an example of a display window displayed on a display apparatus 2 in the contents display apparatus system according to the first embodiment.

FIG. 3 shows an example of a display window displayed on the display apparatus 2 in the contents display apparatus system according to the first embodiment. Referring to FIG. 3, reference numeral 100 denotes a display window; and 111 to 146, contents icons represented by thumbnails that display the substances of the contents in a reduced scale. Reference numerals 101 to 104 denote order conditions indicating the regularity of contents icon arrays arranged in the horizontal direction. In the example shown in FIG. 3, contents icons are sorted based on "event" 101, "person" 102, "location" 103, and "date and time" 104 as the order conditions.

Reference numeral 105 denotes a highlighting indicating a focused icon array among a plurality of contents icon arrays which are sorted based on the aforementioned order conditions. Within the area of this highlighting, contents icons arranged in the horizontal direction can be slid one by one.

As the highlighting method, icons larger than contents icons arranged in other contents icon arrays may be displayed. That is, the method is not particularly limited as long as the outer appearance of icons in the highlighting area can be distinguished from that of other contents icon arrays.

Reference numeral 106 denotes a highlighting which indicates that contents icon indicating arbitrary contents are arranged on the vertical axis. Note that the highlighting method is not particularly limited as long as the outer appearance of icons in this area can be distinguished from that of other contents icons, as in the highlighting 105 of the contents icon array.

Reference numeral 107 denotes a highlighting of a focused contents icon, and its method is not particularly limited as in the highlighting 105 of the contents icons array and the highlighting 106 of the contents icons.

Note that contents icons 113 included in the highlighted contents icon arrays use the same contents icon number for the sake of convenience, but they may use different contents icon data as long as these contents icons indicate identical contents.

Reference numeral 108 denotes a meta information display indicating meta information appended to a reference content. Reference numeral 109 denotes operation guide signs which are associated with instructions by the operation input apparatus 3 and plainly indicate guides of an operation method. This operation method will be described in more detail later.

Note that FIG. 3 shows file names under respective contents icons. However, these file names are shown for the sake of convenience to explain the correspondence with the contents of data sets to be described later. The presence/absence of practical descriptions of these file names and additional descriptions of other kinds of information are not limited to this.

FIG. 4 shows an example of data sets of contents to be handled by the contents display apparatus according to the first embodiment. In the example shown in FIG. 4, the meta information appended to contents is classified into items such as a date and time, location, person, event, and the like.

Note that the items are not limited to those described above, and the data sets may include contents storage location information and associated contents icon information.

As all the contents included in the data sets, JPEG images are described. Alternatively, data of other image formats, moving image data, and PC data represented by document data to be handled as a general personal computer may be used.

Furthermore, as for the data set management method, it is desirable to perform management using a database. However, the present invention is not limited to this, and a management table description method is not particularly limited.

FIG. 5 shows an example of contents arrays generated from the data sets of the contents shown in FIG. 4. Referring to FIG. 5, reference numerals 201 to 204 denote content icon arrays corresponding to the order conditions 101 to 104 shown in FIG. 3. Reference numeral 200 denotes a content indicated by the contents icon 113 indicated by the highlighting 107 in FIG. 3. The content 200 is explicitly illustrated for the sake of convenience.

Note that the contents arrays are parts of arrays obtained by arranging all the contents to be displayed according to given order conditions. Alternatively, contents arrays required for display may be virtually generated as needed using a query in the database.

The processing of the display image controller 12 which reads out required contents icons from the storage unit 11 based on the contents arrays shown in FIG. 5 generated from the data sets shown in FIG. 4, and generates the display window shown in FIG. 3 will be described below with reference to FIG. 6.

Figure 6:
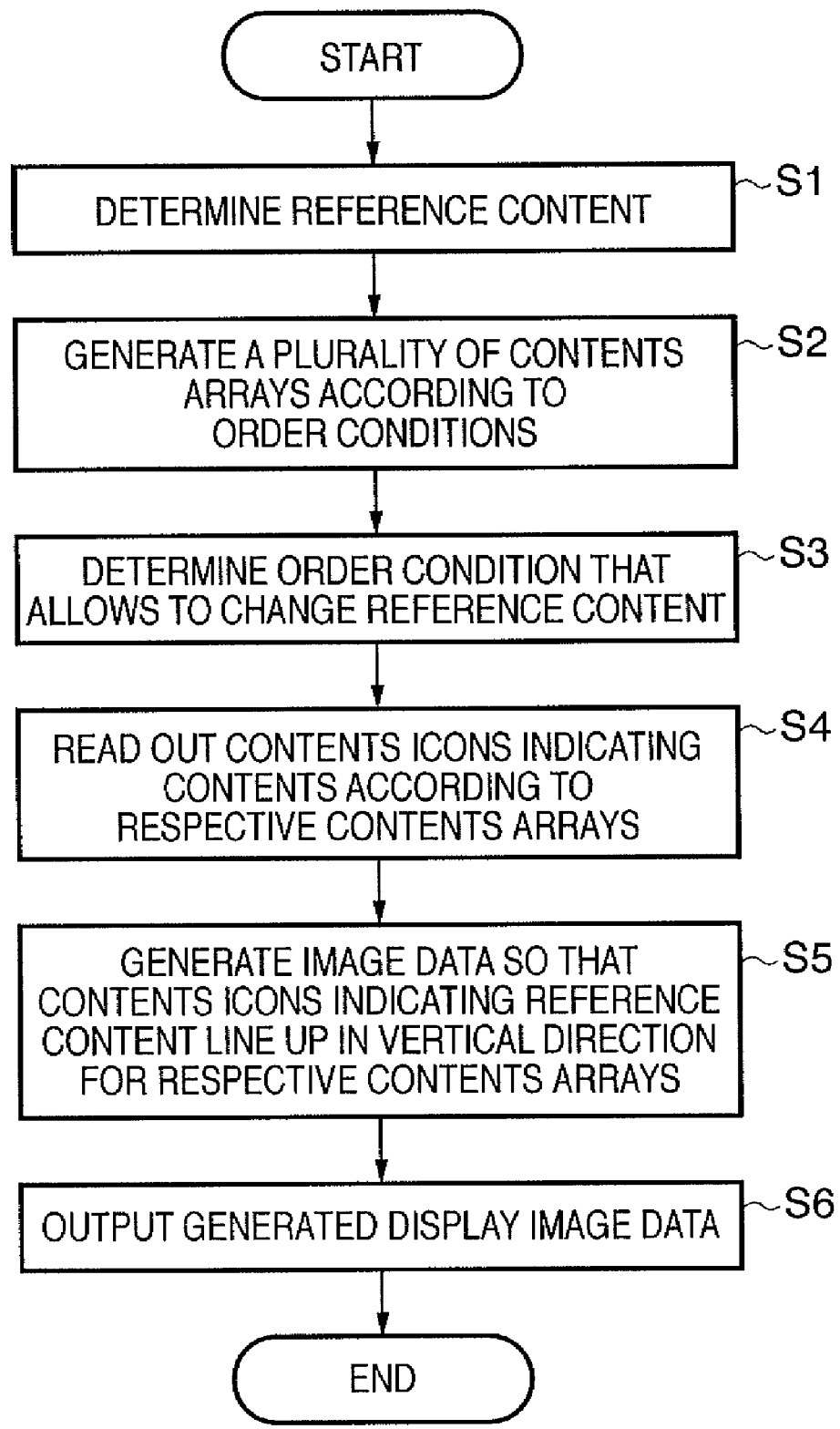
FIG. 6 is a flowchart showing an example of the processing until a display image control unit 12 of the first embodiment generates an initial window.

FIG. 6 is a flowchart showing an example of the processing until the display image controller 12 of the first embodiment generates an initial window. The display image controller 12 determines a reference content, i.e., a content to be focused (S1). The determination method is not particularly limited. For example, various determination methods each for determining, as a reference content, the latest content, a content which was determined as a reference content at the end of the last use, a specific content designated by the user, or the like may be used.

The display image controller 12 then generates contents arrays shown in FIG. 5 according to the order conditions from the data sets shown in FIG. 4 (S2). The controller 12 determines order conditions that allow the user to change the reference content (S3). More specifically, the controller 12 determines the order condition (date and time 104 in the example shown in FIG. 3) of the contents icon array to be focused in the lowermost row shown in FIG. 3.

The display image controller 12 reads out contents icons for respective order conditions from the storage unit 11 in accordance with the respective contents icon arrays (S4). Note that only contents icons required for display are desirably read out in consideration of the reference content. However, the present invention is not limited to this. For example, all contents icons may be read out and cached on a memory irrespective of whether or not they are to be displayed.

The display image controller 12 generates display image data by laying out the readout contents icons for respective order conditions (S5). More specifically, the controller 12 generates display image data by laying out the contents icons in the horizontal direction according to the respective order conditions, so that contents icons indicating the reference content determined in step S1 line up in the vertical direction, as shown in FIG. 3.

Finally, the display image controller 12 stores the generated display image data in the frame buffer 13, and the display output unit 14 displays the display window 100 on the display apparatus 2 (S6).

Figure 7:
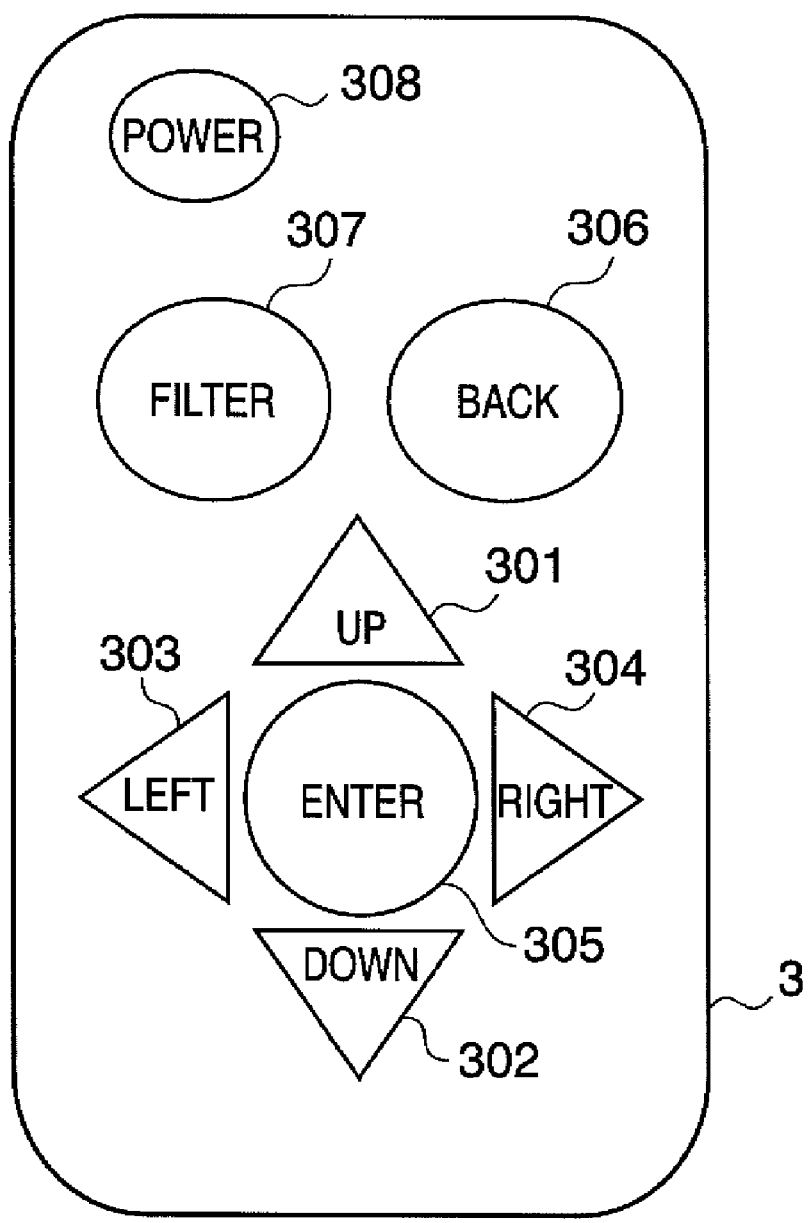
FIG. 7 is a view showing an example of an operation input apparatus 3 used to operate the contents display apparatus 1 according to the first embodiment.

FIG. 7 shows an example of the operation input apparatus 3 that allows the user to operate the contents display apparatus 1 of the first embodiment. Referring to FIG. 7, reference numeral 301 to 304 denote up, down, left, and right buttons to which arrow keys are generally assigned. Reference numeral 305 denotes an enter button; and 306, a back button pressed to return to the display state before pressing of the enter button 305.

Reference numeral 307 denotes a filter button pressed to execute an additional function (a detailed description thereof will not be given); and 308, a power button pressed to turn on/off the power supply of the contents display apparatus 1.

The processing of the contents display apparatus 1 of the first embodiment when the user controls the contents display apparatus 1 to select desired contents using the operation input apparatus 3, and to display these contents on the display apparatus 2 will be described below with reference to FIGS. 8 to 12.

FIG. 8 is a flowchart showing an example of the processing of the contents display apparatus 1 based on operation inputs according to the first embodiment. If the operation acquisition unit 15 acquires an operation input signal from the operation apparatus 3 (YES in S1), the operation interpretation unit 16 interprets the operation input signal (S12, S21, S31). The processing for arranging a plurality of images in different sort orders and coaxially displaying identical images as a characteristic display method of the first embodiment will be described below taking, as an example, a case in which the user inputs a change instruction of a reference content.

If the aforementioned interpretation result is the operation input of a change instruction (left button 303 or right button 304) of a reference content, the process advances from step S21 to step S22. In step S22, the display image controller 12 changes the reference content based on the contents change instruction. For example, in case of the operation input upon pressing the right button 304, the controller 12 changes the reference content to a content indicated by a content icon 114 which is located on the right side of the contents icon 113 indicated by the highlighting 107 shown in FIG. 3.

That is, the display image controller 12 changes the reference content to a content 210 which is described in a row lower by one than the content 200 included in a contents array 204 of the date and time order shown in FIG. 5. With this change, meta information appended to the reference content 210 is changed to a data set in a row 220 shown in FIG. 9. Therefore, the controller 12 changes the contents arrays of the reference content 210 in the respective order conditions "location", "person", and "event" to those shown in FIG. 10 unlike the arrays before operation shown in FIG. 5.

In step S23, the display image controller 12 reads out contents icons indicating contents as needed for respective order conditions in accordance with the above contents array. In step S14, the controller 12 generates display window data by arranging the contents icons read out for respective order conditions in step S23. More specifically, the controller 12 lays out the contents icons in the horizontal direction according to the respective order conditions, so that the contents icons which indicate the reference content changed in step S22 line up in the vertical direction, as in FIG. 3. Then, the controller 12 generates display image data by scrolling the contents icons within the highlighting 105 to the left or right, so as to adjust the display positions of the highlightings 105, 106, and 107 before and after the change instruction of the order condition.

Finally, in step S15 the display image controller 12 stores the display image data generated in step S14 in the frame buffer 13, and displays a display window.

Figure 11:
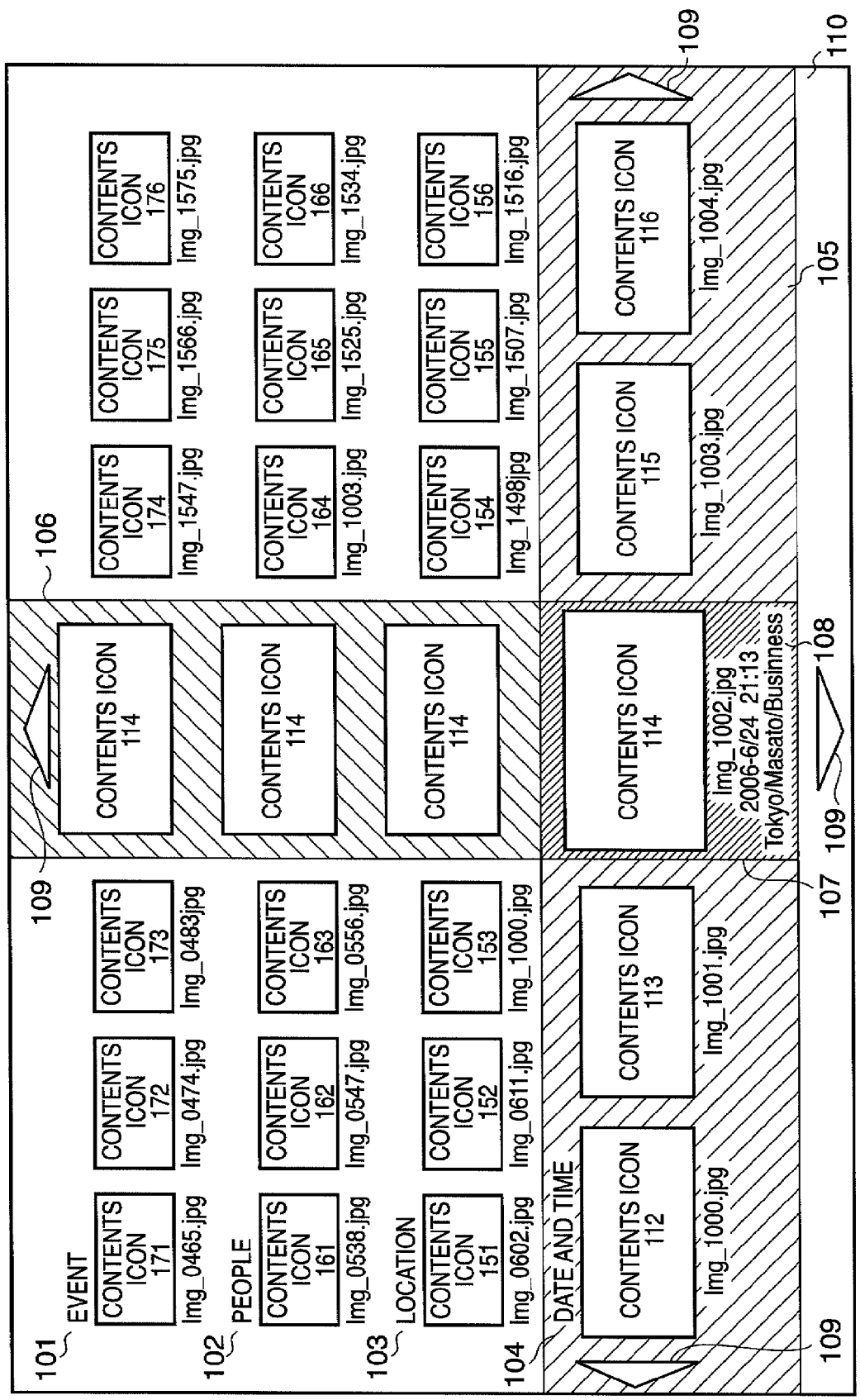
FIG. 11 shows a display window displayed upon pressing of the right button 304 in the state of a display window 100 shown in FIG. 3.

FIG. 11 shows a display window displayed upon pressing of the right button 304 in the state of the display window 100 shown in FIG. 3. As shown in FIG. 11, contents arrays of the contents icons of "event" 101, "person" 102, and "location" 103 are displayed according to the contents array shown in FIG. 10 with reference to the contents icons 114 indicated by the highlighting 107.

The processing for arranging a plurality of images in different sort orders and coaxially displaying identical images as a characteristic display method of the first embodiment will be described below taking, as an example, a case in which the user inputs a change instruction of the order conditions in the state of a display window 110 shown in FIG. 11.

If the aforementioned interpretation result is the operation input of a change instruction (up button 301 or down button 303) of the order condition that can change the reference content, the process advances from step S12 to step S13. In step S13, the display image controller 12 changes the focused contents icon array based on the change instruction of the order condition. For example, in case of the operation input upon pressing the up button 301, the controller 12 changes the highlighting 105 of the contents icon array of "date and time" 104 focused on the display window 110 shown in FIG. 11 to the contents icon array of "location" 103 upper by one row.

In step S14, the display image controller 12 generates display image data so that contents icons which indicate the reference content line up in the vertical direction, in consideration of the contents icon array to be focused, which is changed in step S13. Then, in step S15 the controller 12 generates display image data by scrolling the entire display window 110 upward or downward to adjust the display position of the highlighting 105 before and after the change instruction of the order condition, thus displaying a display window.

Figure 12:
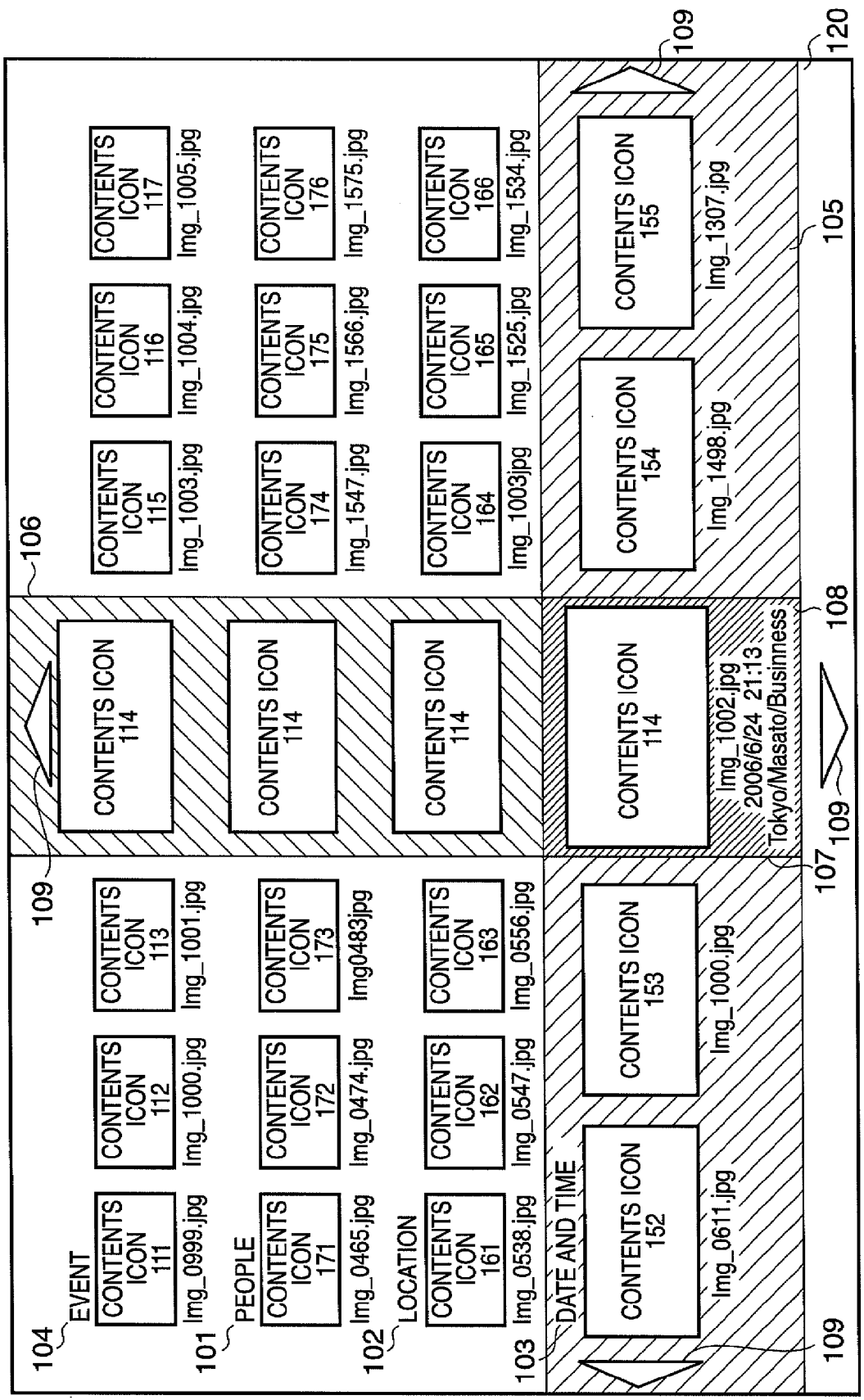
FIG. 12 shows a display window displayed upon pressing of an up button 301 from the state of a display window 110 shown in FIG. 11.

FIG. 12 shows a display window displayed upon pressing of the up button 301 from the state of the display window 110 shown in FIG. 11. A display window 120 shown in FIG. 12 is displayed, so that the reference contents icons 114 remain unchanged, and the contents array to be focused is scrolled from that of "date and time" 104 to that of "location" 103.

Referring back to FIG. 8, a case will be explained below wherein the user makes operations other than the aforementioned change instructions. If it is determined in step S31 that the interpretation result indicates the operation input of an end instruction (power button 308), this processing ends. If the interpretation result is not the operation instruction of an end instruction, the process advances to step S32 to execute processing corresponding to that operation. More specifically, if the operation input is that of the enter button 305, a content indicated by the focused contents icon is played back, and is displayed on the full screen. If the operation input is that of the back button 306, the window display returns to that represented by FIG. 3.

As described above, a plurality of contents icon arrays in which contents icons are sorted in different sort orders are arranged, and movements required to search for a content in an arbitrary sort order and those required to change the sort order are respectively assigned to the arrow keys of the operation input apparatus 3. In this way, the user can easily and intuitively reach a desired content.

Since contents related to the current content of interest are laid out on the single window, the user can visually recognize them, and can easily access related contents.

First Modification of First Embodiment

The first modification of the first embodiment according to the present invention will be described in detail hereinafter with reference to the accompanying drawings. Note that a description of the matters pursuant to the first embodiment will not be repeated.

FIG. 13 shows an example of a display window displayed on the display apparatus 2 upon changing the order condition in the first modification of the first embodiment. Differences from FIG. 12 of the first embodiment are as follows.

Upon generation of display image data, the hierarchical relationship of the display positions of the order conditions is held before and after pressing of the up button 301. That is, display image data is generated to adjust the display positions of the highlightings 105 and 107 to the column of the order conditions, thereby displaying a display window 130.

With this configuration, the entire window need not be scrolled upon changing the order condition, the correspondence between the input operation and the window to be displayed can be understood more easily, and a simpler user interface can be provided.

Second Modification of First Embodiment

The second modification of the first embodiment according to the present invention will be described in detail hereinafter. Note that a description of the matters pursuant to the first embodiment will not be repeated.

FIG. 14 shows a display window displayed on the display apparatus 2 in the second modification of the first embodiment. Differences from FIG. 3 of the first embodiment are as follows.

In the first embodiment, two-dimensional contents icon arrays are formed on the display window by arranging the contents icons which indicate the reference content in the vertical direction.

On the other hand, in this second modification, display image data is generated by laying out order condition contents icons, so that contents icons which indicate the reference content line up in the depth direction, thereby displaying a virtual three-dimensional display window 140.

With this configuration, a more innovative user interface can be provided.

Third Modification of First Embodiment

The third modification of the first embodiment according to the present invention will be described in detail hereinafter. Note that a description of the matters pursuant to the first embodiment will not be repeated.

FIG. 15 shows a display window displayed on the display apparatus 2 in the third modification of the first embodiment. Differences from FIG. 3 of the first embodiment are as follows.

In the first embodiment, two-dimensional contents icon arrays are formed on the display window by arranging the contents icons which indicate the reference content in the vertical direction.

On the other hand, in this third modification, only one contents icon which indicates the reference content is displayed within the focused contents icon array.

Furthermore, pieces of meta information 101 to 104 appended to the reference content are displayed at the positions of the contents icons which were laid out in the first embodiment to indicate the reference content. That is, on a display window 150, the reference contents icon is displayed only on the highlighting 107 without being displayed on the highlighting 106. Then, the pieces of meta information appended to the reference content are displayed on intersections of the order conditions and highlighting 106.

With this configuration, the user can recognize, at a glance, meta information and contents icon arrays in which the contents related to the reference content are arranged, thus greatly improving the usability.

Fourth Modification of First Embodiment

The fourth modification of the first embodiment according to the present invention will be described in detail hereinafter. Note that a description of the matters pursuant to the first embodiment will not be repeated.

FIG. 16 shows a display window displayed on the display apparatus 2 in the fourth modification of the first embodiment. Differences from FIG. 3 of the first embodiment are as follows.

In the first embodiment, two-dimensional contents icon arrays are formed on the display window by arranging the contents icons which indicate the reference content in the vertical direction.

On the other hand, a display window 160 of the fourth modification does not display any contents icons which indicate the reference content in the contents icon arrays of the respective order conditions, which are arranged in the horizontal direction. The display window 160 displays in turn from a contents icon indicating the content next to the reference content based on respective contents arrays.

A contents icon indicating the reference content, i.e., a focused contents icon is displayed at an arbitrary position on the display window 160, as indicated by the highlighting 107.

With this configuration, the focused contents icon can be displayed to have a position and size which are easier to recognize, thus improving the usability.

Fifth Modification of First Embodiment

The fifth modification of the first embodiment according to the present invention will be described in detail hereinafter. Note that a description of the matters pursuant to the first embodiment will not be repeated.

In FIG. 15 that shows the third modification, an input of the filter button 307 from the operation input apparatus 3 shown in FIG. 7 is detected. Then, filtering is done using meta information related to the order condition of the focused contents icon array of those of the contents indicated by the focused contents icon.

The filtering result is reflected in a parent population of contents upon determining contents arrays associated with all the order conditions.

FIG. 17 shows an example of a display window after filtering which is displayed on the display apparatus 2 in the fifth modification of the first embodiment. Referring to FIG. 17, reference numeral 199 denotes a marker indicating meta information used as a filtering condition. Note that the display icon is not limited to this, and different shapes, highlighting of meta information, and the like may be used as long as the user can recognize execution of filtering, and the condition used for filtering.

A display window 170 indicates that filtering is done using "Party" as a condition, and only contents including this keyword are arranged in the contents arrays under all the order conditions.

As a method of canceling the filtering condition, the user moves a focus to the contents icon array with the marker 199, and presses the filter button 307 again, thus toggling ON/OFF of filtering.

Note that this cancel method is merely an example, and is not particularly limited. For example, the user may press a cancel button (not shown), may press the filter button 307 for a long period of time, and so forth.

With this condition, since the user can easily input a filtering condition, he or she can easily make an operation for searching for a desired content and an operation for browsing an intended contents group in a desired order, thus improving the usability.

Sixth Modification of First Embodiment

The sixth modification of the first embodiment according to the present invention will be described in detail hereinafter. Note that a description of the matters pursuant to the first embodiment will not be repeated.

Upon pressing of the filter button 307 of the operation input apparatus 3, the operation acquisition unit 15 detects that operation, and the operation interpretation unit 16 interprets the operation input. The display image controller 12 changes respective order conditions using meta information related to the order condition of the focused contents icon array of the meta information appended to the content indicated by the focused contents icon.

FIG. 18 shows a contents array determined upon pressing of the filter button 307. The example shown in FIG. 18 shows a contents array in the order of person upon pressing of the filter button 307 while the contents icon arrays sorted under the order condition of "event".

In order to determine the contents array, "event" is used as the order of the first priority. Next, contents with identical meta information associated with "event", e.g., "Golf", are filtered using "person" as the order of the second priority.

With this configuration, since the user can easily input complicated order conditions, he or she can easily make an operation for searching for a desired content and an operation for browsing an intended contents group in a desired order.

Also, a function equivalent to filtering can be provided without limiting the parent population of contents unlike filtering. Therefore, a filtering search can be conducted more flexibly than the fifth modification of the first embodiment, thus greatly improving the usability.

Second Embodiment

The second embodiment according to the present invention will be described in detail hereinafter with reference to the accompanying drawings.

Note that the arrangement of a contents display apparatus system according to the second embodiment is the same as that shown in FIG. 1 described in the first embodiment, and a repetitive description thereof will be avoided.

Also, the arrangements of the contents display apparatus 1 and operation input apparatus 3 are the same as those shown in FIGS. 2 and 7 described in the first embodiment, and a repetitive description thereof will be avoided.

FIG. 19 shows an example of a display window displayed on the display apparatus 2 in the contents display apparatus system according to the second embodiment. Referring to FIG. 19, reference numeral 400 denotes a display window; and 411 to 415, contents icons represented by thumbnails that display the substances of the contents in a reduced scale. Reference numerals 421 to 446 denote contents group icons represented by thumbnails each of which displays the content included in the corresponding contents group. Note that the display method of contents group icons will be described in more detail later.

Reference numerals 401 to 404 denote displays indicating the regularity of a contents icon array arranged in the horizontal direction and grouping conditions used upon grouping contents. In the example shown in FIG. 19, "year" 401, "month" 402", and "day" 403 are displayed as the grouping conditions, and "date and time" 404 is displayed as the regularity of the contents icon array of all contents to be displayed.

However, the number of group arrays, the regularity upon arranging contents, and the grouping conditions are not limited to them. For example, after contents are sorted in the order of "event" or "photographing location" in location of the order of "date and time", they may be grouped using identical events or locations.

Reference numeral 405 denotes a highlighting indicating a array of focused icons of the contents icon array or contents group icons. The highlighted contents icons arranged in the horizontal direction or highlighted contents group icons can be scrolled one by one.

The highlighting method is not particularly limited as long as the outer appearance of icons in the highlighting area can be distinguished from that of other contents icon arrays. For example, icons to be highlighted may be displayed to have a larger size than contents icons and contents group icons arranged in other contents icon arrays or contents icon group arrays.

Reference numeral 406 denotes a highlighting in which a contents icon indicating a reference content and contents group icons indicating contents groups including the reference content are coaxially arranged in the vertical direction and are focused. Note that the highlight method is not particularly limited as long as the outer appearance of icons can be distinguished from other contents icons and contents group icons as in the highlighting 405 of the contents icon array and contents group icon array.

Reference numeral 407 denotes a highlighting of the focused contents icon or contents group icon. Note that the highlight method is not particularly limited as long as the outer appearance of icons can be distinguished from other icons as in the highlighting 405 of the icon array indicating the reference content and the highlighting 106 of contents groups including the reference content.

Reference numeral 408 denotes a meta information display indicating meta information appended to the reference content. Reference numerals 409 denote operation guide signs which are associated with operation input instructions and plainly indicate guides of an operation method. This operation method will be described in more detail later.

Note that in FIG. 19 respective contents icons do not have any descriptions of identification information such as file names and the like required to identify respective contents. The presence/absence of practical descriptions of such identification information and additional descriptions of other kinds of information are not limited to this.

FIG. 20 shows an example of data sets of contents to be handled by the contents display apparatus of the second embodiment. As all the contents included in the data sets, JPEG images are described. Alternatively, data of other image formats, moving image data, and PC data represented by document data to be handled as a general personal computer may be used.

Also, FIG. 20 describes "date and time" alone as meta information appended to the contents, but may also include items such as "photographing location", "person", "event", and the like, contents storage location information, and associated contents icon information. Hence, the present invention is not limited to this.

Furthermore, as for the data set management method, it is desirable to perform management using a database. However, the present invention is not limited to this, and a management table description method is not particularly limited.

FIG. 21 shows an example of a contents array and contents group arrays generated from the data sets of the contents shown in FIG. 20. Referring to FIG. 21, reference numerals 501 to 504 denote a contents array and contents group arrays respectively corresponding to the grouping conditions and regularity. Reference numeral 500 denotes a reference content indicated by the focused contents icon and contents group icons in the contents array and contents group arrays. The reference content is explicitly indicated for the sake of convenience.

Note that the contents array and contents group arrays are a part of arrays obtained by arranging all the contents according to a given order condition and grouping conditions. However, the contents array and contents group array may be generated as needed using a query in the database.

The processing of the display image controller 12 which reads out required contents icons and contents group icons from the storage unit 11 based on the aforementioned contents array and contents group arrays, and generates the display window shown in FIG. 19 will be described below with reference to FIG. 22.

Figure 22:
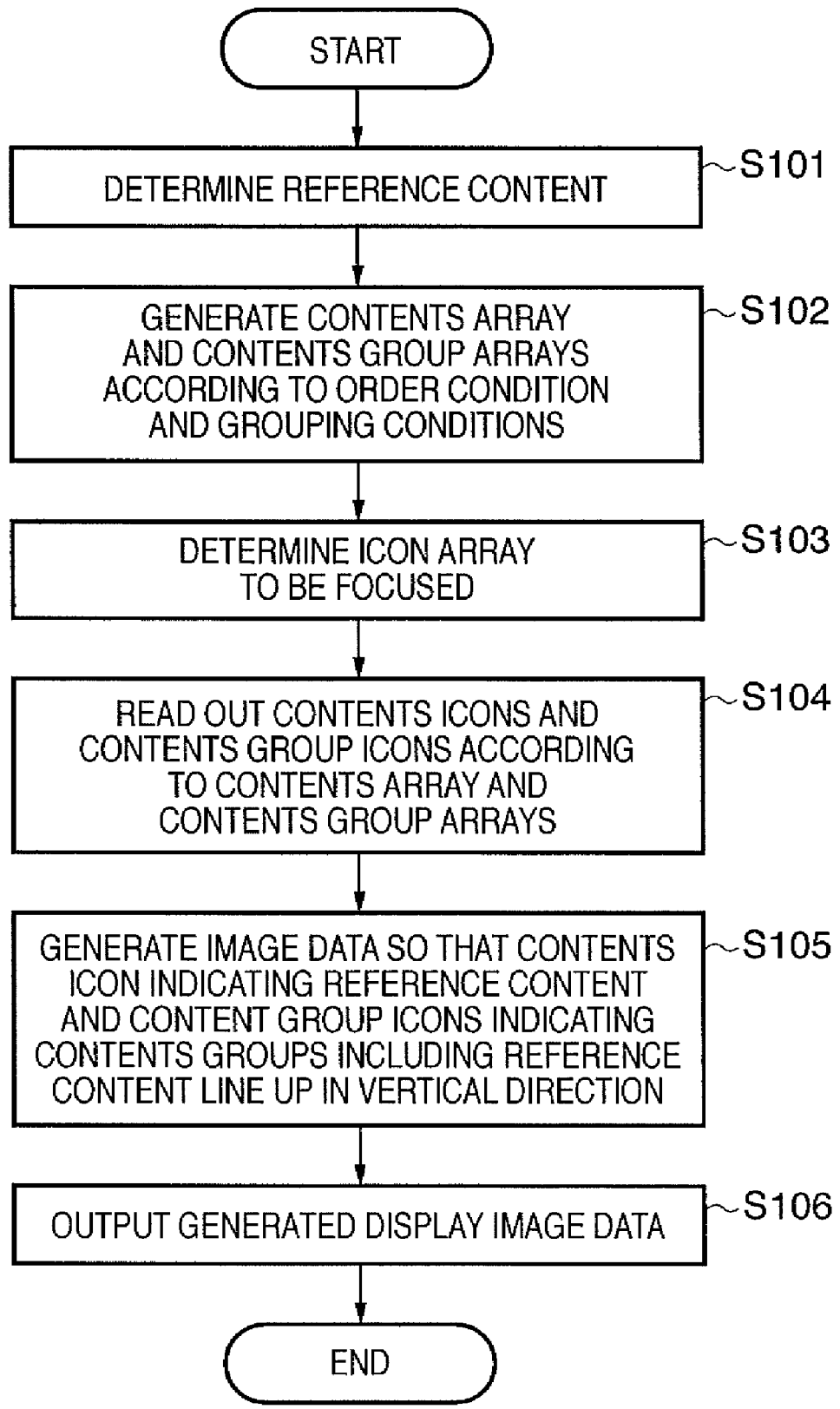
FIG. 22 is a flowchart showing an example of the processing until a display image controller 12 of the second embodiment generates an initial window.

FIG. 22 is a flowchart showing an example of the processing until the display image controller 12 of the second embodiment generates an initial window. The display image controller 12 determines a reference content, i.e., a content to be focused (S101). Note that various determination methods may be used as the determination method as in the first embodiment, and the present invention is not particularly limited to the determination method.

The display image controller 12 then generates the content array and contents group arrays shown in FIG. 21 according to the regularity and grouping conditions from the data sets shown in FIG. 20 (S102). The controller 12 determines an icon array to be focused (S103). More specifically, the controller 12 determines an icon array in the lowermost row shown in FIG. 19 as that to be focused (S103). Note that the controller may determine a group array as an icon array to be focused.

The display image controller 12 reads out contents icons and contents group icons for respective arrays from the storage unit 11 in accordance with the respective contents array, contents group arrays, and the reference content information (S104). Note that only contents icons required for display are desirably read out in consideration of the reference content. However, the present invention is not limited to this. For example, all contents icons may be read out and cached on a memory irrespective of whether or not they are to be displayed.

The display image controller 12 generates display image data by laying out the readout icons for respective order conditions (S105). More specifically, the controller 12 generates display image data by laying out the respective icons in the horizontal direction, so that the contents icon indicating the reference content and contents group icons indicating contents group including the reference content line up in the vertical direction.

Finally, the display image controller 12 stores the generated display image data in the frame buffer 13, and the display output unit 14 displays the display window 400 on the display apparatus 2 (S106).

The processing of the contents display apparatus 1 of the second embodiment when the user controls the contents display apparatus 1 to select desired contents using the operation input apparatus 3, and to display these contents on the display apparatus 2 will be described below with reference to FIGS. 23 to 29.

Figure 23:
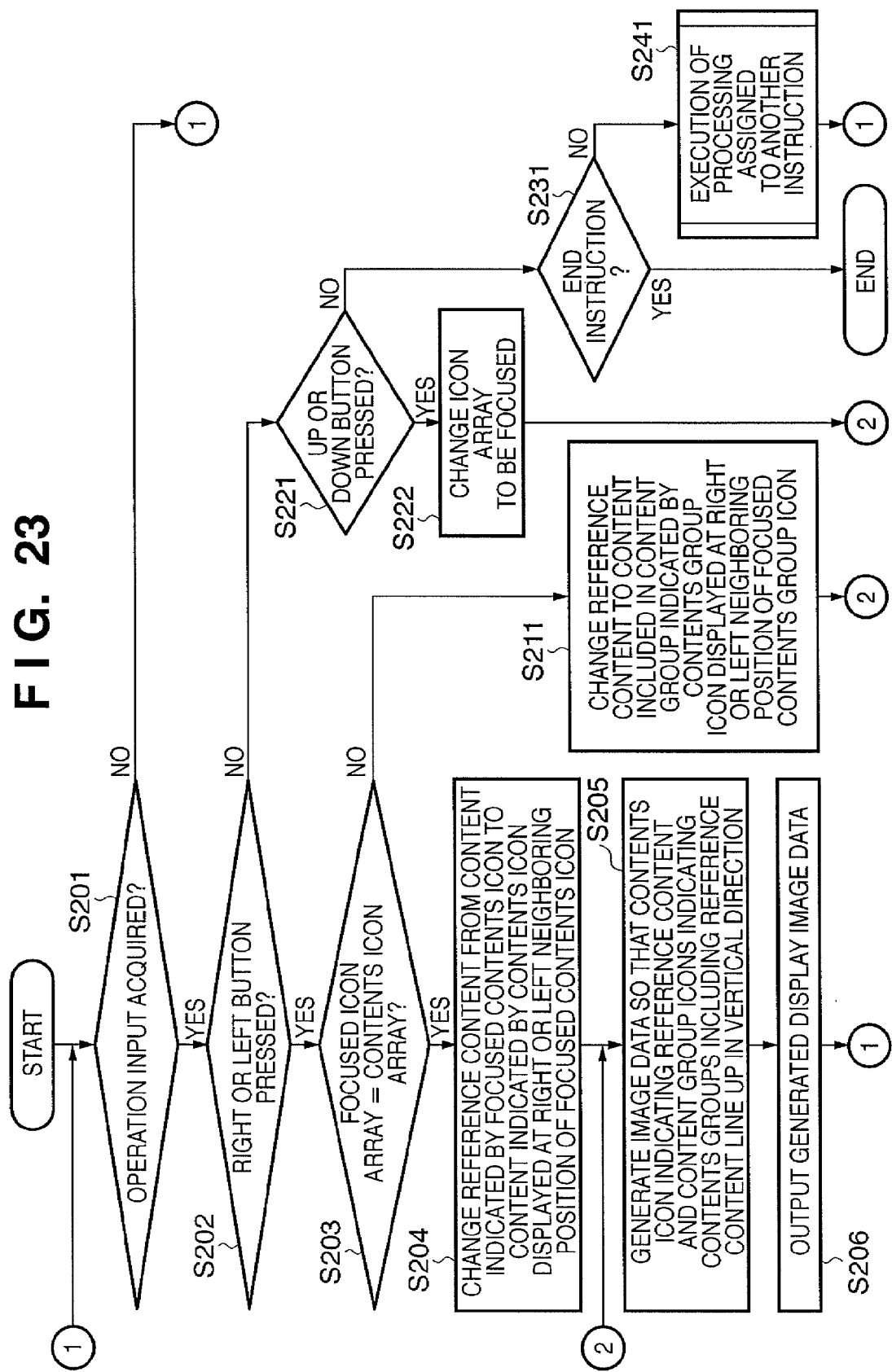
FIG. 23 is a flowchart showing an example of the processing of a contents display apparatus 1 based on operation inputs according to the second embodiment.

FIG. 23 is a flowchart showing an example of the processing of the contents display apparatus 1 based on operation inputs according to the second embodiment. If the operation acquisition unit 15 acquires an operation input signal from the operation apparatus 3 (YES in S201), the operation interpretation unit 16 interprets the operation input signal (S202, S221, S231). The display processing as a characteristic feature of the second embodiment will be explained below taking, as an example, a case of reception of an operation instruction in the horizontal direction while the contents icon array is focused.

If the aforementioned interpretation result is the operation input of the left button 303 or right button 304, the process advances from step S202 to step S203. The display image controller 12 checks in step S203 if the focused icon array is the contents icon array. If the focused icon array is the contents icon array, the process advances to step S204 to change the reference content to a content indicated by a horizontally neighboring contents icon designated by the operation instruction. For example, upon pressing of the right button 304, the controller 12 changes the content of the contents icon 314 in the contents icon array in the area of the highlighting 407 in FIG. 19 to a content of the right neighboring contents icon 414.

More specifically, the display image controller 12 changes a content 500 as the reference contents to a content 510 described in a row lower by one in the contents array 504 shown in FIG. 21. As a result, the contents group icon is changed to an icon that allows the user to identify the content 510. Details of the display and change processes of the contents group icons will be described in more detail later.

In step S205, the display image controller 12 generates display image data so that the contents icon indicating the reference content and contents group icons indicating contents groups which include the reference content line up in the vertical direction, as in generation of the initial window. In step S206, the controller 12 stores the display image data generated in step S205 in the frame buffer 13, thus displaying a display window.

Figure 24:
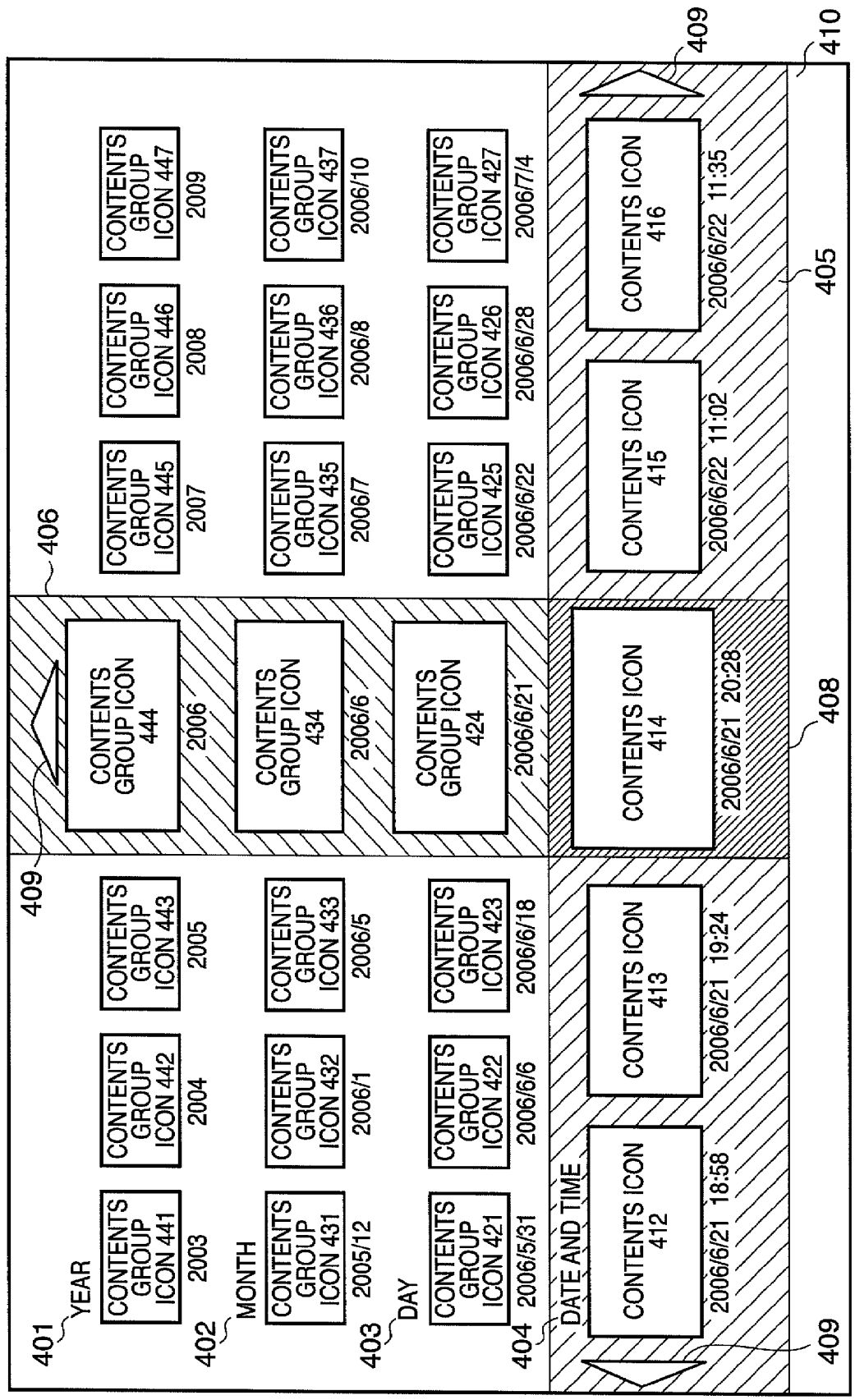
FIG. 24 shows a display window displayed upon pressing a right button 304 once in the state of a display window 400 shown in FIG. 19.

FIG. 24 shows a display window displayed upon pressing the right button 304 once in the state of the display window 400 shown in FIG. 19. FIG. 25 shows a display window displayed upon pressing the right button 304 another once in the state of a display window 410 shown in FIG. 24. As shown in FIG. 24, the contents icon array of "date and time" 404 in the area of the highlighting 405 in the state shown in FIG. 19 is scrolled to the left, and the reference content is changed to the contents icon 414. In this case, since the contents group icons 424, 434, and 444 include the reference content, the contents group icon arrays remain unchanged.

On the other hand, in FIG. 25, the contents icon array of "date and time" 404 in the area of the highlighting 405 in the state shown in FIG. 24, and the contents group icon array of "day" 403 are scrolled to the left. More specifically, the reference content is changed to the contents icon 415, and the content group icon of "day" 403 is changed to the contents group icon 425 including the reference content.

FIG. 26 shows an example of a contents icon array and contents group icon arrays upon pressing the right button 304 twice.

In this manner, upon scrolling the contents icon in the horizontal direction, the reference content is changed, and contents group icons including the reference content are scrolled in the same direction to fall within the area of the highlighting 406.

That is, the user can easily access all the contents without tracing the higher hierarchies while he or she operates the contents icons in the horizontal direction to confirm the contents located near the content indicated by the focused contents icon.

Next, a case will be described below wherein the user makes the operation input in the vertical direction, i.e., that of the up button 301 or down button 302.

If the result of the operation interpretation unit 16 indicates the operation input in the vertical direction, the process advances from step S221 to step S222. In step S222, the display image controller 12 changes an icon array to be focused. For example, if the user makes the operation input of the up button 301 on a display window 420 shown in FIG. 25, the contents icon array of "date and time" 404 which was focused so far is free from the highlighting. Then, the contents group icon array of contents groups based on "day" 403 in the upper row is alternatively focused and highlighted on a display window 430 as shown in FIG. 27.

FIG. 27 shows an example of the display window 430 displayed when the user presses the up button 301 from the state of the display window 420 shown in FIG. 25.

When the icon array to be focused is changed, the display image controller 12 generates display image data so that the contents icon indicating the reference contents and contents group icons indicating contents groups including the reference content line up in the vertical direction as upon generation of the initial window. Then, the display output unit 14 displays the display image data on the display window 430.

Note that the display image controller 12 may generate the display image data to adjust the display position of the highlighting 105 before and after pressing of the up button 301, i.e., to scroll the entire display window downward.

However, in case of the contents group arrays having the hierarchical structure including "year", "month", "day", and "date and time", by holding the hierarchical relationship of the display position, as shown in FIG. 27, the icon array to be focused can be shifted without visually changing the hierarchical structure.

Next, a case will be described below wherein the contents display apparatus receives the operation instruction in the horizontal direction while the contents group icon array is focused.

If the aforementioned result indicates the operation input of the left button 303 or right button 304, and the focused icon array is the contents group icon array, the process advances from step S203 to step S211. In step S211, the display image controller 12 changes the reference content to an arbitrary content included in a contents group, and generates new display image data.

For example, upon pressing of the right button 304, the display image controller 12 shifts the focus to the contents icon group 426 which is located on the right side of the contents group icon 425 shown in FIG. 27. The controller 12 changes the reference content from the content in the content group indicated by the contents group icon 425 to an arbitrary content in the contents group indicated by the contents group icon 426 accordingly.

Note that various methods of selecting the reference content from those in the contents group may be used. For example, a content at the first position or an arbitrary position in the contents group, a content which best represents a feature of the contents group, a specific content determined by the user, or the latest content may be selected.

In the second embodiment, upon sorting contents in the contents group array under the order condition used to determine the contents array, the first content in that contents group is selected as the reference content for the sake of convenience. However, the present invention is not limited to this method.

FIG. 28 shows an example of the contents array, contents group arrays, and reference content upon pressing the right button 304 once from the display state shown in FIG. 27. That is, FIG. 28 shows the contents array, contents group arrays, and reference content after the user presses the right button 304 once while the contents group icon array of "day" is focused in the contents array and contents group arrays shown in FIG. 26. Referring to FIG. 28, reference numeral 530 explicitly denotes a reference content at that time.

In step S205, the display image controller 12 generates display image data so that the contents icon indicating the reference content and contents group icons indicating contents groups including the reference content line up in the vertical direction, as in generation of the display image data shown in FIG. 27. In step S206, the controller 12 stores the display image data generated in step S205 in the frame buffer 13, thus displaying the display image data on the display window. Note that the display window displayed at that time is not shown since it is obvious.

Referring back to FIG. 23, a case will be explained below wherein the user makes operations other than that of the right or left button or the up or down button. If it is determined in step S231 that the interpretation result indicates the operation input of an end instruction (power button 208), this processing ends.

On the other hand, if it is determined in step S231 that the interpretation result is not the operation instruction of an end instruction, the process advances to step S241 to execute processing corresponding to that operation. More specifically, if the operation input is that of the enter button 305, and the focused icon is a contents icon, a content indicated by that contents icon is played back, and is displayed on the full screen. If the focused icon is a contents group icon, a list of thumbnails of contents included in the contents group indicated by that contents group icon is displayed on the screen.

If the operation input is that of the back button 306 in the aforementioned state, the window display returns to that represented by FIG. 19.

The display method and change method of contents group icons will be described below with reference to FIG. 29.

Figure 29:
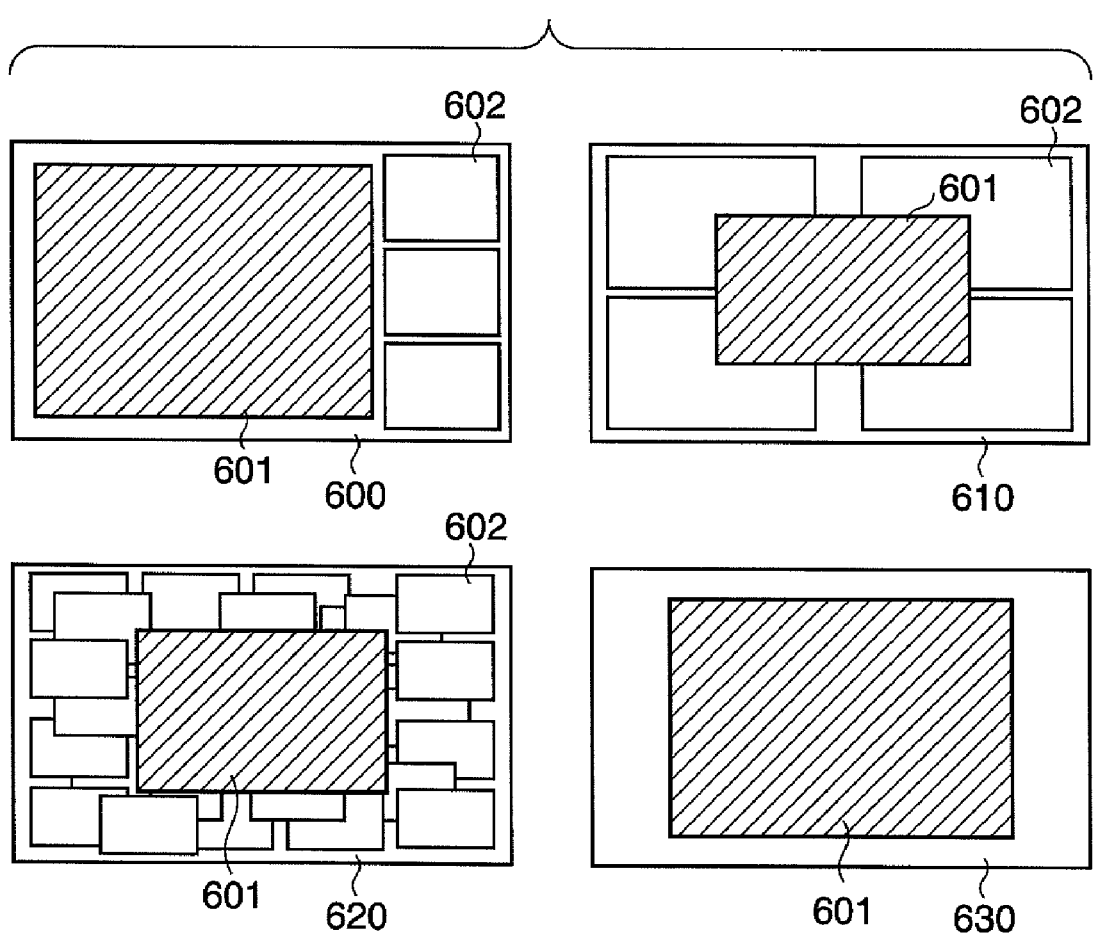
FIG. 29 shows the display method and change method of contents group icons.

FIG. 29 shows an example of the display method and change method of contents group icons. Referring to FIG. 29, reference numerals 600, 610, 620, and 630 respectively denote contents group icon display methods. Reference numeral 601 denotes a thumbnail of a content as a reference content or its candidate. Reference numeral 602 denotes thumbnails of contents included in a contents group indicated by the contents group icon.

Note that the components 601 and 602 need not always be thumbnails, but their shapes and substances are not particularly limited as long as the substances of contents can be understood.

As the method of selecting contents indicated by images used as the thumbnails 602, various methods of selecting all the contents, contents near the reference contents, contents which best represent a feature of the contents group, specific contents determined by the user, and the like may be used. However, the selection method is not particularly limited.

In the display method 600, the thumbnail of the reference content is displayed on the screen to have a largest size, and those of contents included in the contents group indicated by the contents group icon are displayed on a free space in the contents group icon.

In the display method 610, the thumbnail of the reference content is displayed on the screen to have a largest size, and those of contents included in the contents group indicated by the contents group icon are orderly displayed around the thumbnail of the reference content.

In the display method 620, the thumbnail of the reference content is displayed on the screen to have a largest size, and a large number of thumbnails of contents included in the contents group indicated by the contents group icon are displayed around the thumbnail of the reference content.

In the display method 630, the thumbnail of the reference content is displayed on the screen to have a large size, and no thumbnails of contents included in the contents group indicated by the contents group icon are displayed.

With any display method, when the reference content is changed upon reception of the operation instruction in the horizontal direction while the contents icon array is focused, the substance of the contents group icon indicating the identical contents group is desirably changed.

Note that a plurality of different contents group icon display methods may be simultaneously used in the display image data to be generated.

For example, the contents group icon in the focused contents group icon array is displayed by the display method 610. The contents group icons in the non-focused contents group icon arrays, which include the reference content, are displayed by the display method 600.

Furthermore, the focused contents group icon is displayed by the display method 620, and other contents group icons are displayed by the display method 630. In this way, it is desired to execute appropriate expression methods in terms of the sizes and positions of the contents group icons or the usability.

As described above, the contents array in which contents icons are sorted under a given order condition, and the contents sorted under identical order conditions are laid out on the single window. Then, image data are generated so that the contents icons indicating contents and the contents group icons indicating contents groups line up.

With this window configuration, the user can visually recognize the contents groups and contents which are collected based on different granularity, and can gain an understanding of contents located near the desired content in whole.

Furthermore, movements required to change the contents or contents groups and those required to change the granularity are respectively assigned to the arrow keys of the remote controller, thus allowing the user to easily and intuitively reach a desired content.

First Modification of Second Embodiment

The first modification of the second embodiment according to the present invention will be described in detail hereinafter with reference to the accompanying drawings. Note that a description of the matters pursuant to the second embodiment will not be repeated.

Figure 30:
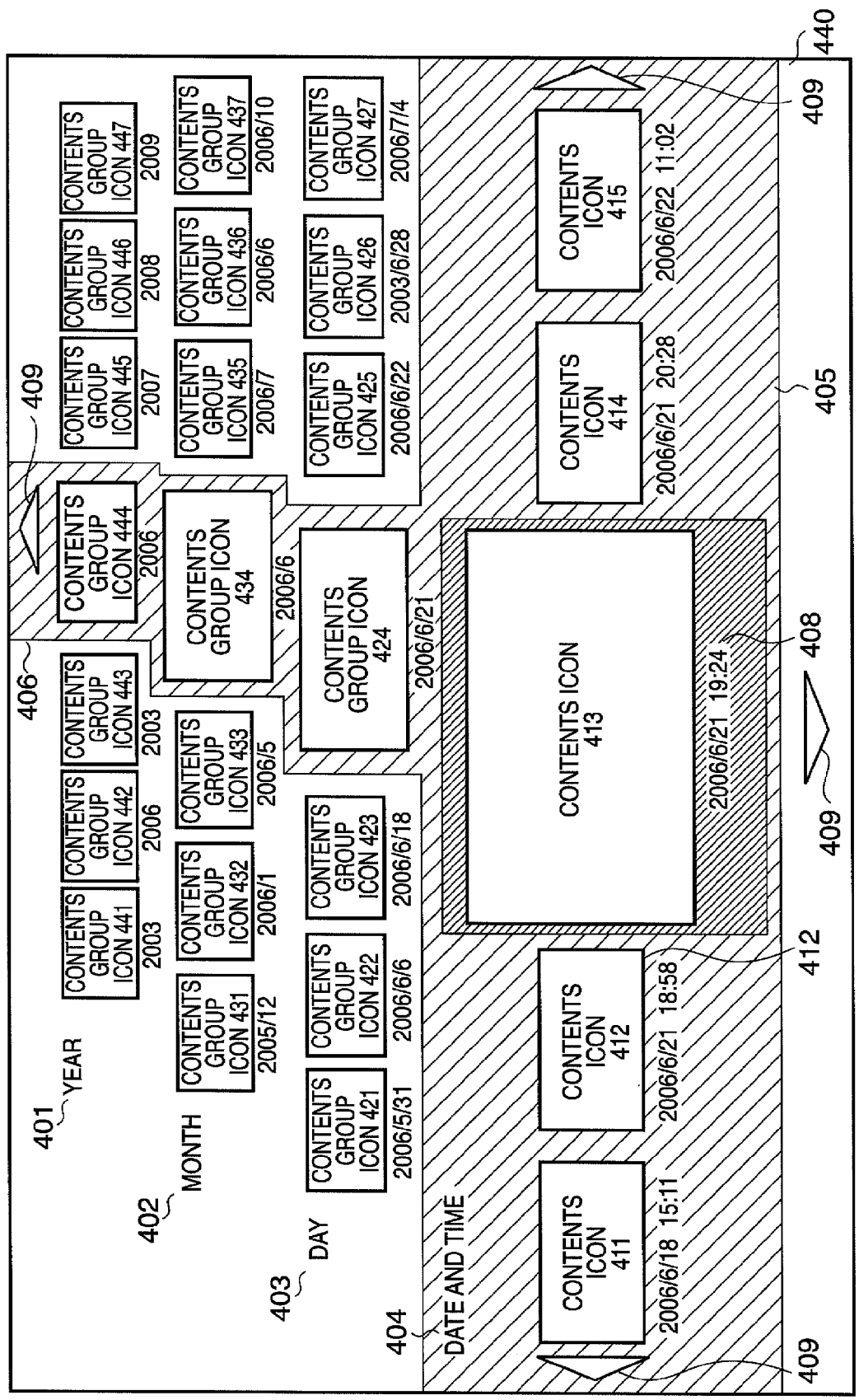
FIG. 30 shows an example of a display window displayed on the display apparatus 2 in the first modification of the second embodiment.

FIG. 30 shows an example of a display window displayed on the display apparatus 2 according to the first modification of the second embodiment. Differences from FIG. 19 of the second embodiment are as follows.

In the second embodiment, two-dimensional contents icon arrays are formed on the display window by arranging the contents icon which indicates the reference content and the contents group icons indicating the contents groups including the reference content in the vertical direction.

On the other hand, in this first modification, display image data is generated by laying out order condition contents icons, so that contents icon indicating the reference content and the contents group icons indicating the contents groups including the reference content line up in the depth direction. Then, a virtual three-dimensional display window 440 is displayed. In this case, upon changing the icon array to be focused, the display image data must be generated so that the focused icon array is displayed on the foremost surface in the depth direction.

With this configuration, a more innovative user interface can be provided.

Second Modification of Second Embodiment

The second modification of the second embodiment according to the present invention will be described in detail hereinafter. Note that a description of the matters pursuant to the second embodiment will not be repeated.

Figure 31:
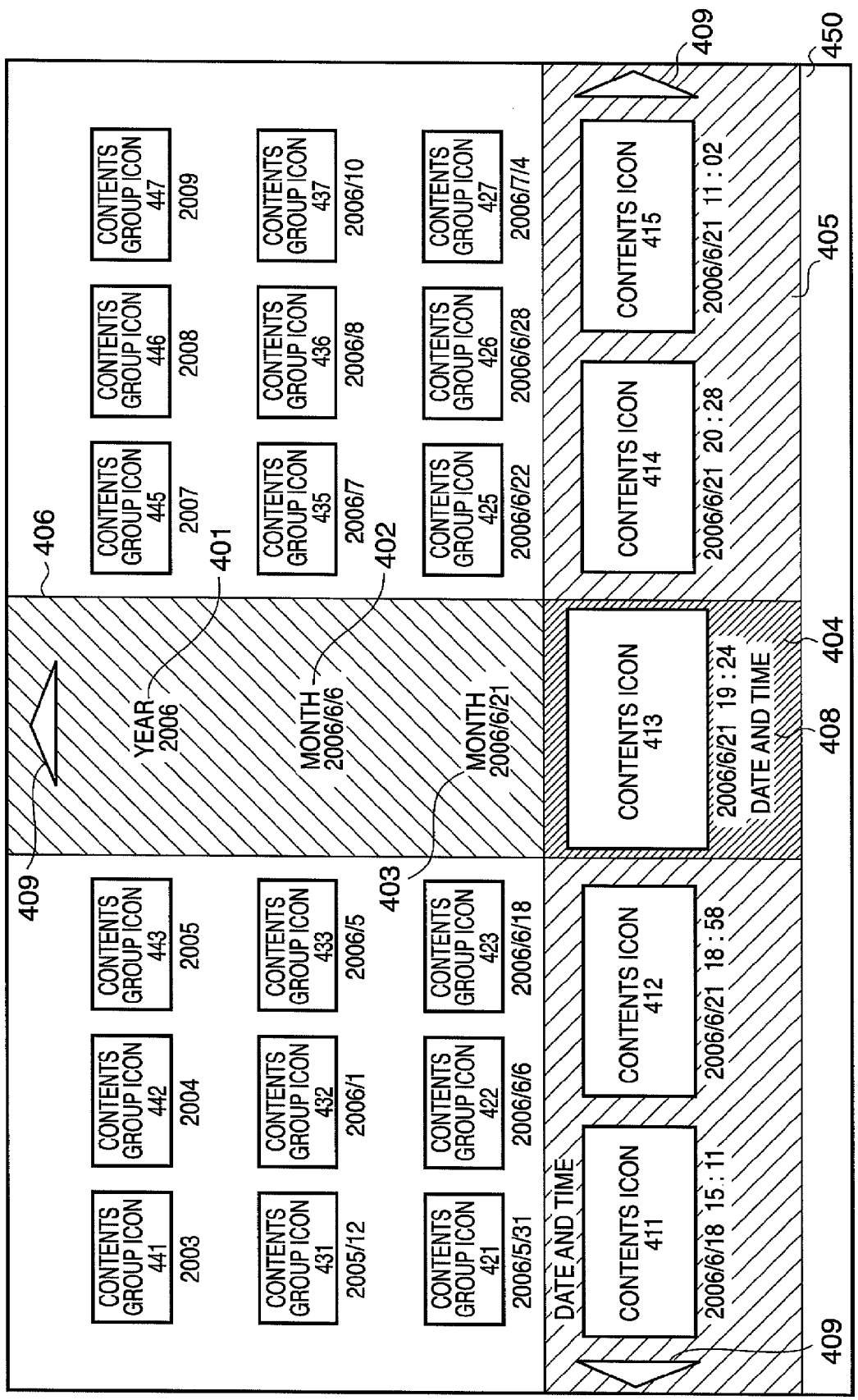
FIG. 31 shows an example of a display window displayed on the display apparatus 2 in the second modification of the second embodiment.

FIG. 31 shows a display window displayed on the display apparatus 2 in the second modification of the second embodiment. Differences from FIG. 19 of the second embodiment are as follows.

In the second embodiment, two-dimensional contents icon arrays are formed on the display window by arranging the contents icon which indicates the reference content and the contents group icons indicating the contents groups including the reference content in the vertical direction.

On the other hand, in this second modification, only one contents icon indicating the reference content or only one contents group icons indicating the contents group including the reference content is displayed within the focused icon array.

Furthermore, the meta information of the reference content and the grouping conditions required to determine the contents group arrays are displayed, as denoted by reference numerals 404 and 401 to 403 in FIG. 31. That is, these pieces of information are displayed at the positions where the contents icon indicating the reference contents and the contents group icons indicating the contents groups including the reference content were displayed in the second embodiment.

Only the contents icon or contents group icon on the highlighting 407 is displayed on the highlighting 406. Then, pieces of meta information and grouping conditions are displayed at intersections between the each icon array and the highlighting 406.

With this configuration, since a simpler display window 450 can be provided, the usability can be improved.

Third Modification of Second Embodiment

The third modification of the second embodiment according to the present invention will be described in detail hereinafter. Note that a description of the matters pursuant to the second embodiment will not be repeated.

Figure 32:
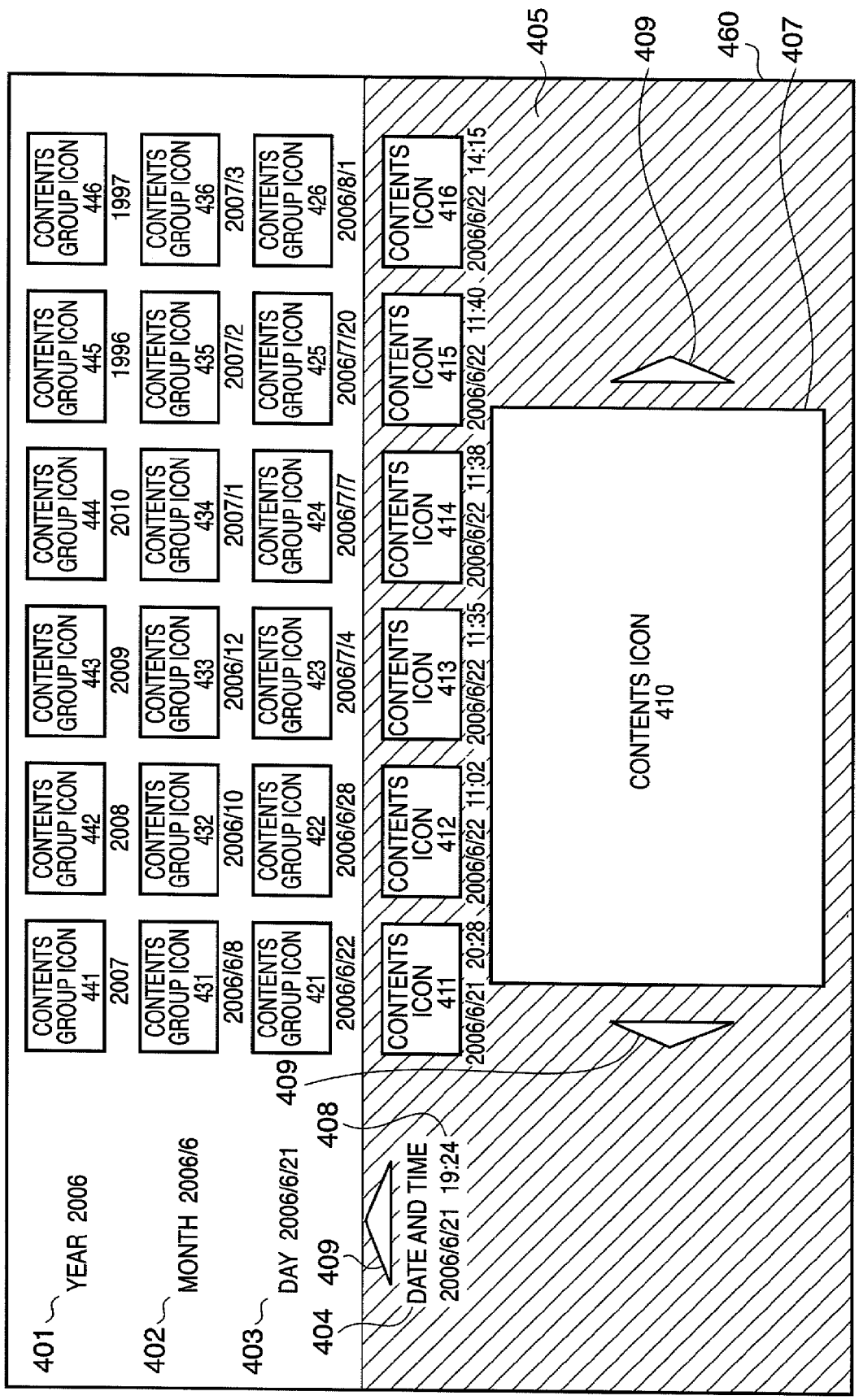
FIG. 32 shows an example of a display window displayed on the display apparatus 2 in the third modification of the second embodiment.

FIG. 32 shows a display window displayed on the display apparatus 2 in the third modification of the second embodiment. Differences from FIG. 19 of the second embodiment are as follows.

In the second embodiment, two-dimensional contents icon arrays are formed on the display window by arranging the contents icon which indicates the reference content and the contents group icons indicating the contents groups including the reference content in the vertical direction.

On the other hand, a display window 460 of the third modification displays no icon array arranged in the horizontal direction for the contents icon indicating the reference content and the contents group icons indicating the contents group including the reference content.

The display window 460 displays, in the icon arrays, icons in turn from a contents icon indicating the content next to the reference content and a contents group icon indicating the contents group next to the contents group including the reference content.

Furthermore, the contents icon indicating the reference content or the contents group icon indicating the contents group including the reference contents, i.e., the focused contents icon or contents group icon is highlighted and displayed at an arbitrary position on the display window 460.

With this configuration, the focused contents icon or contents group icon can be displayed to have a position and size which are easier to recognize, thus improving the usability.

According to the first and second embodiments, a plurality of contents icon arrays sorted in different sort orders are formed, movements required to search for a content using arbitrary sort orders and those required to change the sort orders are assigned to the arrow keys of the remote controller. In this manner, the user can easily and intuitively reach a desired content. Furthermore, contents related to the content of interest are laid out on the single window, thus allowing the user to visually recognize the related contents, and to easily access the related contents.

Also, contents sorted under a given order condition, and contents groups including these contents are laid out to form arrays on the single window. In this manner, the user can visually recognize the contents groups and contents which are collected based on different granularity, and can gain an understanding of contents located near the desired content in whole. Furthermore, movements required to change the contents or contents groups and those required to change the granularity are respectively assigned to the arrow keys of the remote controller. As a result, the user can easily and intuitively reach a desired content.

Third Embodiment

The third embodiment according to the present invention will be described in detail hereinafter with reference to the accompanying drawings.

In recent years, in addition to personal computers (PCs) and dedicated storage devices, cameras having a storage function of storing captured contents, disk recorders for storing broadcasting contents, and the like are available. Also, display apparatuses which display lists of contents stored in these devices are available. Some display apparatuses display lists of contents names of all the contents by means of text.

In recent years, a list display method that adopts a list which explicitly displays contents overviews such as thumbnails of contents, partial playback of features, and the like by means of images or video pictures is also available. With this list display, since a plurality of contents are displayed in various orders such as orders of dates, file names, and the like, the contents overviews are presented plainly, and this display method is effective to search contents.

A method of helping the user search for contents by ordering and grouping contents is also available. In this case, a method of displaying a grouped contents group using one icon is known. The icon of the contents group is normally generated based on an image of a representative content or images of some or all contents in that contents group.

However, upon displaying a list of contents, a display is made according to various orders to allow the user to easily search for contents. However, since the display is switched every time the order is switched, the data list cannot be efficiently presented to the user.

Hence, the following method is available. In this method, thumbnails of contents are classified into different categories, and the thumbnails of representative contents of the respective categories are aligned and displayed. Then, the category is selected using a right or left key, and the thumbnails of the contents in the selected category are displayed and selected using an up or down key. For example, see Japanese Patent Laid-Open No. 9-37181.

Also, the following system is available. In this system, images of contents and contents groups are displayed to form arrays, and the user selects one of these contents and contents groups by a first operation. When the user selects the contents group, the images of contents in that group are displayed, and he or she selects a content in the group by a second operation. When the user selects the contents and contents groups on the arrays by the first operation again, the content selected last by the second operation is displayed as an image of that group. For example, see Japanese Patent Laid-Open No. 2003-202952.

Furthermore, the following system is available. In this system, in respective contents groups, contents are sorted and displayed based on order data to allow the user to select a content. In this case, group names are displayed, and upon selection of each individual content, the location of that content in a array is displayed. For example, see Japanese Patent Laid-Open No. 2006-033776.

However, these related arts suffer the following problems.

(1) Upon visually searching for contents, contents are grouped and displayed so as to allow the user to recognize their overviews and to reach a desired content quickly. Upon grouping contents, since there are various grouping conditions depending on search procedures, switching of the windows or a simple list display disturbs recognition of the contents list or an easy visual search.

(2) Which of contents group icon arrays is used as the reference for layout cannot be determined.

(3) Upon selecting a contents group icon on the currently selected array, which of contents group icon arrays is effective cannot be determined.

(4) Which of contents in a reference contents group is used as a reference for layout of contents group icon arrays cannot be determined.

(5) When another contents group icon is changed to a reference contents group icon, which of contents in the contents icon group is used as a reference for layout of the contents group icon arrays cannot be determined.

(6) In each contents group, a reference icon cannot be freely selected.

(7) Upon forming a contents group, categories upon forming and laying out groups cannot be determined.

(8) In a contents group icon array of each category, neighboring contents group icons have no relevance, and an effective contents search is disturbed.

The third embodiment has as its object to display a list of contents groups which are grouped under various conditions to have relevance between them.

The third embodiment will explain processing for displaying a list by generating contents group icons by grouping a plurality of image contents under a given group condition, and sorting these contents group icons under a designated order condition. The arrangement of the overall system including a contents search apparatus which displays a list of contents group icons will be described first.

System Arrangement

Figure 33:
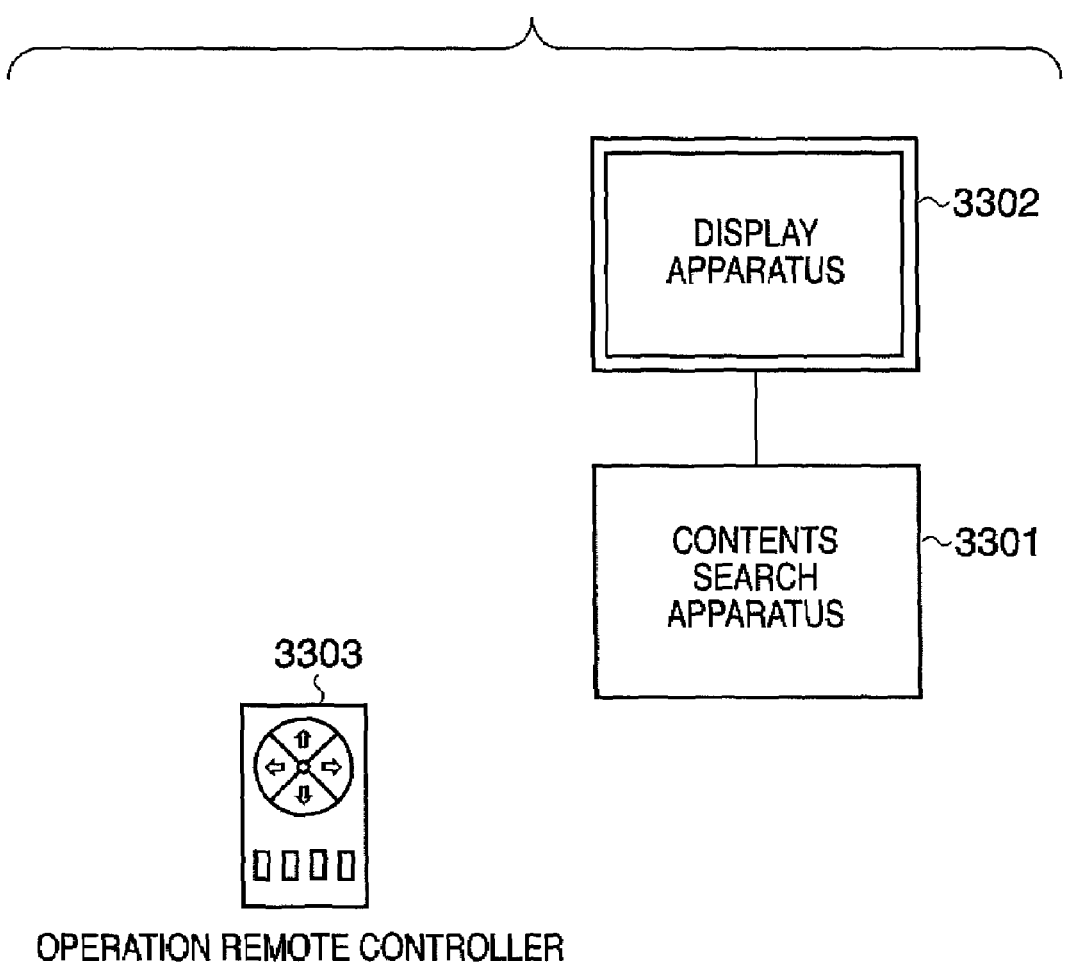
FIG. 33 is a view showing an example of the arrangement of a contents search system according to the third embodiment.

FIG. 33 shows an example of the arrangement of a contents search system according to the third embodiment. Referring to FIG. 33, reference numeral 3301 denotes a contents search apparatus which holds contents and contents group icons, and forms arrays of contents group icons. The apparatus 3301 lays out the arrays of contents group icons, and outputs them to a display apparatus (to be described below). Reference numeral 3302 denotes a display apparatus such as a display or the like, which has a function of displaying images of contents and contents group icons output from the contents search apparatus 3301. Reference numeral 3303 denotes an operation remote controller, which has an operation input function such as selection of contents, switching of display, and the like.

Figure 34:
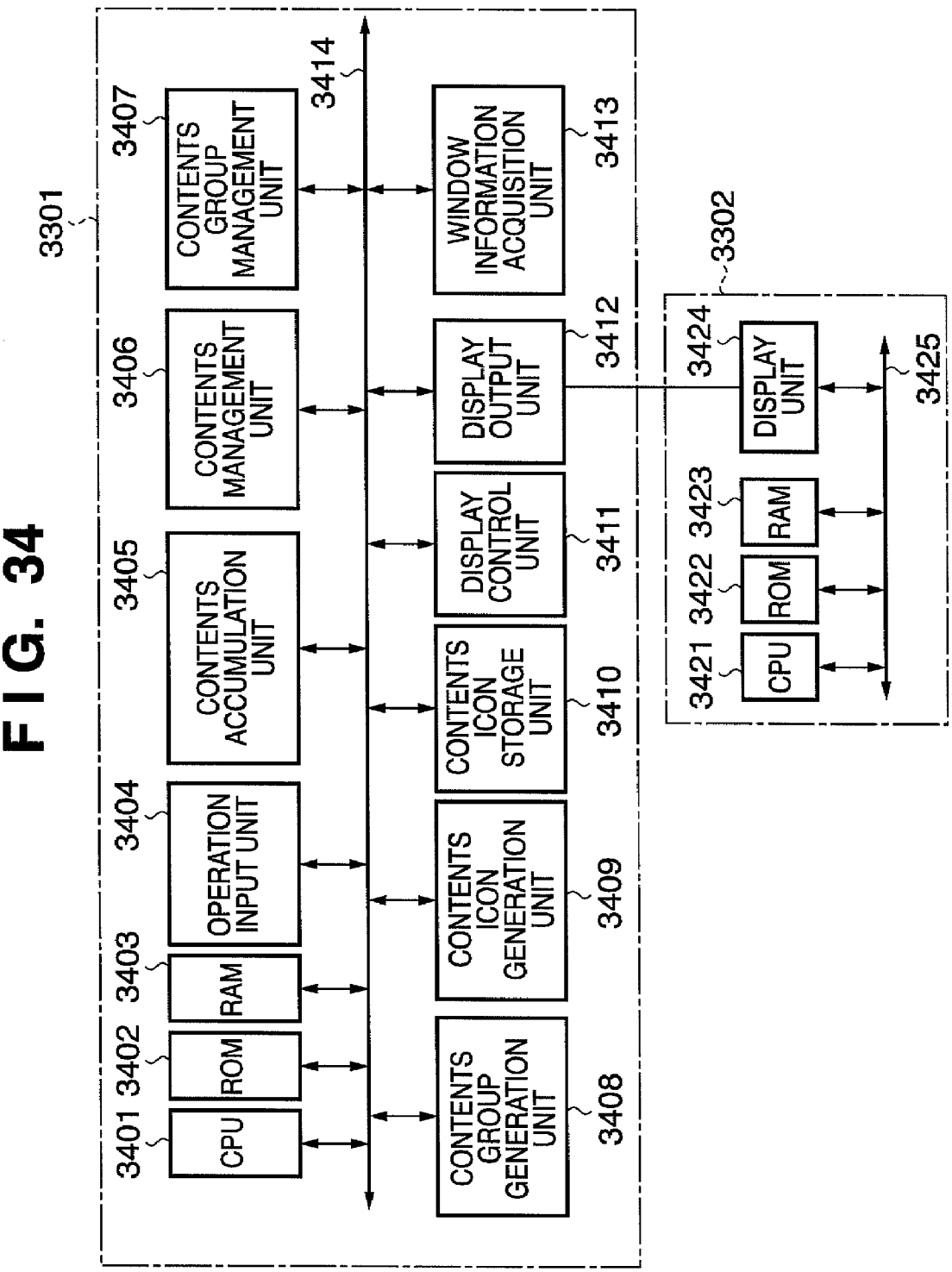
FIG. 34 is a block diagram showing an example of the hardware arrangement of a contents search apparatus 3301 and display apparatus 3302 shown in FIG. 33.

FIG. 34 shows an example of the hardware arrangements of the contents search apparatus 3301 and display apparatus 3302 shown in FIG. 33. Referring to FIG. 34, in the contents search apparatus 3301, reference numeral 3401 denotes a central processing unit (CPU), which controls the entire contents search apparatus according to programs stored in a ROM and the like (to be described below). Reference numeral 3402 denotes a ROM which stores programs of the CPU 3401, control data, and the like. Reference numeral 3403 denotes a RAM as a memory on which a work area used when the CPU 3401 executes control and various tables are defined.

Reference numeral 3404 denotes an operation input unit, which receives operation commands from the operation remote controller 3303. Reference numeral 3405 denotes a contents accumulation unit which accumulates contents to be displayed and searched. Reference numeral 3406 denotes a contents management unit, which manages the contents accumulated in the contents accumulation unit 3405.

Reference numeral 3407 denotes a contents group management unit, which holds group conditions and order conditions, and manages contents groups corresponding to these conditions. Reference numeral 3408 denotes a contents group generation unit, which generates groups of contents by grouping the contents accumulated in the contents accumulation unit 3405 in accordance with a given group condition of the contents group management unit 3407.

Reference numeral 3409 denotes a contents icon generation unit, which generates contents group icons for the contents groups managed by the contents group management unit 3407. Reference numeral 3410 denotes a contents icon storage unit which holds the contents group icons generated by the contents icon generation unit 3409.

Reference numeral 3411 denotes a display control unit which forms arrays of the contents group icons according to given order conditions held in the contents group management unit 3407, and lays out the contents group icon arrays to generate operation window data. Reference numeral 3412 denotes a display output unit, which outputs contents and their icons, the operation window data generated by the display control unit 3411, and the like to the display apparatus 3302.

Reference numeral 3413 denotes a window information acquisition unit, which acquires and manages a window state displayed on a display unit of the display apparatus 3302. Reference numeral 3414 denotes an internal bus.

In the display apparatus 3302, reference numeral 3421 denotes a central processing unit (CPU); 3422, a ROM; and 3423, a RAM. Reference numeral 3424 denotes a display unit which displays display image data, which is generated by the display control unit 3411 of the contents search apparatus 3301, and is output from the display output unit 3412. Reference numeral 3425 denotes an internal bus.

Figure 35:
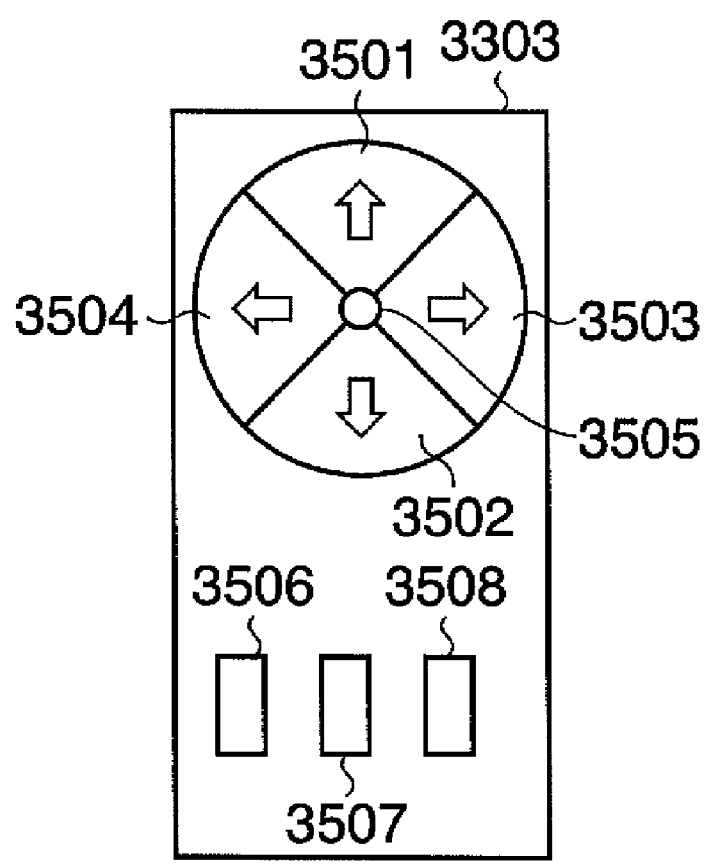
FIG. 35 is a view showing an example of the hardware arrangement of an operation remote controller 3303 shown in FIG. 33.

FIG. 35 shows an example of the hardware arrangement of the operation remote controller 3303. Referring to FIG. 35, reference numeral 3501 denotes an up instruction key; 3502, a down instruction key; 3503, a right instruction key; and 3504, a left instruction key. The user operates these keys upon changing the selection of a contents icon and upon changing the selection of a content itself. Reference numeral 3505 denotes an enter key, which determines a selection and operation.

Reference numeral 3506 denotes a contents change key which is used to switch to an operation for changing a reference content in a reference contents group. Reference numeral 3507 denotes an operation change key which is used to switch between a normal operation and filtering operation. Reference numeral 3508 denotes a window switching key which is used to switch windows from a contents list display window to a contents group list display window.

The operations for shifting the contents group icons displayed on the display apparatus 3302 in accordance with the up, down, right, and left instruction keys 3501 to 3504 of the operation remote controller 3303 will be described below with reference to FIGS. 36 to 38.

Figure 36:
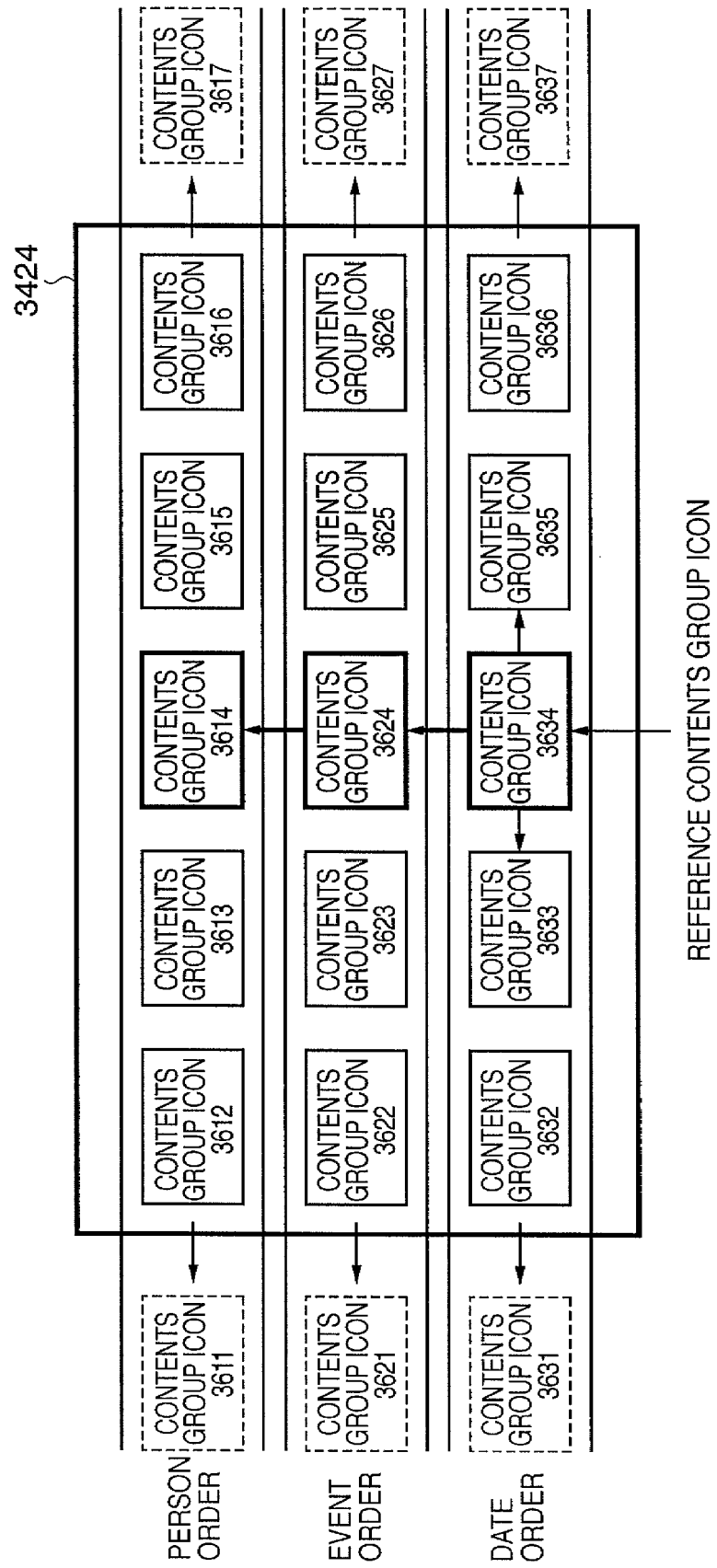
FIG. 36 is a view for explaining the display transition of contents group icons.

Referring to FIG. 36, contents group icons 3631 to 3637 grouped based on dates are sorted in a date order to form a array, which serves as a reference contents group icon array. Furthermore, contents group icons 3621 to 3627 grouped based on events are sorted in an event order to form another array, and contents group icons 3611 to 3617 grouped based on person are sorted in a person order to form still another array. Then, the reference contents group icon 3634 including a reference content is designated. In the group of the event order, the contents group icon 3624 includes this reference content. In the group of the person order, the contents group icon 3614 includes the reference content.

Figure 37:
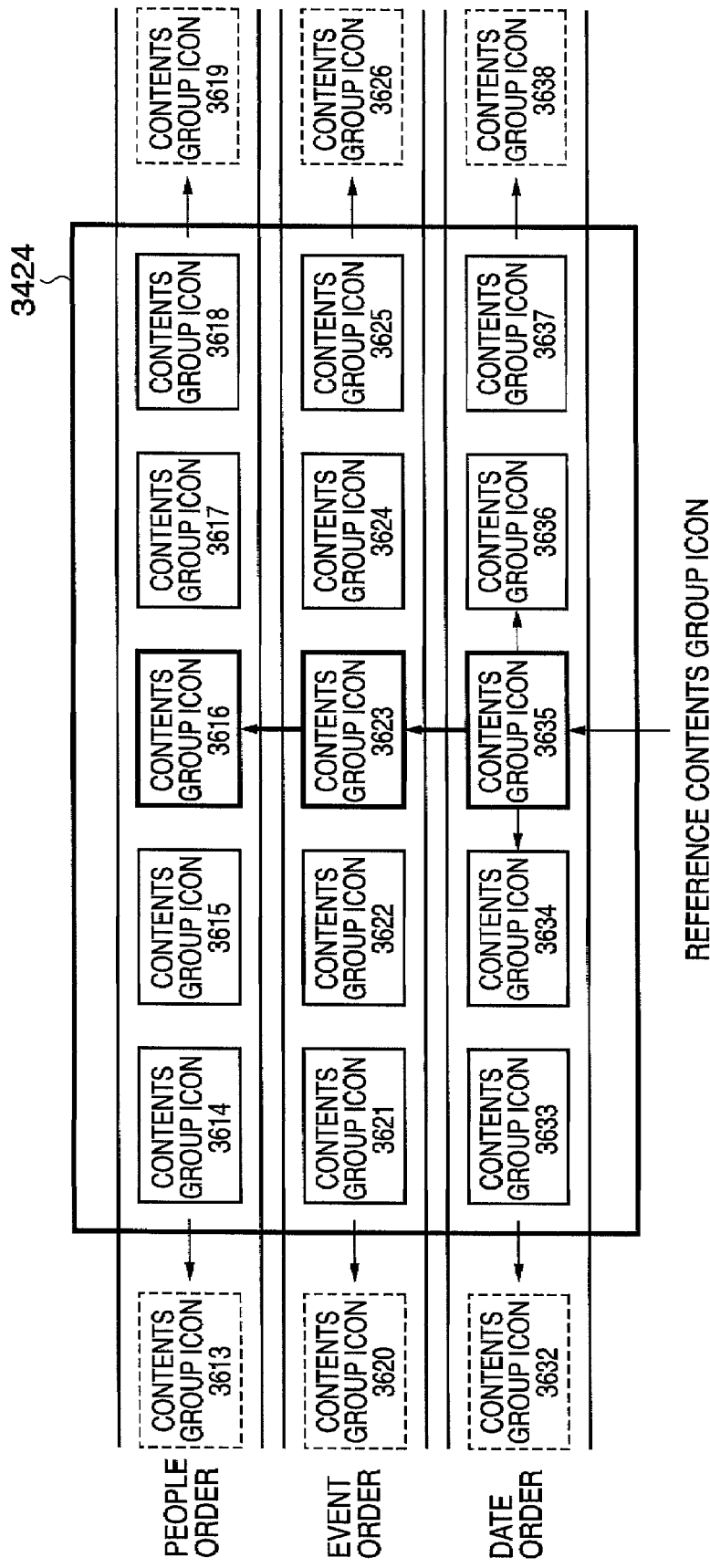
FIG. 37 is a view for explaining the display transition of contents group icons.

When the user presses the right instruction key 3503 of the operation remote controller 3303 in this state, the contents icon array of the groups of the date order is scrolled to the left to change the reference contents group icon to the icon 3635, as shown in FIG. 37. In the groups of the event order, the contents group icon 3623 includes the reference content. In the groups of the person order, the contents group icon 3616 includes the reference content. Therefore, the contents group icon arrays are scrolled to locate these contents group icons above the contents group icon 3635.

Figure 38:
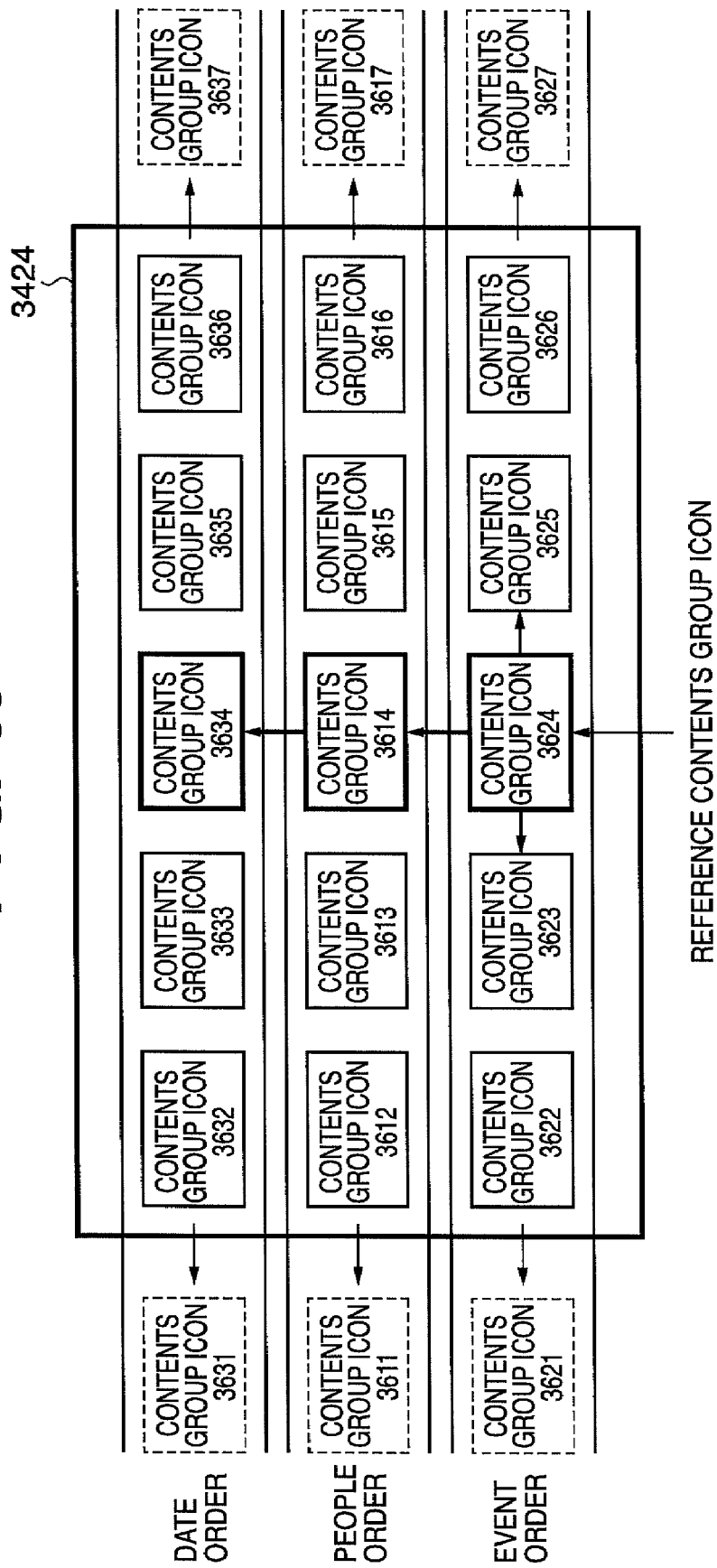
FIG. 38 is a view for explaining the display transition of contents group icons.

When the user presses the up instruction key 3501 of the operation remote controller 3303 in the state shown in FIG. 36, the contents icon array of the groups of the event order is scrolled downward to change the reference contents group icon to the icon 3624, as shown in FIG. 38. In the groups of the person order, the contents group icon 3614 includes this reference content. In the groups of the date order, the contents group icon 3634 includes the reference content. Therefore, the contents group icon arrays are scrolled to locate these contents group icons above the contents group icon 3624.

In this way, the reference contents group icon is changed in accordance with the up, down, right, and left instruction keys 3501 to 3504 of the operation remote controller 3303, and the contents group icon arrays are scrolled according to this change, thus transiting the windows.

Figure 39:
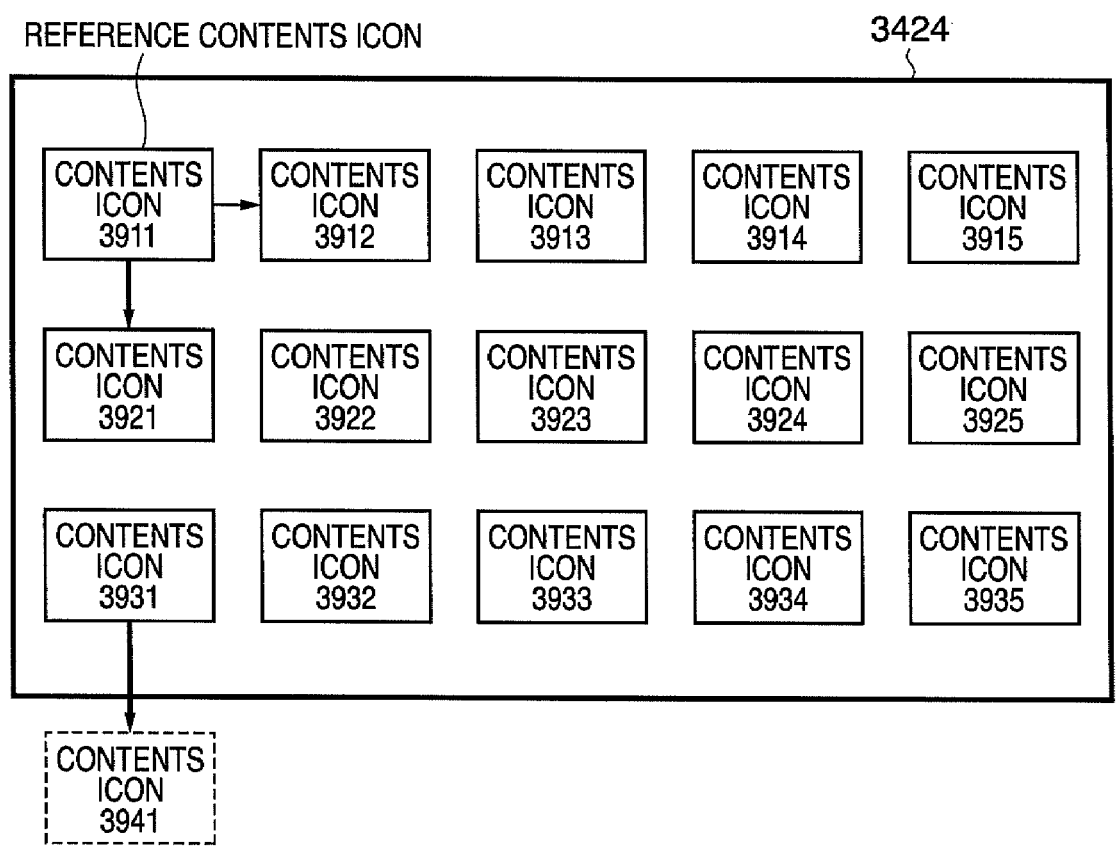
FIG. 39 shows an example of a window that displays contents icons designated by a reference contents group icon upon pressing of an enter key 3505.

When the contents group icon arrays are scrolled according to the up, down, right, and left instruction keys 3501 to 3504 of the operation remote controller 3303, and the user then presses the enter key 3505, contents icons are displayed, as shown in FIG. 39.

FIG. 39 shows an example of a window which displays contents icons indicated by the reference contents group icon upon pressing of the enter key 3505. Referring to FIG. 39, reference numeral 3911 denotes a reference contents icon, which is displayed to have an outer appearance different from other contents icons. Furthermore, the up, down, right, and left instruction keys 3501 to 3504 of the operation remote controller 3303 allow the user to select contents. Reference numerals 3912 to 3941 denote normal contents icons. If there are contents icons which cannot fall within one window, they are displayed by scrolling the window.

Figure 40:
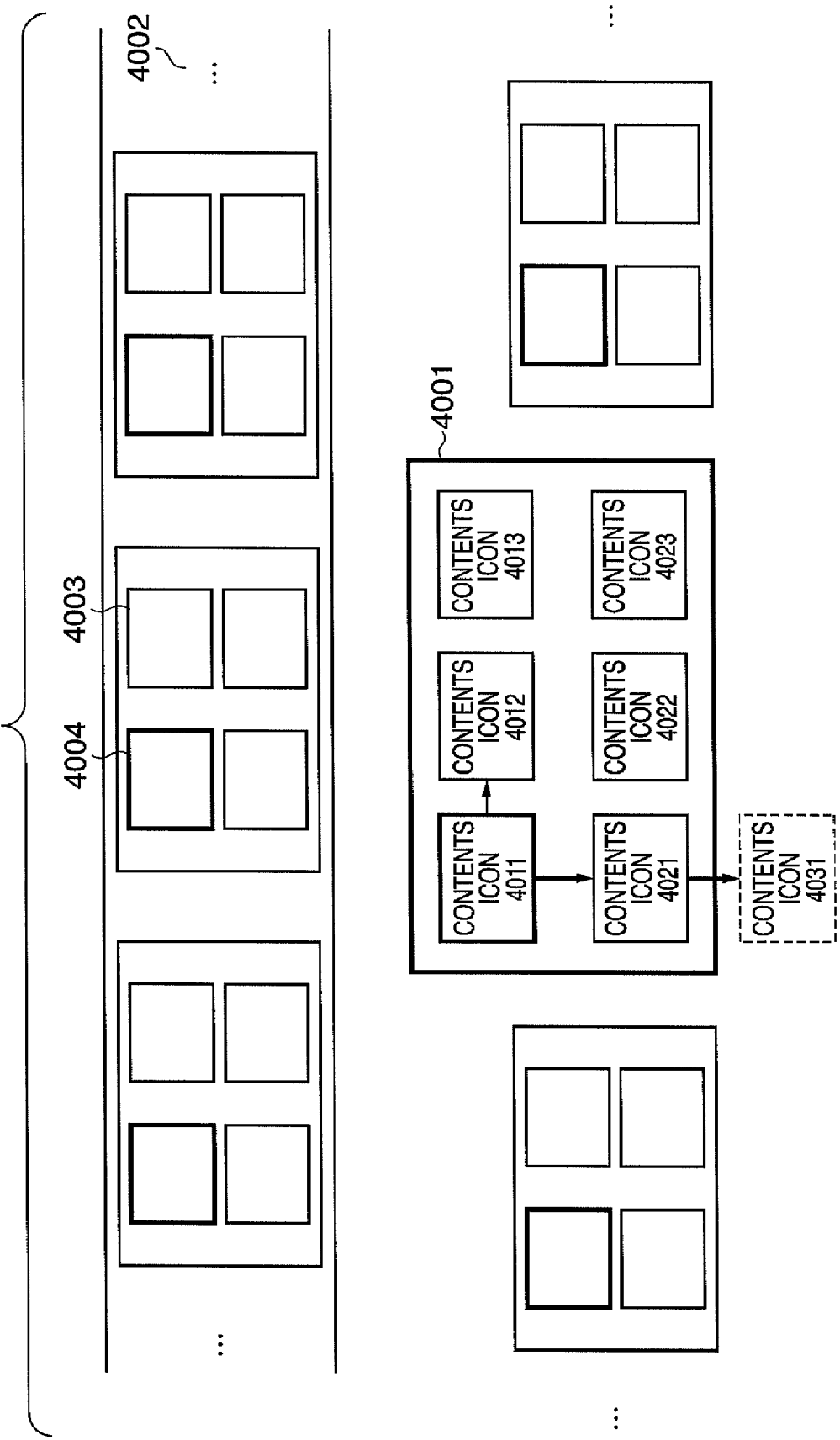
FIG. 40 shows an example of a reference contents change display window.

When the user presses the contents change key 3506 for the reference contents group icon, a change display window is displayed, as shown in FIG. 40.

FIG. 40 shows an example of the reference contents change display window. In FIG. 40, reference numeral 4011 denotes a reference contents icon, which is displayed to have an outer appearance different from other contents icons. Furthermore, the up, down, right, and left instruction keys 3501 to 3504 of the operation remote controller 3303 allow the user to change the reference content. Reference numeral 4012 to 4031 denote normal contents icons. If there are contents icons which cannot fall within one window, they are displayed by scrolling the window.

Reference numeral 4001 denotes a reference contents group icon; 4002, another contents group icon array; 4003, a contents group icon; and 4004, an image indicating a given content.

Description of Detailed Operation

The practical operations of the contents search apparatus 3301 in the third embodiment will be described hereinafter in several cases.

Displays and window transitions of contents group icons, which are sorted under different group conditions such as the date order, event order, and person order, and under different order conditions will be described first.

Figure 41:
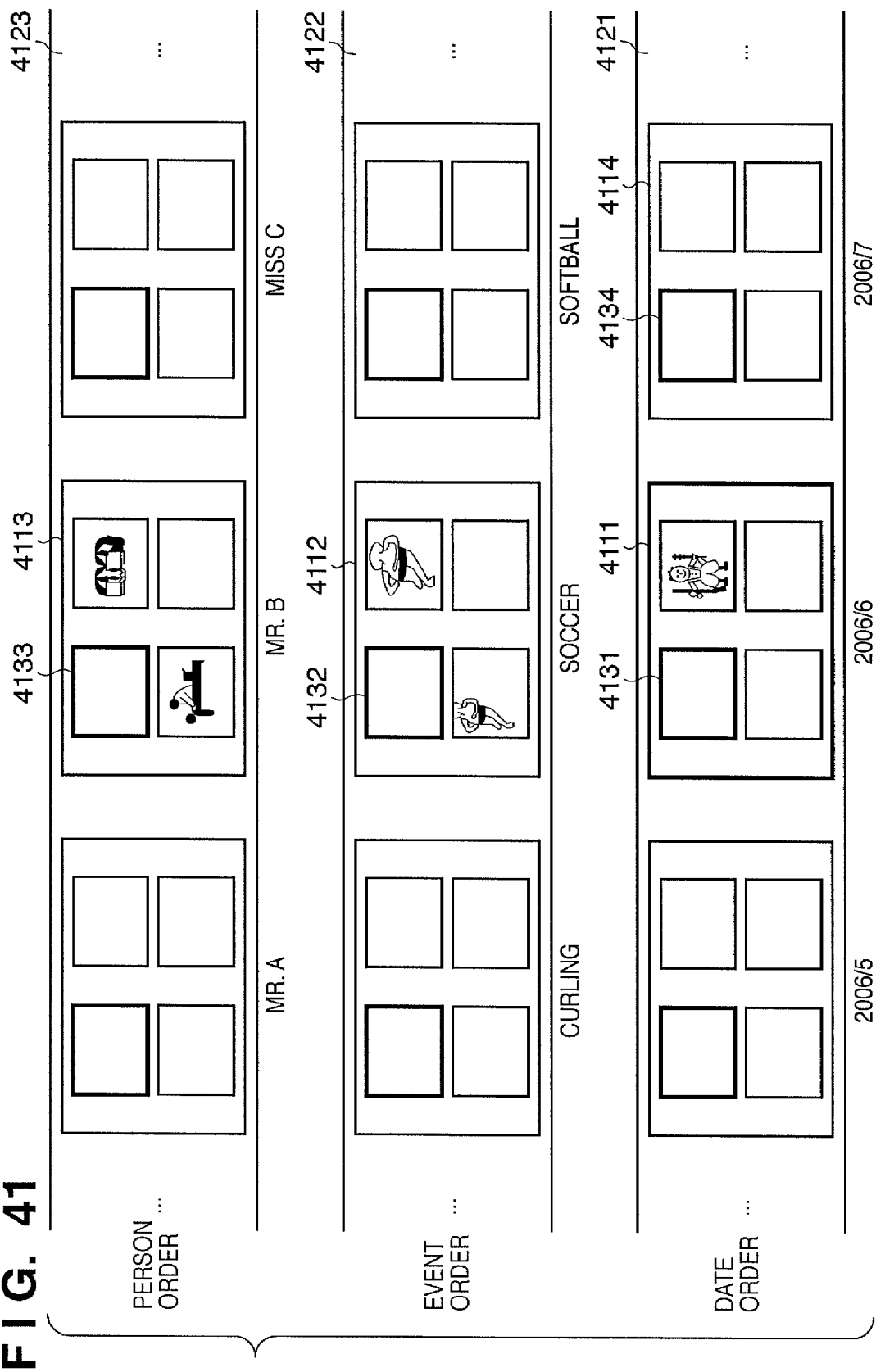
FIG. 41 shows an example of a user interface window displayed on a display unit 3424.

FIG. 41 shows an example of a user interface window displayed on the display unit 3424. Referring to FIG. 41, reference numeral 4111 denotes a reference contents group icon which includes the reference content, belongs to the reference contents group icon group, and is displayed to have an outer appearance different from other contents group icons 4112 to 4114. Reference numeral 4112 denotes a reference contents group icon which belongs to the contents group icon array sorted in the event order. Reference numeral 4113 denotes a reference contents group icon which belongs to the contents group icon sorted in the person order.

Note that reference contents group icons 4111 to 4113 include the reference content. In this example, each contents group icon includes images indicating four contents.

Reference numeral 4114 denotes an example of a contents group icon other than the reference contents group icons 4111 to 4113. This icon 4114 includes an image 4134 which indicates a representative content, and is displayed to have an outer appearance different from images indicating other contents.

Reference numeral 4121 denotes a contents group icon array sorted in the date order. Reference numeral 4122 denotes a contents group icon array sorted in the event order. Reference numeral 4123 denotes a contents group icon array sorted in the person order. In this example, the contents group icon array 4121 sorted in the date order is the reference contents group icon array, and is displayed to have an outer appearance different from other contents group icon arrays 4122 and 4123.

Reference numeral 4131 denotes an image which indicates the reference content in the reference contents group icon 4111, and is displayed to have an outer appearance different from images indicating other contents. The contents group icons 4112 and 4113 also include images 4132 and 4133 indicating the reference content. As these images 4132 and 4133, the same images as the image 4131 indicating the reference content are displayed to have an outer appearance different from images indicating other contents.

Figure 42:
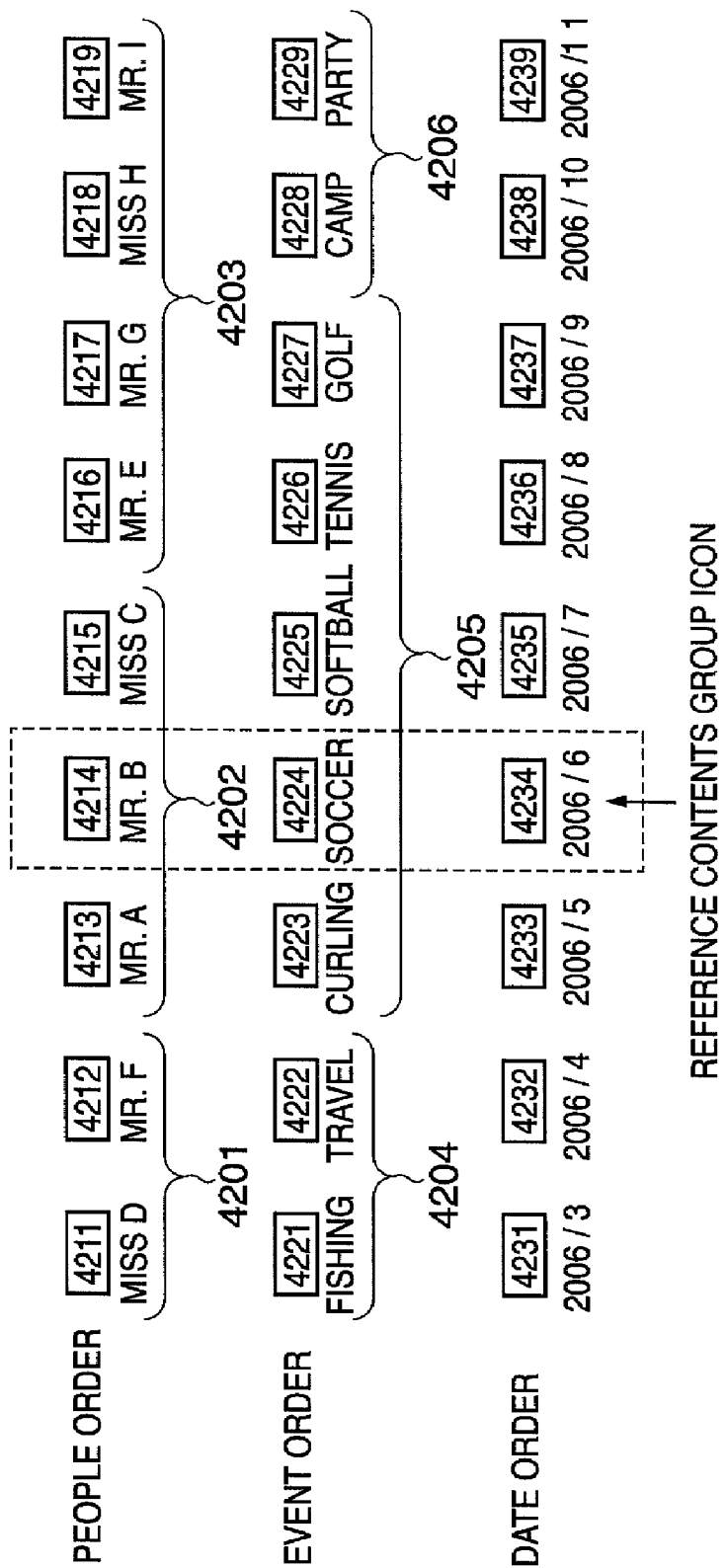
FIG. 42 shows contents group icon arrays under respective order conditions.

FIG. 42 shows contents group icon layouts under the respective order conditions. In FIG. 42, in the contents group icon array sorted in the date order, contents are grouped for each month, and the reference content group corresponds to a group 4234 "2006/6".

In the contents group icon array sorted in the event order, contents are further grouped for each event, and are sorted in the order of a group 4204 of "fishing" 4221, a group of 4205 of "curling" 4223, and a group 4206 of "camp" 4228. The reference content group of this array is a group 4224 "soccer".

In the contents group icon array sorted in the person order, contents are further grouped for each person, and are sorted in the order of a group 4201 of "Miss D" 4211, a group 4202 of "Mr. A" 4213, and a group 4203 of "Mr. E" 4216. The reference content group of this array is a group 4214 "Mr. B".

Figure 43:
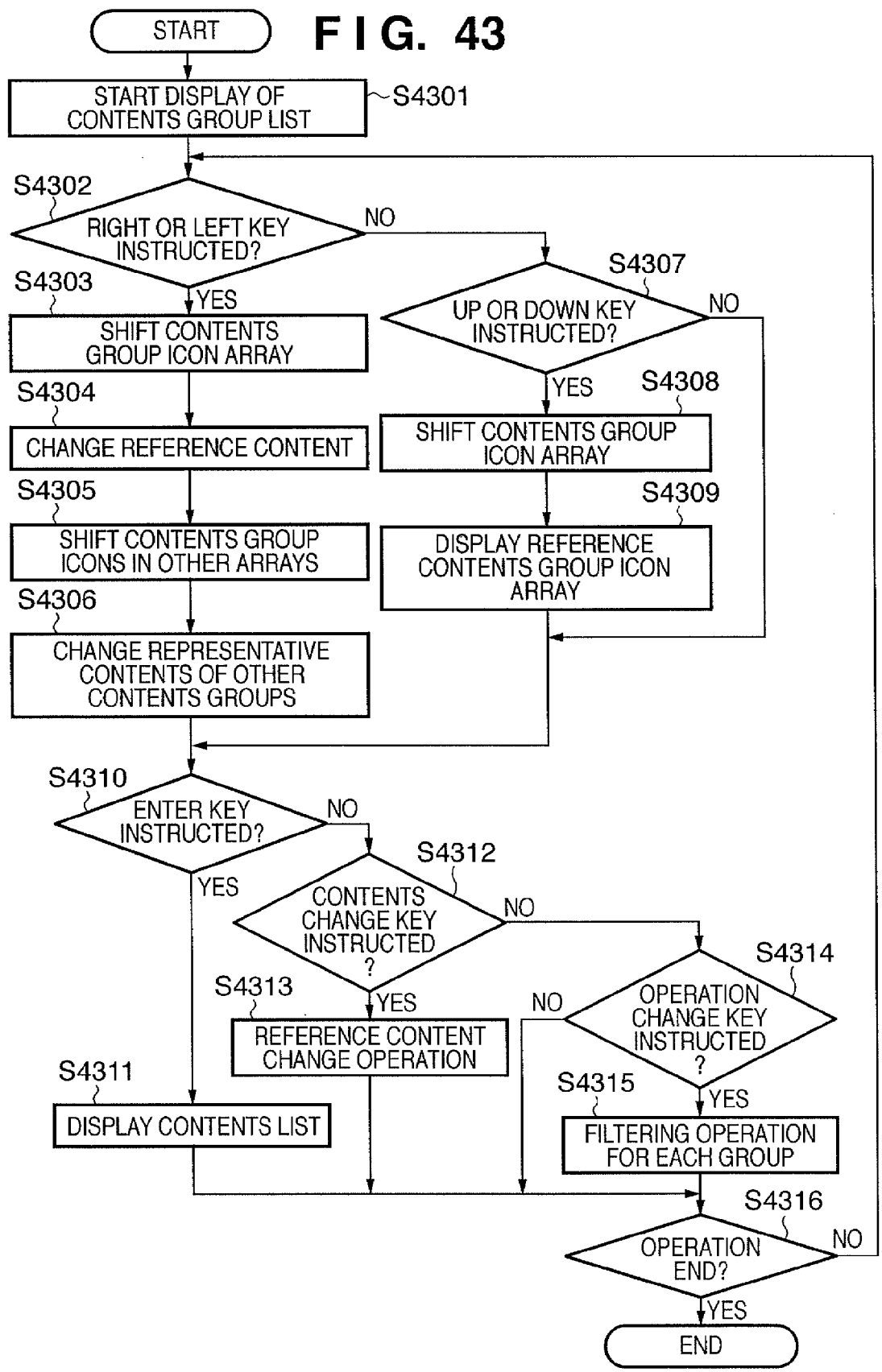
FIG. 43 is a flowchart showing the contents group icon selection processing according to the third embodiment.

FIG. 43 is a flowchart showing the contents group icon selection processing according to the third embodiment. Initially, the CPU 3421 displays a contents group list window with a focus on the reference contents group icon 4111 of the reference contents group icon array 4121 shown in FIG. 41 (S4301). If the user presses the right instruction key 3503 of the operation remote controller 3303 (S4302), the CPU 3421 scrolls the reference contents group icon array 4121 to the left to transit the window from that shown in FIG. 36 to that shown in FIG. 37 (S4303). The CPU 3421 changes the reference contents group icon to the contents group icon 4114, and displays that icon to have an outer appearance different from other icons. Furthermore, the CPU 3421 changes the reference contents to the image 4134 as the representative content of the contents group icon 4114 (S4304).

The CPU 3421 scrolls the contents group icon array 4122 so as to locate the contents group icon including the reference content 4134 in the contents group icon array 4122 above the contents group icon 4114 (S4305). Also, the CPU 3421 similarly scrolls the contents group icon array 4123. Then, the CPU 3421 changes the representative contents of these contents group to the same content as the reference content 4134 (S4306).

If the user presses the left instruction key 3504 of the operation remote controller 3303 (S4302), the CPU 3421 scrolls the reference contents group icon array 4121 to the right and executes the same operations as those upon pressing of the right instruction key 3503.

On the other hand, if the user presses the up instruction key 3501 of the operation remote controller 3303 (S4307), the CPU 3421 scrolls the contents group icon array 4122 of the event order downward so as to transmit the window from that shown in FIG. 36 to that shown in FIG. 38. The CPU 3421 locates the contents group icon array 4121 of the date order at the uppermost position (S4308). Next, the CPU 3421 displays the contents group icon array 4122 of the event order to have an outer appearance different from other contents group icon arrays (S4309).

If the user presses the down instruction key 3502 of the operation remote controller 3303 (S4307), the CPU 3421 scrolls the contents group icon array 4121 of the date order upward. Then, the CPU 3421 locates the contents group icon array 4123 of the person order at the lowermost position, and executes the same operations as those upon pressing of the up instruction key 3501.

If the user presses the enter key 3505 of the operation remote controller 3303 (S4310), the CPU 3421 unfolds the selected reference contents group icon to display the list of contents icons shown in FIG. 39 (S4311). If the user presses the contents change key 3506 of the operation remote controller 3303 (S4312), the CPU 3421 switches the window to the reference contents change window shown in FIG. 40 (S4313).

Figure 45:
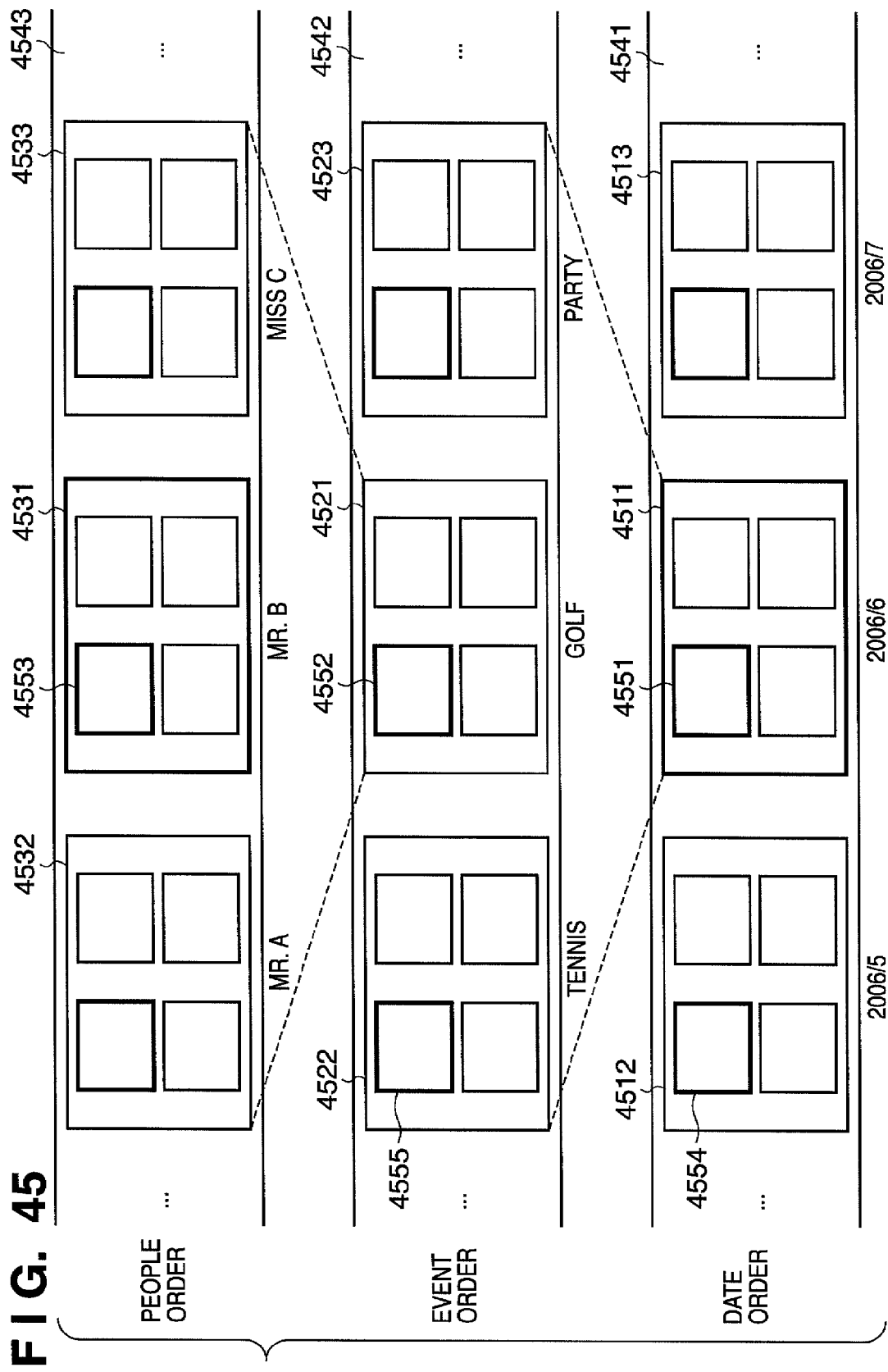
FIG. 45 shows an example of a user interface window used to execute filtering for respective group conditions.

If the user presses the operation change key 3507 of the operation remote controller 3303 (S4314), the CPU 3421 switches the window to a filtering window for respective groups shown in FIG. 45 to have the currently selected reference contents group as the center (S4315). After that, the CPU 3421 repeats the aforementioned processes until the user quits the operation.

In this manner, the contents group icons including the reference content in the up direction can always be displayed to have the selected contents group as the reference contents group, thus allowing the user to recognize the overviews of the contents list and to conduct a simple visual search. Also, the user can easily recognize the reference contents group icon array, reference contents group icons, and reference content.

Figure 44:
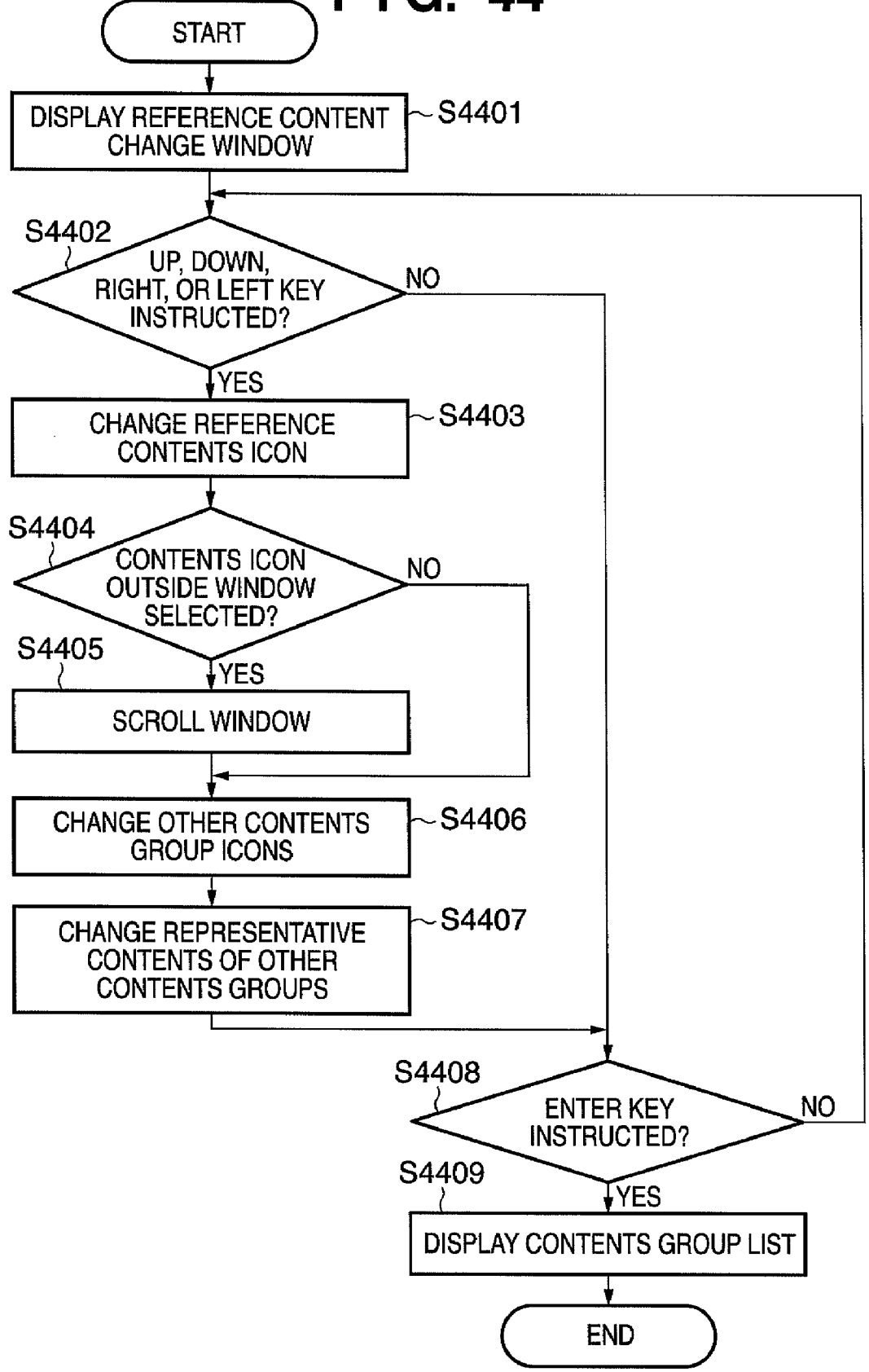
FIG. 44 is a flowchart showing the reference contents selection processing according to the third embodiment.

FIG. 44 is a flowchart showing the reference content selection processing according to the third embodiment. Initially, the CPU 3421 displays the reference contents change window by unfolding the reference contents group icon 4001 based on the contents icons, as shown in FIG. 40 (S4401). In FIG. 40, the reference contents icon is the icon 4011. If the user presses the down instruction key 3502 of the operation remote controller 3303 (S4402), the CPU 3421 changes the reference contents icon to the icon 4021; if he or she presses the right instruction key 3503 (S4402), it changes the reference contents icon to the icon 4012 (S4403).

In this way, if the user changes, in the up, down, right, and left directions, the reference contents icon to, e.g., a content outside the display like the contents icon 4031 (S4404), the CPU 3421 scrolls the display of the reference contents group icon 4001. Then, the CPU 3421 displays the scrolled contents group icon (S4405). Furthermore, the CPU 3421 changes the contents group including the reference content to the reference contents group 4003 included in the other contents group icon array 4002, and displays its icon on the reference contents group icon 4001 (S4406). The CPU 3421 changes the representative content of the changed contents group 4003 to the same content as the currently selected reference content (S4407).

If the user presses the enter key 3505 of the operation remote controller 3303 (S4408), the CPU 3421 switches the window to the contents group list window shown in FIG. 41 (S4409).

In this manner, the user can switch the reference content within the contents group, and can also change the representative content by setting a content which was the reference content immediately before change in the reference contents group as the representative content.

The display of the contents group icons contents group icons filtered and arranged for respective group conditions by applying filtering such as grouping of the contents event groups sorted in the date order for respective events and then grouping of the filtered groups for each person will be described below.

FIG. 45 shows an example of a user interface window used to apply filtering for respective group conditions. Referring to FIG. 45, reference numerals 4511 to 4533 denote contents group icons for respective order conditions; 4541 to 4543, contents group icon arrays; and 4551 to 4555, images indicating the contents in the contents group icons.

In this example, the contents group icon array sorted in the date order is the reference contents group icon array 4541 and is displayed to have an outer appearance different from other contents group icon arrays 4542 and 4543.

Reference numeral 4511 denotes a reference contents group icon which belongs to the reference contents group icon array 4541, and the contents included in this icon can be classified to contents groups indicated by the contents group icons 4521 to 4523.

Reference numeral 4521 denotes a reference contents group icon which belongs to the contents group icon array 4542 sorted in the event order, and the contents included in this icon can be classified to contents groups indicated by the contents group icons 4531 to 4533. Reference numeral 4531 denotes a reference contents group icon which belongs to the contents group icon array 4543 sorted in the person order.

The contents group icons 4511, 4521, and 4531 respectively include the images 4551, 4552, and 4553 indicating the reference content.

Reference numeral 4551 denotes an image indicating the reference content in the reference contents group icon 4511. The contents group icons 4521 and 4531 also include the images 4552 and 4553 indicating the reference content. These images are the same as the image 4551 indicating the reference content in the reference contents group icon 4511. Reference numerals 4554 and 4555 denote images indicating the representative contents in the contents group icons 4512 and 4522.

Figure 46:
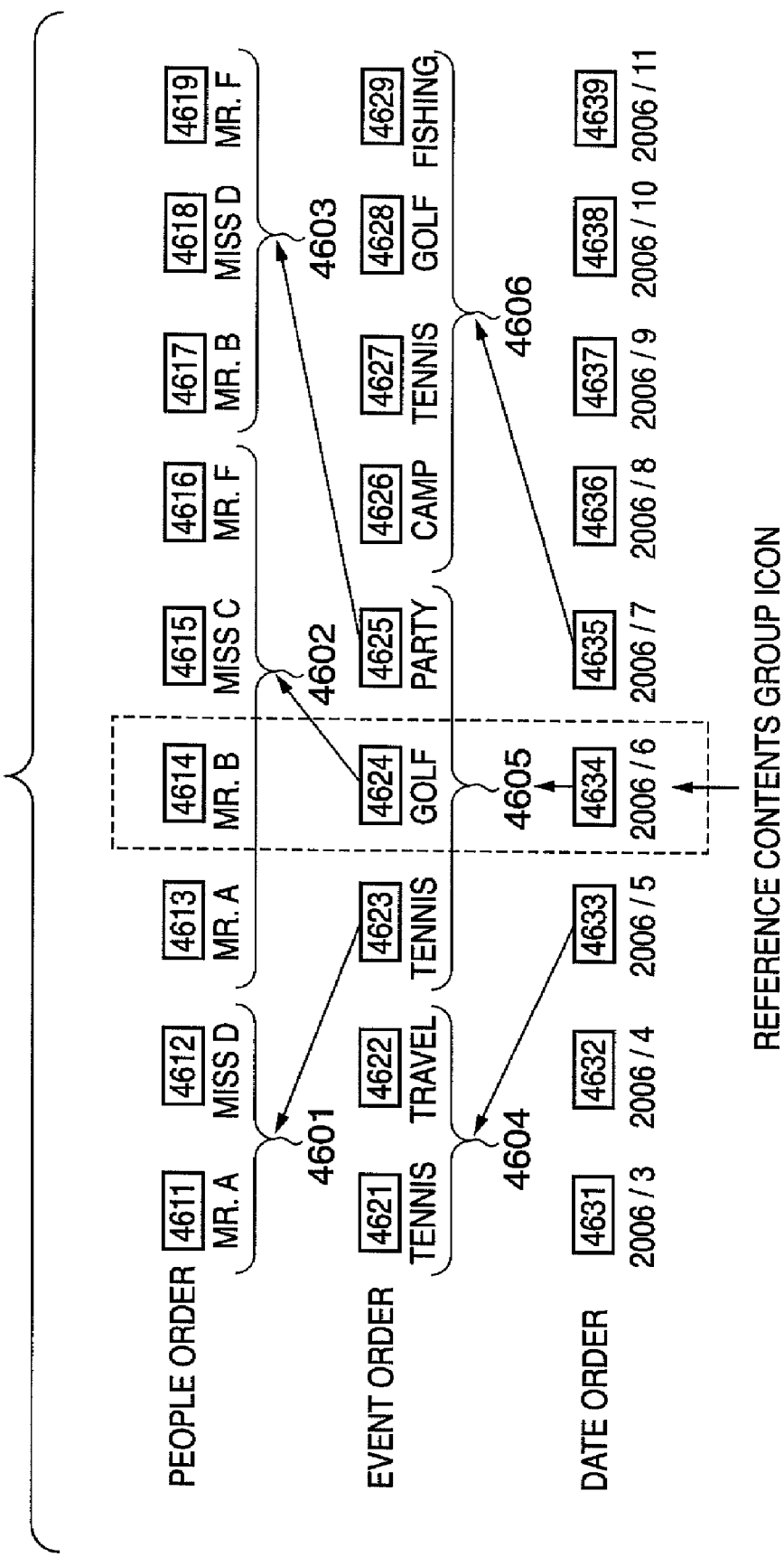
FIG. 46 shows an example of a contents group layout of filtered arrays for respective group conditions.

FIG. 46 shows an example of contents group layouts of filtered arrays for respective group conditions. Referring to FIG. 46, the contents group icon array sorted in the date order is grouped for respective months, and the reference contents group is a group 4634 "2006/6". The contents group icon array sorted in the event order is further grouped based on the contents groups respectively included in contents groups 4631 to 4639. More specifically, contents included in the reference contents group 4634 "2006/6" are arranged while being classified into contents groups 4623 "tennis", 4624 "golf", and 4625 "party" (a group 4605).

Also, contents included in the contents group 4633 "2005/5" are arranged while being classified into contents groups 4621 "tennis" and 4622 "travel" (group 4604). In addition, contents included in the contents group 4635 "2006/7" are arranged while being classified into contents groups 4626 "camp", 2627 "tennis", 4628 "golf", and 4629 "fishing" (group 4606).

Furthermore, the contents group icon array sorted in the person order is further grouped based on contents groups respectively included in contents groups 4621 to 4629. More specifically, contents included in the contents group 4624 "golf" are arranged while being classified into contents groups 4613 "Mr. A", 4614 "Mr. B", 4615 "Miss C", and 4616 "Mr. F" (group 4602).

Also, contents included in the contents group 4623 "tennis" are arranged while being classified into contents groups 4611 "Mr. A" and 4612 "Miss D" (group 4601). In addition, contents included in the contents group 4625 "party" are arranged while being classified into contents groups 4617 "Mr. B", 4618 "Miss D", and 4619 "Mr. F".

The respective arrays include a plurality of contents groups to be grouped as identical groups. However, these contents groups are filtered from the reference contents group, and include different contents.

Figure 47:
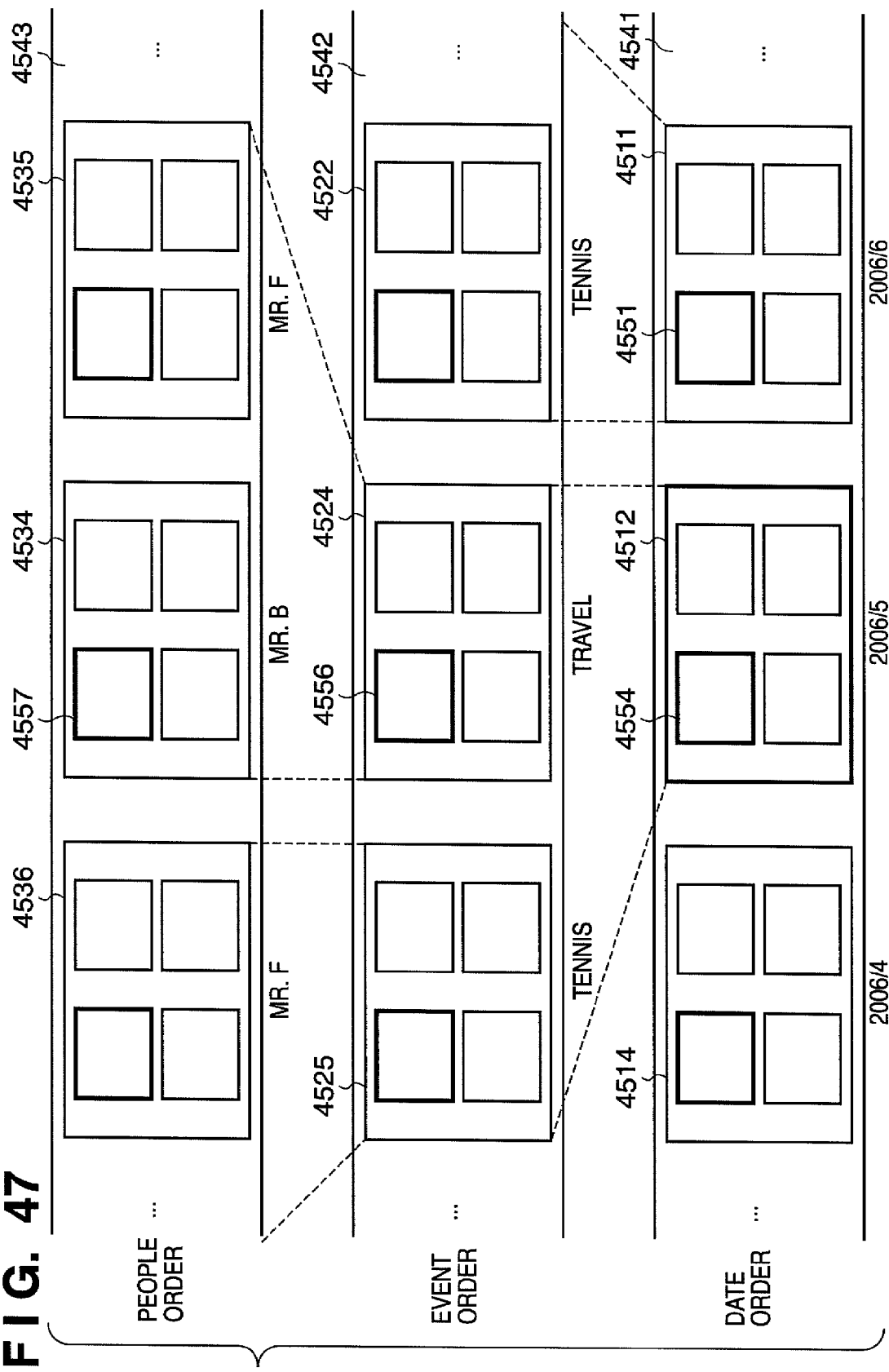
FIG. 47 shows a transition state from the user interface window shown in FIG. 45 after filtering for respective groups.

When the user changes the reference contents group icon 4511 to the left neighboring contents group icon 4512 on the filtering window for respective groups shown in FIG. 45, the window transits to a filter window for respective groups shown in FIG. 47.

FIG. 47 shows the transition state from the user interface window shown in FIG. 45 after filtering is done for respective groups. As shown in FIG. 47, the reference contents group icon is changed from the contents group icon 4511 to the contents group icon 4512. The reference content is the representative content 4554 included in the contents group icon 4512.

Contents included in the reference contents group icon 4512 can be classified into contents groups indicated by the contents group icons 4524 and 4525. The contents group icon 4524 becomes a reference contents group icon which includes the image 4556 indicating the same content as the reference content 4554, and belongs to the contents group icon array sorted in the event order. Furthermore, contents included in this contents group icon 4524 can be classified into contents groups indicated by the contents group icons 4534 and 4535.

On the right side of the contents group icon 4524, the contents group icon 4522 included in the contents group icon 4511 located on the right side of the contents group icon 4512 as the source of the icon 4524 is displayed. The contents group icon 4534 becomes a reference contents group icon which includes the image 4556 indicating the same content as the reference content 4554, and belongs to the contents group icon array sorted in the person order.

On the left side of the contents group icon 4534, the contents group icon 4536 included in the contents group icon 4525 located on the left side of the contents group icon 4524 as the source of the icon 4534 is displayed.

Figure 48:
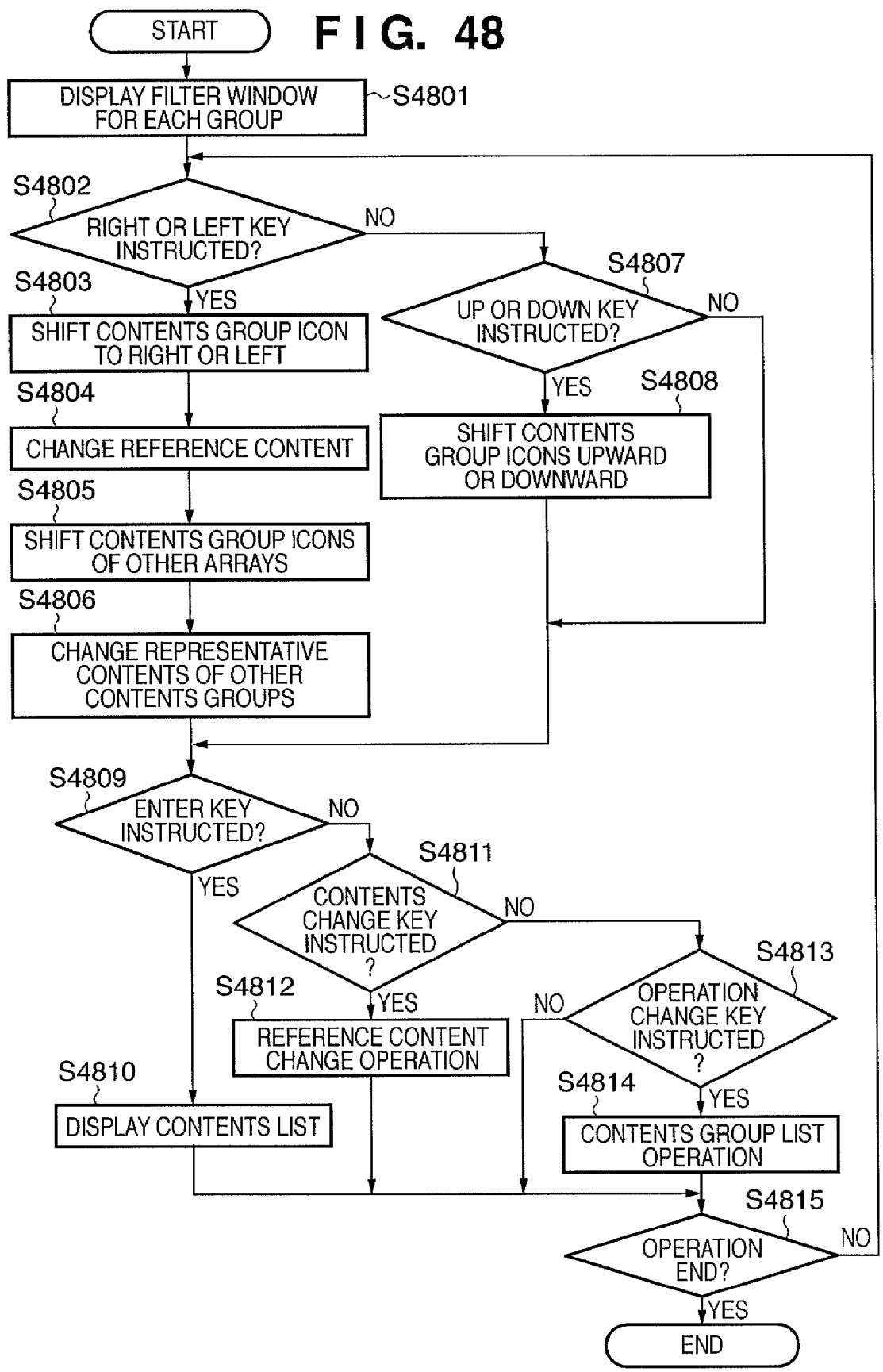
FIG. 48 is a flowchart showing the filtered contents group icon selection processing according to the third embodiment.

FIG. 48 is a flowchart showing the filtering contents group icon selection processing according to the third embodiment. Initially, the CPU 3421 displays the contents group list window to have the reference contents group icon 4511 of the reference contents group icon array 4541 as the center shown in FIG. 45 (S4801). If the user presses the left instruction key 3504 of the operation remote controller 3303 (S4802), the CPU 3421 scrolls the reference contents group icon array 4541 to the right (S4803). The CPU 3421 changes the reference contents group icon to the icon 4512 and displays it to have an outer appearance different from other icons. Furthermore, the CPU 3421 changes the reference content to the image 4554 as the representative content of the contents group icon 4512 (S4804).

Next, the CPU 3421 shifts the contents group icon array 4542 to locate a contents group icon including the reference content 4554 in that array above the contents group icon 4512 (S4805). Also, the CPU 3421 similarly shifts the contents group icon array 4543. The CPU 3421 changes the representative contents of these contents groups to the same content as the reference content 4554 (S4806).

If the user presses the right instruction key 3503 of the operation remote controller 3303 (S4802), the CPU 3421 scrolls the reference contents group icon array 4541 to the left and executes the operations as those upon pressing of the left instruction key 3504.

On the other hand, if the user presses the up instruction key 3501 of the operation remote controller 3303 in the state shown in FIG. 45 (S4807), the CPU 3421 changes the reference contents group icon to the icon 4521 (S4808). Furthermore, if the user presses the left instruction key 3504 of the operation remote controller 3303, the CPU 3421 scrolls the contents group icon array 4542 to the right (S4803). The CPU 3421 changes the reference contents group icon to the icon 4522 and displays that icon to have an outer appearance different from other icons. Furthermore, the CPU 3421 changes the reference content to the image 4555 as the representative content of the contents group icon 4522 (S4804).

The CPU 3421 shifts the contents group icon array 4543 to locate a contents group icon including the reference content 4555 in that array above the contents group icon 4522 (S4805). The CPU 3421 changes the representative contents of these contents groups to the same content as the reference content 4555 (S4806). Note that the CPU 3421 does not shift the contents group icon 4511 in the reference contents group icon array 4541, since that icon includes the reference content 4555, and changes the representative content to the same content as the reference content 4555 (S4806).

If the user presses the enter key 3505 of the operation remote controller 3303 (S4809), the CPU 3421 unfolds the selected reference contents group icon to display the list of contents icons, as shown in FIG. 39 (S4810).

If the user presses the contents change key 3506 of the operation remote controller 3303 (S4811), the CPU 3421 switches the window to the reference contents change window shown in FIG. 40 (S4812). If the user presses the operation change key 3507 of the operation remote controller 3303 (S4813), the CPU 3421 switches the window to the contents group list display window shown in FIG. 41 to have the currently selected reference contents group as the center (S4814). After that, the CPU 3421 repeats the aforementioned processes until the user quits the operation.

In this way, upon grouping contents, and laying out groups, related groups can be laid out at neighboring positions, and the user can recognize related contents groups and can conduct a simple visual search by filtering the contents groups.

In the third embodiment, three rows of contents group icon arrays of the date, event, and person orders are arranged. Alternatively, two rows or four or more rows of contents group icon arrays may be arranged. Contents are grouped for different categories. However, contents may be grouped for respective days, months, and years in the date order.

The reference contents group icons are displayed in all the contents group icon arrays. However, the reference contents group icon may be displayed in only the reference contents group icon array, and may not be displayed in other contents group icon arrays.

Furthermore, each contents group icon may be configured by data which is not an image indicating a content, images indicating one or more arbitrary contents, or images indicating all the contents included in the contents group.

The window is generated by laying out the reference contents group icons in a second direction perpendicular to the contents group icon arrays. Alternatively, the reference contents group icons may be laid out so that the second direction crosses in an oblique direction. In this case as well, the window is generated to always lay out the reference contents group icons in the predetermined second direction.

The positions of the reference contents group icons in the window are always located at the center. However, these positions may be shifted to the right or left. In this case as well, the intersections between the first and second directions are shifted, but the window is generated to always lay out the reference contents group icons in the predetermined second direction.

Fourth Embodiment

The fourth embodiment according to the present invention will be described in detail hereinafter with reference to the accompanying drawings.

In recent years, digital home electric appliances such as digital cameras, digital video cameras, digital video disk recorders, flat panel televisions, and the like are rapidly prevailing. In these digital home electric appliances, contents such as still images, moving images, and the like are generated, accumulated, played back, and edited. As storage media have larger sizes and lower prices, the ratio of moving images in these contents goes on increasing.

Since a moving image content has a time axis unlike a still image content, functions different from those for the still image content are required to recognize its overview and to execute playback and edit processes while designating a required frame (scene).

The most popular one of these functions is to play back, fast-forward, and rewind a moving image. Also, a method of analyzing the characteristics of frames in the moving image content to detect boundaries, displaying a list of still images of representative frames in sections divided by the boundaries, and making operations such as editing of the section by designating the still image is known (for example, see Japanese Patent Laid-Open No. 6-209451).

As is known, for a moving image content set with cue points called chapters, when the user instructs to display a given chapter, a chapter display window is displayed. The chapter display window repetitively displays the selected section of the moving image content as a moving image, and further displays thumbnails (reduced-scale images) corresponding to chapters before and after the current chapter (for example, see Japanese Patent Laid-Open No. 2006-86612).

However, with the related arts, when the user wants to find out a required scene in a content while selecting moving image contents and to play back or edit such scene, the operations become troublesome. For example, the user must conduct a search or sort on a contents management window to filter contents to acquire a desired contents group, must sequentially select contents from the filtered contents group, must switch the chapter display window, and must then select a required scene.

Note that scenes of all the filtered contents may be displayed. When the user wants to add scenes of other contents, the same operations are required. Also, scenes of all the contents may be displayed, but the number of scenes becomes large, and it is difficult for the user to select a required scene.

The fourth embodiment has as its object to improve the operability upon selecting a scene from a plurality of moving image contents in a contents playback and editing apparatus.

Figure 49:
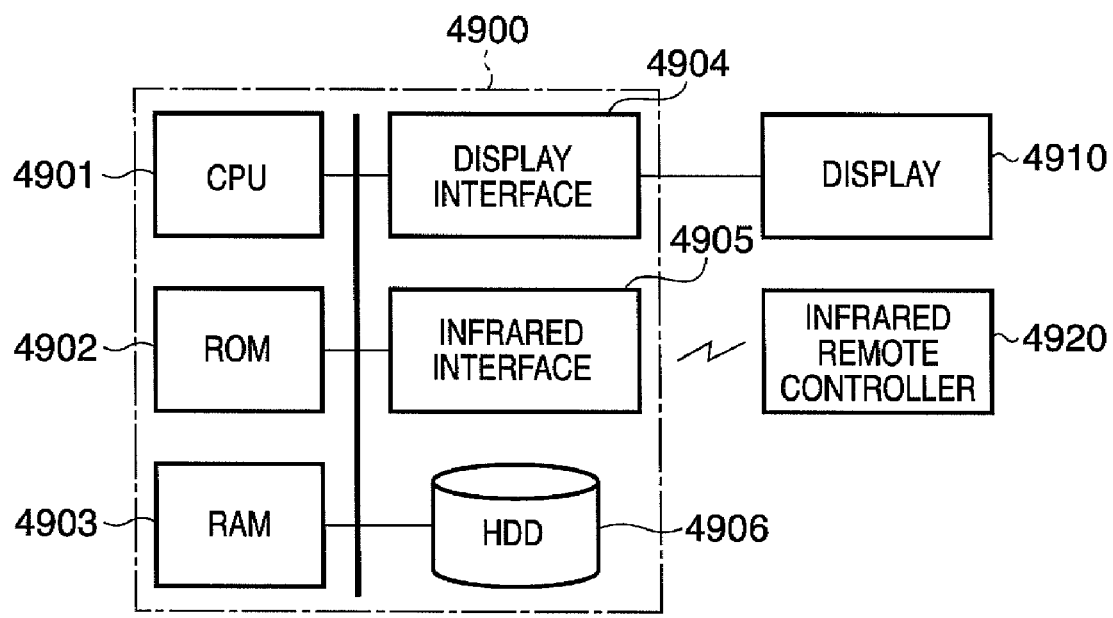
FIG. 49 is a block diagram showing an example of the hardware arrangement of a contents playback and editing apparatus according to the fourth embodiment.

FIG. 49 shows an example of the hardware arrangement of a contents playback and editing apparatus according to the fourth embodiment. As shown in FIG. 49, a contents playback and editing apparatus 4900 comprises a CPU 4901, ROM 4902, RAM 4903, display interface 4904, infrared input interface 4905, and hard disk drive (HDD) 4906.

The display interface 4904 converts window information from a display device driver (not shown) into a signal that a display 4910 can process. The infrared input interface 4905 receives an infrared signal from an infrared remote controller 4920, and converts the received signal into information that an infrared interface device driver (not shown) can process.

Note that an operating system (to be abbreviated as OS hereinafter), processing programs (to be described later), device drivers, and the like are stored in the HDD 4906, are temporarily stored in the RAM 4903 as needed, and are executed by the CPU 4901, although not shown. The ROM 4902 stores an input/output control program, which executes processing of the CPU 4901 to start up the OS stored in the HDD 4906 upon power ON.

Note that the same reference numerals denote the same parts described using other figures unless otherwise specified, and a repetitive description thereof will be avoided.

Figure 50:
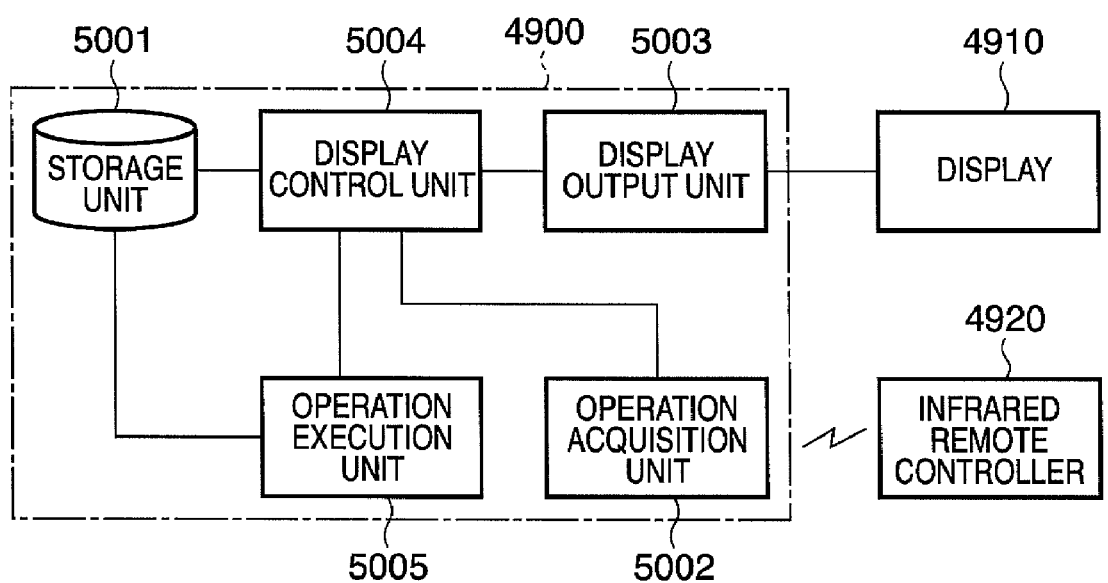
FIG. 50 is a block diagram showing an example of the functional arrangement of the contents playback and editing apparatus according to the fourth embodiment.

FIG. 50 shows an example of the functional arrangement of the contents playback and editing apparatus according to the fourth embodiment. As shown in FIG. 50, the contents playback and editing apparatus 4900 includes a storage unit 5001, operation acquisition unit 5002, display output unit 5003, display control unit 5004, and operation execution unit 5005.

The storage unit 5001 stores contents information (FIG. 52), moving image frame information (FIG. 53), array information (FIGS. 54 and 55), and playlist information (FIG. 62), as will be described later. Also, the storage unit 5001 stores contents data and thumbnail data (not shown).

The operation acquisition unit 5002 transfers an operation instruction from the infrared remote controller 4920 to the display control unit 5004. The display output unit 5003 sends a display output to the display 4910 based on window data generated by the display control unit 5004. The window data may be either image data or information required to generate image data.

The display control unit 5004 reads out thumbnails of contents and moving image frames stored in the storage unit 5001 in accordance with an operation instruction acquired by the operation acquisition unit 5002. Then, the display control unit 5004 generates window data by laying out the readout thumbnails based on the array information (FIGS. 54 and 55) to be described later. Furthermore, the display control unit 5004 issues an operation instruction for a content by the operation execution unit 5005 in accordance with an operation instruction acquired by the operation acquisition unit 5002.

The operation execution unit 5005 executes processes such as playback (reading out and display) and deletion of corresponding contents stored in the storage unit 5001, editing of playlist information (FIG. 62) to be described later, and the like based on an instruction from the display control unit 5004. Also, the operation execution unit 5005 updates contents information (FIG. 52), moving image frame information (FIG. 53), and array information (FIGS. 54 and 55) to be described later in accordance with these processes.

Figure 51:
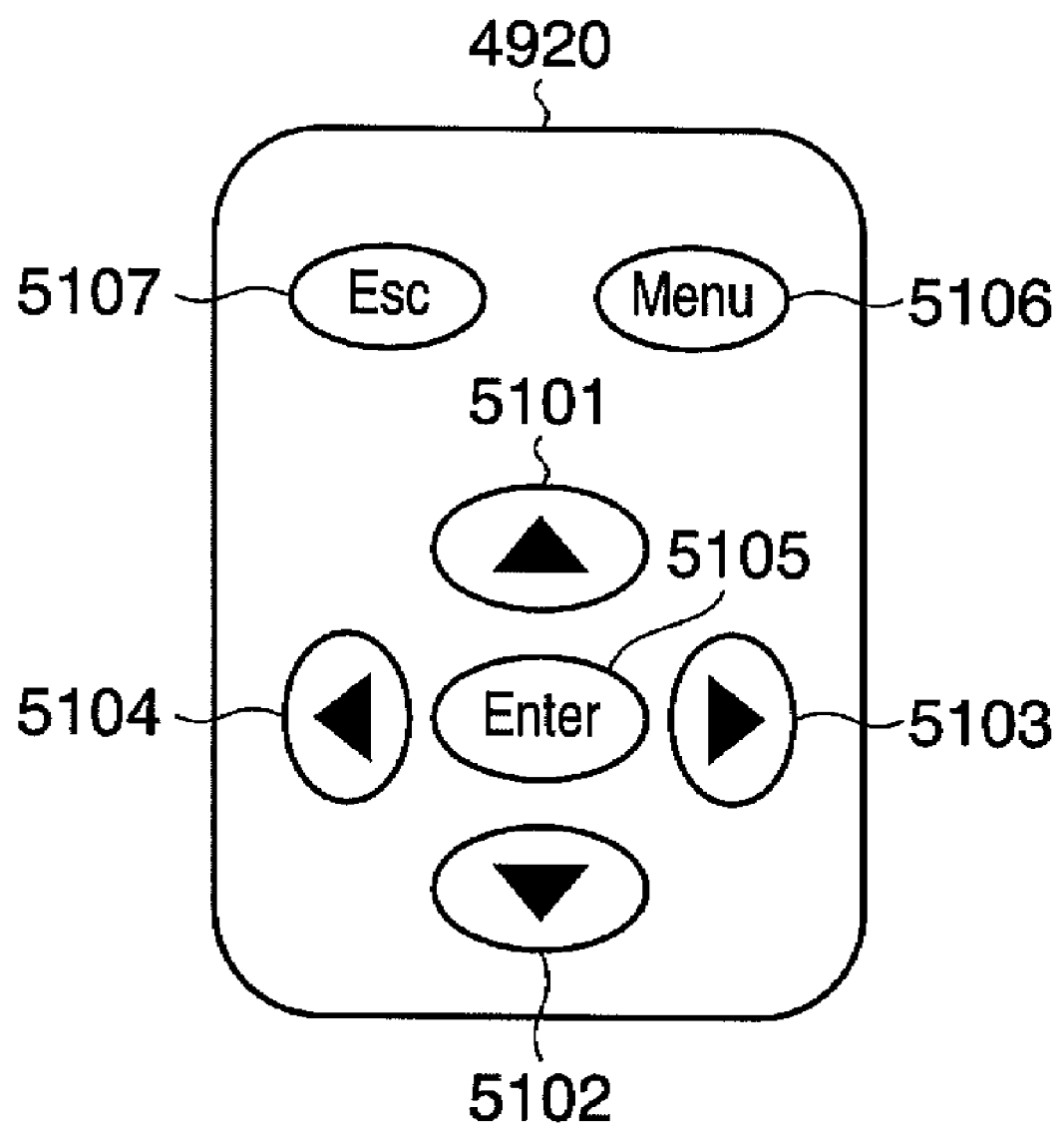
FIG. 51 shows an example of the arrangement of an infrared remote controller 4920 according to the fourth embodiment.

FIG. 51 shows an example of the arrangement of the infrared remote controller 4920 according to the fourth embodiment. The infrared remote controller 4920 comprises a right button 5103 used to issue a right scroll instruction, a left button 5104 used to issue a left scroll instruction, an up button 5101 used to issue an upward shift instruction, and a down button 5102 used to issue a downward shift instruction. Also, the infrared remote controller 4920 comprises a menu button 5106 used to issue an operation menu display instruction, an enter button 5105 used to determine an item of the operation menu, and an escape button 5107 used to escape from the operation menu or playback display.

Note that the infrared remote controller 4920 shown in FIG. 51 is merely an example, and the present invention is not limited to these layout, button names, and the like.

FIG. 52 shows an example of contents information according to the fourth embodiment. As shown in FIG. 52, contents information 5200 includes items of a contents name, date, person, location, event, contents file name, and thumbnail file name, and is stored in the storage unit 5001. For example, a content with a contents name "photo1" has information of date "2006-01-15", person "Taro", location "Tokyo", and event "Travel". Furthermore, the file name of a file as an entity of the content is "contents/photo1.jpg", and its thumbnail file name is "thum/photo1_thum.jpg".

Note that the aforementioned contents information 5200 is merely an example, and the present invention is not limited to the configuration of items, names, values, and the like.

FIG. 53 shows an example of moving image frame information according to the fourth embodiment. As shown in FIG. 53, moving image frame information 5300 includes items of a moving image frame name, contents name, position, and thumbnail file name, and is stored in the storage unit 5001. Note that the contents name is the name of a content having the corresponding moving image frame, and the position represents the temporal position in that content.

For example, a moving image frame with a moving image frame name "video1-frame1" has a contents name "video1" and position "00:00:00". Furthermore, the thumbnail file name of that frame is "thum/video1_f1_thum.jpg".

Note that the aforementioned moving image frame information 5300 is merely an example, and the present invention is not limited to the configuration of items, names, values, and the like.

Figure 54:
FIG. 54 shows an example of array information according to the fourth embodiment.

FIG. 54 shows an example of array information according to the fourth embodiment. Arrays 5401 to 5404 shown in FIG. 54 are generated based on the contents information 5200, and are stored in the storage unit 5001. Note that the array 5401 is generated by sorting the contents names of the contents information 5200 in a date order. The array 5402 is generated by sorting the contents names of the contents information 5200 in a person order. The array 5403 is generated by sorting the contents names of the contents information 5200 in a location order. The array 5404 is generated by sorting the contents names of the contents information 5200 in an event order.

For example, the array 5401 indicates that the date order of contents names is "photo2", "video2", "photo1", "video1," . . . .

Note that the aforementioned arrays 5401 to 5404 are merely examples, and the present invention is not limited to the configuration of each array, names, values, and the like. Furthermore, these arrays may be generated from the contents information 5200 only when they are required.

Figure 55:
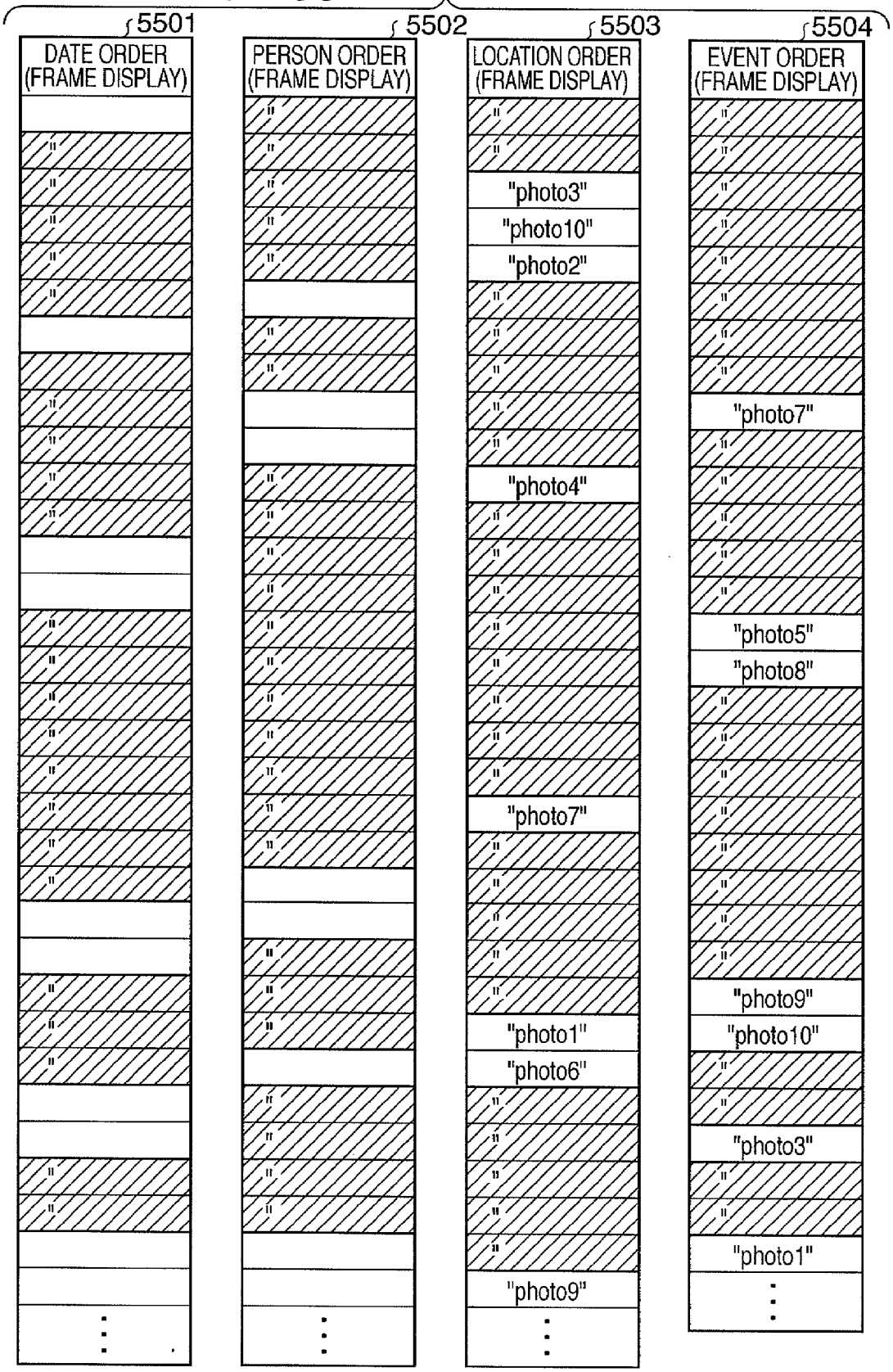
FIG. 55 shows an example of array information of frame display labels according to the fourth embodiment.

FIG. 55 shows an example of array information of frame display labels according to the fourth embodiment. Arrays 5501 to 5504 shown in FIG. 55 are generated based on the contents information 5200 and moving image frame information 5300, and are stored in the storage unit 5001. Note that the array 5501 is generated by sorting the contents name of the contents information 5200 and the moving image frame names of the moving image frame information 5300 in the date order. The array 5502 is generated by sorting the contents name of the contents information 5200 and the moving image frame names of the moving image frame information 5300 in the person order. The array 5503 is generated by sorting the contents name of the contents information 5200 and the moving image frame names of the moving image frame information 5300 in the location order. The array 5504 is generated by sorting the contents name of the contents information 5200 and the moving image frame names of the moving image frame information 5300 in the event order. Note that the contents information 5200 indicating the same content as the moving image frame information 5300 is excluded.

For example, the array 5501 indicates that the date order of the contents information 5200 and moving image frame information 5300 is "photo2", "video2-frame1", "video2-frame2", "video2-frame3", . . . .

Note that the aforementioned arrays 5501 to 5504 are merely examples, and the present invention is not limited to the configuration of each array, names, values, and the like. Furthermore, these arrays may be generated from the contents information 5200 and moving image frame information 5300 only when they are required.

Figure 56:
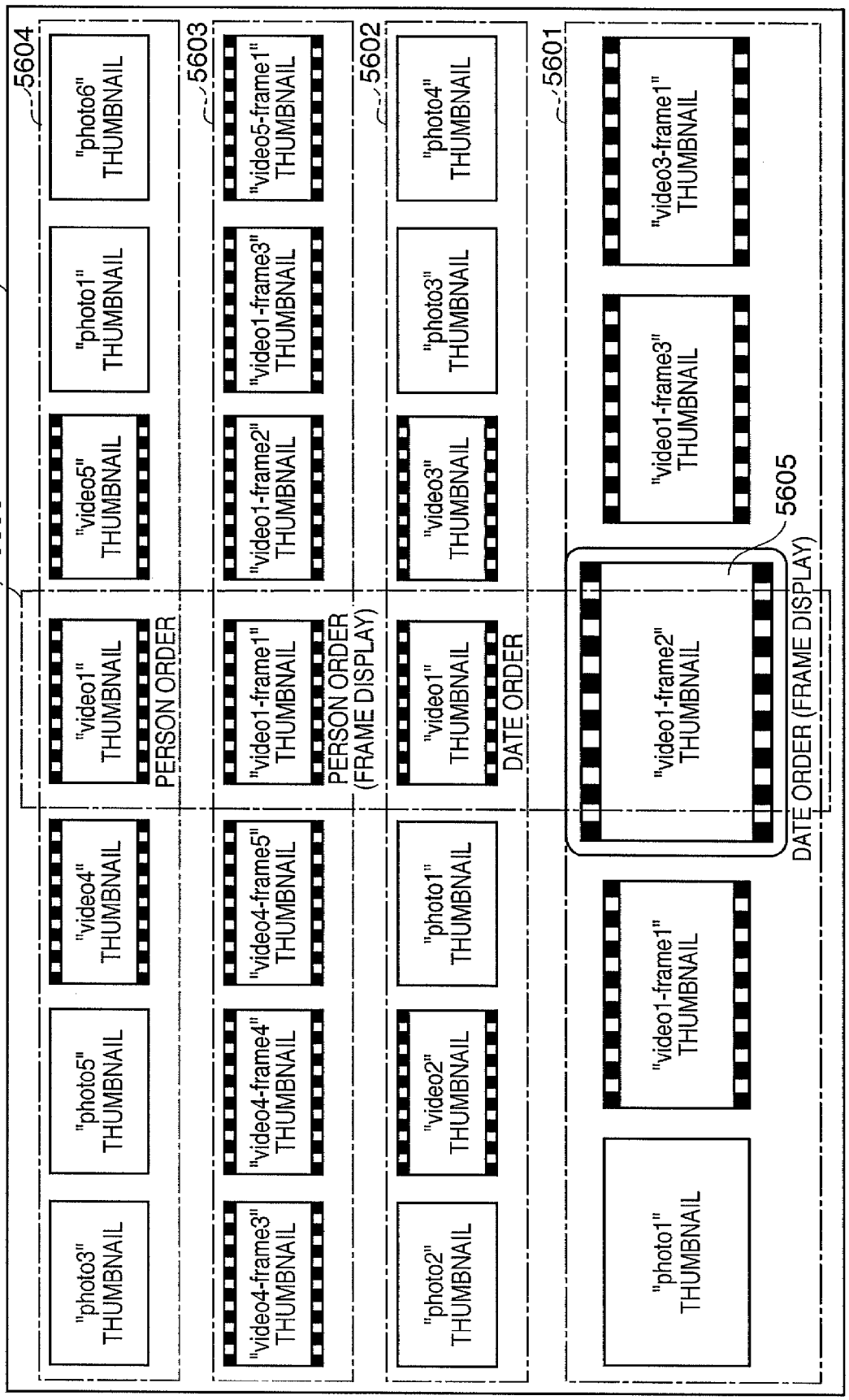
FIG. 56 shows an example of a user interface window according to the fourth embodiment.

FIG. 56 shows an example of a user interface window according to the fourth embodiment. As shown in FIG. 56, a user interface window 5600 is configured by thumbnail arrays 5601 to 5604 corresponding to the arrays. The thumbnail array 5601 is a selected array as an operation instruction target, and is displayed in an enlarged scale to be apparently distinguished from other thumbnail arrays 5602 to 5604.

A thumbnail 5605 "video1-frame2" located at the center of the thumbnail array 5601 is selected thumbnail as an operation instruction target, and is enlarged in size and is displayed with a frame so as to be apparently distinguished from other thumbnails. A thumbnail group 5606 includes thumbnails which indicate the same content as the selected thumbnail "video1-frame2", and line up in the vertical direction in this example.

In this example, the thumbnail array 5601 corresponds to the array 5501, the thumbnail array 5602 corresponds to the array 5401, the thumbnail array 5603 corresponds to the array 5502, and the thumbnail array 5604 corresponds to the array 5402. However, the present invention is not limited to this.

Figure 57:
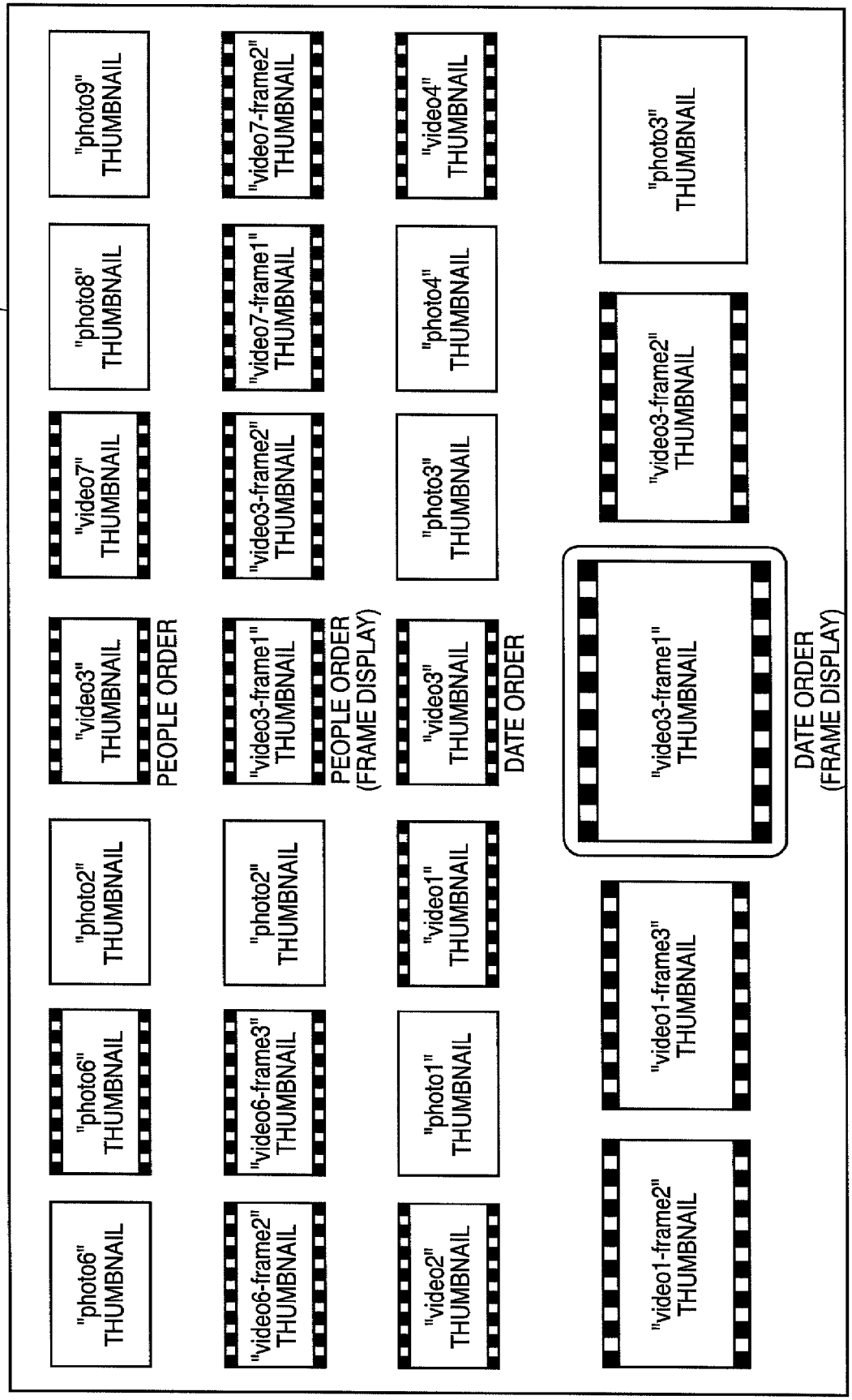
FIG. 57 shows an example of a user interface window after a user interface window 5600 according to the fourth embodiment is horizontally scrolled.

FIG. 57 shows an example of a user interface window after the user interface window 5600 of the fourth embodiment is horizontally scrolled. A user interface window 5700 is displayed after the user presses the left button 4904 of the infrared remote controller 4920 twice in the display state of the user interface window 5600. That is, the second right neighboring thumbnail "video3-frame1" of "video1-frame2" which was the selected thumbnail on the user interface window 5600 is changed to the selected thumbnail on the user interface window 5700. Also, other thumbnail arrays are updated so that thumbnails indicating the same content "video3" as the selected thumbnail "video3-frame1" line up in the vertical direction.

In this example, the selected icon is fixed in position at the center. Alternatively, the position of the selected icon may be shifted.

Figure 58:
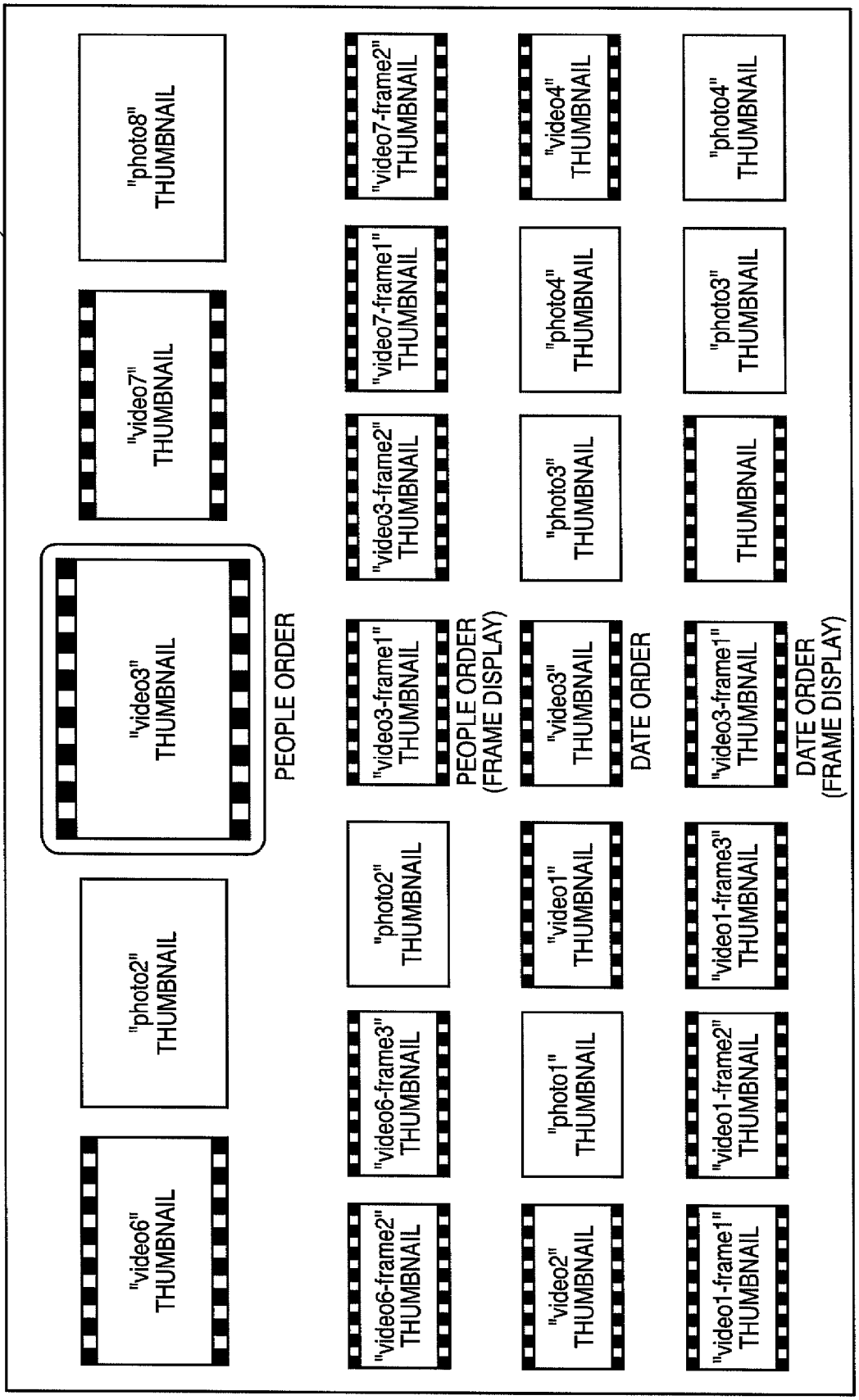
FIG. 58 shows an example of a user interface window after a user interface window 5700 according to the fourth embodiment is vertically shifted.

FIG. 58 shows an example of a user interface window after the user interface window 5700 of the fourth embodiment is shifted in the vertical direction. A user interface window 5800 is displayed after the user presses the down button 5102 of the infrared remote controller 4920 once in the display state of the user interface window 5700. That is, the "person order" thumbnail array which is virtually located below the "date order (frame display)" thumbnail array, which was the selected array on the user interface window 5700, is changed to the selected array.

In this example, the position of the selected array is shifted in the vertical direction. However, the selected array may be fixed in position, and the icon arrays may be vertically scrolled.

Figure 59:
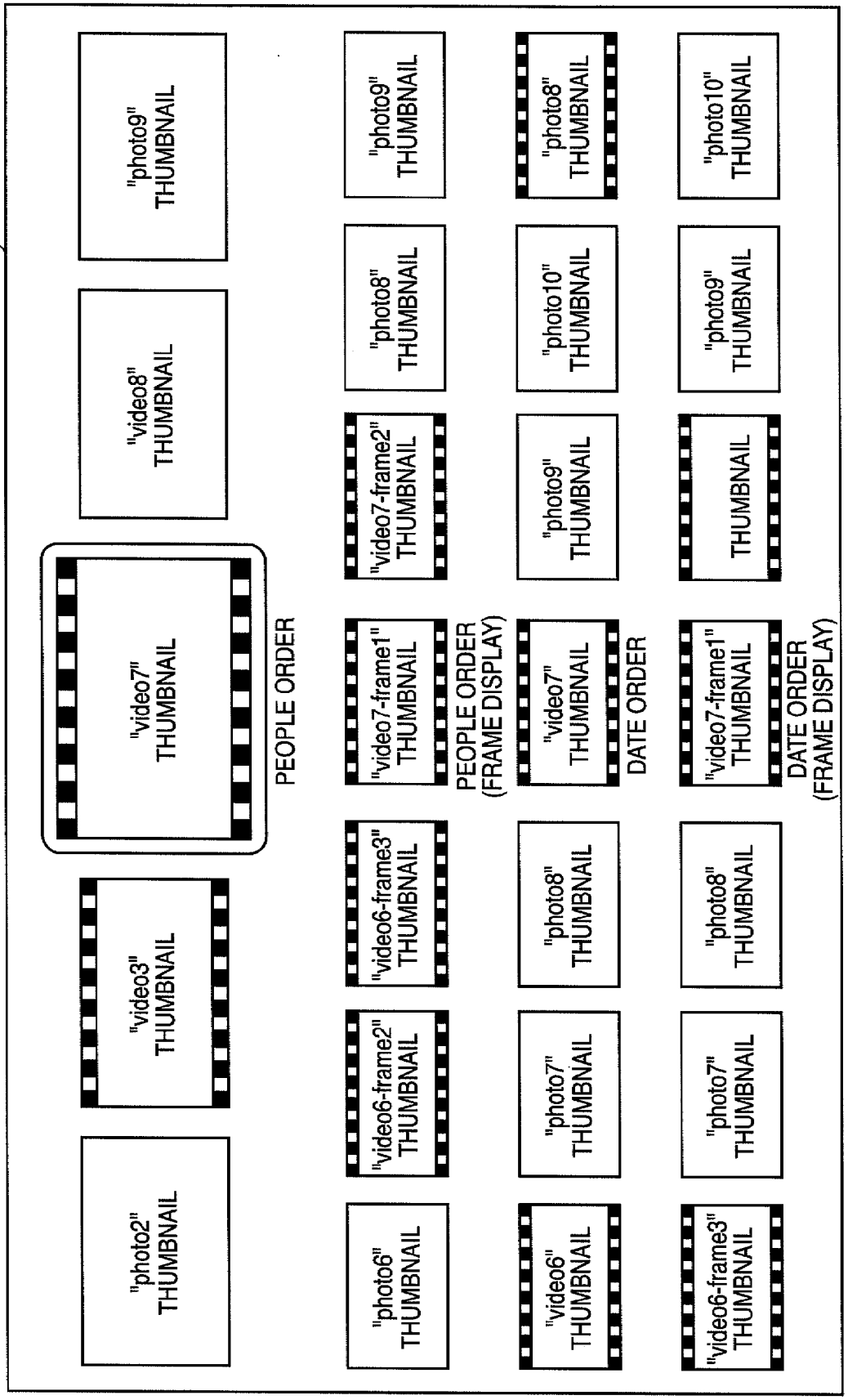
FIG. 59 shows an example of a user interface window after a user interface window 5800 according to the fourth embodiment is horizontally scrolled.

FIG. 59 shows an example of a user interface window after the user interface window 5800 of the fourth embodiment is horizontally scrolled. A user interface window 5900 is displayed after the user presses the left button 5104 of the infrared remote controller 4920 once in the display state of the user interface window 5800. That is, right neighboring "video7" of "video3" which was the selected thumbnail on the user interface window 5800 is changed to the selected thumbnail on the user interface window 5900. Also, other thumbnail arrays are updated, so that thumbnails indicating the same content as the selected thumbnail "video7" line up in the vertical direction.

Figure 60:
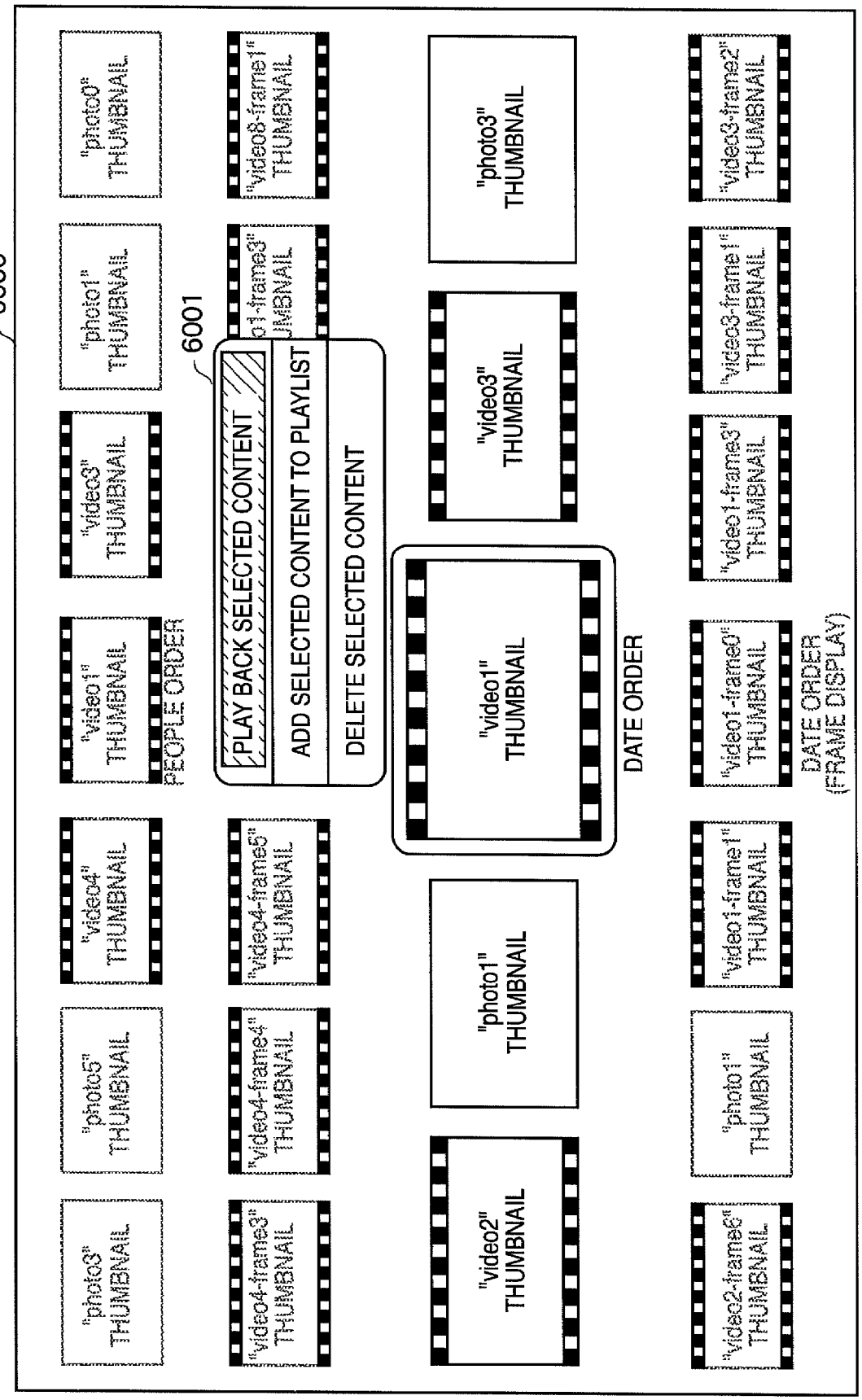
FIG. 60 shows an example of a user interface window which is displaying an operation menu for contents according to the fourth embodiment.

FIG. 60 shows an example of a user interface window on which an operation menu for contents is being displayed in the fourth embodiment. On a user interface window 6000, reference numeral 6001 denotes an operation menu for contents. That is, the operation menu 6001 indicates that there are three choices of operations "play back selected content", "add selected content to playlist", and "delete selected content" for the content indicated by the selected thumbnail "video1". The operation menu 6001 is displayed when the selected thumbnail is a thumbnail of a content and the user presses the menu button 5106 of the infrared remote controller 4920. The user can select items in the operation menu 6001 using up or down button 5101 or 5102 and determines the selected item by the enter button 5105.

Figure 61:
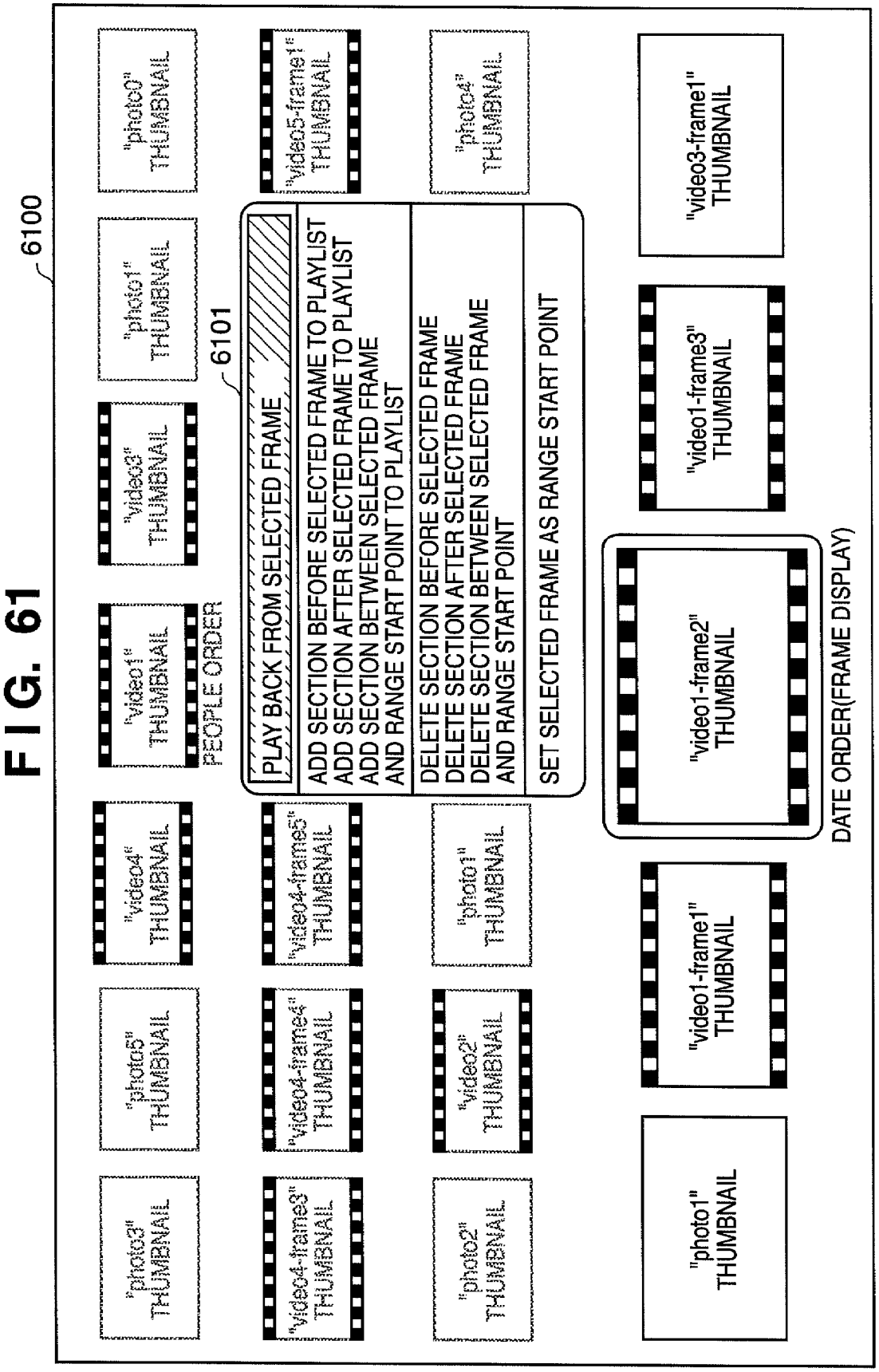
FIG. 61 shows an example of a user interface window which is displaying an operation menu for moving image frames according to the fourth embodiment.

FIG. 61 shows an example of a user interface window on which an operation menu for moving image frames is being displayed in the fourth embodiment. On a user interface window 6100, reference numeral 6101 denotes an operation menu for moving image frames. That is, the operation menu 6101 allows the user to select operations associated with playback, addition to a playlist, deletion, and range setting for a moving image frame corresponding to the selected thumbnail "video1-frame2".

As for addition to a playlist and deletion, the range can be designated in a moving image content, and there are three choices: "before selected frame", "after selected frame", and "from range start point to selected frame". Note that the range start point is stored by determining "set selected frame as range start point".

The operation menu 6101 is displayed when the selected thumbnail is a thumbnail of a moving image frame, and the user presses the menu button 5106 of the infrared remote controller 4920. The user can select items in the operation menu 6101 using up or down button 5101 or 5102 and determines the selected item by the enter button 5105.

Figure 62:
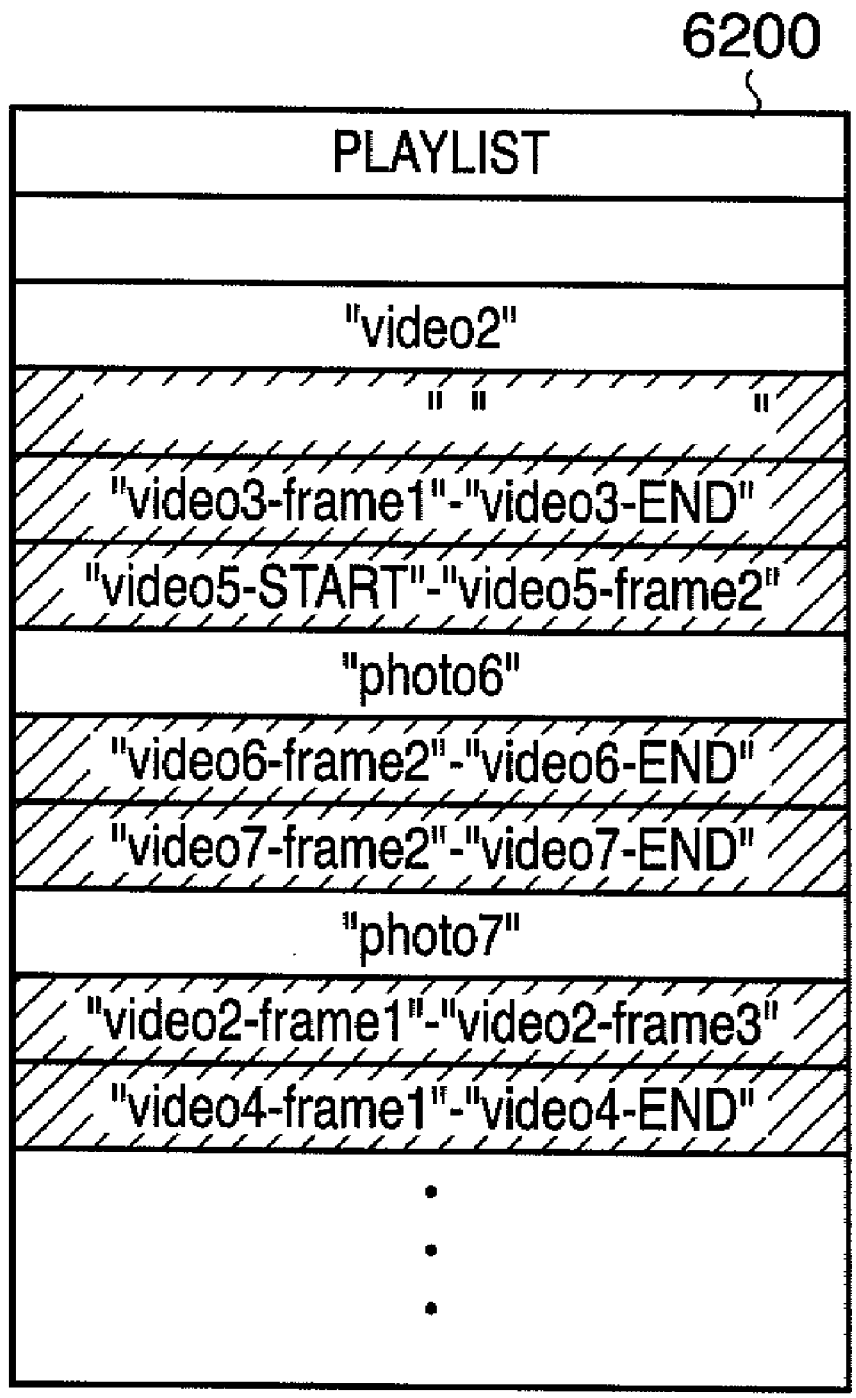
FIG. 62 shows an example of playlist information according to the fourth embodiment.

FIG. 62 shows an example of playlist information in the fourth embodiment. Playlist information 6200 shown in FIG. 62 is updated upon determination of the playlist addition operation described in FIGS. 60 and 61. The playlist information 6200 indicates that contents in a playlist are "photo2", "video2", from "video1-frame2" to the end of "video2", (the rest is omitted).

In this example, one playlist has been explained however, there may be a plurality of playlists. In such case, however, a menu or the like used to select a playlist need be added.

Editing of contents in the playlist will not especially be described. However, functions such as deletion, order change, and the like of contents in the playlist are readily understood.

Figure 63A:
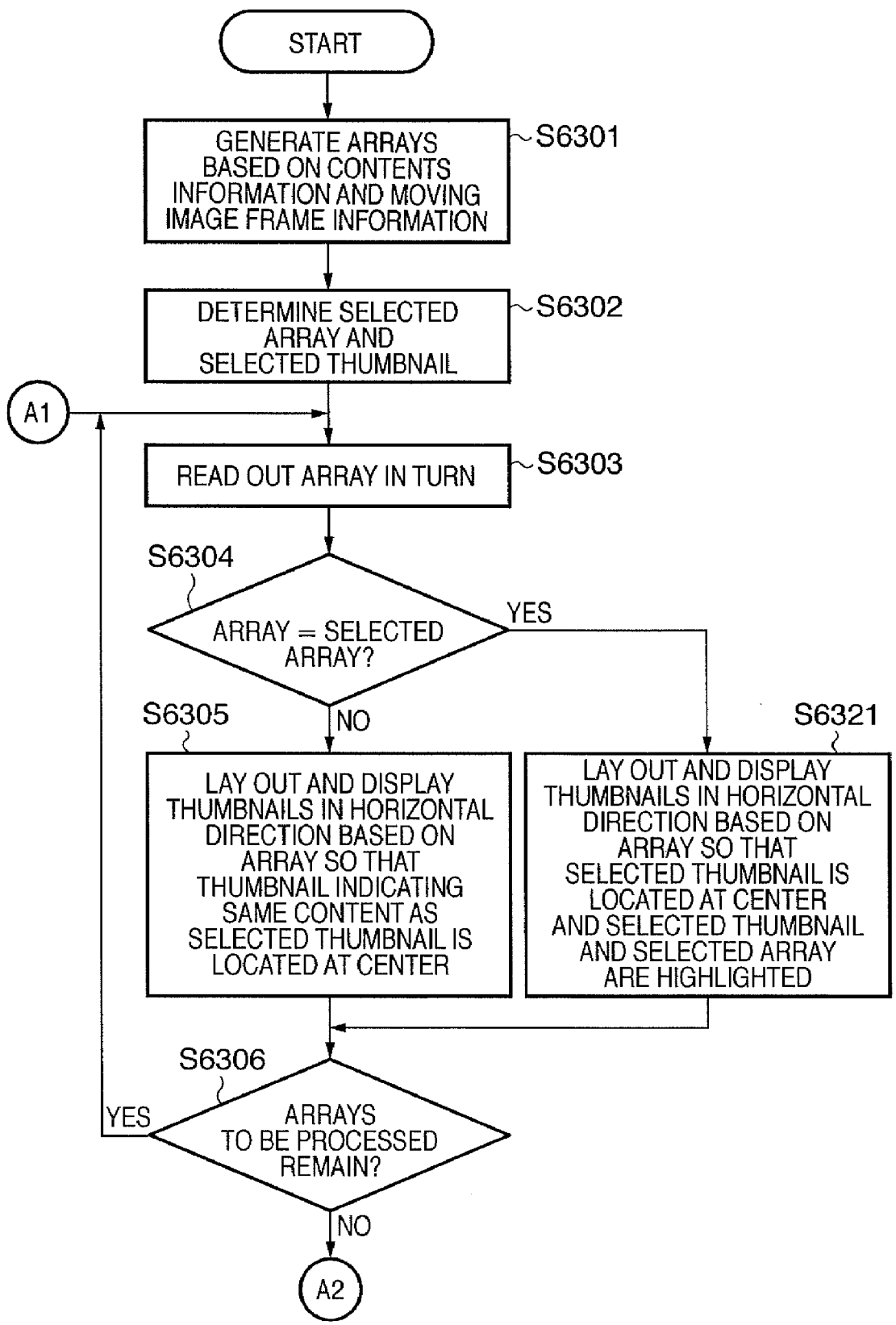
FIGS. 63A and 63B are flowcharts showing the processing of the contents playback and editing apparatus according to the fourth embodiment.
Figure 63B:
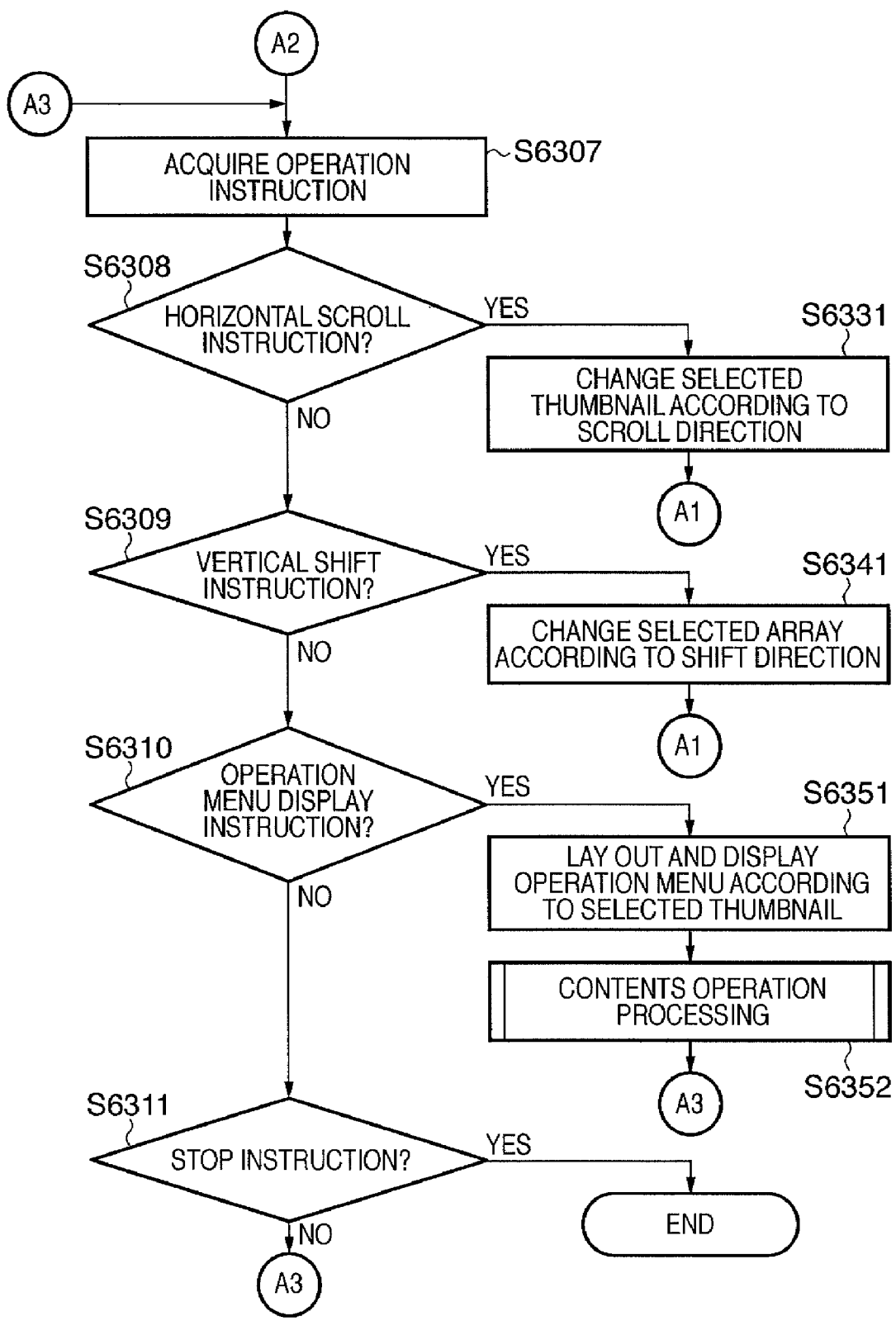

FIGS. 63A and 63B are flowcharts showing the processing of the contents playback and editing apparatus according to the fourth embodiment. Upon starting the startup processing, the CPU 4901 generates the arrays 5401 to 5404 and 5501 to 5504 based on the contents information 5200 and moving image frame information 5300 (S6301). The CPU 4901 determines the selected array and selected thumbnail (S6302). The CPU 4901 then sequentially reads out the array to be displayed from those which are generated in step S6301 (S6303).

If the readout array is the selected array (YES in S6304), the CPU 4901 lays out and displays thumbnails in the horizontal direction based on the array, so that the selected thumbnail is located at the center of the array, and the selected thumbnail and array are highlighted (S6321). If the readout array is not the selected array (NO in S6304), the CPU 4901 lays out and displays thumbnails in the horizontal direction based on the array so that the a thumbnail indicating the same content as the selected thumbnail is located at the center of the array (a position where that thumbnail and the selected thumbnail line up in the vertical direction) (S6305). After the thumbnails are displayed in step S6305 or S6321, if it is determined in step S6306 that the arrays to be processed still remain, the process returns to step S6303 to repeat the aforementioned processes.

On the other hand, if it is determined in step S6306 that no array remains (the read process ends), the process advances to step S6307. In step S6307, the CPU 4901 acquires an operation instruction. If the operation instruction is a horizontal scroll instruction (YES in S6308), the CPU 4901 changes the selected thumbnail in accordance with the scroll direction (S6331), and repeats the processes from step S6303. If the operation instruction is not a horizontal scroll instruction (NO in S6308), and if it is a vertical shift instruction (YES in S6309), the CPU 4901 changes the selected array in accordance with the shift direction (S6341), and repeats the processes from step S6303.

If the operation instruction is not a vertical shift instruction (NO in S6309) and if it is an operation menu display instruction (YES in S6310), the CPU 4901 allocates and displays the operation menu according to the selected thumbnail (S6351). The CPU 4901 then executes contents operation processing (details of which will be described later) (S6352), and the process returns to step S6307. If the operation instruction is not an operation menu display instruction (NO in S6310) and if it is a stop instruction (YES in 36311), the CPU 4901 ends this processing. However, if the operation instruction is not a stop instruction (NO in S6311), the process returns to step S6307. Assume that the stop instruction is issued when the user presses a power button (not shown).

Figure 64A:
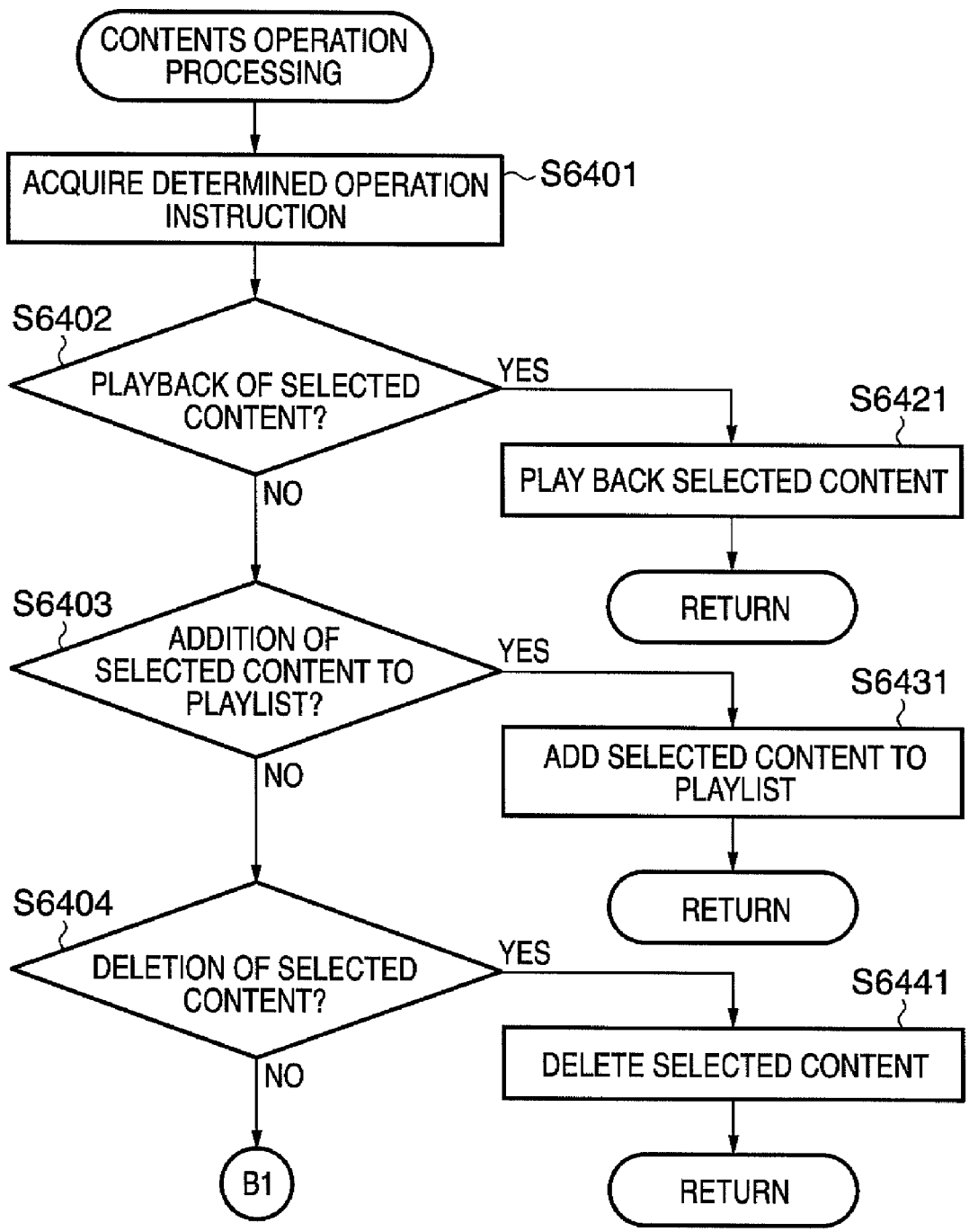
FIGS. 64A and 64B are flowcharts showing the contents operation processing according to the fourth embodiment.
Figure 64B:
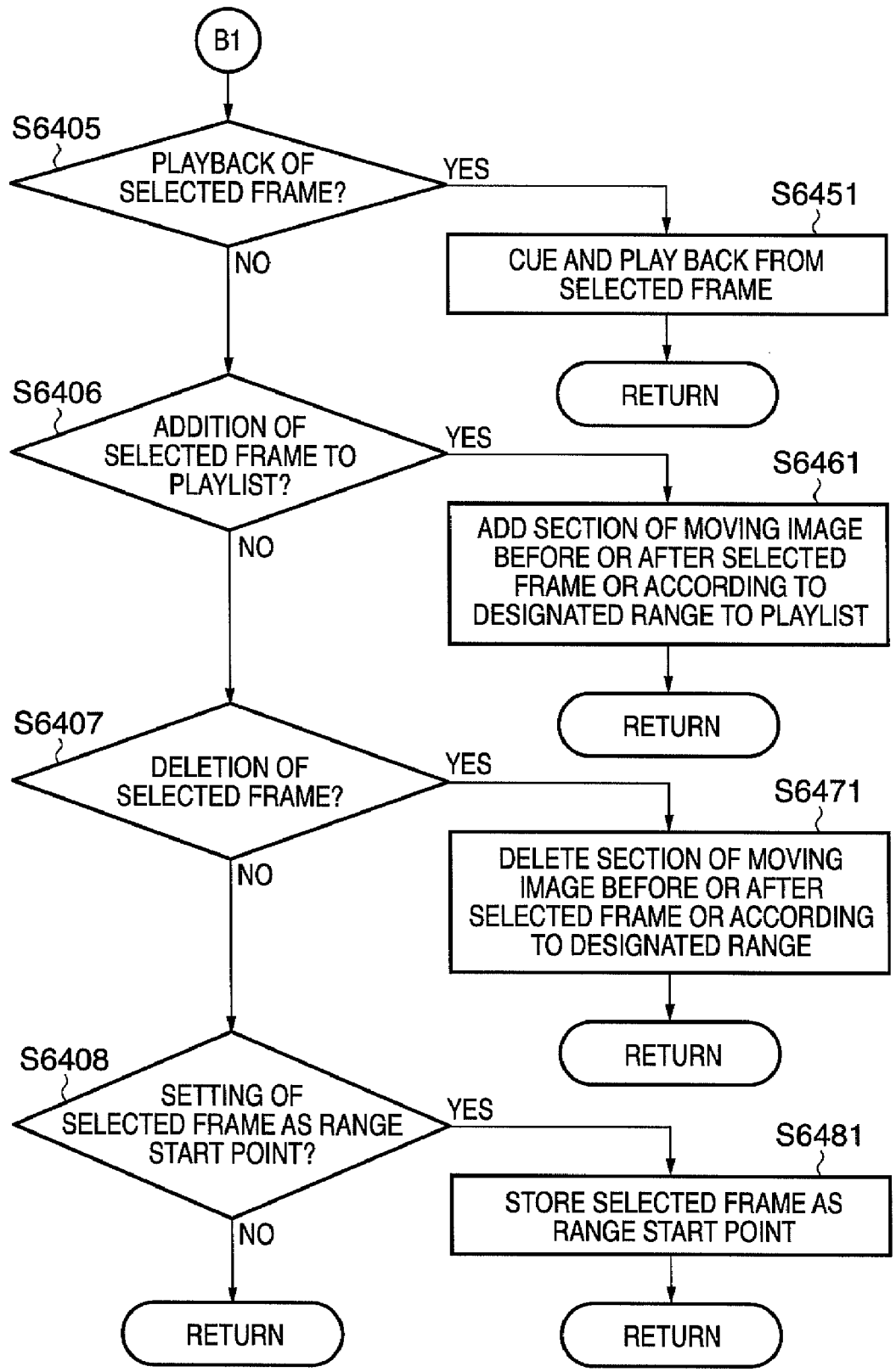

FIGS. 64A and 64B are flowcharts showing the contents operation processing according to the fourth embodiment. The CPU 4901 acquires an operation instruction determined on the operation menu (S6401). If the operation instruction is a playback instruction of the selected content (YES in S6402), the CPU 4901 plays back that selected content (S6421), and returns from this process. If the operation instruction is not a playback instruction of the selected content (NO in S6402), the process advances to step S6403. If the operation instruction is a playlist addition instruction of the selected content (YES in S6403), the CPU 4901 adds the selected content to the playlist (S6431), and returns from this process. If the operation instruction is not a playlist addition instruction of the selected content (NO in S6403), the process advances to step S6404.

If the operation instruction is a deletion instruction of the selected content (YES in S6404), the CPU 4901 deletes the selected content (S6441), and returns from this process. If the operation instruction is not a deletion instruction of the selected content (NO in S6404), the process advances to step S6405. If the operation instruction is a playback instruction of the selected frame (YES in S6405), the CPU 4901 cues and plays back a moving image content based on the contents name and position of the moving image frame information of the selected frame (S6451), and returns from this process. If the operation instruction is not a playback instruction of the selected frame (NO in S6405), the process advances to step S6406.

If the operation instruction is a playlist addition instruction of the selected frame (YES in S6406), the CPU 4901 adds the designated section in the moving image content to the playlist (S6461), and returns from this process. If the operation instruction is not a playlist addition instruction of the selected frame (NO in S6406), the process advances to step S6407. If the operation instruction is a deletion instruction of the selected frame (YES in S6407), the CPU 4901 deletes the designated section in the moving image content (S6471), and returns from this process. If the operation instruction is not a deletion instruction of the selected frame (NO in S6407), the process advances to step S6408.

If the operation instruction is a range start point setting instruction of the selected frame (YES in S6408), the CPU 4901 stores the selected frame as a range start point (S6481), and returns from this process.

Note that the section in steps S6461 and S6471 is one of a section before the selected frame of the moving image content, a section after the selected frame, and a section designated as a range, and is designated together with the operation instruction.

According to the fourth embodiment, upon scrolling a thumbnail array of contents, a thumbnail of a moving image frame corresponding to the array is displayed. Hence, the user can select a content while confirming the substance of the moving image frame.

When the user wants to select a moving image frame, he or she can select it by the shift and scroll operations of the array as in selection of contents, thus improving the operability.

Furthermore, when the user selects a moving image frame after scrolling, since thumbnails of related contents are displayed in another array with a focus on the corresponding moving image content, and thumbnails of these moving image frames are displayed in still another array, he or she can easily select related frames.

First Modification of Fourth Embodiment

The first modification of the fourth embodiment according to the present invention will be described in detail hereinafter with reference to the accompanying drawings. Note that the hardware arrangement, functional arrangement, infrared remote controller, contents information, moving image frame information, arrays, operation menu, playlist information, and contents operation processing are the same as those of the fourth embodiment.

FIG. 65 shows an example of a user interface window according to the first modification of the fourth embodiment. As shown in FIG. 65, this user interface window 6500 displays four arrays of "date order (frame display)", "person order", "location order", and "event order".

FIG. 66 shows an example of a user interface window after the vertical shift of the user interface window 6500. As shown in FIG. 66, this user interface window 6600 displays the array of "date order" at the position of the array of "date order (frame display)" as the selected array on the user interface window 6500. The window 6600 displays the array of "person order (frame display)" as a new selected array at the position of the array of "person order".

In the first modification, as shown in FIGS. 65 and 66, the selected array is a array of frame display, and a array including only contents having the same order condition as the selected array is not displayed.

Figure 67A:
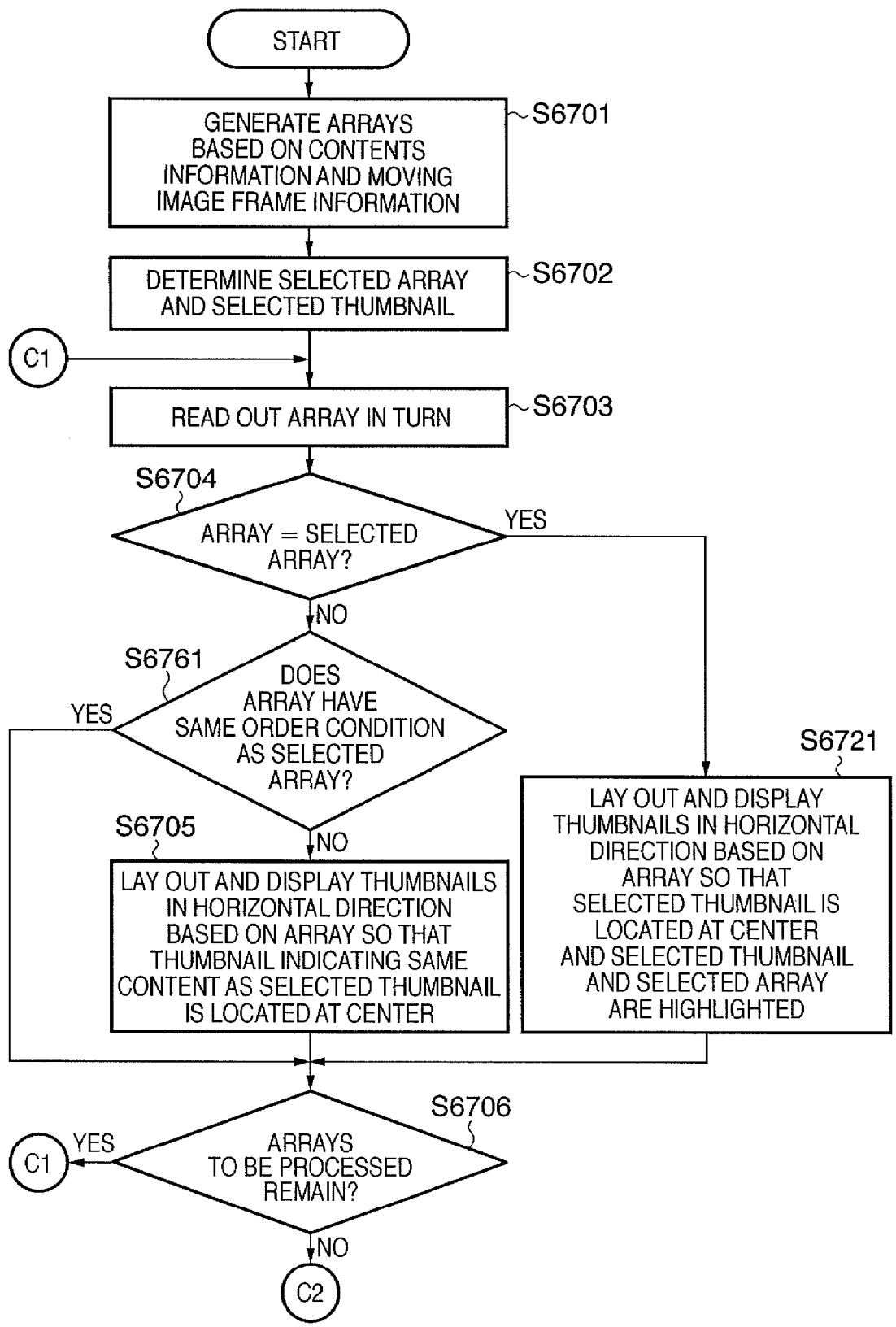
FIGS. 67A and 67B are flowcharts showing the processing in the first modification of the fourth embodiment.
Figure 67B:
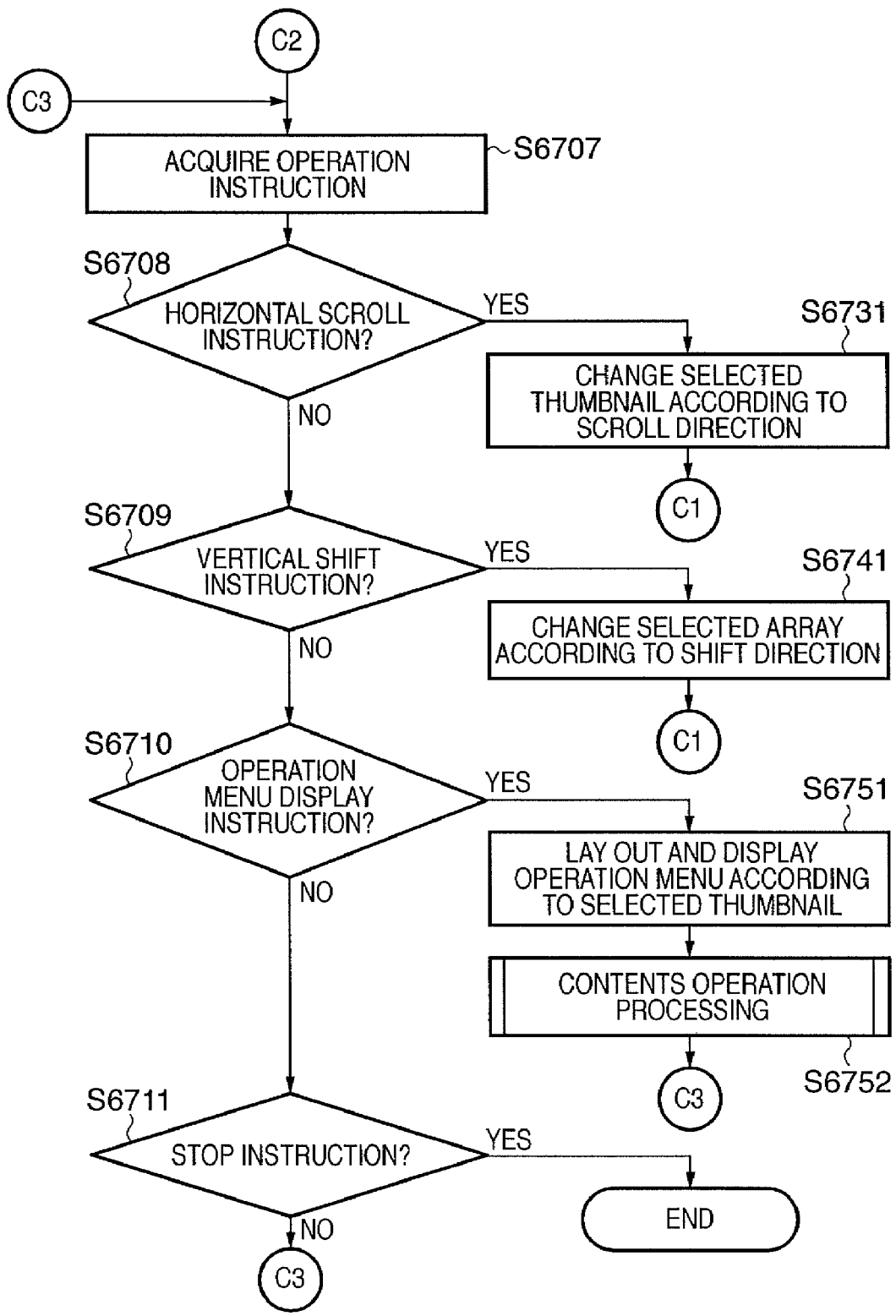

FIGS. 67A and 67B are flowcharts showing the processing in the first modification of the fourth embodiment. Note that the processes in steps S6701 to S6711 and S6721 to S6752 are the same as those in steps S6301 to S6311 and S6321 to S6352 shown in FIGS. 63A and 63B described in the fourth embodiment.

A process different from those in the fourth embodiment will be described below. After the CPU 4901 generates the arrays and determines the selected thumbnail, if the readout array is not the selected array (NO in S6704), the process advances to step S6761. The CP 4901 checks in step S6761 if the readout array has the same order condition as that of the selected array. If the readout array does not have the same order condition as that of the selected array (NO in S6761), the CPU 4901 lays out and displays thumbnails in the horizontal direction based on the array (S6705). However, if the readout array has the same order condition as that of the selected array (YES in S6761), the CPU 4901 skips the process in step S6705, and the process advances to step S6706.

According to the first modification, the arrays of more order conditions can be displayed on the limited display area, and the operability upon selection of moving image frames in related moving image contents can be improved.

Second Modification of Fourth Embodiment

The second modification of the fourth embodiment according to the present invention will be described in detail hereinafter with reference to the accompanying drawings. Note that the hardware arrangement, functional arrangement, infrared remote controller, contents information, moving image frame information, arrays, operation menu, playlist information, and contents operation processing are the same as those of the fourth embodiment.

FIG. 68 shows an example of a user interface window according to the second modification of the fourth embodiment. As shown in FIG. 68, a user interface window 6800 displays four arrays of "date order (frame display)", "date order", "person order (frame display)", and "person order". In the arrays other than the selected array, no thumbnails indicating the same content as the selected thumbnail are displayed, and pieces of information based on the respective order conditions, i.e., two pieces of information 6801 and 6802, and information 6803, are displayed. In the array of "person order (frame display)", neither "video1-frame2" nor "video1-frame3" are displayed, but "video5-frame1" and "video5-frame2" which neighbor their positions are displayed.

FIG. 69 shows an example of a user interface window after the vertical shift of the user interface window 6800. As shown in FIG. 69, the selected array is changed to the array of "person order (frame display)" on this user interface window 6900. Then, "video1-frame1", "video1-frame2", and "video1-frame3" which are not displayed on the window 6800 are displayed.

As shown in FIGS. 68 and 69, the same thumbnails as the selected thumbnail and the thumbnails of moving image frames of the same contents are not displayed, and the thumbnails of other neighboring contents are displayed.

Figure 70B:
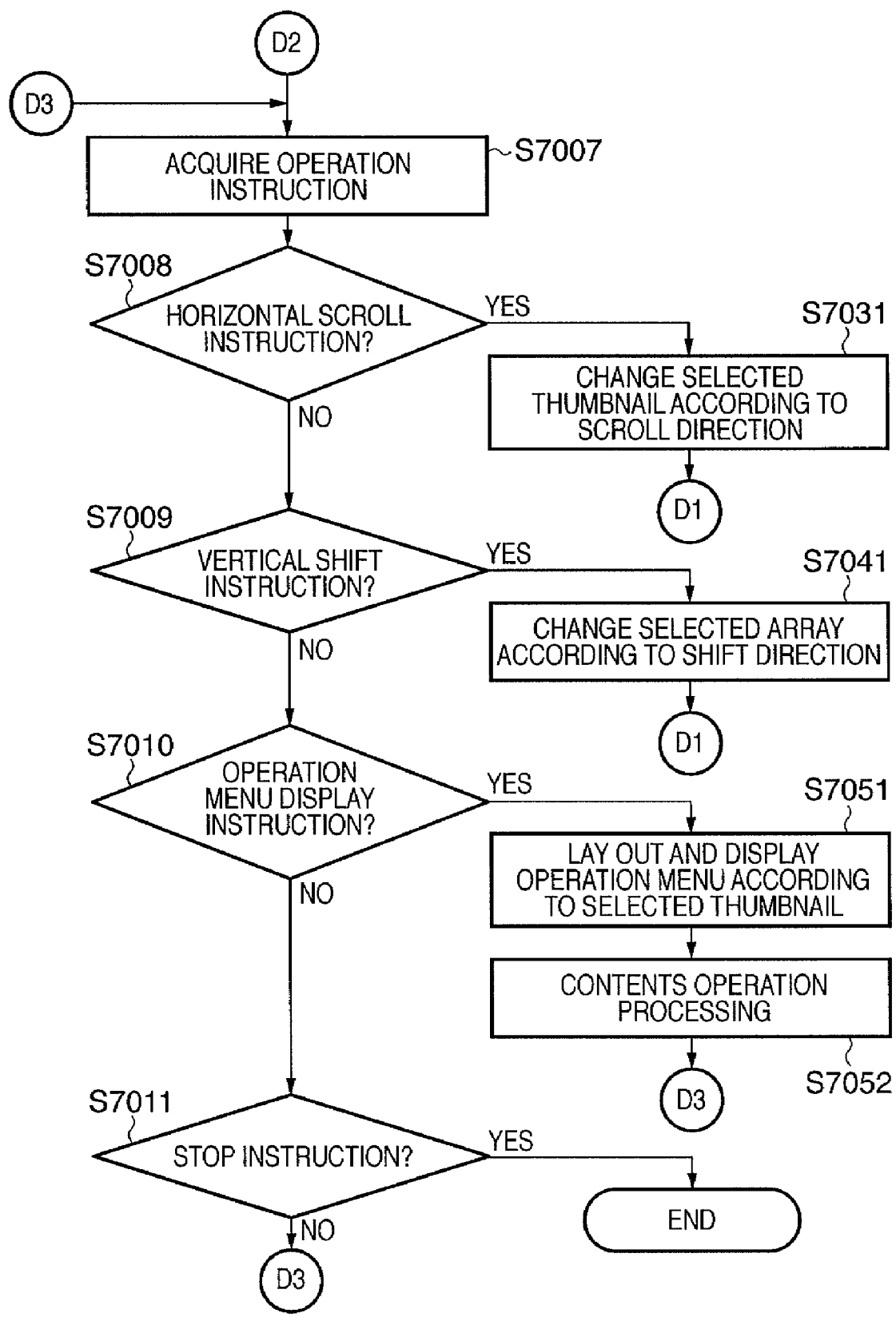

FIGS. 70A and 70B are flowcharts showing the processing in the second modification of the fourth embodiment. Note that the processes other than step S7005 are the same as those shown in FIGS. 63A and 63B described in the fourth embodiment.

After the CPU 4901 generates the arrays and determines the selected thumbnail, if the readout array is not the selected array (NO in S7004), the CPU 4901 lays out, based on the array, information of the corresponding order condition at the center of the array where a thumbnail indicating the same content as the selected thumbnail is located in the selected array. Then, the CPU 4901 lays out and displays thumbnails in the horizontal direction except for the thumbnail with the same content (S7005).

According to the fourth embodiment, the user can select a moving image content while confirming a scene, can select a scene by the same operation as that for the content, and can play back or edit the selected scene. Therefore, the operability for the scene of the moving image content can be improved.

Fifth Embodiment

The fifth embodiment according to the present invention will be described in detail hereinafter with reference to the accompanying drawings.

In recent years, along with the advance of computer technologies, the user can readily save contents such as still images and moving images in a storage device of a non-PC apparatus like a television screen, and can enjoy playback of such contents on its display.

Upon popularization of such environments, contents to be stored are increasing voluminously. For this reason, the user often forgets the storage locations of contents, and can hardly find a desired content. The stored contents may be kept saved in the storage device and may become dead storages.

Upon displaying an operation window on the television screen, higher visibility and easier operability are required than that on a PC.

To solve this problem, the Windows® Media Center (WMC) simplifies a conventional file access function, and allows the user to access contents by tracing the hierarchical structure using arrow keys of a remote controller. Also, the XrossMediaBar® (XMB®) lays out media icons and contents icons in a cross pattern to allow intuitive contents selection.

A method of helping the user search for contents by ordering and grouping contents is also available. In this case, a grouped contents group is displayed using one icon. The icon of the contents group is normally generated based on an image of a representative content or images of some or all contents in that contents group.

However, upon displaying a list of contents, a display is made according to various orders to allow the user to easily search for contents. However, since the display is switched every time the order is switched, the data list cannot be efficiently presented to the user.

To solve such problem, the following method is available. In this method, thumbnails of contents are classified into different categories, and the thumbnails of representative contents of the respective categories are aligned and displayed. Then, the category is selected using a right or left key, and the thumbnails of the contents in the selected category are displayed and selected using an up or down key.

Also, the following system is available. In this system, images of contents and contents groups are displayed to form arrays, and the user selects one of these contents and contents groups by a first operation. When the user selects the contents group, the images of contents in that group are displayed, and he or she selects a content in the group by a second operation. When the user selects the contents and contents groups on the arrays by the first operation again, the content selected last by the second operation is displayed as an image of that group.

Furthermore, the following system is available. In this system, in respective contents groups, contents are sorted and displayed based on order data to allow the user to select a content. In this case, group names are displayed, and upon selection of each individual content, the location of that content in a array is displayed.

Since a moving image content has a time axis unlike a still image content, functions different from those for the still image content are required to recognize its overview and to execute playback and edit processes while designating a required frame (scene).

The most popular one of these functions is to play back, fast-forward, and rewind a moving image.

Also, a method of analyzing the characteristics of frames in the moving image content to detect boundaries, displaying a list of still images of representative frames in sections divided by the boundaries, and making operations such as editing of the section by designating the still image is known.

As is known, for a moving image content set with cue points called chapters, when the user instructs to display a given chapter, a chapter display window is displayed. The chapter display window repetitively displays the selected section of the moving image content as a moving image, and further displays thumbnails (reduced-scale images) corresponding to chapters before and after the current chapter.

However, the WMC and XMB improve the access method to a desired content, but they do not allow the user to recognize contents associated with the selected content. Hence, the user is forced to operate thinking of the best search method after he or she visualizes the next content to be browsed.

Upon visually searching for contents, contents are grouped and displayed so as to allow the user to recognize their overviews and to reach a desired content quickly. Upon grouping contents, since there are various grouping conditions depending on search procedures, switching of the windows or a simple list display disturbs recognition of the contents list or an easy visual search.

Which of contents group icon arrays is used as the reference for layout cannot be determined.

In the WMC, in order to access a content in a different hierarchy group, the user must trace back hierarchies, and re-select that content. Furthermore, upon expressing another hierarchy, a display failure occurs.

With the related arts, when a content is a moving image, and the user wants to find out a required scene in a content while selecting moving image contents and to play back or edit such scene, the operations become troublesome. For example, the user must conduct a search or sort on a contents management window to filter contents to acquire a desired contents group, must sequentially select contents from the filtered contents group, must switch the chapter display window, and must then select a required scene. In this case, scenes of all the filtered contents may be displayed. When the user wants to add scenes of other contents, the same operations are required. Also, scenes of all the contents may be displayed, but the number of scenes becomes large, and it is difficult for the user to select a required scene.

The fifth embodiment has as its object to improve the operability upon selection of a scene from a plurality of moving image contents in a contents display apparatus.

FIG. 71 is a block diagram showing an example of the hardware arrangement of a content display apparatus according to the fifth embodiment. Referring to FIG. 71, reference numeral 7101 denotes an operation unit used to make an operation input. Reference numeral 7102 denotes a CPU which executes arithmetic operations, logical decisions, and the like for various kinds of processing, and controls respective components connected to a bus 7106. Furthermore, the CPU 7102 also serves as a display controller which generates display data, and outputs the generated data to a display output unit 7103. The display output unit 7103 outputs display data. As the display output unit 7103, an LCD that can output a bitmap image is used. Alternatively, a display such as a CRT or the like may also be used.

Reference numeral 7104 denotes a program memory which records programs for control by the CPU 7102, which programs include the processing arrays of flowcharts to be described later. Note that the program memory 7104 may be either a ROM or a RAM on which programs are loaded from an external storage device or the like prior to the processing.

Reference numeral 7105 denotes a storage unit which stores display data of contents, contents icons, and the like, and data generated during various kinds of processing. Note that the storage unit 7105 comprises a RAM but it may comprise a hard disk or nonvolatile external storage medium. In this case, assume that the storage unit 7105 loads programs and data prior to the processing or refers to them as needed.

The bus 7106 transfers address signals used to designate components to be controlled by the CPU 7102, control signals used to control respective components, and data exchanged among respective components.

Figure 72:
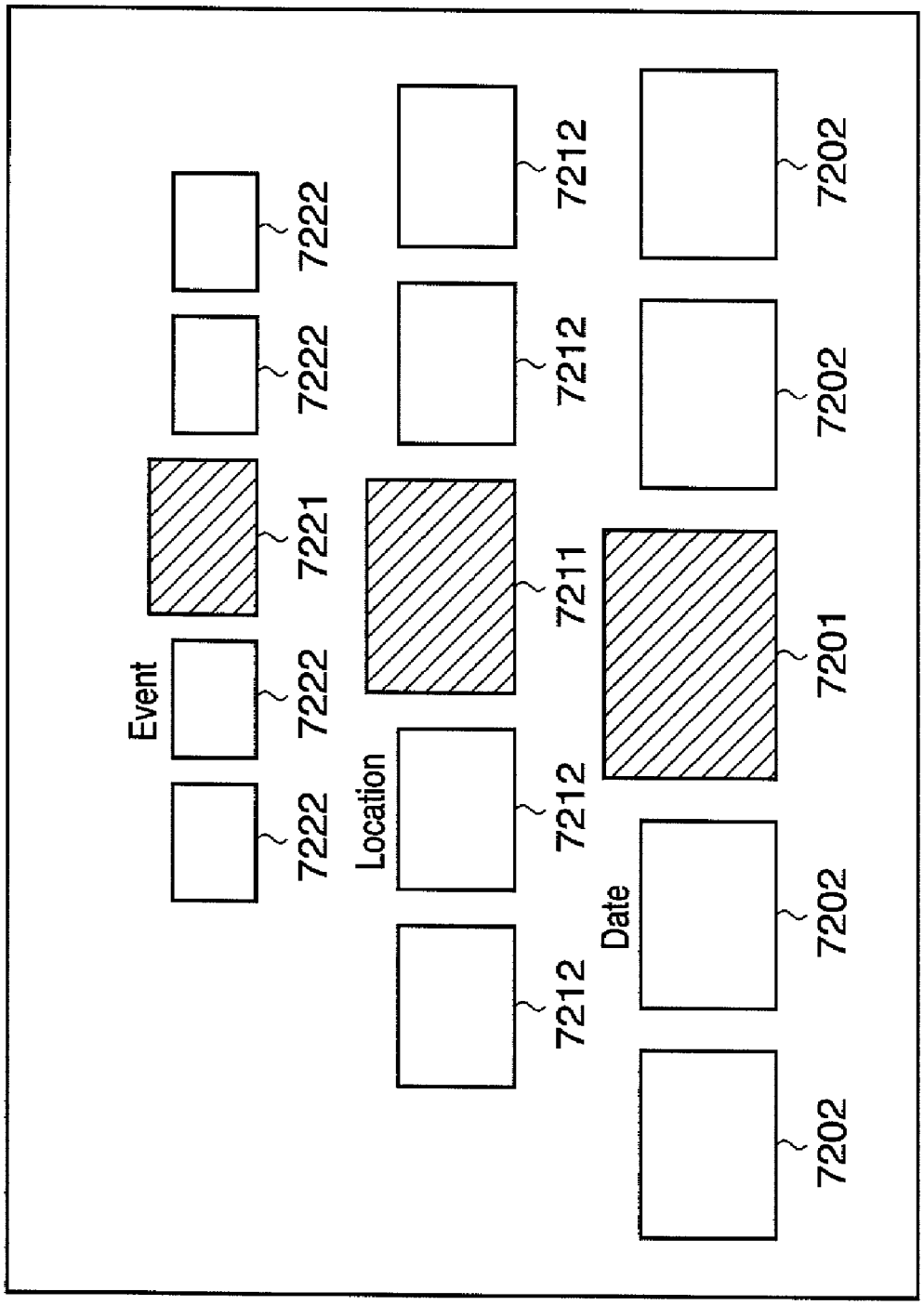
FIG. 72 shows an example of the configuration of a contents display window according to the fifth embodiment.

FIG. 72 shows an example of the configuration of a contents display window according to the fifth embodiment. Referring to FIG. 72, reference numeral 7201 denotes a thumbnail which indicates a representative still image of still image contents which are classified based on a category "Date" in the horizontal direction. Reference numeral 7202 denotes thumbnails of still images which are classified based on the category "Date" in the horizontal direction. The thumbnail 7201 of the representative still image has a size relatively larger than the thumbnails 7202 of other still images since it is a representative for the thumbnails 7202.

Reference numeral 7211 denotes a thumbnail which indicates a representative still image of still image contents which are classified based on a category "Location" in the horizontal direction. Note that the thumbnail 7211 indicates the same still image as the thumbnail 7201, but it has a size slightly smaller than the thumbnail 7201 and is laid out at the upper right position rather than the thumbnail 7201, so as to show the still image as if it were placed at a deeper position on a three-dimensional space. The thumbnail 7211 may have a different size and position.

Reference numeral 7212 denotes thumbnails of still images which are classified based on the category "Location" in the horizontal direction. The thumbnail 7211 of the representative still image has a size relatively larger than the thumbnails 7212 of other still images since it is a representative for the thumbnails 7212.

Reference numeral 7221 denotes a thumbnail which indicates a representative still image of still image contents which are classified based on a category "Events" in the horizontal direction. Note that the thumbnail 7221 indicates the same still image as the thumbnail 7211, but it has a size slightly smaller than the thumbnail 7211 and is laid out at the upper right position rather than the thumbnail 7211, so as to show the still image as if it were placed at a deeper position on the three-dimensional space. The thumbnail 7221 may have a different size and position.

Reference numeral 7222 denotes thumbnails of still images which are classified based on the category "Location" in the horizontal direction. The thumbnail 7221 of the representative still image has a size relatively larger than the thumbnails 7222 of other still images since it is a representative for the thumbnails 7222.

In the fifth embodiment, contents are classified using three categories "Date", "Location", and "Event". Furthermore, a category "Person" may be added. That is, the number of categories is not particularly limited as long as two or more categories are used. As contents, still images are presented, but other kinds of contents such as music and the like may be presented.

Note that contents are classified using some categories, and a common representative window allows the user to easily search for a content over different categories. However, when the user looks at this window for the first time, he or she may not easily understand that the common representative window indicates identical contents.

Hence, the fifth embodiment sequentially displays images using dynamic animations upon displaying the contents display window to help the user easily understand that the common representative window indicates identical contents.

The sequential display state of the window configurations of the fifth embodiment using dynamic animations upon displaying the contents display window shown in FIG. 72 will be explained below with reference to FIGS. 73 to 89.

Figure 73:
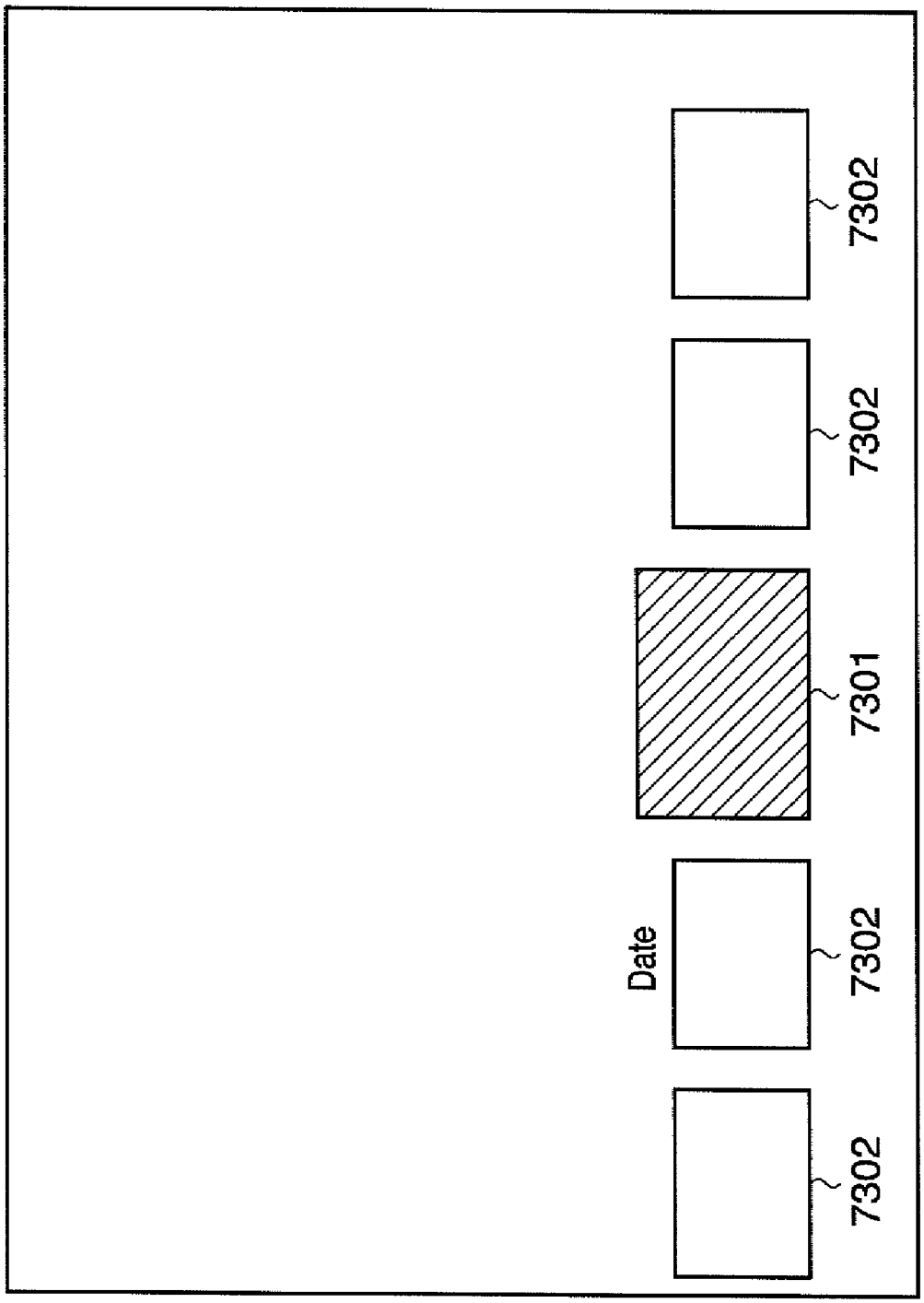
FIG. 73 is a view for explaining a state wherein the window configurations of the fifth embodiment are sequentially displayed using dynamic animations.

FIG. 73 shows an example of the window configuration of a display window which is displayed first in the fifth embodiment. As shown in FIG. 73, a thumbnail 7301 of a still image, as a contents icon which indicates a representative still image as a reference content included in the category "Date", is displayed at the center of a lowermost row of the window. Then, thumbnails 7302 of a array of still images included in the category "Date" are juxtaposed and displayed on the right and left sides of the thumbnail 7301 as a reference.

Figure 74:
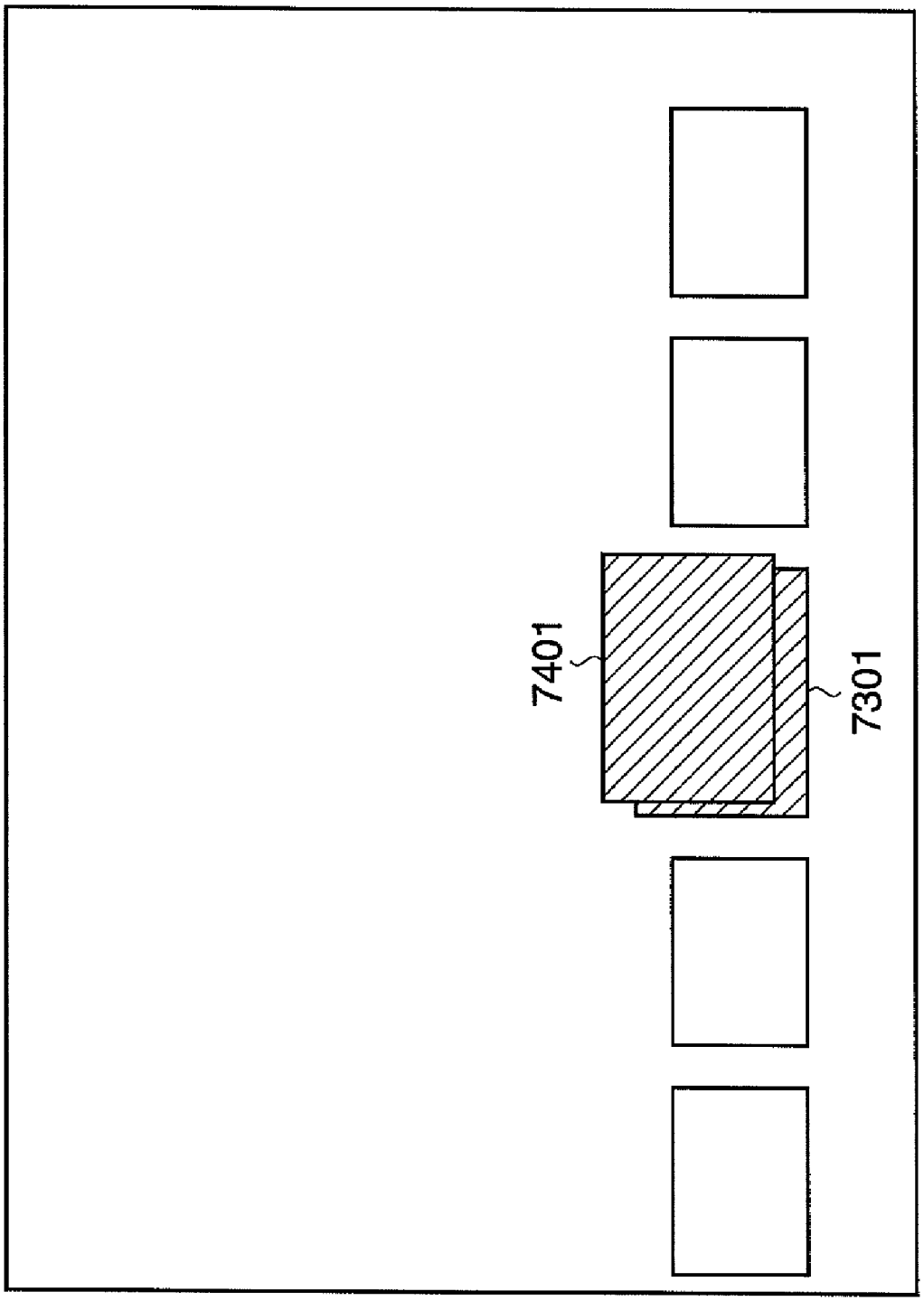
FIG. 74 is a view for explaining a state wherein the window configurations of the fifth embodiment are sequentially displayed using dynamic animations.
Figure 75:
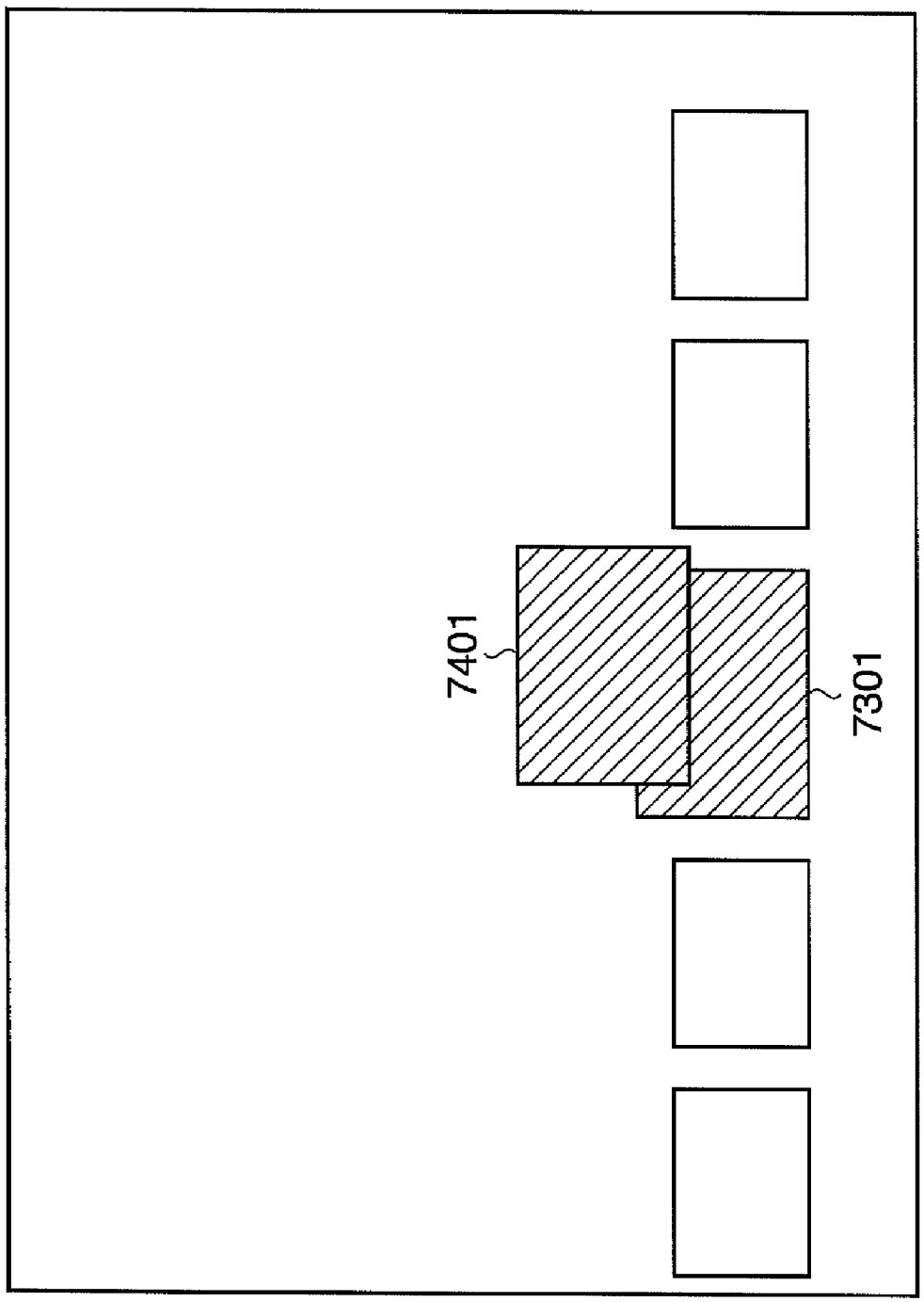
FIG. 75 is a view for explaining a state wherein the window configurations of the fifth embodiment are sequentially displayed using dynamic animations.
Figure 76:
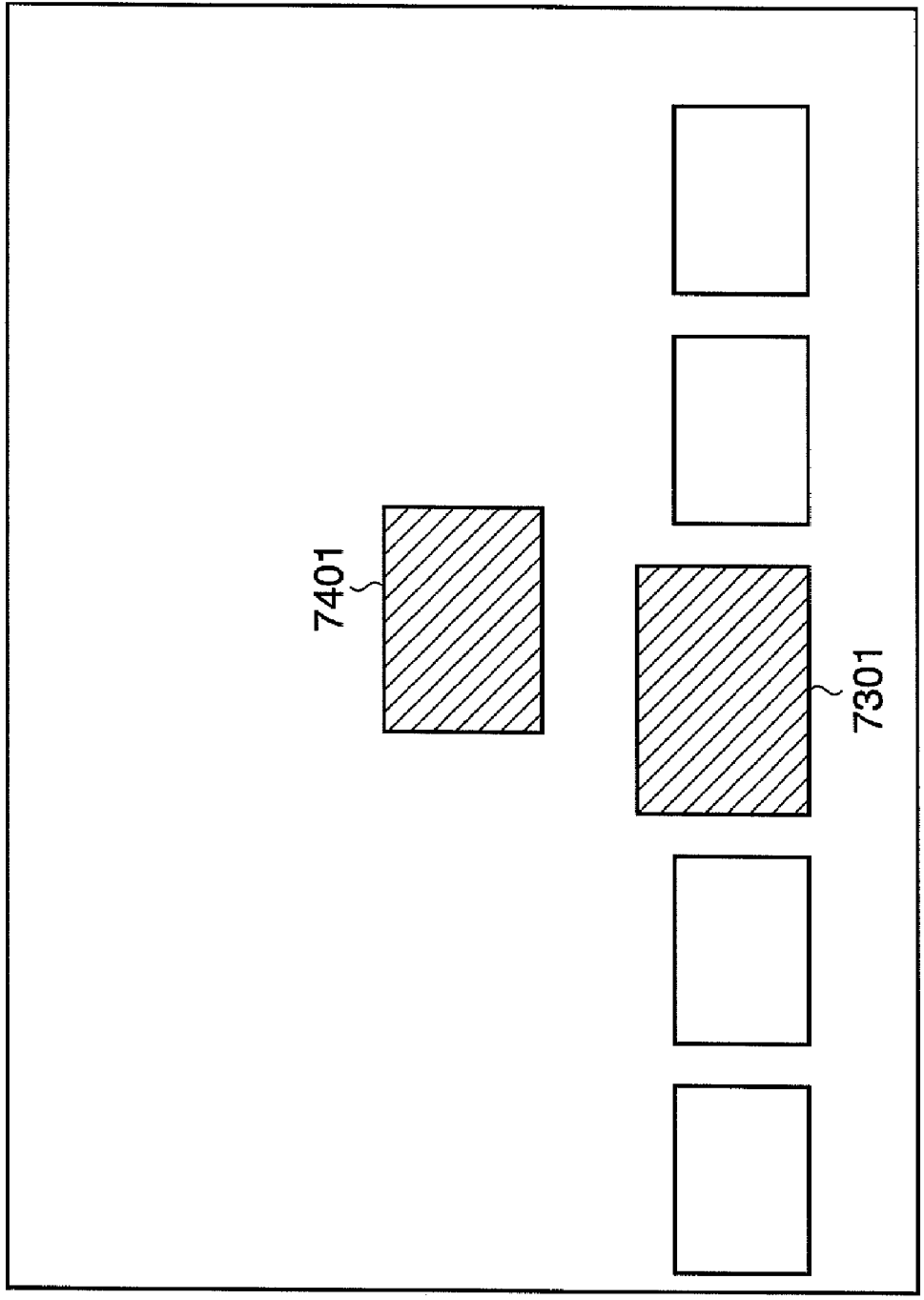
FIG. 76 is a view for explaining a state wherein the window configurations of the fifth embodiment are sequentially displayed using dynamic animations.

Next, as shown in FIG. 74, a copy image 7401 of the thumbnail 7301 indicating the representative still image as a reference is generated, and is displayed to overlap the thumbnail 7301 indicating the representative still image. As shown in FIGS. 75 and 76, the copy image 7401 moves upward along the window while reducing its size, and is displayed in turn. As shown in FIG. 76, the copy image 7401 stops at a display position along with the thumbnail 7301 indicating the representative still image. Note that the copy image 7401 will be referred to as a reference thumbnail hereinafter.

Figure 77:
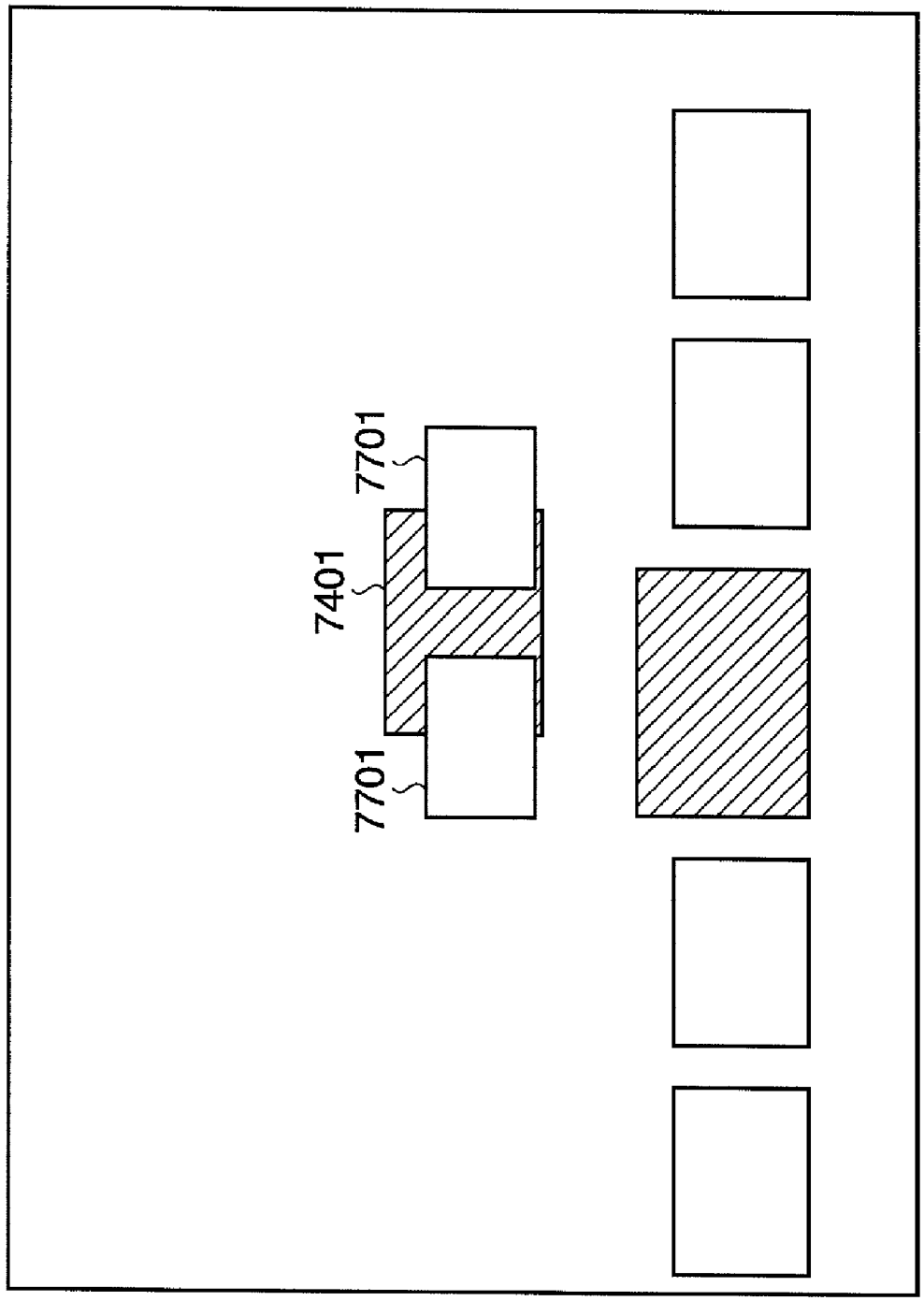
FIG. 77 is a view for explaining a state wherein the window configurations of the fifth embodiment are sequentially displayed using dynamic animations.
Figure 78:
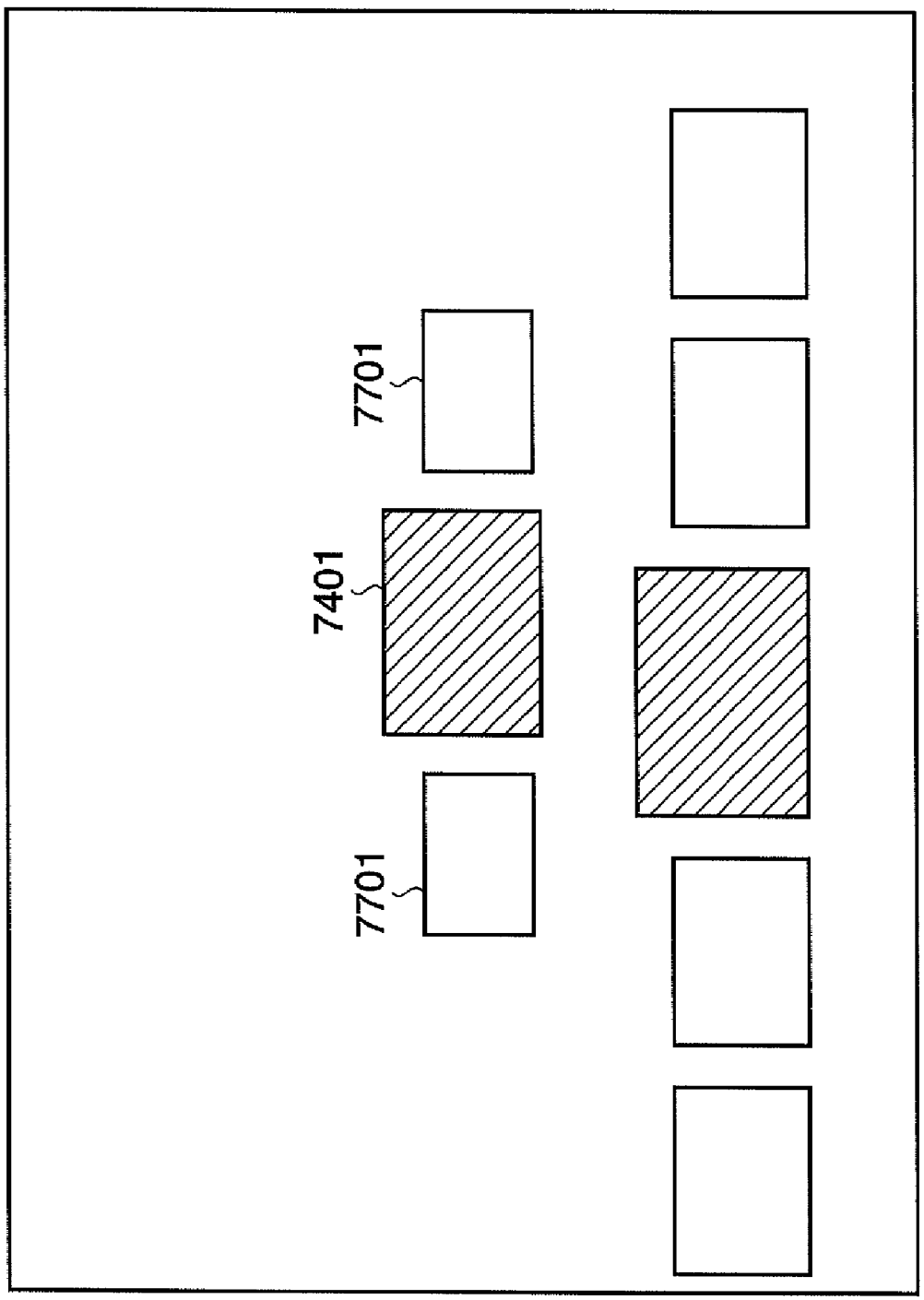
FIG. 78 is a view for explaining a state wherein the window configurations of the fifth embodiment are sequentially displayed using dynamic animations.

As shown in FIG. 77, thumbnails 7701 of a array of still images included in the category "Location" are displayed at positions of the reference thumbnail 7401, and move separately to the right and left sides of the reference thumbnail 7401. As shown in FIG. 78, the thumbnails 7701 stop at display positions next to the reference thumbnails 7401.

Figure 79:
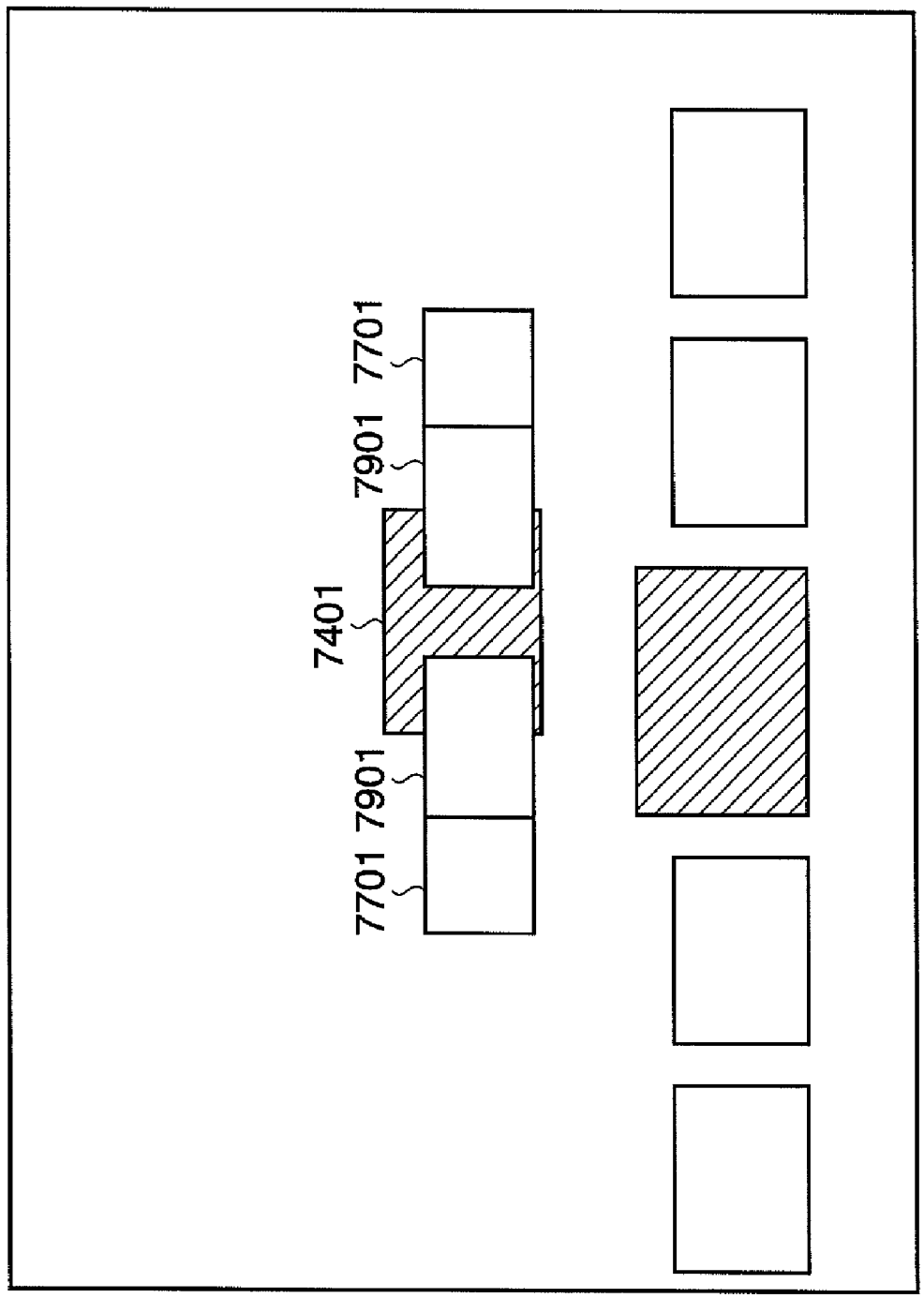
FIG. 79 is a view for explaining a state wherein the window configurations of the fifth embodiment are sequentially displayed using dynamic animations.
Figure 80:
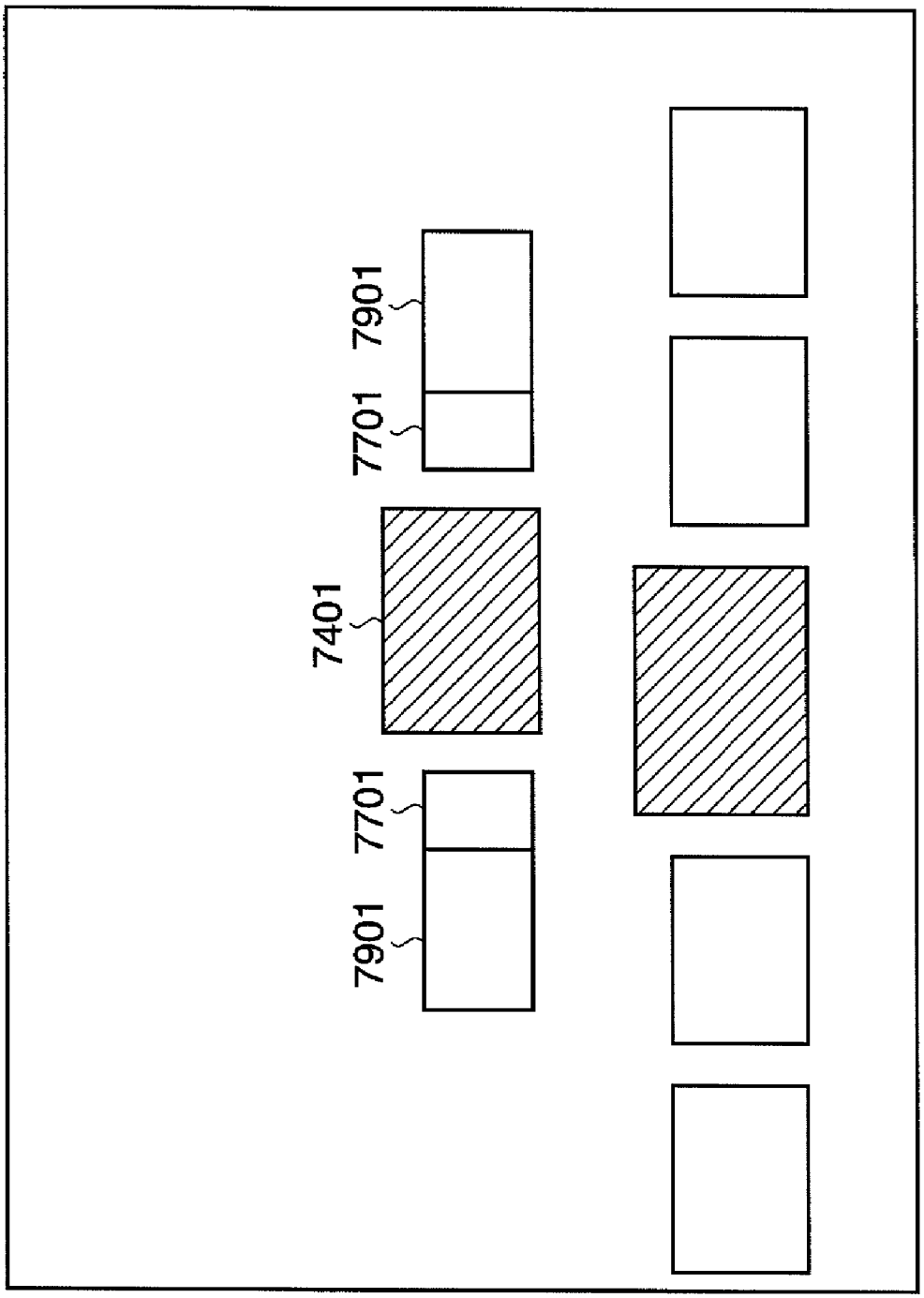
FIG. 80 is a view for explaining a state wherein the window configurations of the fifth embodiment are sequentially displayed using dynamic animations.
Figure 81:
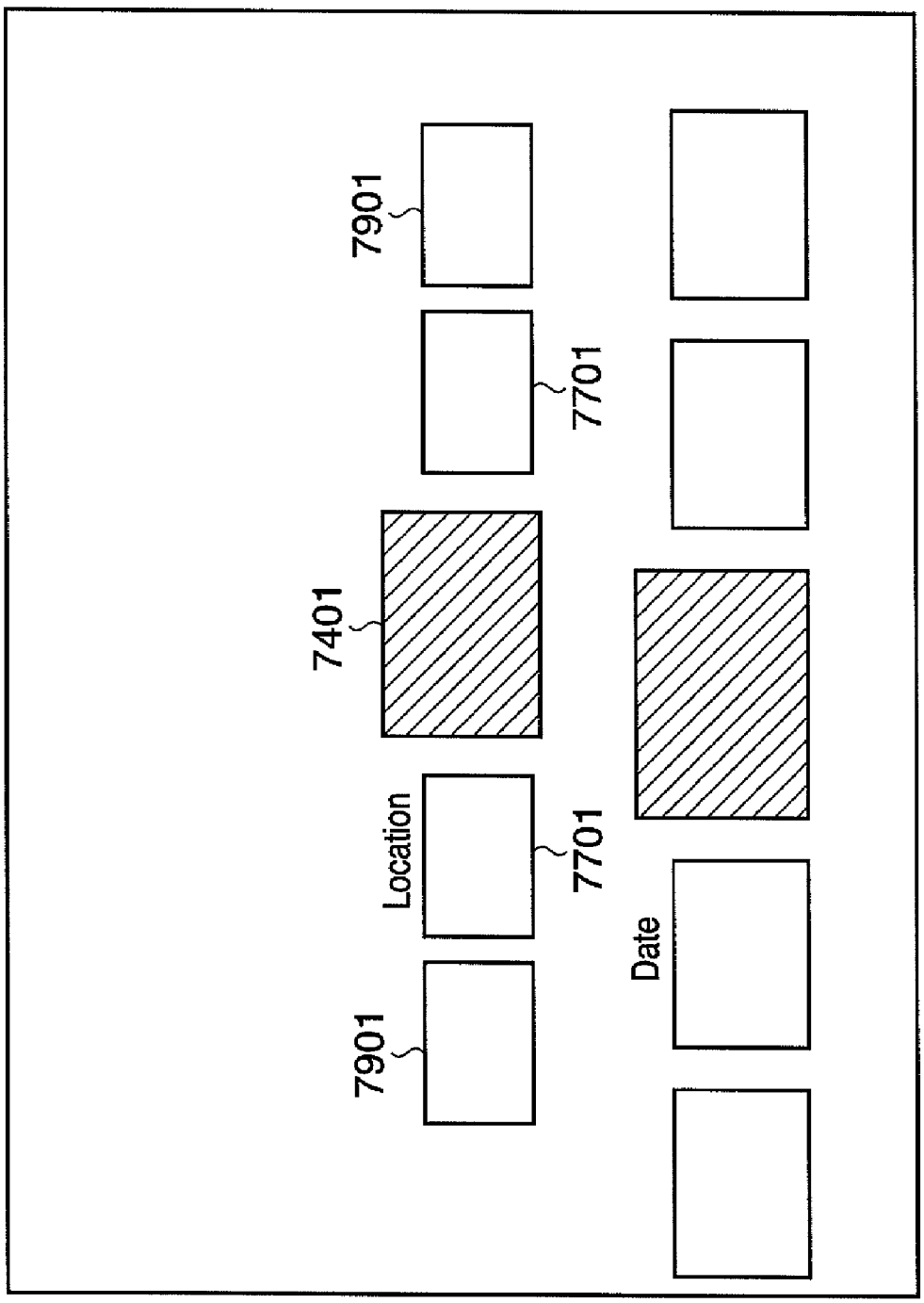
FIG. 81 is a view for explaining a state wherein the window configurations of the fifth embodiment are sequentially displayed using dynamic animations.

Thumbnails 7901 of a array of still images included in the category "Location" are displayed at positions of the reference thumbnail 7401, as shown in FIG. 79, and move separately to the right and left sides of the reference thumbnail 7401, as shown in FIG. 80. As shown in FIG. 81, the thumbnails 7901 stop at display positions next to the thumbnails 7701.

Figure 82:
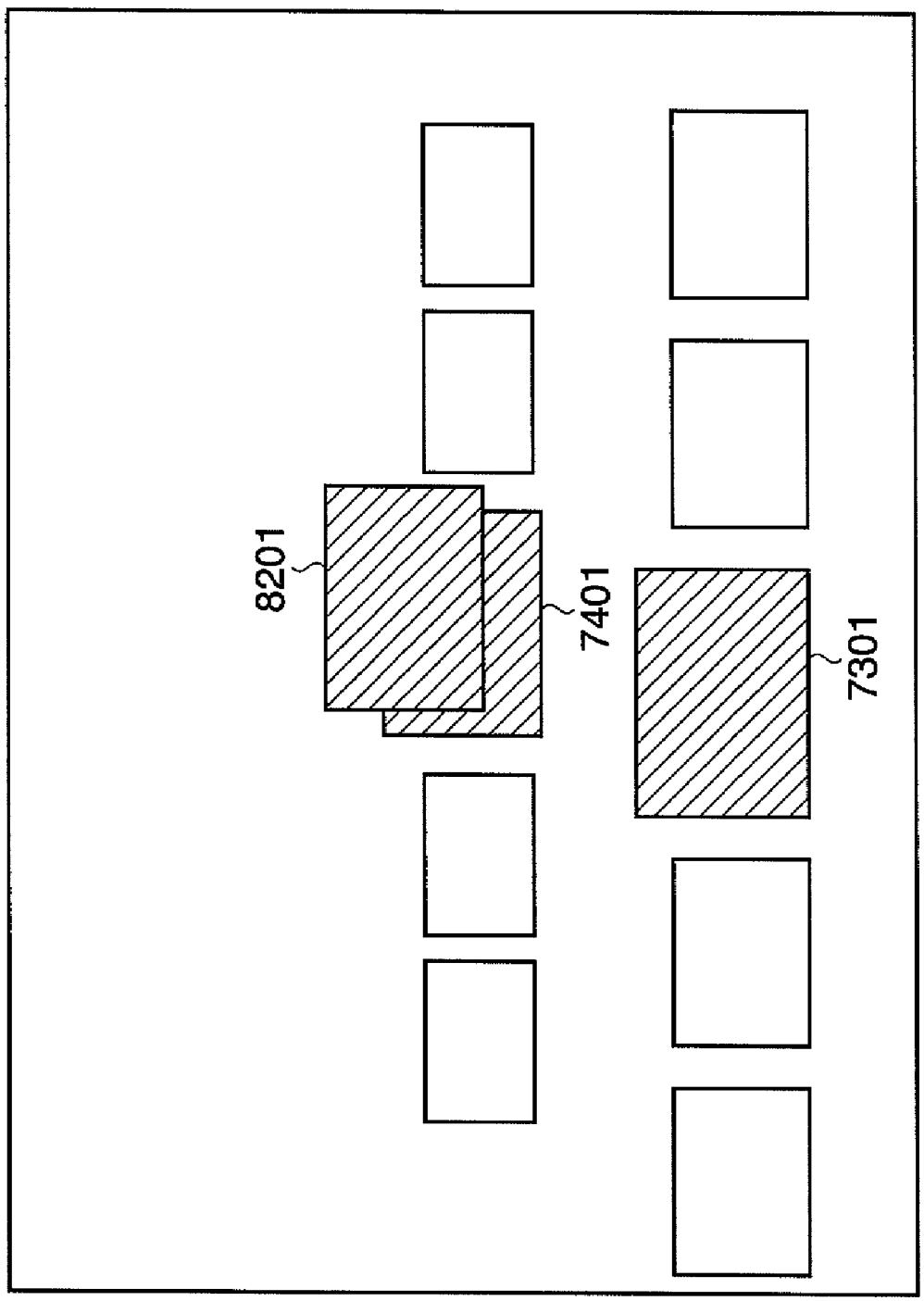
FIG. 82 is a view for explaining a state wherein the window configurations of the fifth embodiment are sequentially displayed using dynamic animations.
Figure 83:
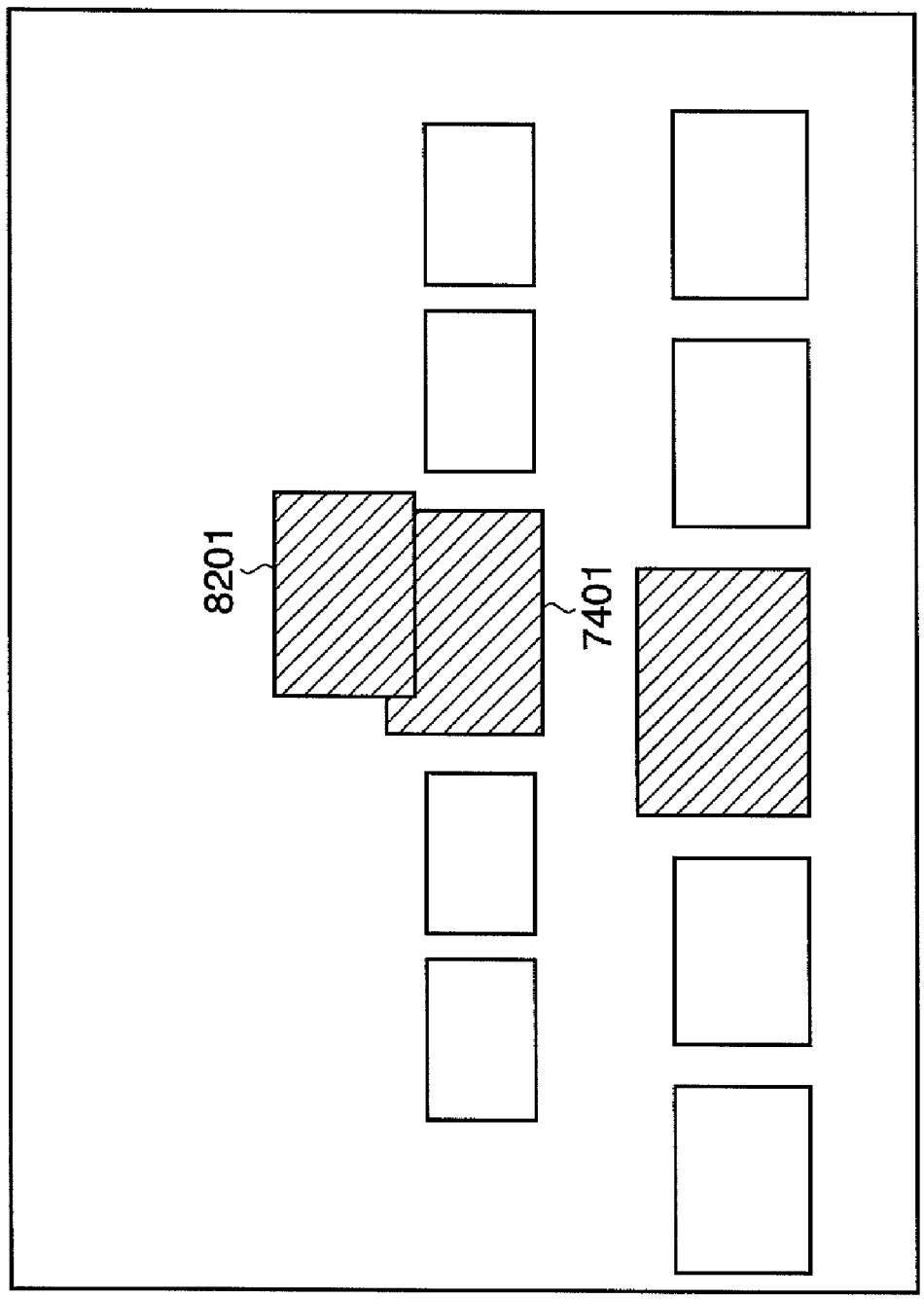
FIG. 83 is a view for explaining a state wherein the window configurations of the fifth embodiment are sequentially displayed using dynamic animations.
Figure 84:
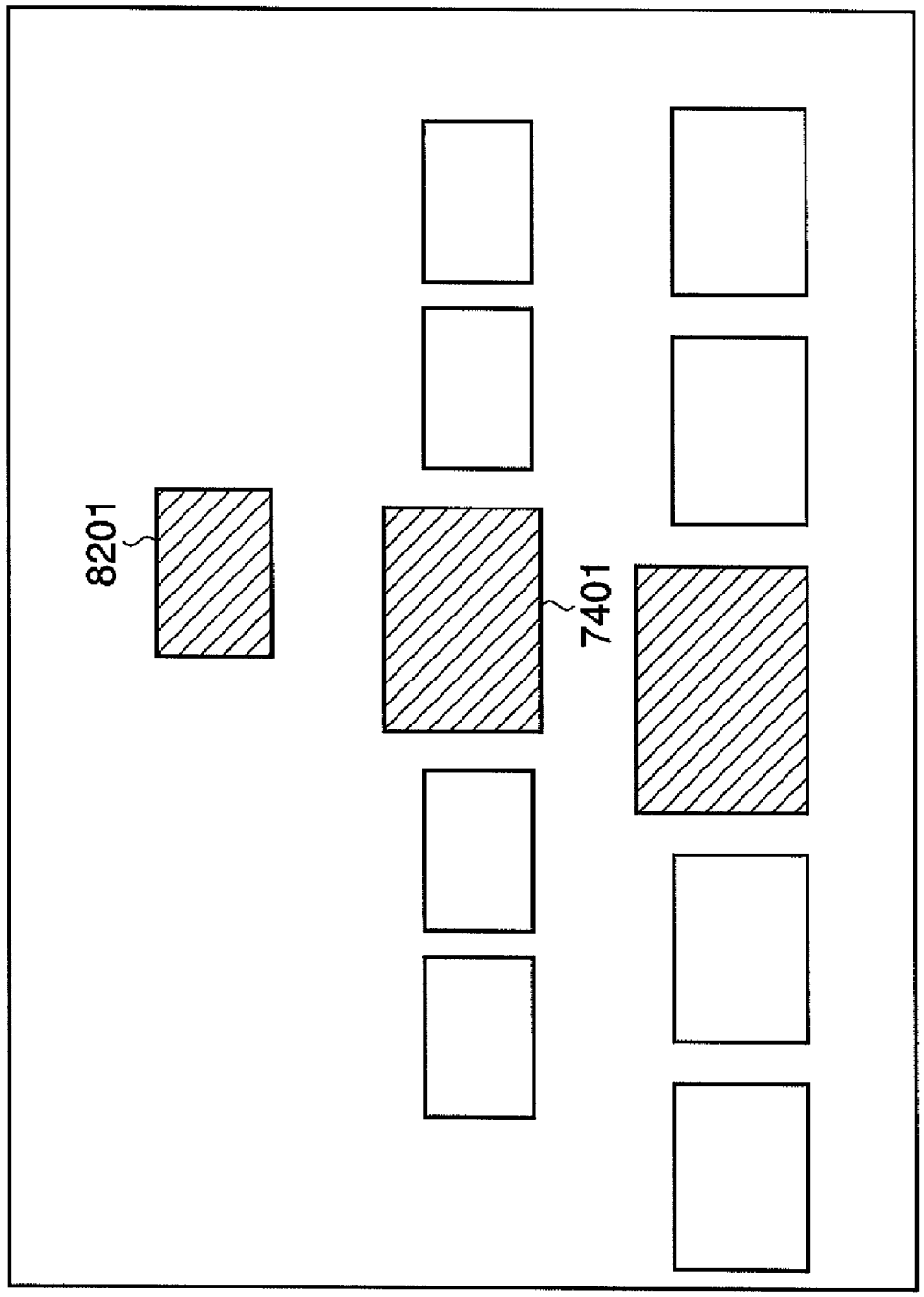
FIG. 84 is a view for explaining a state wherein the window configurations of the fifth embodiment are sequentially displayed using dynamic animations.

As shown in FIG. 82, as in the case of the thumbnail 7301 indicating the representative still image as a reference, a copy image 8201 of the reference thumbnail 7401 is generated and is displayed to overlap the reference thumbnail 7401. As shown in FIG. 83, the copy image 8201 moves upward along the window and is displayed in turn. As shown in FIG. 84, the copy image 8201 stops at a display position along with the reference thumbnail 7401. Note that the copy image 8201 will be referred to as a reference thumbnail hereinafter.

Figure 85:
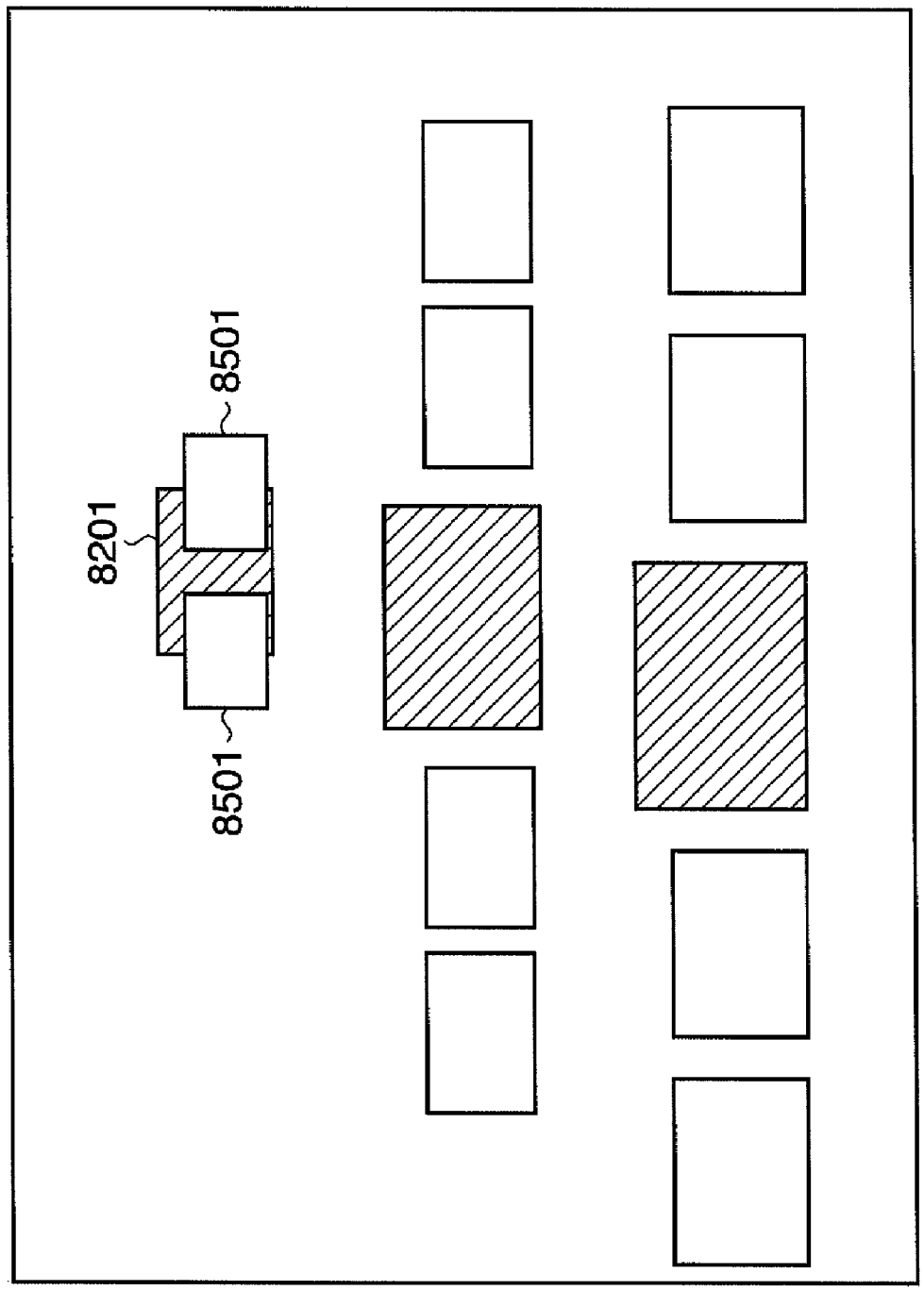
FIG. 85 is a view for explaining a state wherein the window configurations of the fifth embodiment are sequentially displayed using dynamic animations.
Figure 86:
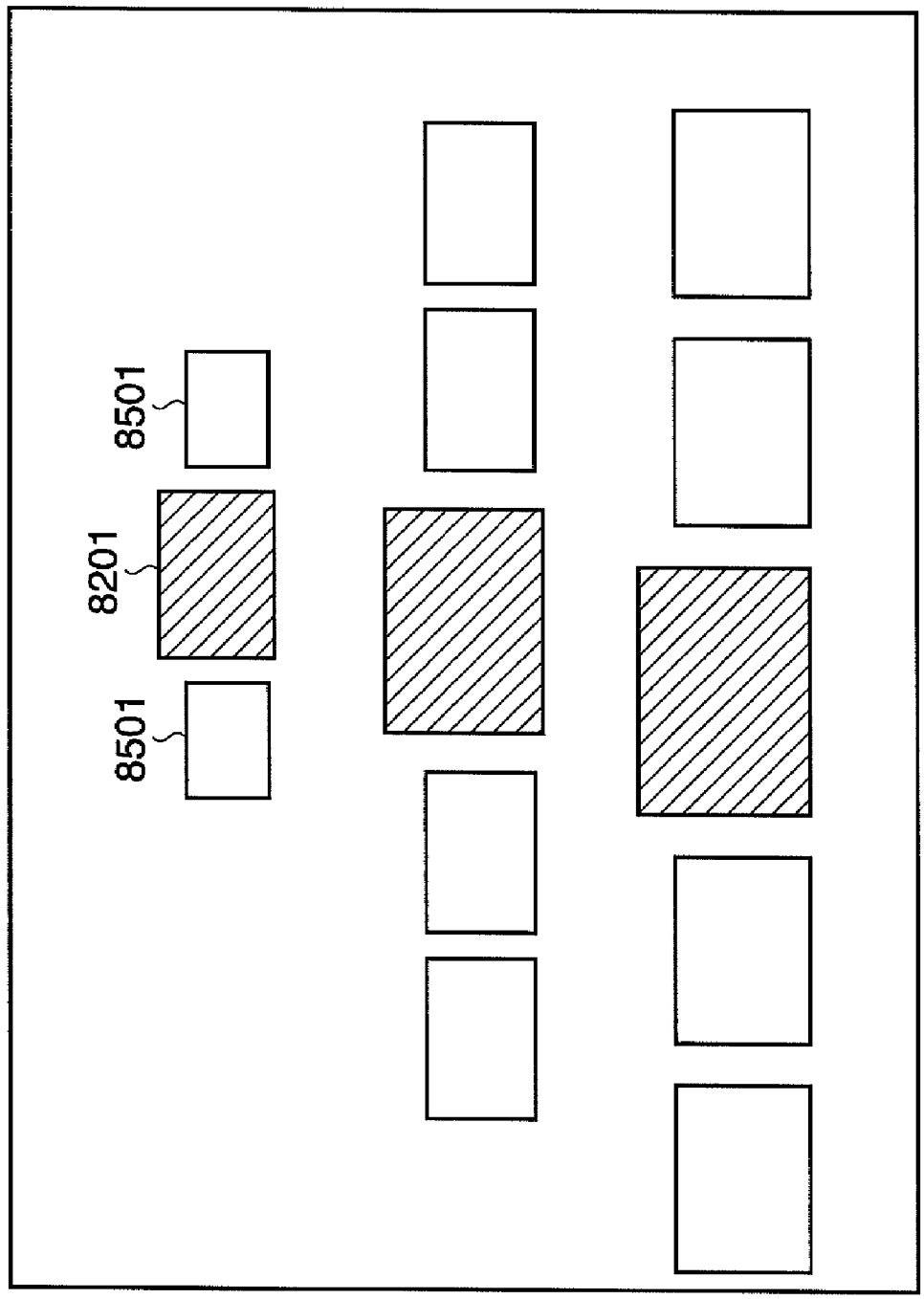
FIG. 86 is a view for explaining a state wherein the window configurations of the fifth embodiment are sequentially displayed using dynamic animations.

As shown in FIG. 85, thumbnails 7701 of a array of still images included in the category "Event" are displayed at positions of the reference thumbnail 8201, and move separately to the right and left sides of the reference thumbnail 8201. As shown in FIG. 86, the thumbnails 8501 stop at display positions next to the reference thumbnail 8201.

Figure 87:
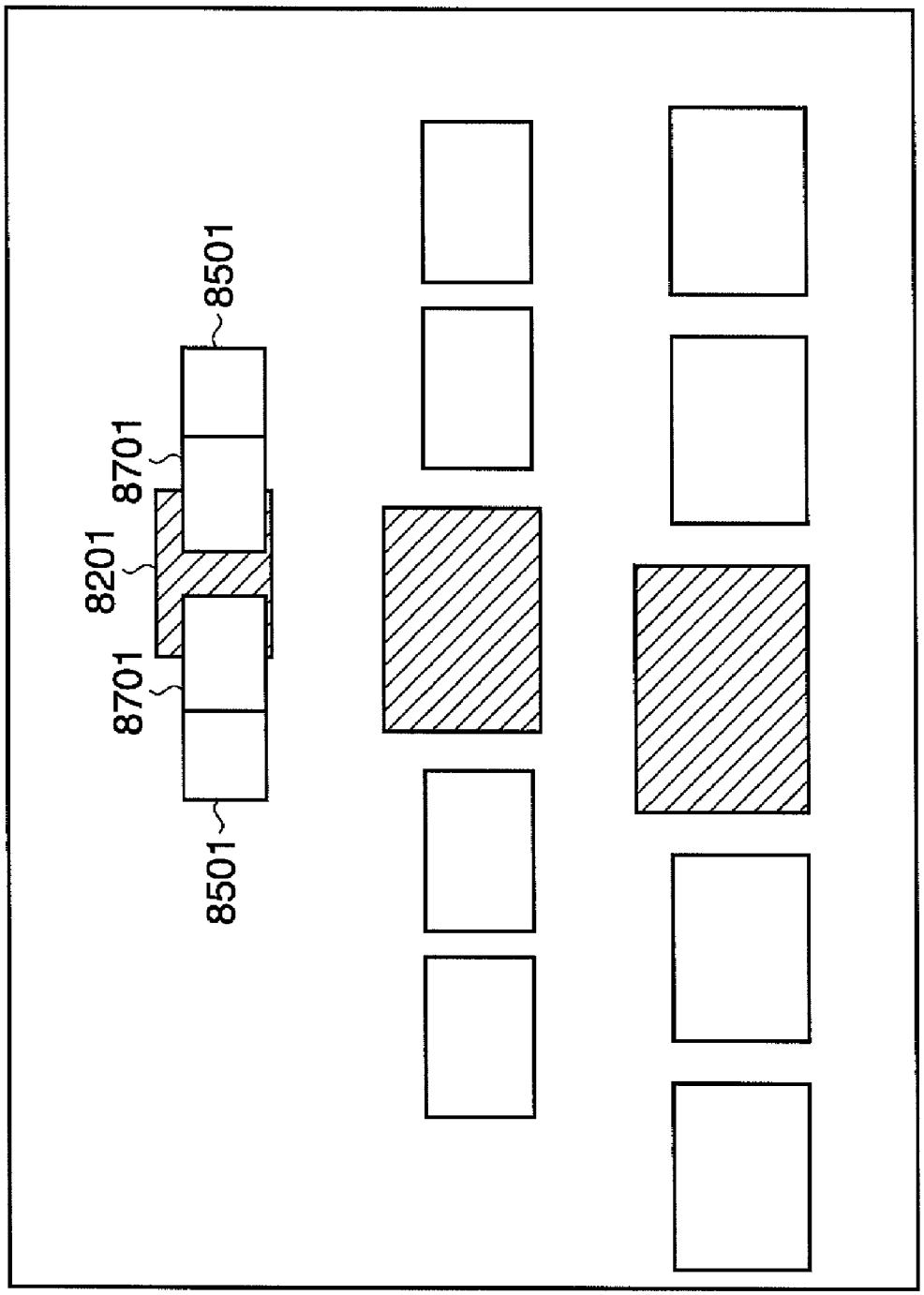
FIG. 87 is a view for explaining a state wherein the window configurations of the fifth embodiment are sequentially displayed using dynamic animations.
Figure 88:
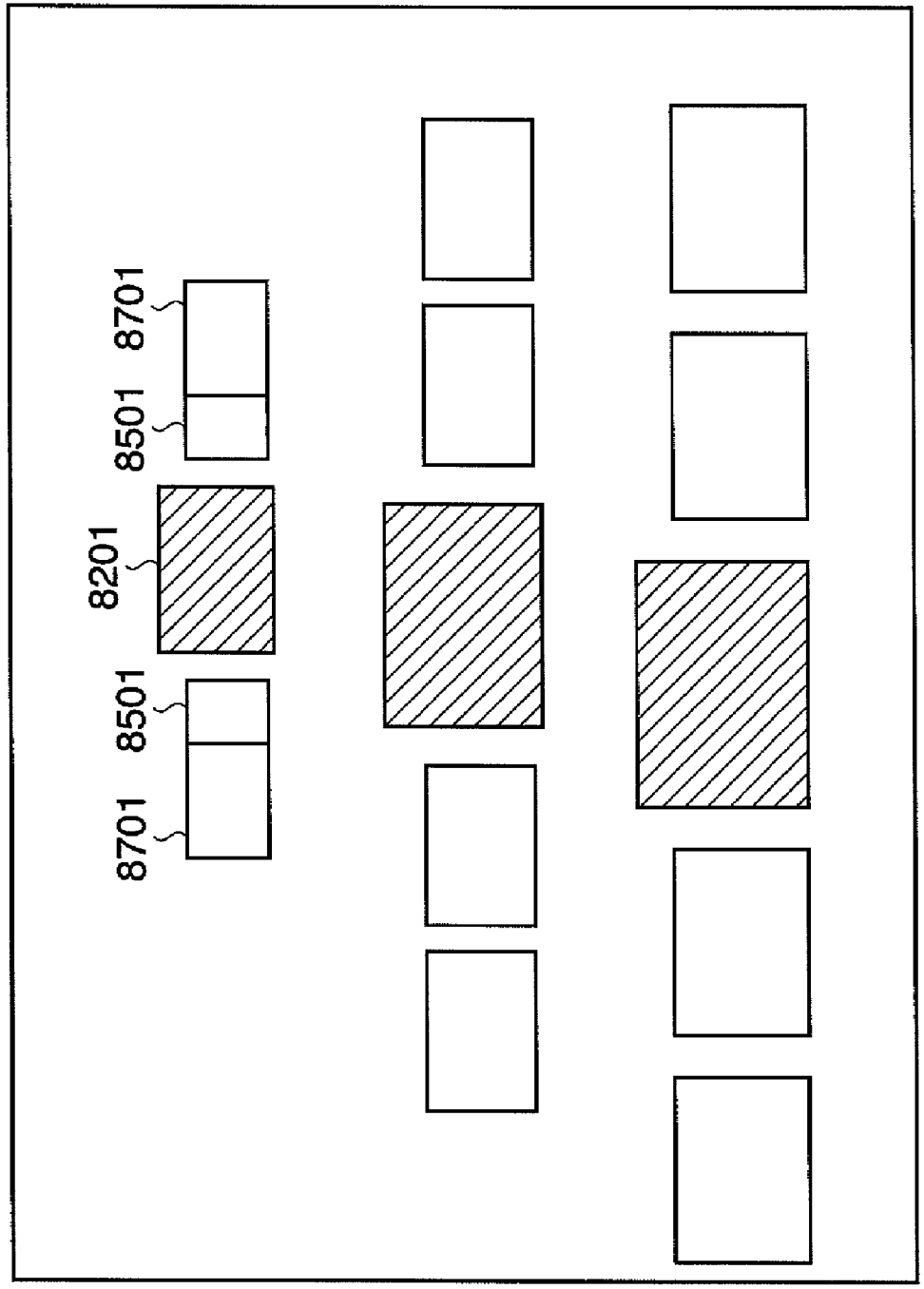
FIG. 88 is a view for explaining a state wherein the window configurations of the fifth embodiment are sequentially displayed using dynamic animations.
Figure 89:
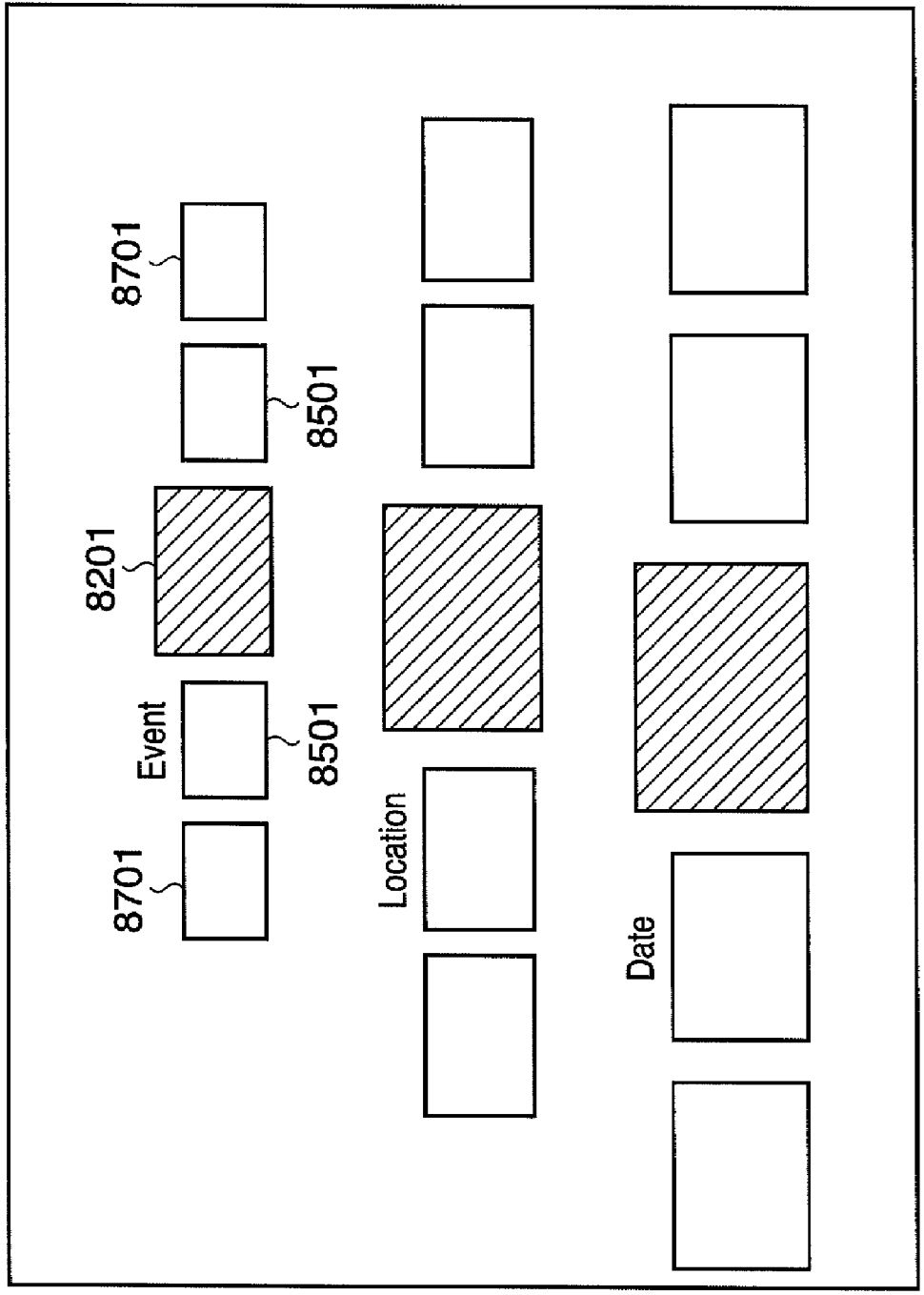
FIG. 89 is a view for explaining a state wherein the window configurations of the fifth embodiment are sequentially displayed using dynamic animations.

Thumbnails 8701 of a array of still images included in the category "Event" are displayed at positions of the reference thumbnail 8201, as shown in FIG. 87, and move separately to the right and left sides of the reference thumbnail 8201, as shown in FIG. 88. As shown in FIG. 89, the thumbnails 8701 stop at display positions next to the thumbnails 8501.

In the description of the fifth embodiment, three categories are used, and three arrays are displayed. However, two or more categories need only be used, and three or more arrays are sequentially displayed by the same operations.

The processing for displaying the contents display window using the aforementioned dynamic animations will be described below with reference to FIG. 90. This processing is implemented in such a manner that the CPU 7102 generates display data of contents and contents icons stored in the storage unit 7105 in accordance with programs recorded in the program memory 7104 and controls the display output unit 7103 to display these data.

Figure 90:
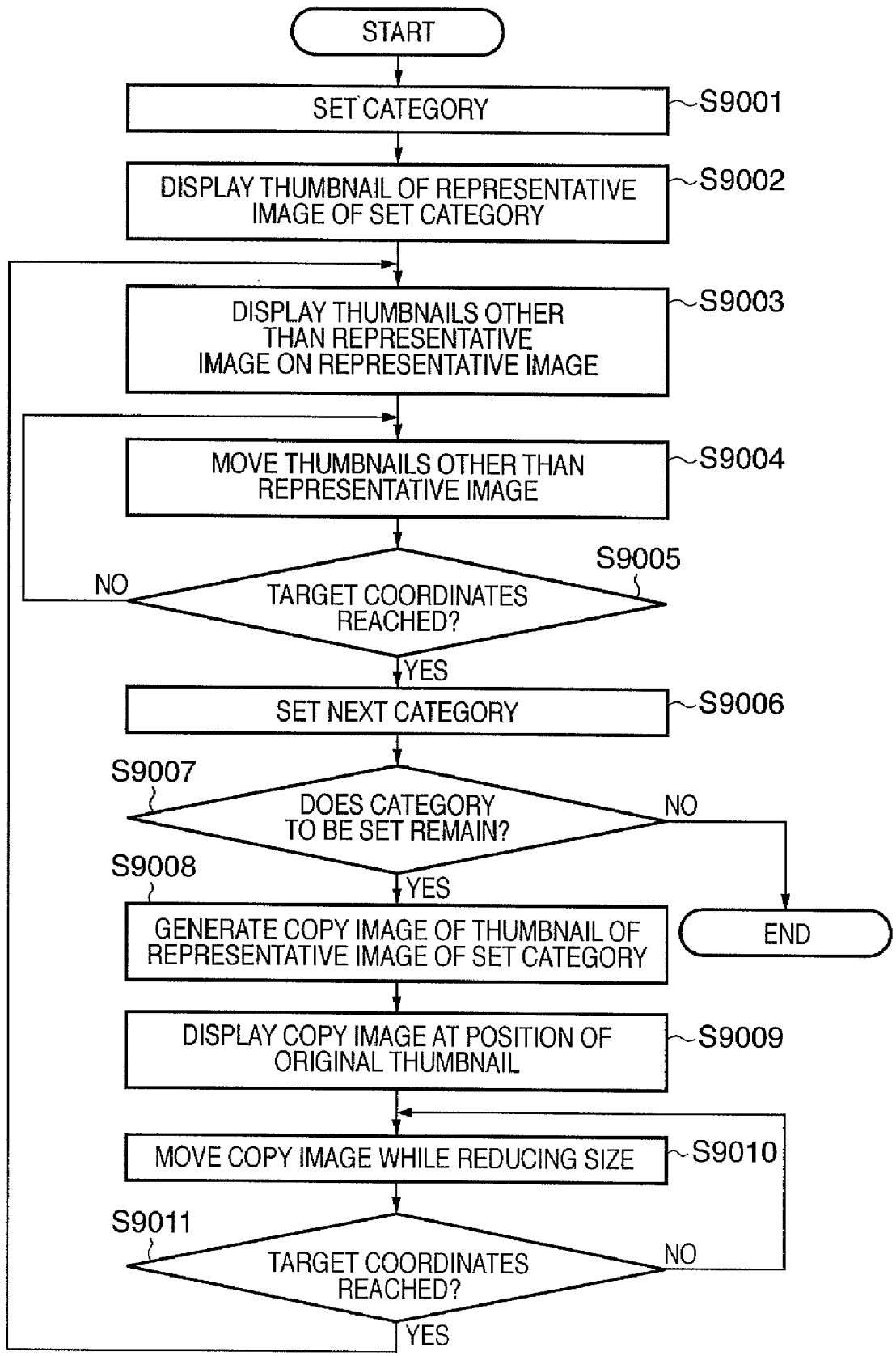
FIG. 90 is a flowchart showing the window display processing according to the fifth embodiment.

FIG. 90 is a flowchart showing the window display processing according to the fifth embodiment. When the processing starts, the CPU 7102 sets the first category in step S9001. In step S9002, the CPU 7102 displays a thumbnail of a representative image (representative thumbnail) as a reference for the category set in step S9001. In step S9003, the CPU 7102 displays thumbnails of images other than the representative image on the representative thumbnail.

In step S9004, the CPU 7102 moves the thumbnails on the representative thumbnail. The CPU 7102 repeats step S9004 until the thumbnails reach their target coordinates in step S9005, thus repetitively moving the thumbnails. After that, if the thumbnails have reached their target coordinates, the process advances to step S9006 to set the next category. The CPU 7102 checks in step S9007 if the next category to be displayed still remains. If no category remains, the CPU 7102 ends this processing.

On the other hand, if it is determined in step S9007 that the next category to be displayed still remains, the process advances to step S9008 to generate a copy image of the thumbnail of the representative image of the set category. In step S9009, the CPU 7102 displays the copy image at the position of the original thumbnail.

In step S9010, the CPU 7102 moves the copy image. The CPU 7102 repeats step S9010 until the copy image reaches its target coordinates in step S9011, thus repetitively moving the copy image. After that, if the copy image has reached its target coordinates, the process returns to step S9003 to repeat the aforementioned processes until all the categories are displayed.

First Modification of Fifth Embodiment

The first modification of the fifth embodiment according to the present invention will be described in detail hereinafter with reference to the accompanying drawings. Note that the arrangement of a contents display apparatus in the first modification of the fifth embodiment is the same as that shown in FIG. 71 described in the fifth embodiment. Also, the configuration of the contents display window is the same as that shown in FIG. 72 described in the fifth embodiment.

The sequential display state in the first modification of the fifth embodiment, in which the order of dynamic animations is different from the fifth embodiment, will be described below with reference to FIGS. 91 to 107.

Figure 91:
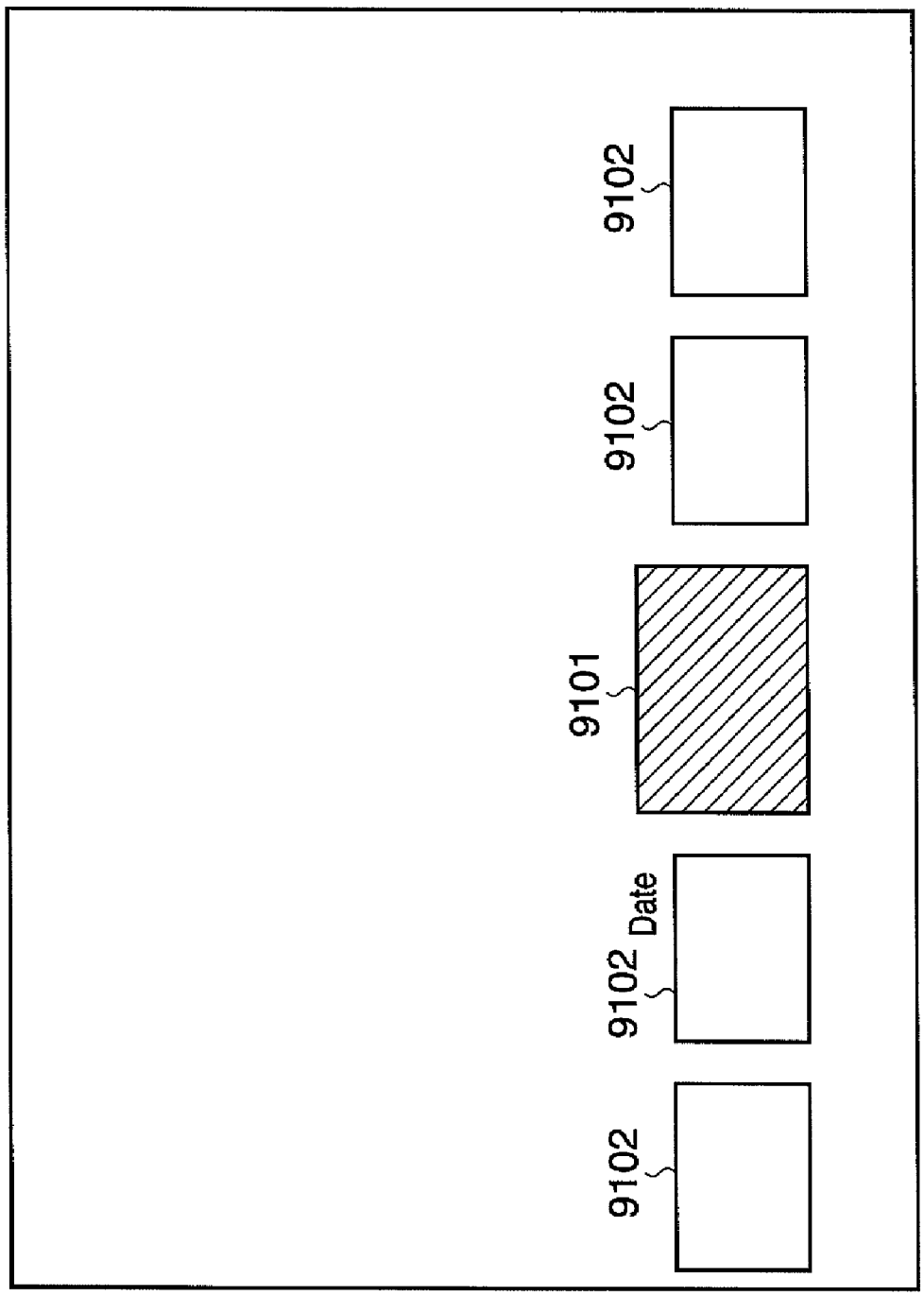
FIG. 91 is a view for explaining a sequential display state in the first modification of the fifth embodiment which has a different order of dynamic animations.

FIG. 91 shows an example of the window configuration of a display window which is displayed first in the first modification of the fifth embodiment. As shown in FIG. 91, a thumbnail 9101 of a still image, as a contents icon which indicates a representative still image as a reference content included in the category "Date", is displayed at the center of a lowermost row of the window. Then, thumbnails 9102 of a array of still images included in the category "Date" are juxtaposed and displayed on the right and left sides of the thumbnail 9101 as a reference.

Figure 92:
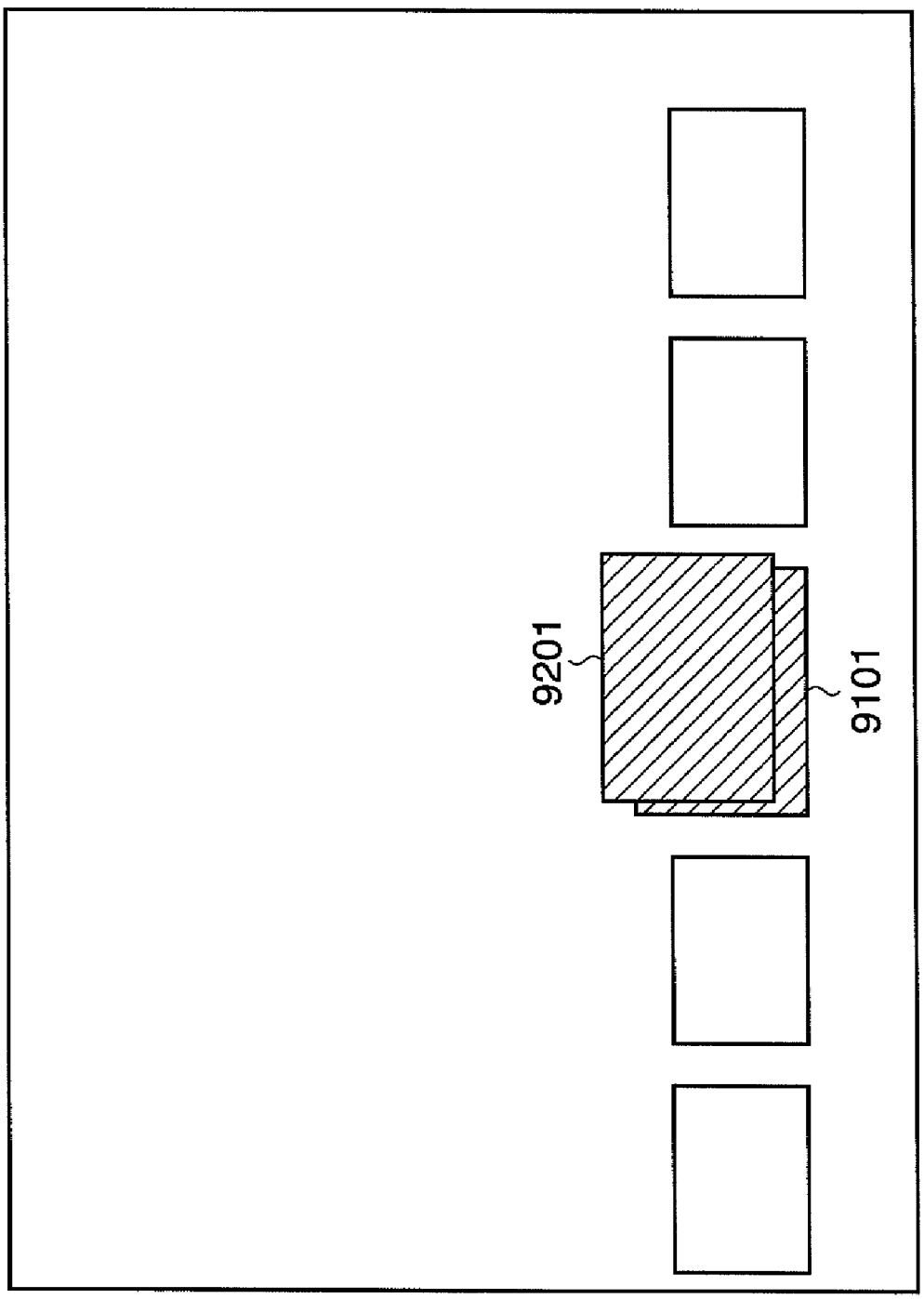
FIG. 92 is a view for explaining a sequential display state in the first modification of the fifth embodiment which has a different order of dynamic animations.
Figure 93:
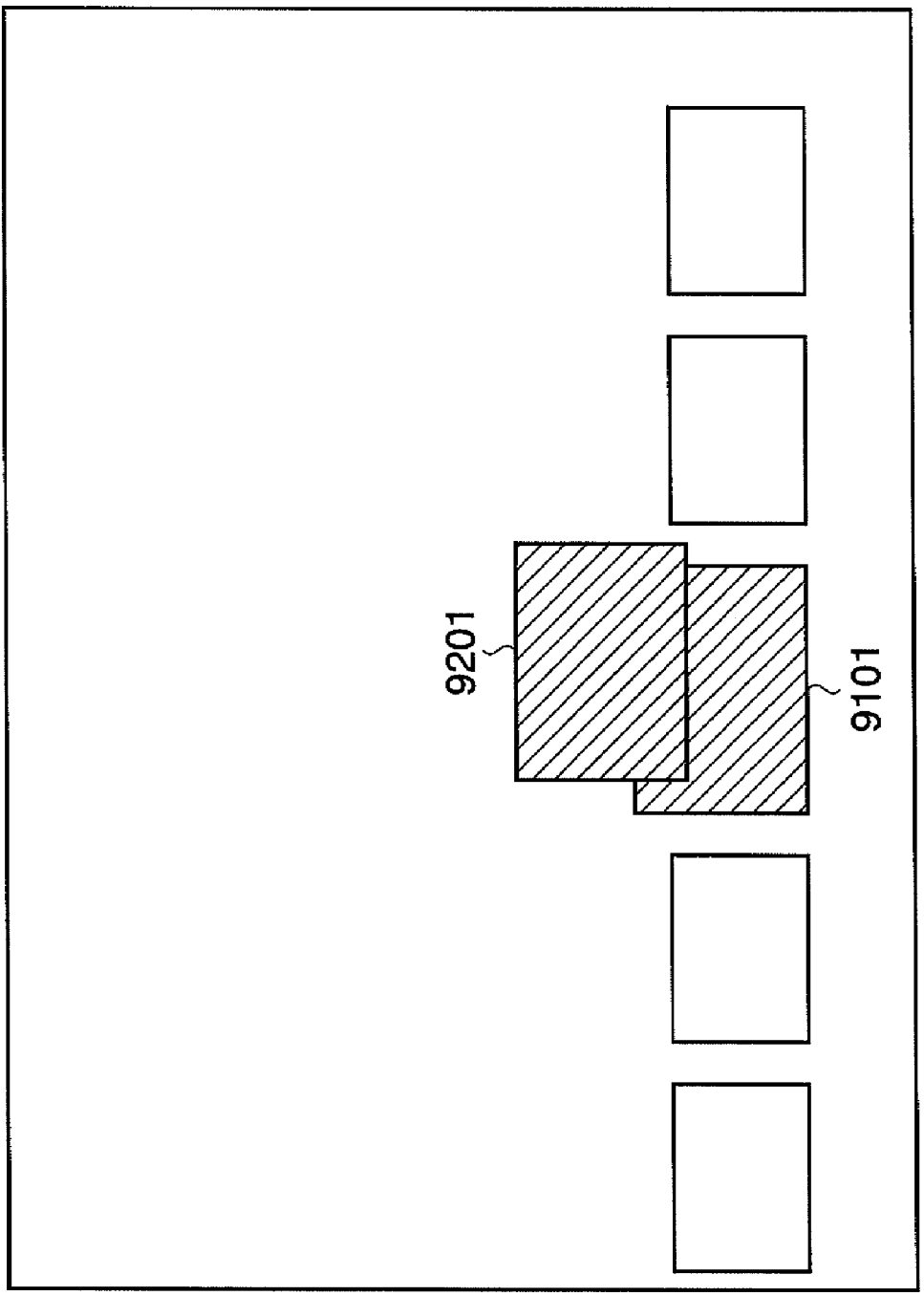
FIG. 93 is a view for explaining a sequential display state in the first modification of the fifth embodiment which has a different order of dynamic animations.
Figure 94:
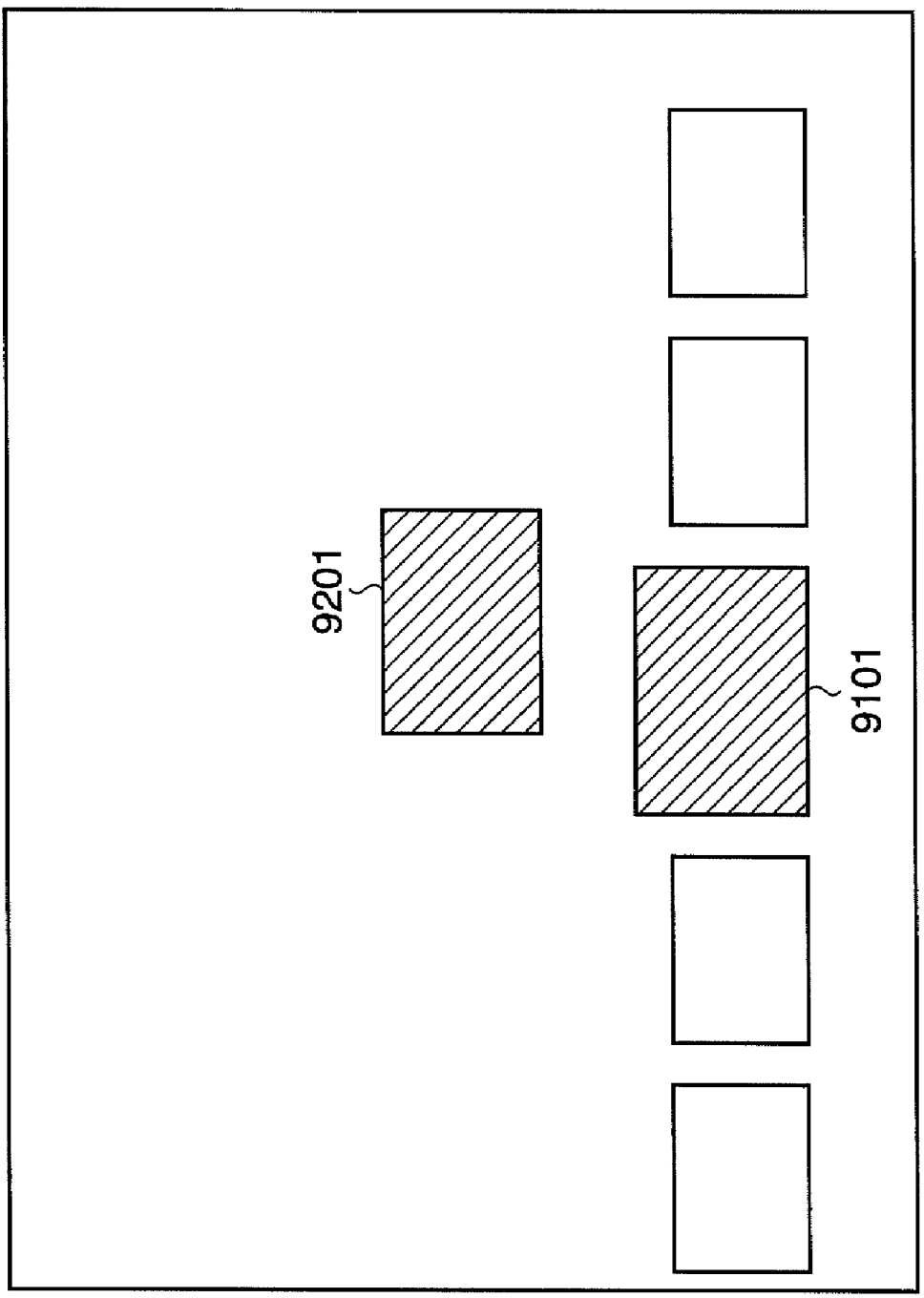
FIG. 94 is a view for explaining a sequential display state in the first modification of the fifth embodiment which has a different order of dynamic animations.

Next, as shown in FIG. 92, a copy image 9201 of the thumbnail 9101 indicating the representative still image as a reference is generated, and is displayed to overlap the thumbnail 9101 indicating the representative still image. As shown in FIGS. 92 and 93, the copy image 9201 moves upward along the window while reducing its size, and is displayed in turn. As shown in FIG. 94, the copy image 9201 stops at a display position along with the thumbnail 9101 indicating the representative still image.

Figure 95:
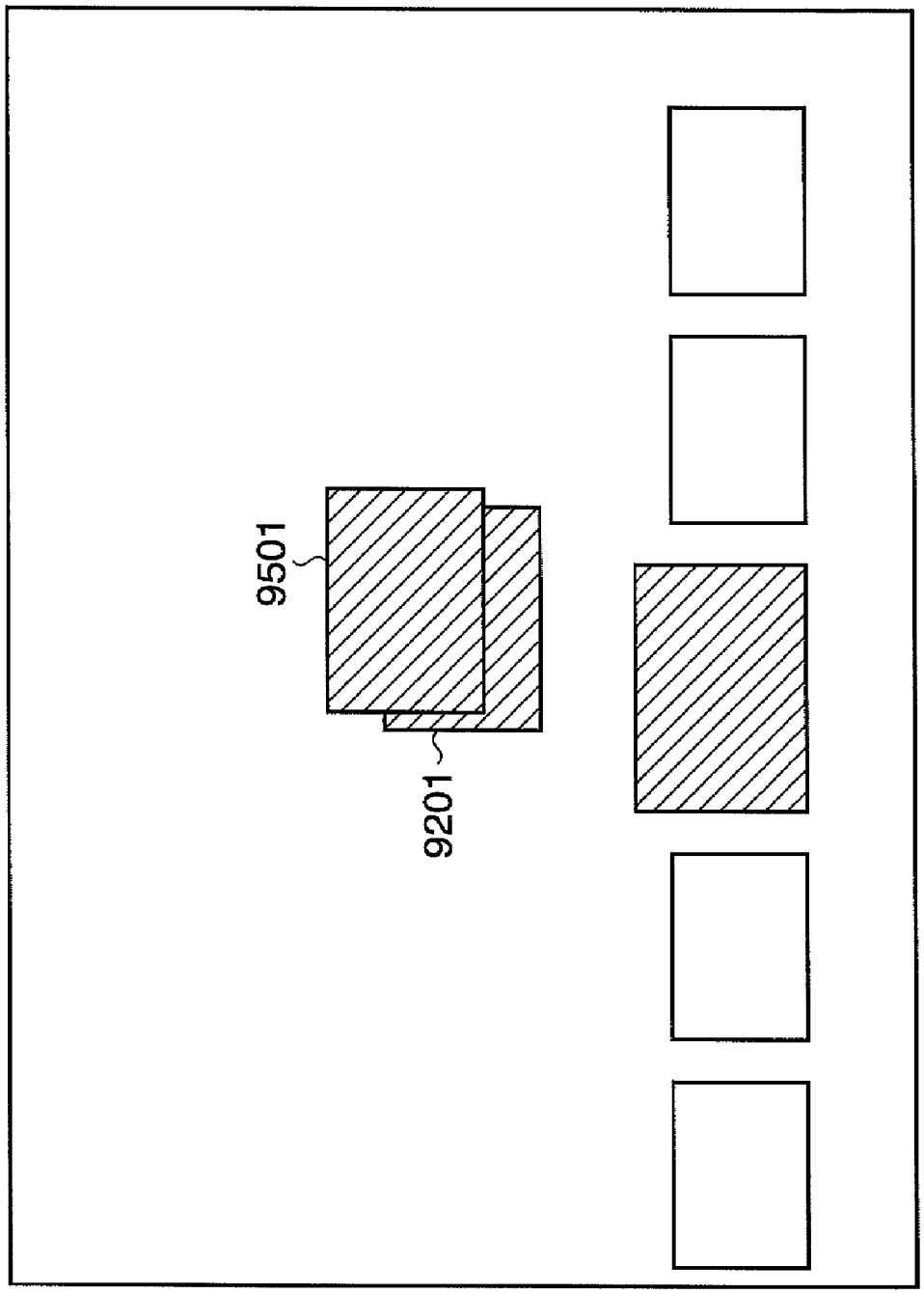
FIG. 95 is a view for explaining a sequential display state in the first modification of the fifth embodiment which has a different order of dynamic animations.
Figure 96:
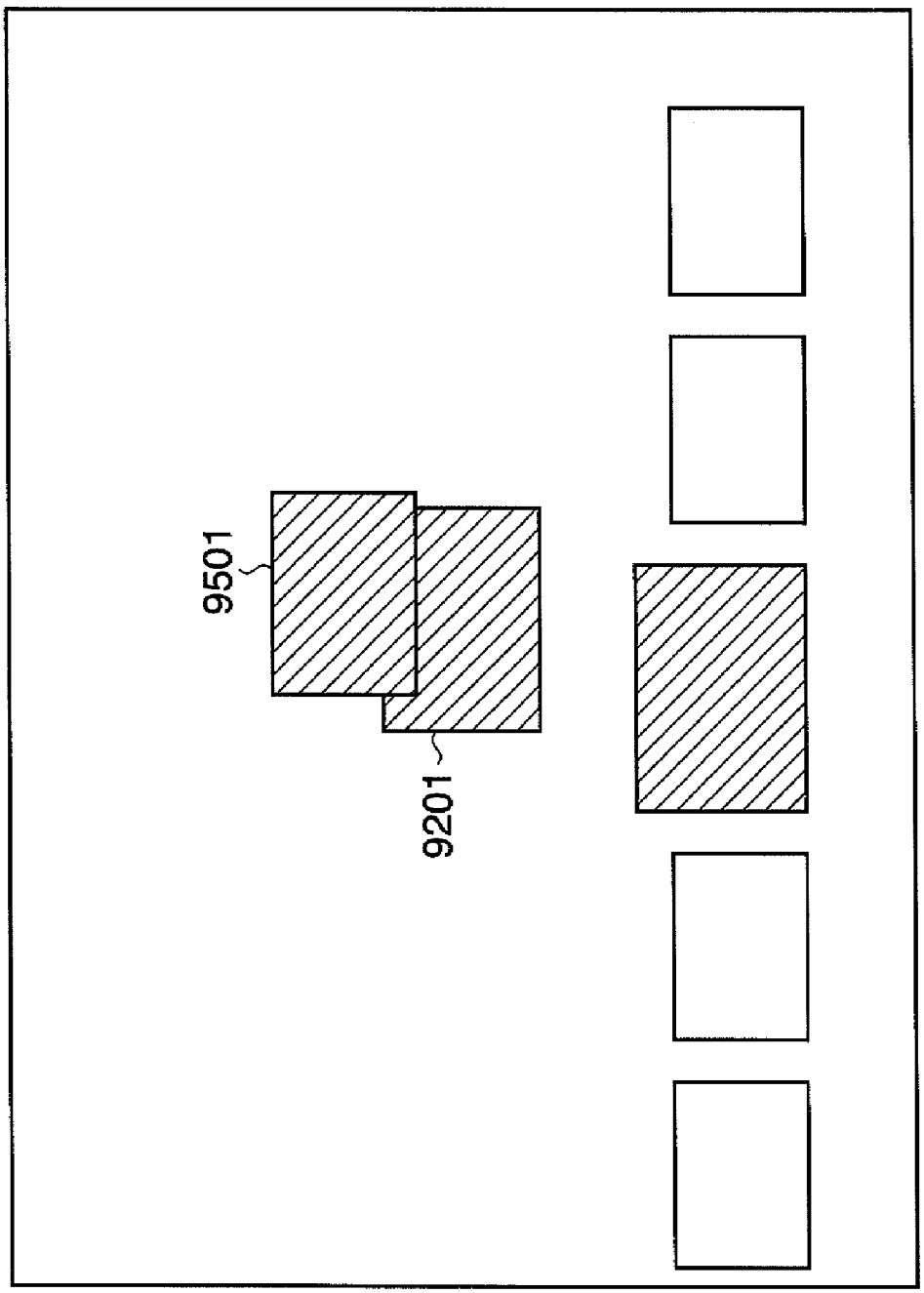
FIG. 96 is a view for explaining a sequential display state in the first modification of the fifth embodiment which has a different order of dynamic animations.
Figure 97:
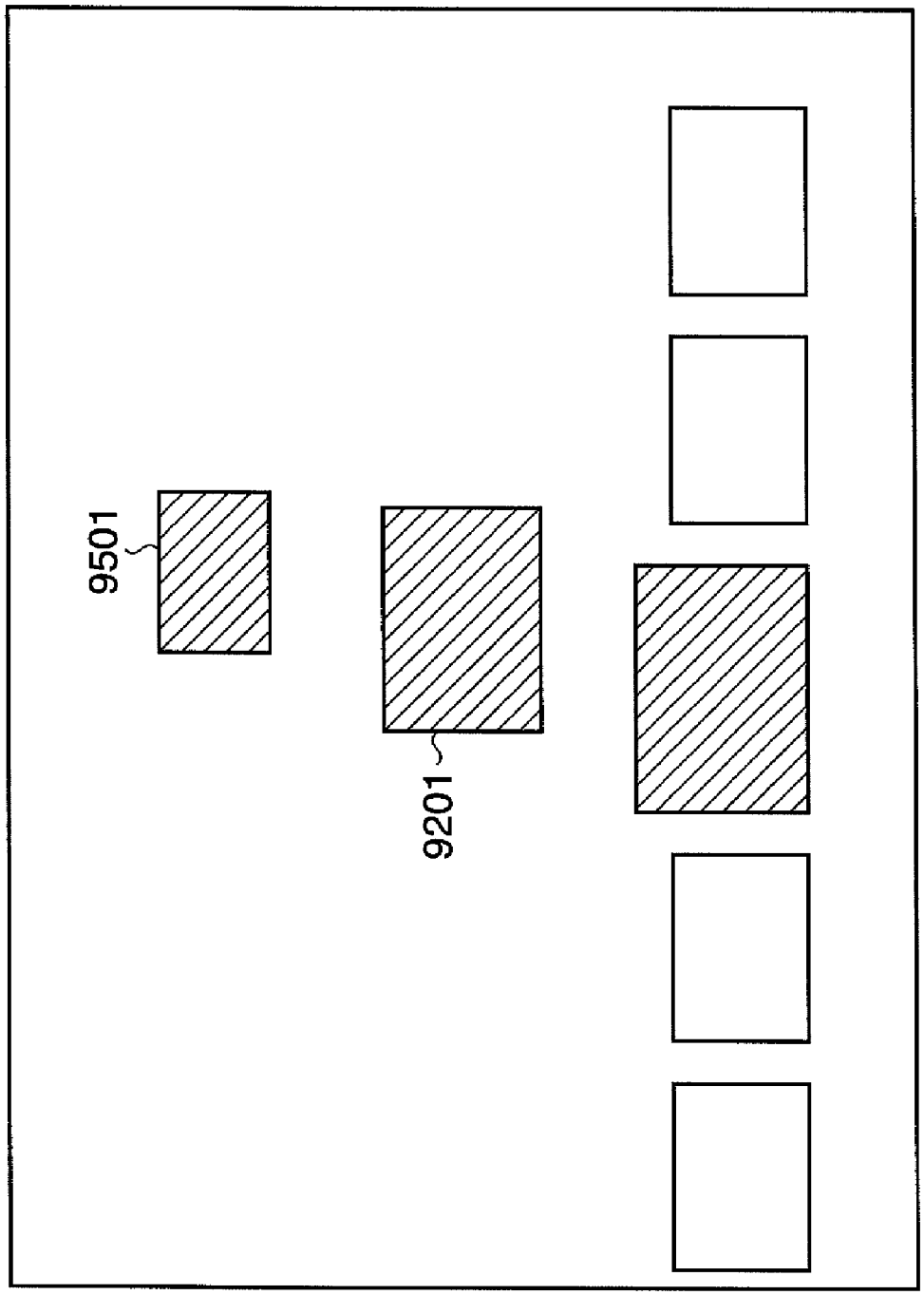
FIG. 97 is a view for explaining a sequential display state in the first modification of the fifth embodiment which has a different order of dynamic animations.

As shown in FIG. 95, an additional copy image 9501 of the copy image 9201 is generated and is displayed to overlap the copy image 9201. As shown in FIGS. 95 and 96, the additional copy image 9501 moves upward along the window while reducing its size and is displayed in turn. As shown in FIG. 97, the additional copy image 9501 stops at a display position along with the copy image 9201.

Figure 98:
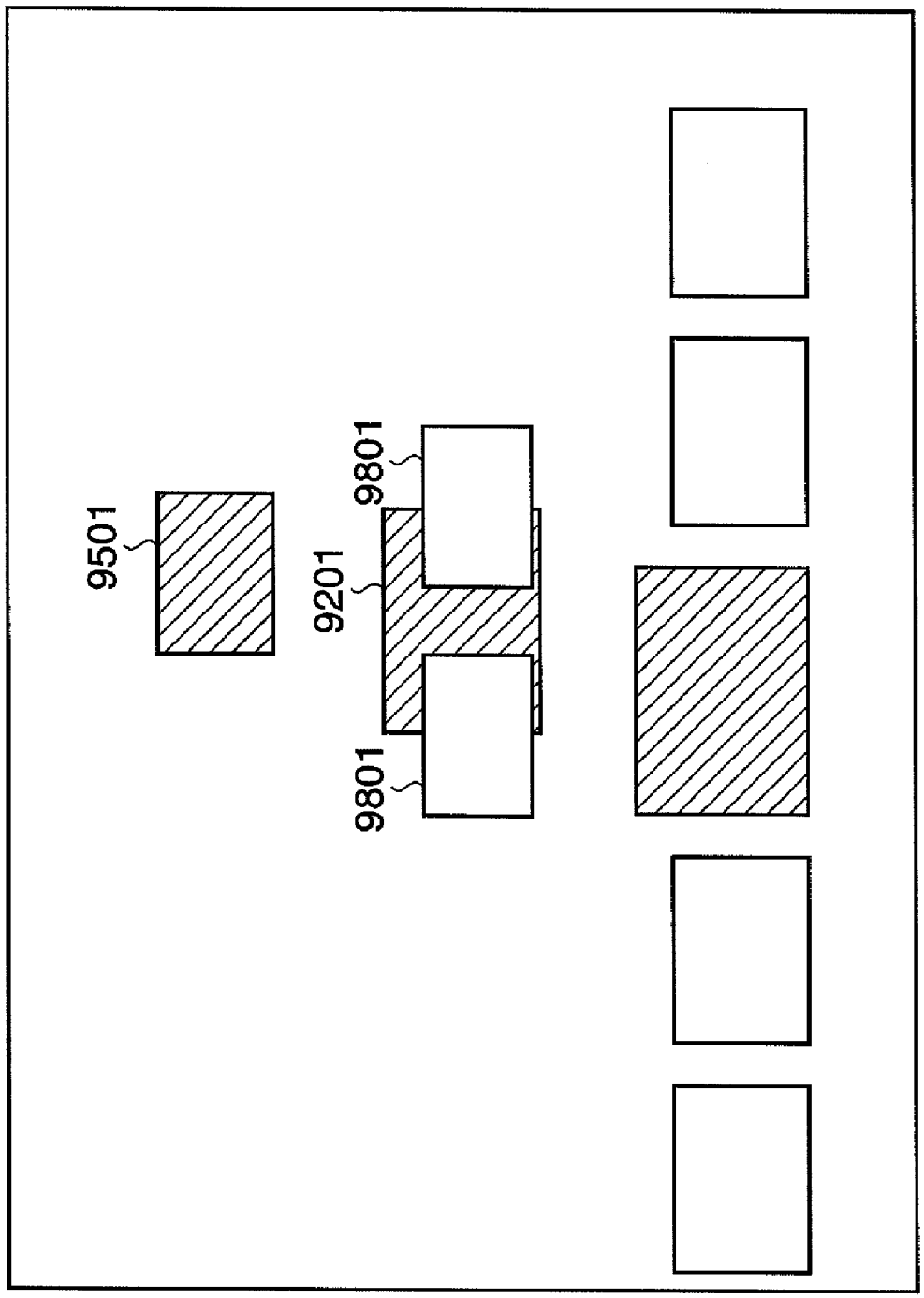
FIG. 98 is a view for explaining a sequential display state in the first modification of the fifth embodiment which has a different order of dynamic animations.
Figure 99:
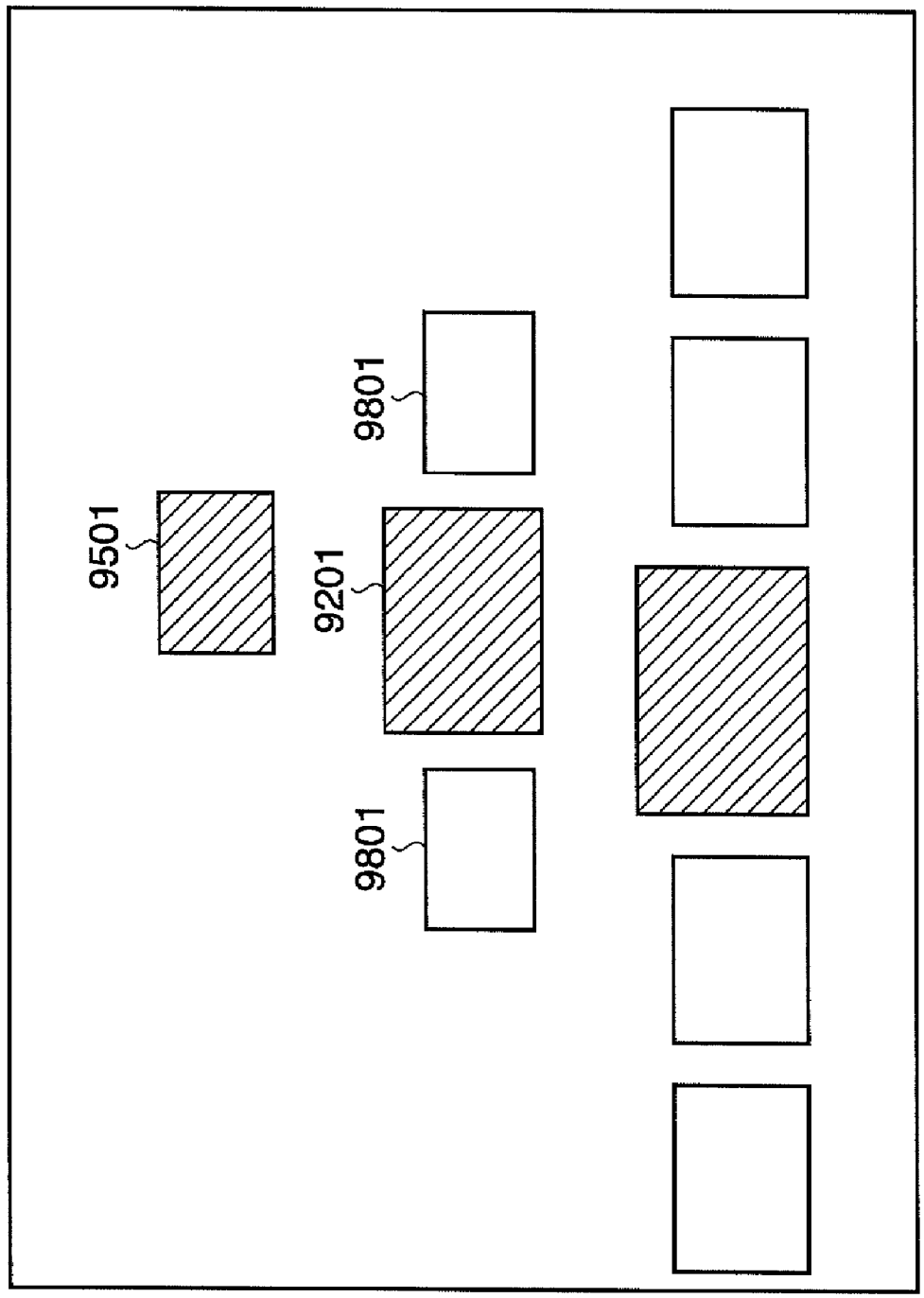
FIG. 99 is a view for explaining a sequential display state in the first modification of the fifth embodiment which has a different order of dynamic animations.

As shown in FIG. 98, thumbnails 9801 of a array of still images included in the category "Location" are displayed at positions of the copy image 9201 as a reference, and move separately to the right and left sides of the copy image 9201. As shown in FIG. 99, the thumbnails 9801 stop at display positions next to the copy image 9201.

Figure 100:
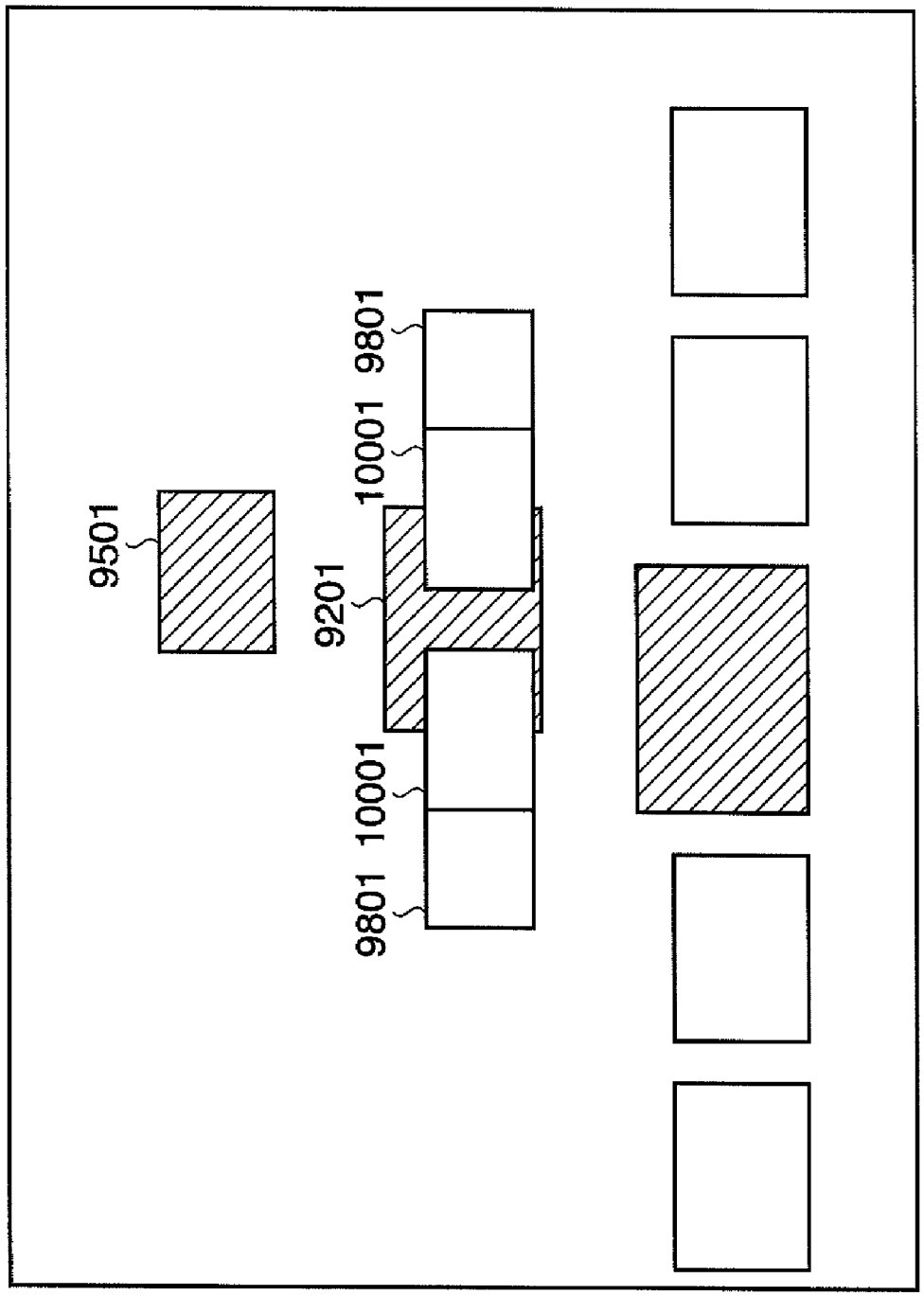
FIG. 100 is a view for explaining a sequential display state in the first modification of the fifth embodiment which has a different order of dynamic animations.
Figure 101:
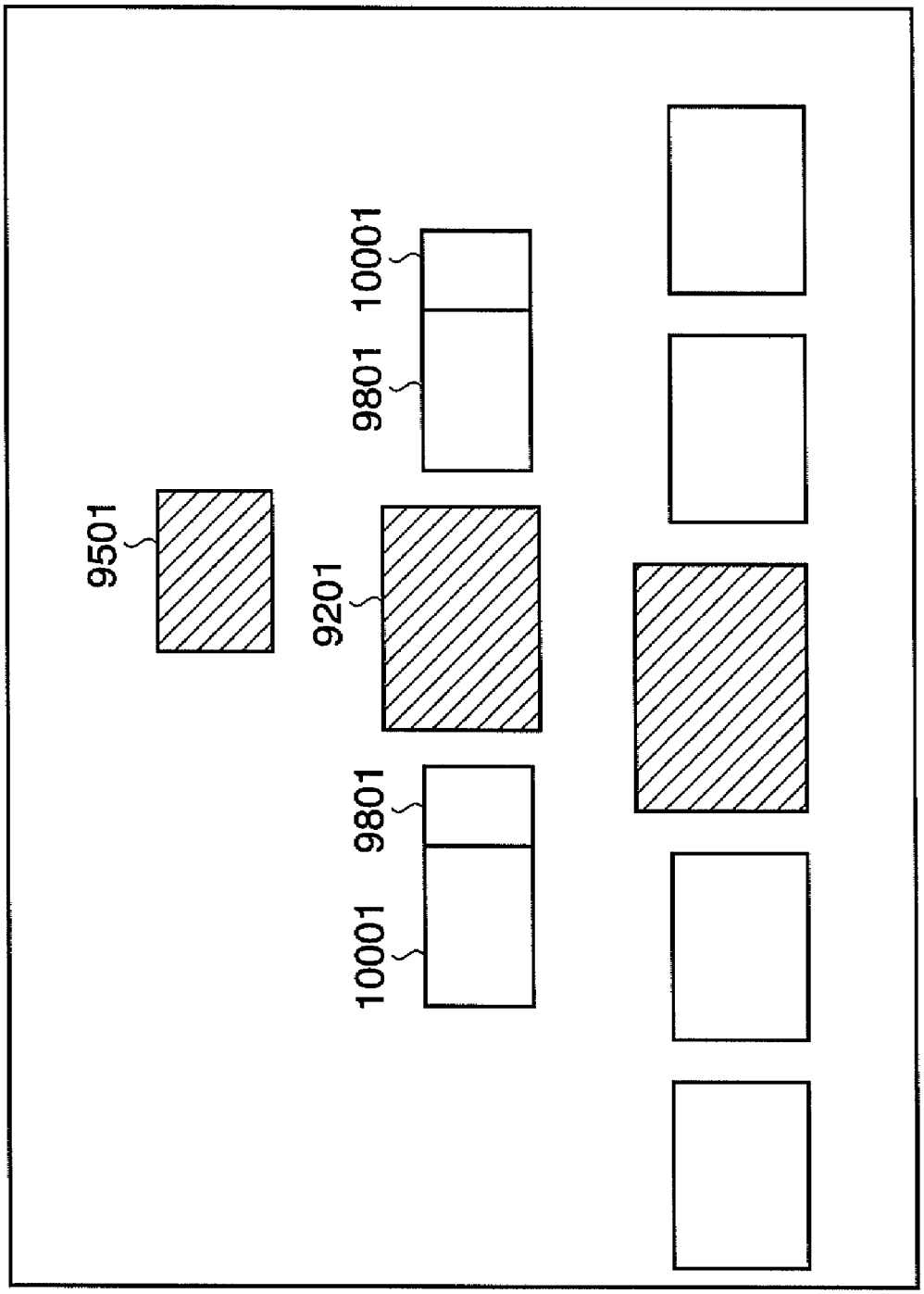
FIG. 101 is a view for explaining a sequential display state in the first modification of the fifth embodiment which has a different order of dynamic animations.
Figure 102:
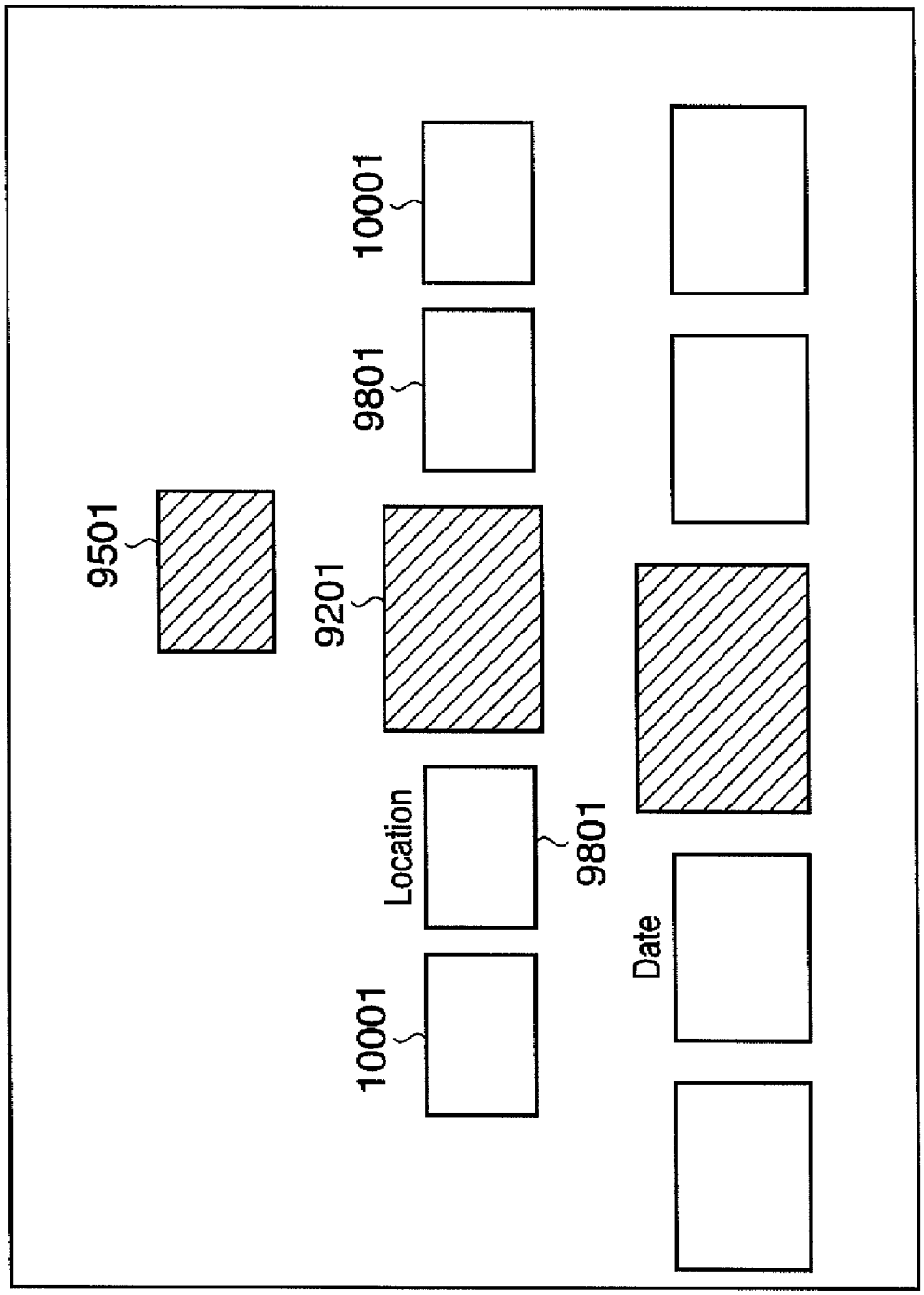
FIG. 102 is a view for explaining a sequential display state in the first modification of the fifth embodiment which has a different order of dynamic animations.

Thumbnails 10001 of a array of still images included in the category "Location" are displayed at positions of the copy image 9201, as shown in FIG. 100, and move separately to the right and left sides of the copy image 9201, as shown in FIGS. 100 and 101. As shown in FIG. 102, the thumbnails 10001 stop at display positions next to the thumbnails 9801.

Figure 103:
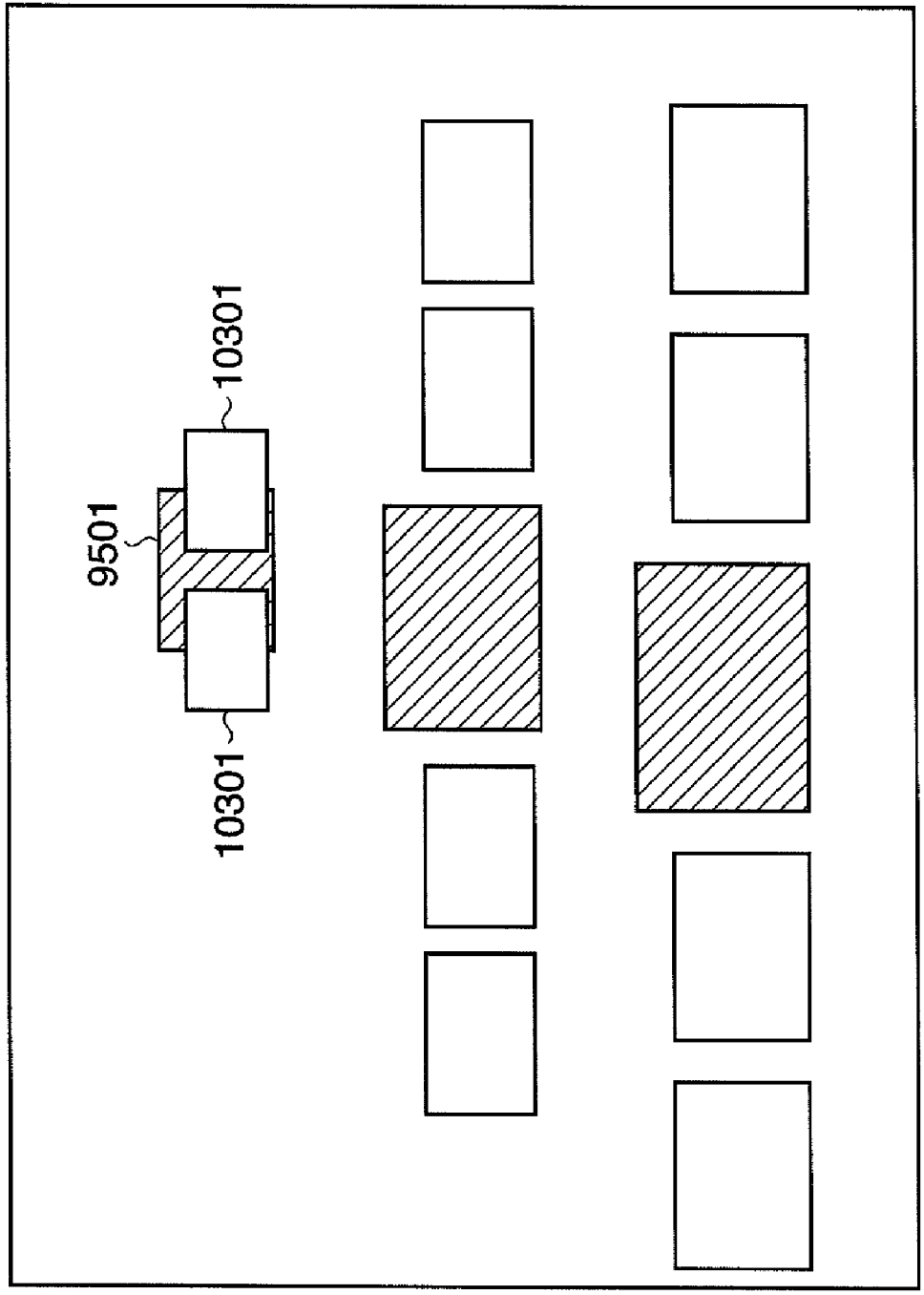
FIG. 103 is a view for explaining a sequential display state in the first modification of the fifth embodiment which has a different order of dynamic animations.
Figure 104:
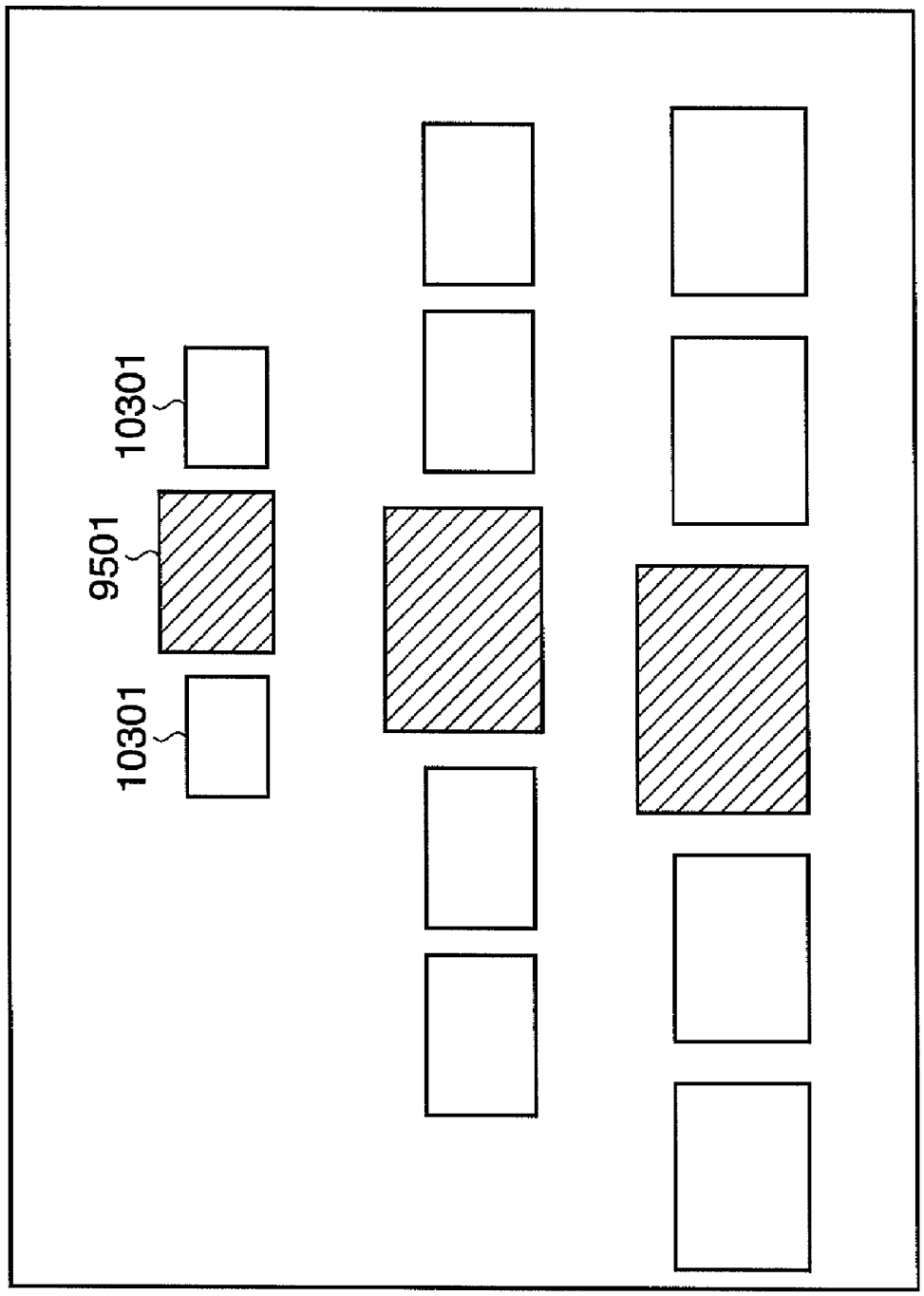
FIG. 104 is a view for explaining a sequential display state in the first modification of the fifth embodiment which has a different order of dynamic animations.

As shown in FIG. 103, thumbnails 10301 of a array of still images included in the category "Event" are displayed at positions of the copy image 9501, and move separately to the right and left sides of the copy image 9501. As shown in FIG. 104, the thumbnails 10301 stop at display positions next to the copy image 10301.

Figure 105:
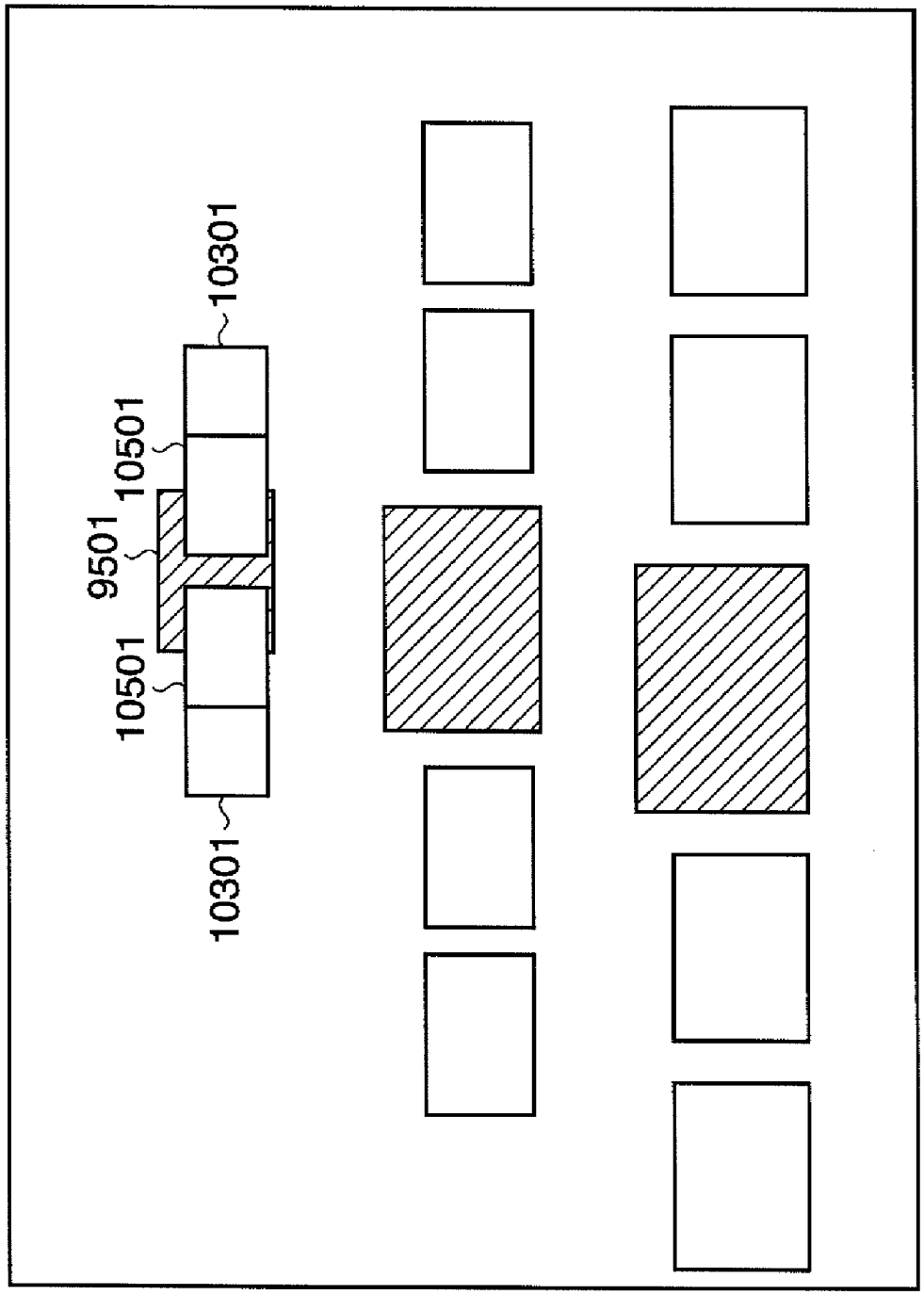
FIG. 105 is a view for explaining a sequential display state in the first modification of the fifth embodiment which has a different order of dynamic animations.
Figure 106:
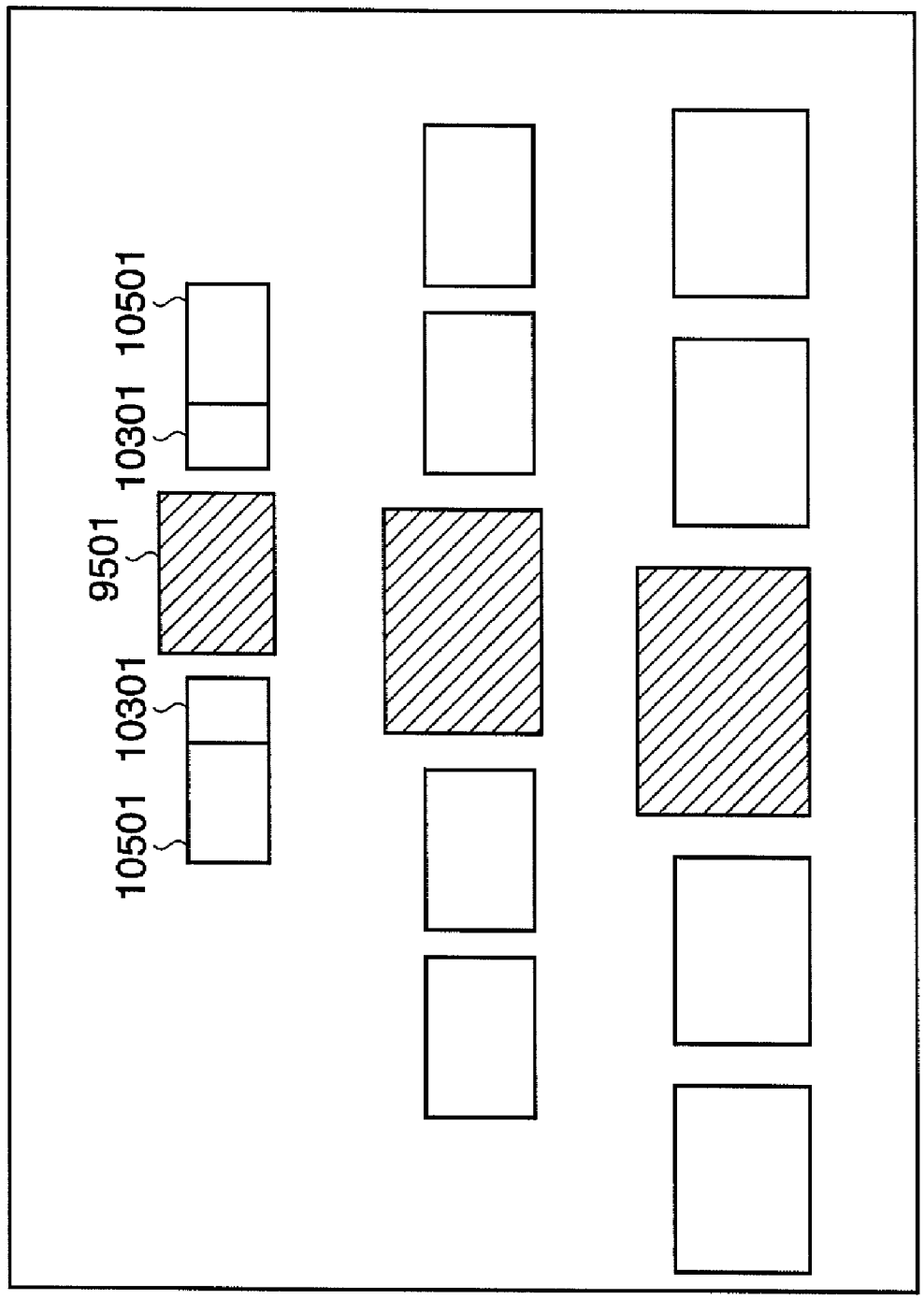
FIG. 106 is a view for explaining a sequential display state in the first modification of the fifth embodiment which has a different order of dynamic animations.
Figure 107:
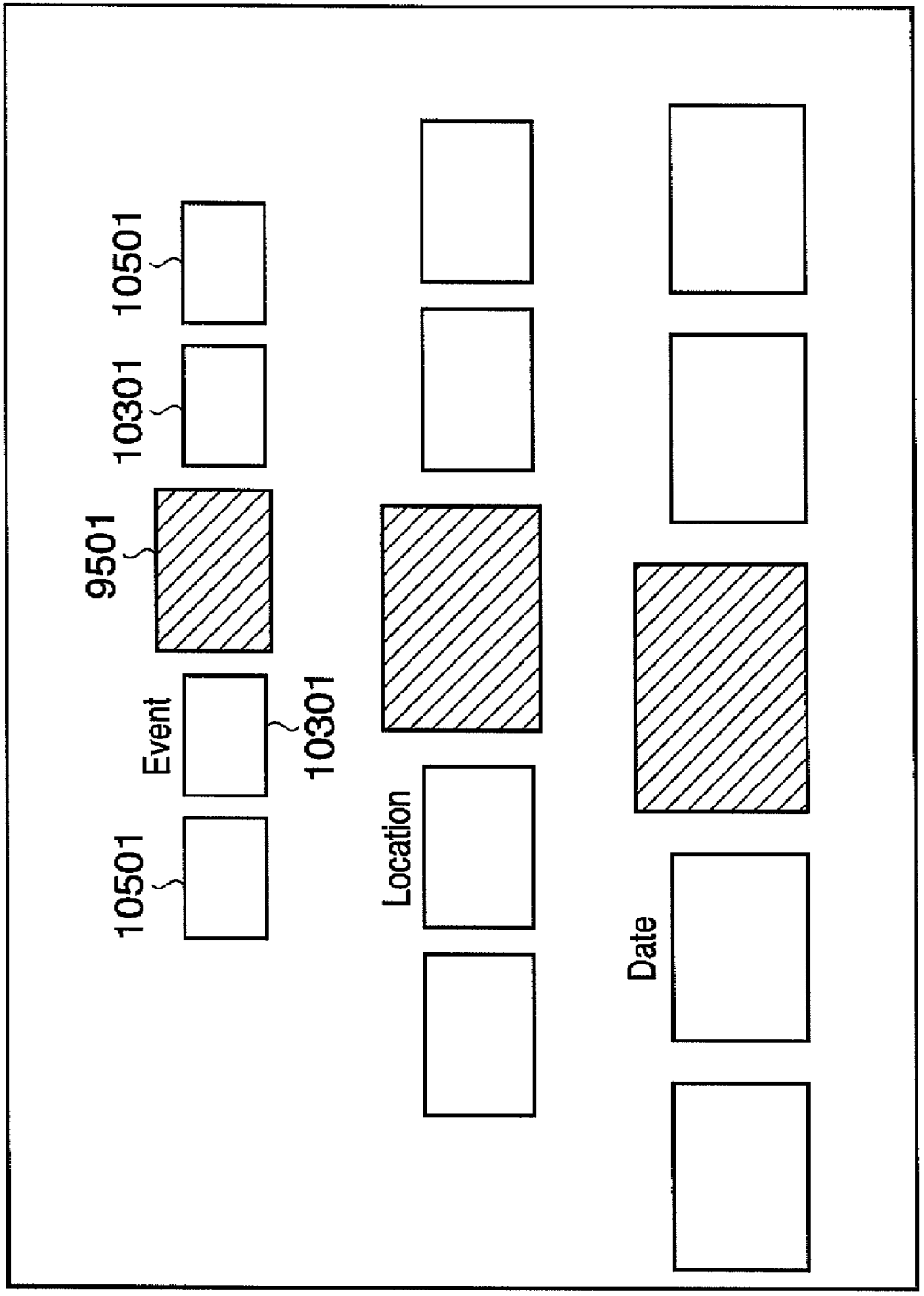
FIG. 107 is a view for explaining a sequential display state in the first modification of the fifth embodiment which has a different order of dynamic animations.

Thumbnails 10501 of a array of still images included in the category "Event" are displayed at positions of the additional copy image 9501, as shown in FIG. 105, and move separately to the right and left sides of the additional copy image 9501, as shown in FIGS. 105 and 106. As shown in FIG. 107, the thumbnails 10501 stop at display positions next to the thumbnails 10301.

The processing in the first modification of the fifth embodiment, which displays the contents display window using dynamic animations will be described below with reference to FIG. 108.

Figure 108:
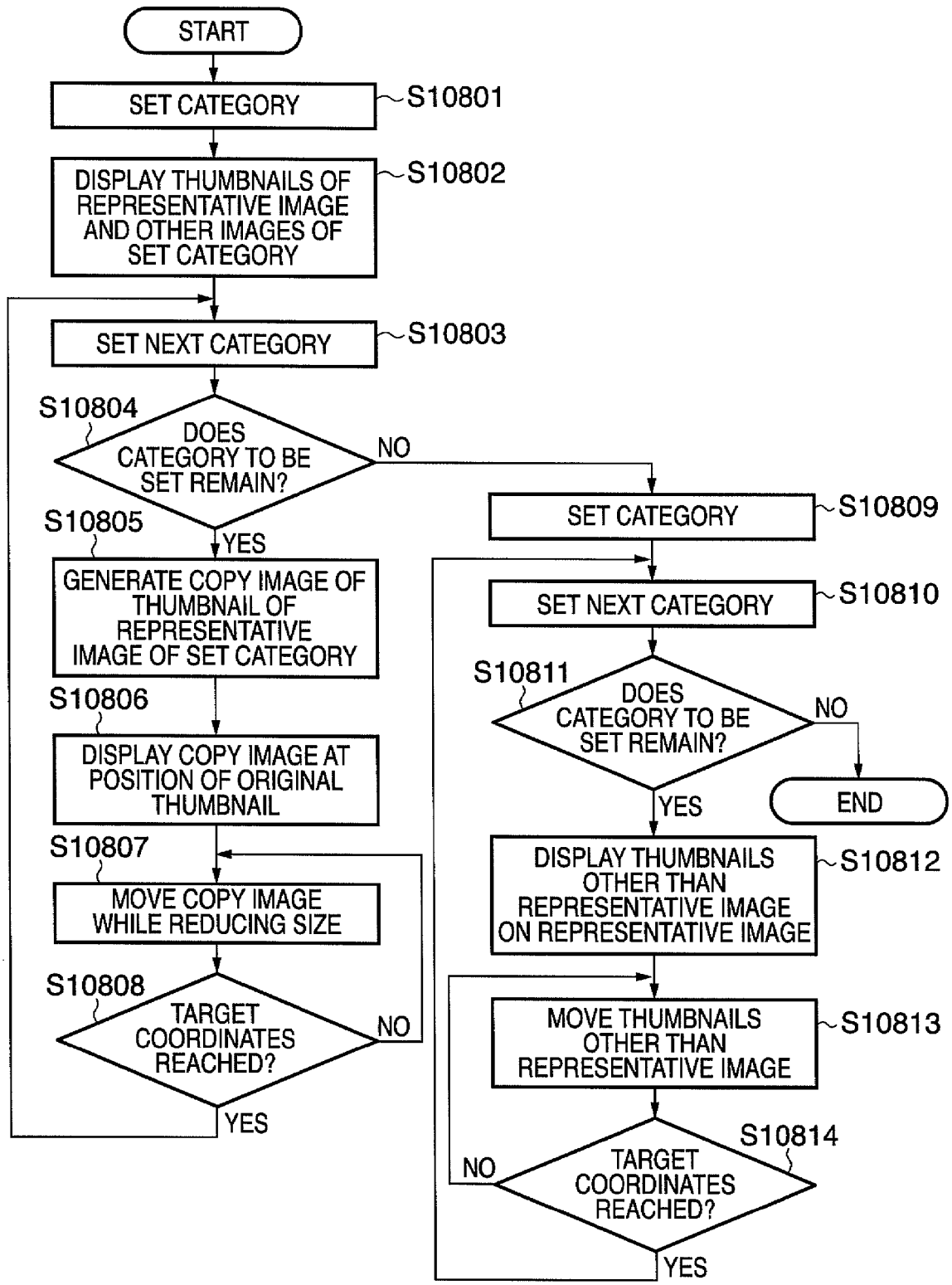
FIG. 108 is a flowchart showing the window display processing in the first modification of the fifth embodiment.

FIG. 108 is a flowchart showing the window display processing according to the first modification of the fifth embodiment. When the processing starts, the CPU 7102 sets the first category in step S10801. In step S10802, the CPU 7102 displays a thumbnail of a representative image for the set category, and thumbnails of images other than the representative image.

In step S10803, the CPU 7102 sets the next category. If the CPU 7102 determines in step S10804 that the next category to be set remains, the process advances to step S10805 to generate a copy image of the thumbnail of the representative image of the set category. In step S10806, the CPU 7102 displays the copy image at the position of the original thumbnail.

In step S10807, the CPU 7102 moves the copy image while reducing its size. The CPU 7102 repeats step S10807 until the copy image reaches its target coordinates in step S10808, thus repetitively moving the copy image. After that, if the copy image has reached its target coordinates, the process returns to step S10803 to lay out a thumbnail of a representative image of another category.

On the other hand, if the CPU 7102 determines in step S10804 that no next category to be set remains, the process advances to step S10809 to return to the first category. In step S10810, the CPU 7102 sets the next category. If the category to be set still remains in step S10811, the CPU 7102 displays thumbnails other than the representative image on the representative image in step S10812.

In step S10813, the CPU 7102 moves the thumbnails other than the representative thumbnail. The CPU 7102 repeats step S10813 until the thumbnails reach their target coordinates in step S10814, thus repetitively moving the thumbnails. After that, if the thumbnails have reached their target coordinates, the process returns to step S10810 to repeat the aforementioned processes until all the categories are set. If all the categories are set, the CPU 7102 ends this processing.

Second Modification of Fifth Embodiment

The second modification of the fifth embodiment according to the present invention will be described in detail hereinafter with reference to the accompanying drawings. Note that the arrangement of a contents display apparatus in the second modification of the fifth embodiment is the same as that shown in FIG. 71 described in the fifth embodiment.

Figure 109:
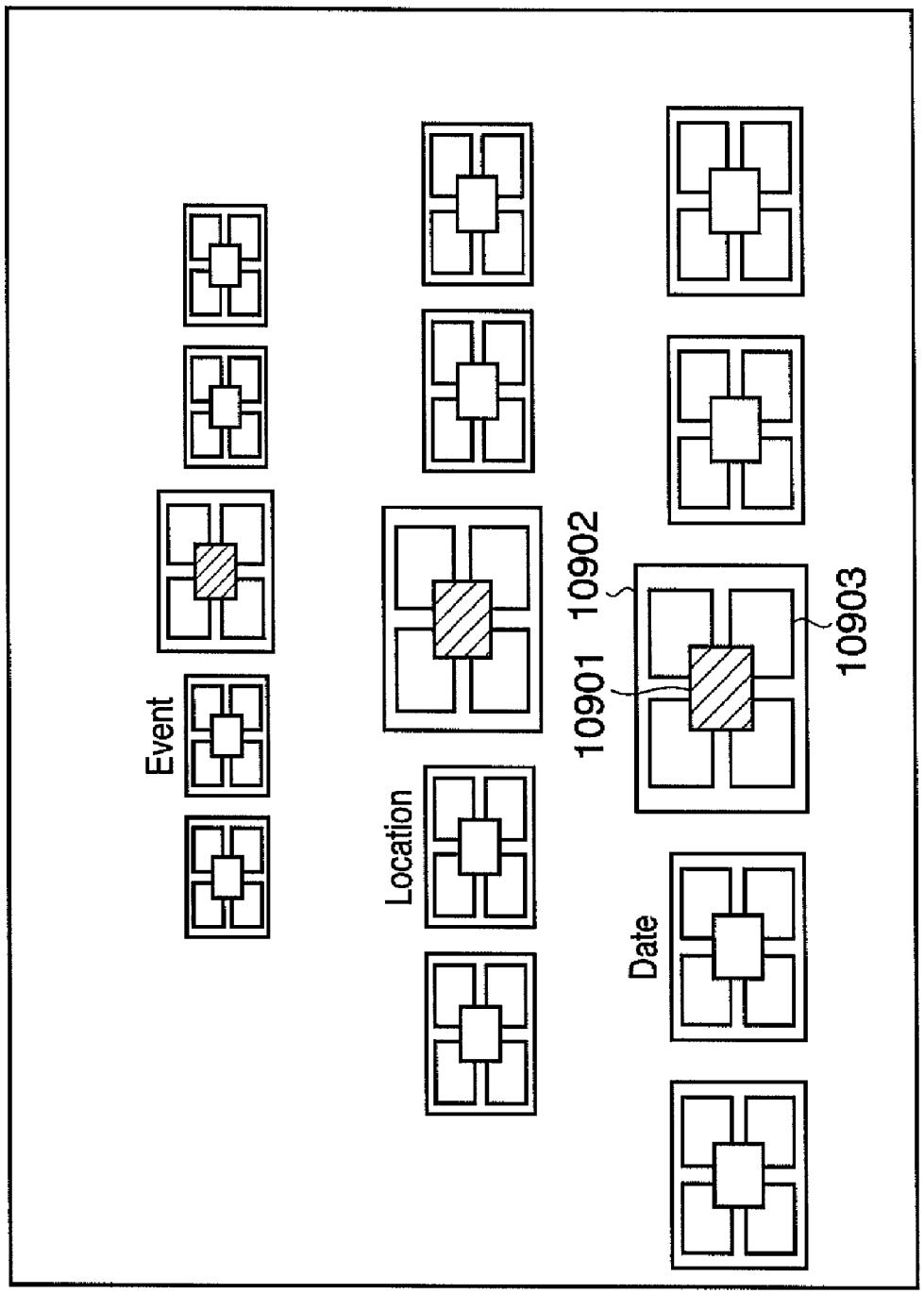
FIG. 109 shows an example of the configurations of contents display windows in the second modification of the fifth embodiment.

FIG. 109 shows an example of the configuration of the contents display window in the second modification of the fifth embodiment. Referring to FIG. 109, reference numeral 10901 denotes a thumbnail which indicates a representative still image of still images which are classified based on the category "Date" in the horizontal direction. Reference numeral 10903 denotes thumbnails of still images which are classified based on the category "Date". Reference numeral 10902 denotes a group of thumbnails which are classified based on the same category.

As shown in FIG. 109, the groups of "Date" line up in the horizontal direction, and groups of "Location" and "Event" line up in the vertical direction. The groups of "Location" and "Event" are displayed to have slightly smaller sizes and are located at upper right positions compared to those of "Date" so as to express the depth on a three-dimensional space.

The sequential display state of the window configurations of the second modification of the fifth embodiment using dynamic animations upon displaying the contents display window shown in FIG. 109 will be described below with reference to FIGS. 110 to 118.

Figure 110:
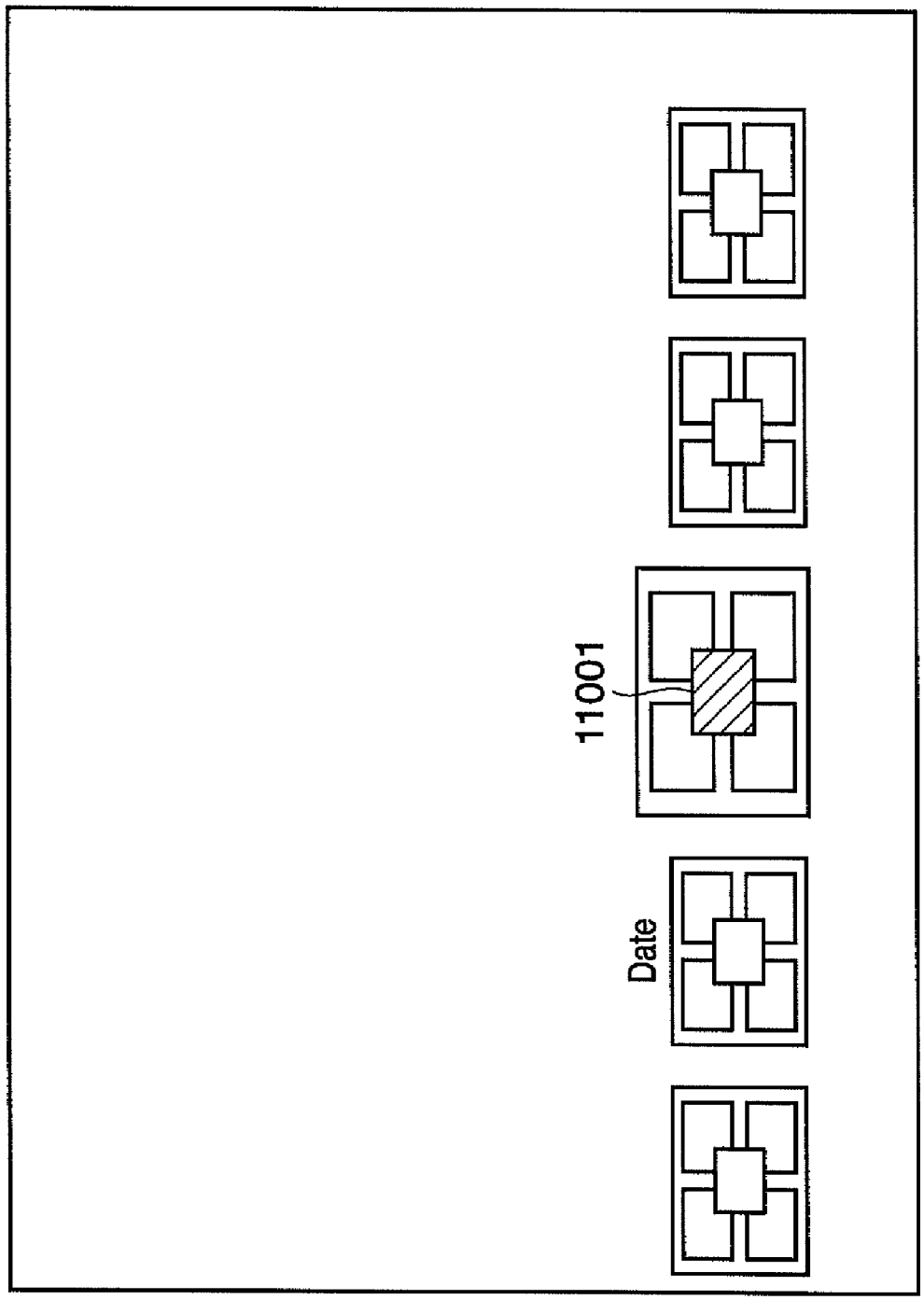
FIG. 110 is a view for explaining a state wherein the window configurations of the second modification of fifth embodiment are sequentially displayed using dynamic animations.

FIG. 110 shows an example of the window configuration which is displayed first in the second modification of the fifth embodiment. As shown in FIG. 110, a thumbnail (representative thumbnail) 11001 of a still image, as a contents icon which indicates a representative still image as a reference content included in the category "Date", is displayed at the center of a lowermost row of the window. Then, a group including the representative thumbnail 11001 is displayed, and a array of groups is then displayed on the right and left sides of the representative thumbnail 11001.

Figure 111:
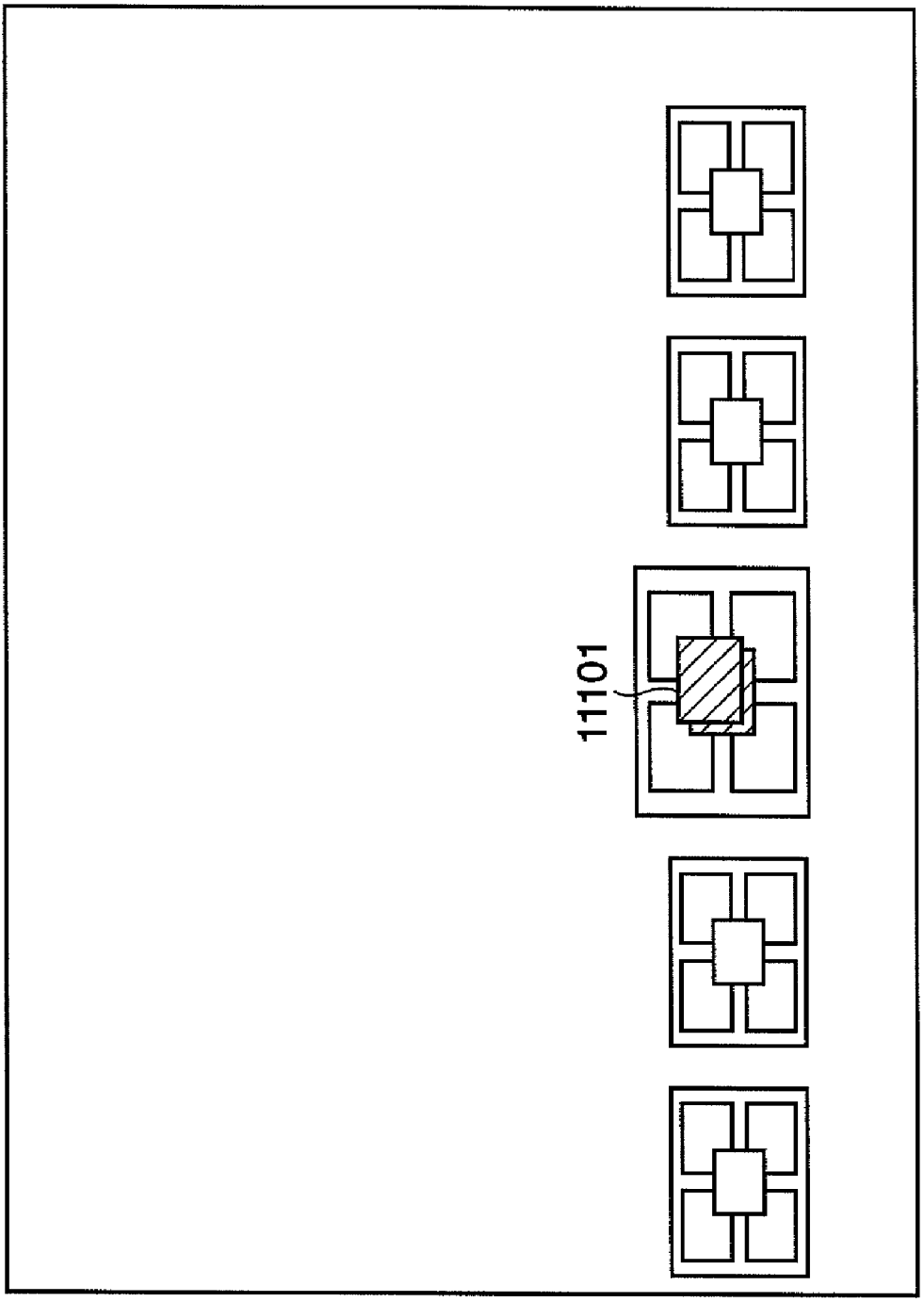
FIG. 111 is a view for explaining a state wherein the window configurations of the second modification of fifth embodiment are sequentially displayed using dynamic animations.
Figure 112:
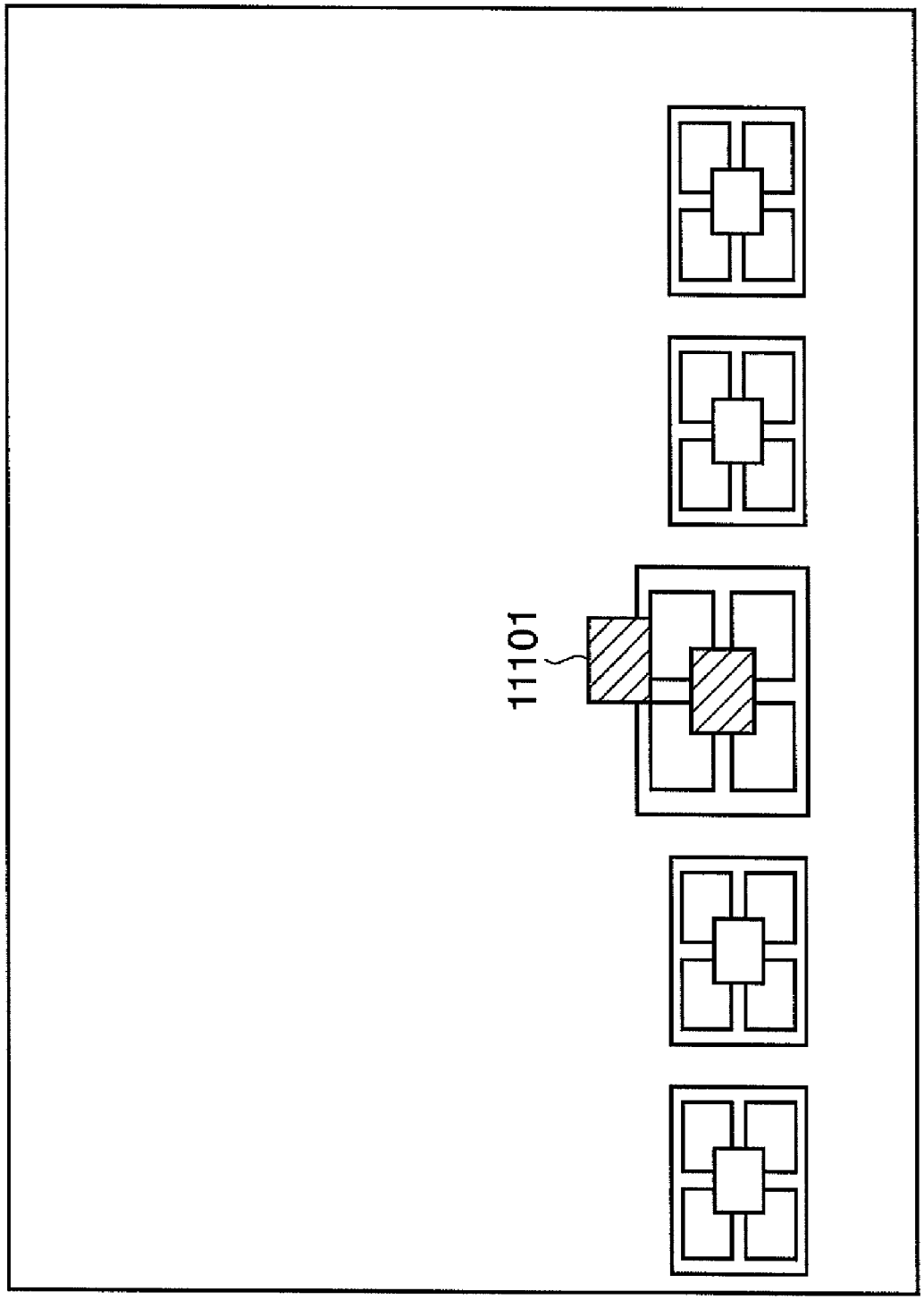
FIG. 112 is a view for explaining a state wherein the window configurations of the second modification of fifth embodiment are sequentially displayed using dynamic animations.

As shown in FIG. 111, a copy image 11101 of the representative thumbnail 11001 is displayed at the same position as the representative thumbnail 11001. After that, the copy image 11101 moves upward while reducing its size, as shown in FIG. 112.

Figure 113:
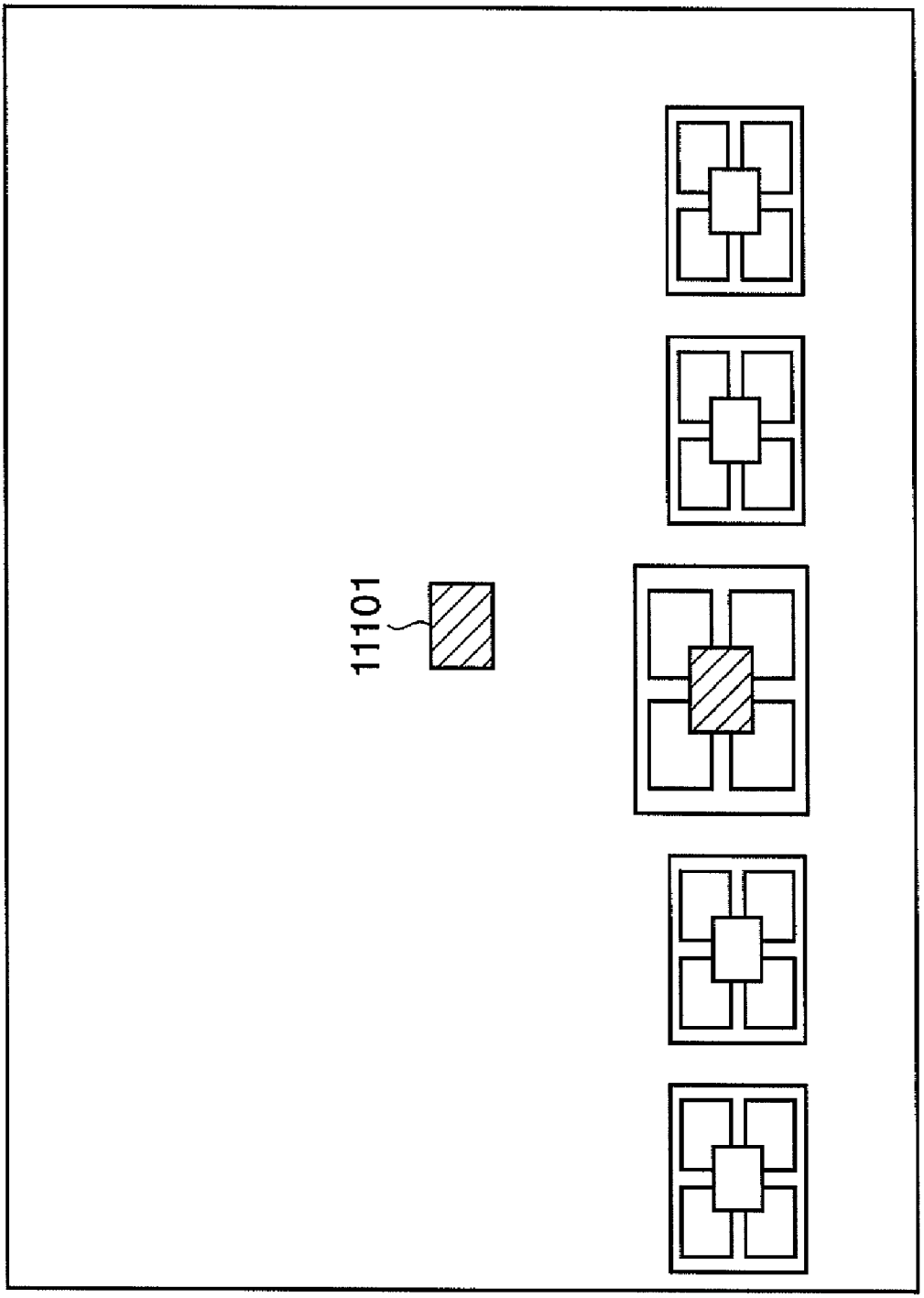
FIG. 113 is a view for explaining a state wherein the window configurations of the second modification of fifth embodiment are sequentially displayed using dynamic animations.
Figure 115:
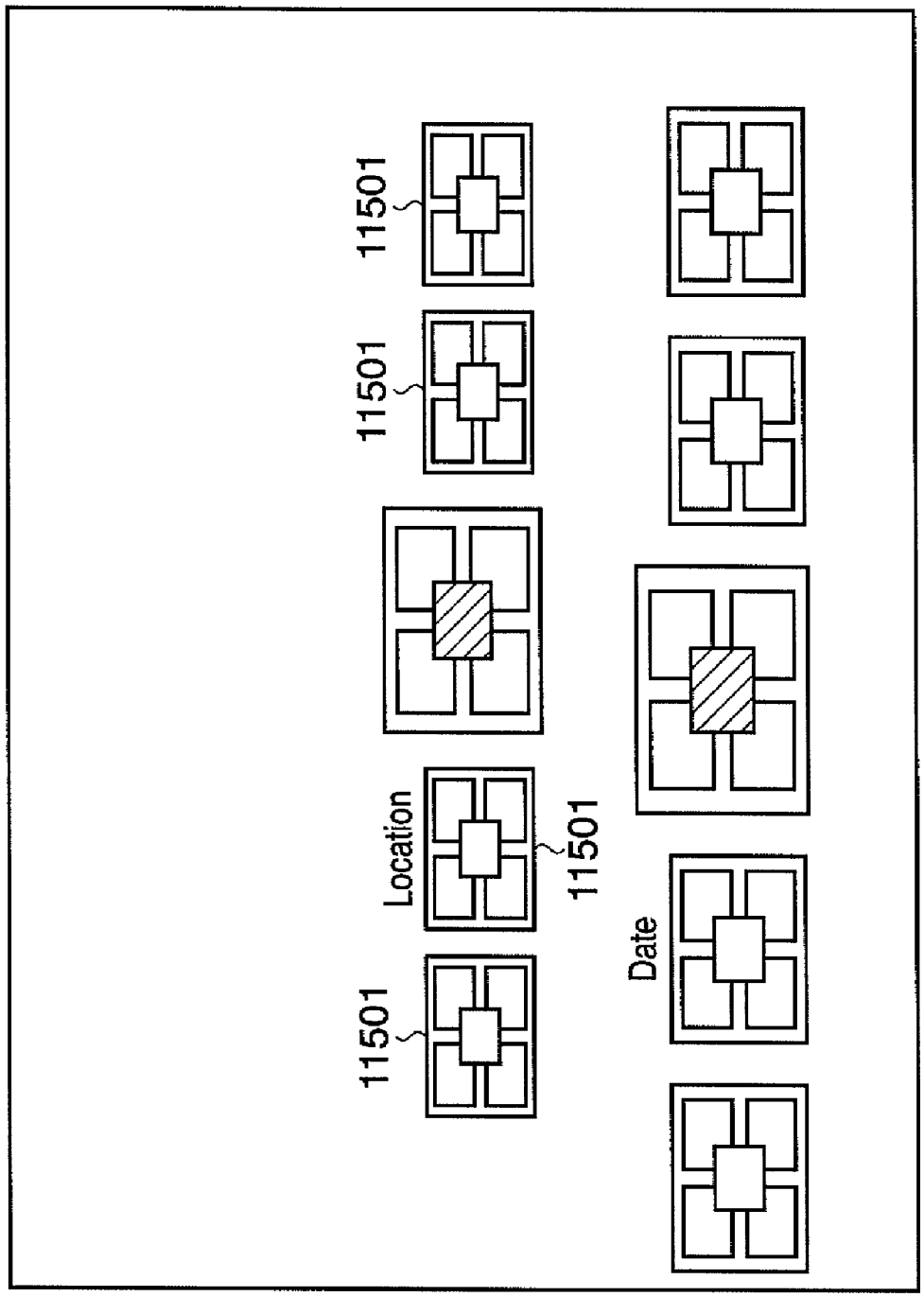
FIG. 115 is a view for explaining a state wherein the window configurations of the second modification of fifth embodiment are sequentially displayed using dynamic animations.
Figure 116:
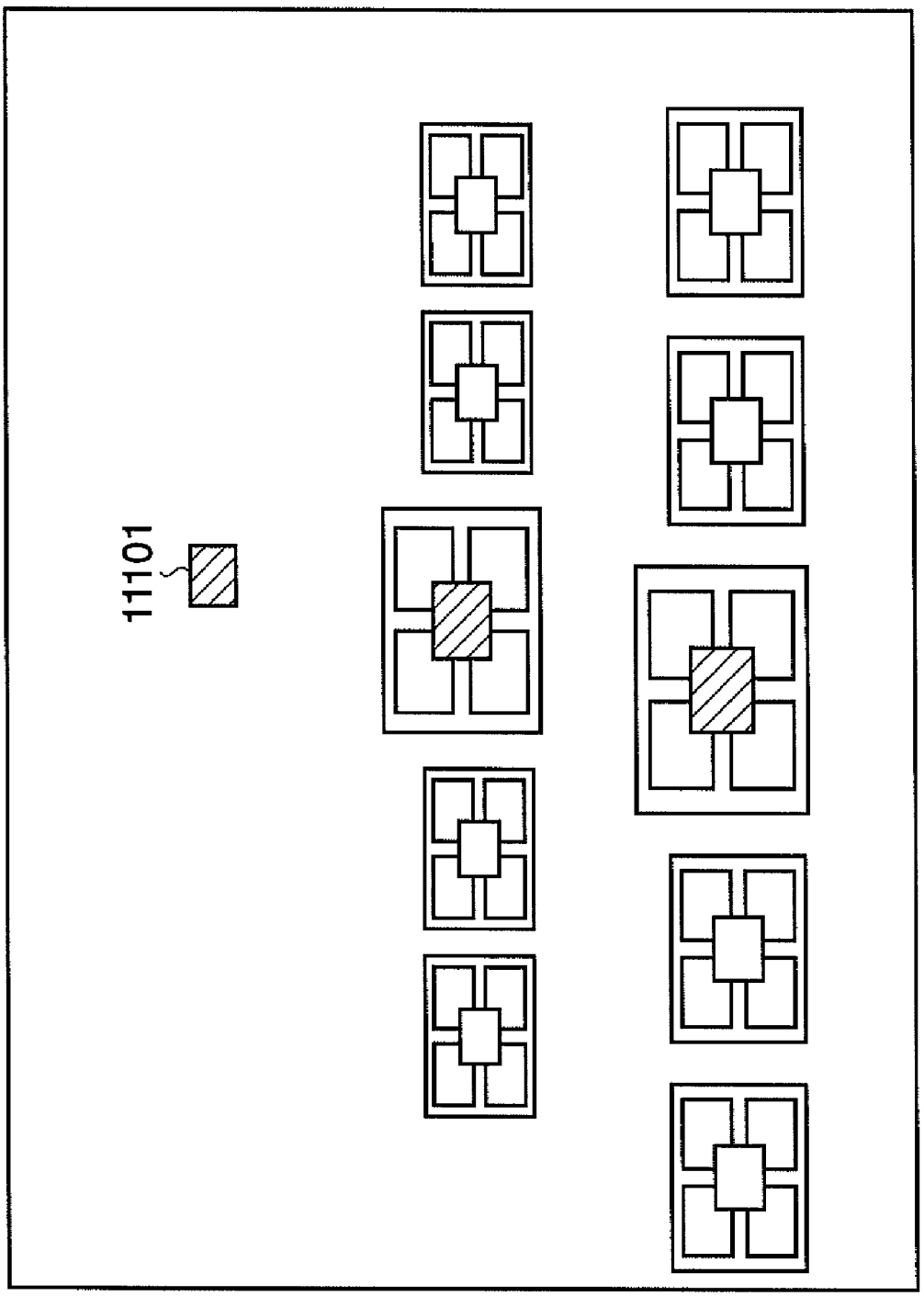
FIG. 116 is a view for explaining a state wherein the window configurations of the second modification of fifth embodiment are sequentially displayed using dynamic animations.
Figure 117:
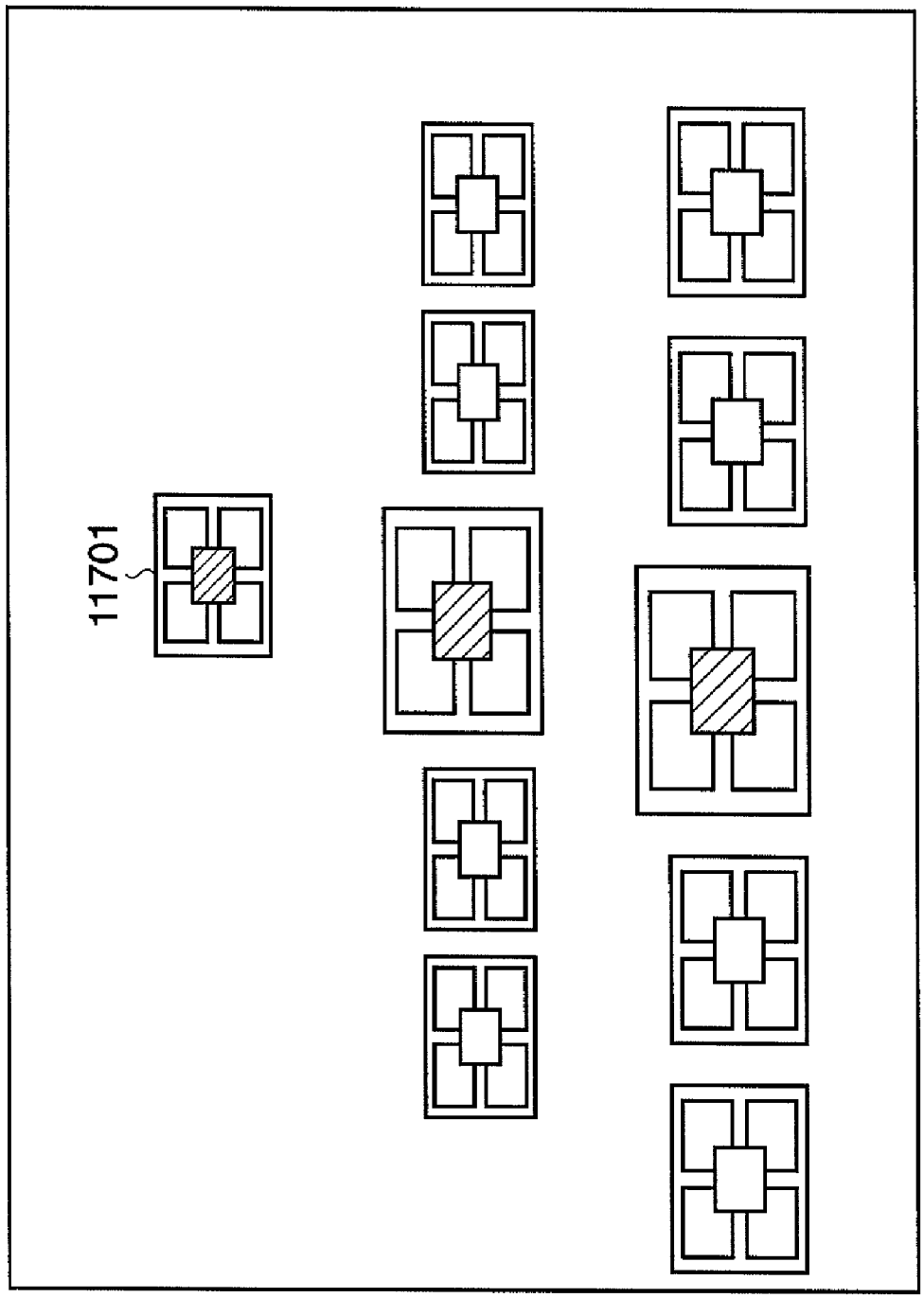
FIG. 117 is a view for explaining a state wherein the window configurations of the second modification of fifth embodiment are sequentially displayed using dynamic animations.
Figure 118:
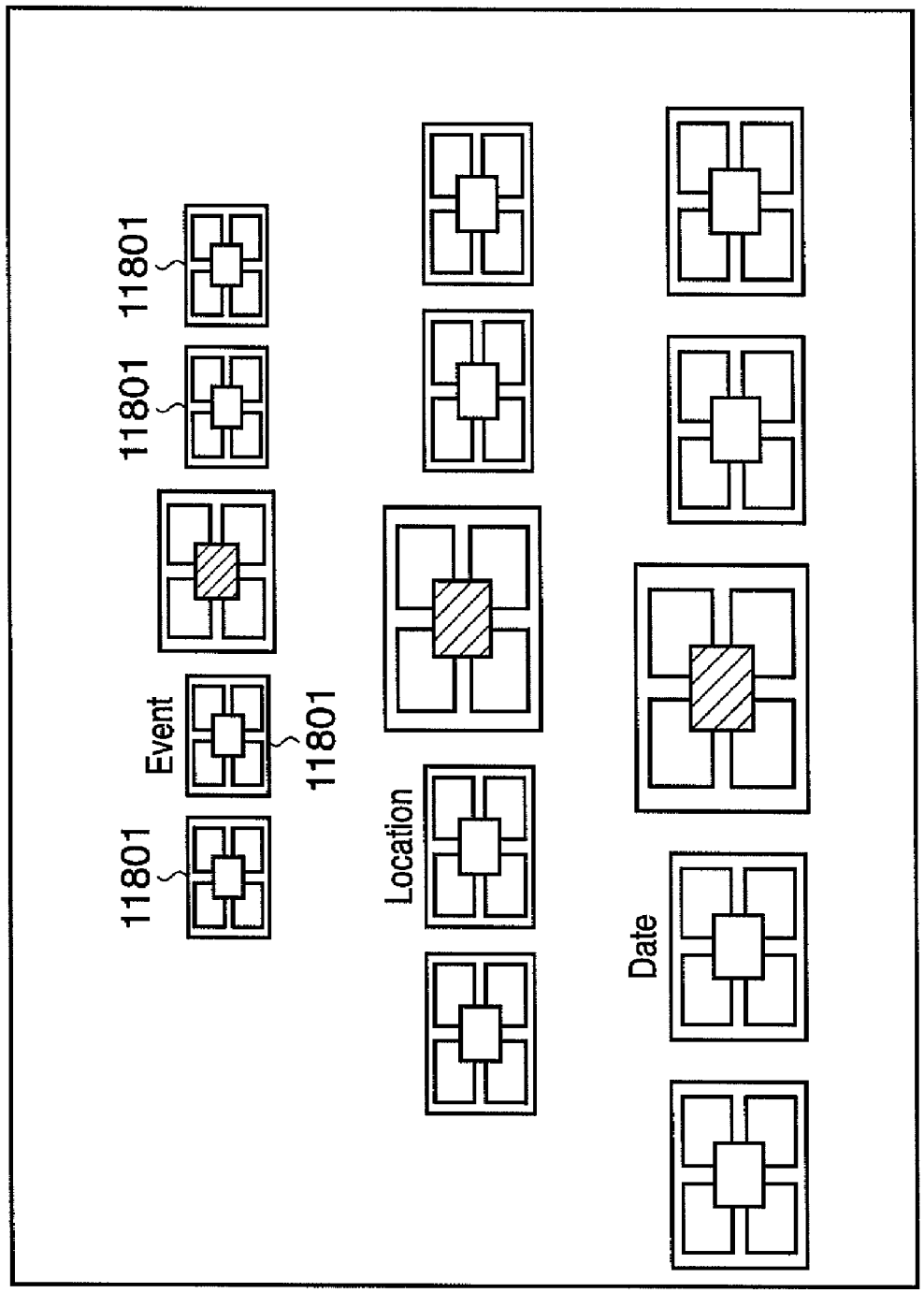
FIG. 118 is a view for explaining a state wherein the window configurations of the second modification of fifth embodiment are sequentially displayed using dynamic animations.

As shown in FIG. 113, the copy image 11101 stops its movement when it has reached a predetermined position. After that, as shown in FIG. 114, a group 11401 including the copy image 11101 is formed. As shown in FIG. 115, a array of groups 11501 of "Location" is formed. As shown in FIG. 116, the copy image 11101 moves upward while reducing its size, and stops at a predetermined position. Then, a group 11701 is formed, as shown in FIG. 117, and a array of groups 11801 of "Event" is formed, as shown in FIG. 118.

The processing for displaying the contents display window using the aforementioned dynamic animations will be described below with reference to FIG. 119.

FIG. 119 is a flowchart showing the window display processing according to the second modification of the fifth embodiment. When the processing starts, the CPU 7102 sets the first category in step S11901. In step S11902, the CPU 7102 displays a thumbnail of a representative image of the category set in step S11901. In step S11903, the CPU 7102 forms a group including the representative image.

In step S11904, the CPU 7102 displays images other than the representative thumbnail on the representative thumbnail. In step S11905, the CPU 7102 moves the images other than the representative thumbnail, and repeats step S11905 until the images reach their target coordinates in step S11906, thus repetitively moving the images. After that, if the images have reached their target coordinates, the process advances to step S11907 to form groups including the moved images.

In step S11907, the CPU 7102 sets the next category. If it is determined in step S11908 that no category remains, the CPU 7102 ends this processing. On the other hand, if the next category remains, the process advances to step S11910 to generate a copy image of the thumbnail of the representative image of the set category. In step S11911, the CPU 7102 displays the copy image at the position of the original thumbnail.

In step S11912, the CPU 7102 moves the copy image, and repeats step S11912 until the copy image reaches its target coordinate in step S11913, thus repetitively moving the copy image. After that, if the copy image has reached its target coordinates, the process returns to step S11903 to repeat the aforementioned processes until no next category remains.

Third Modification of Fifth Embodiment

The third modification of the fifth embodiment according to the present invention will be described in detail hereinafter with reference to the accompanying drawings. Note that the arrangement of a contents display apparatus in the third modification of the fifth embodiment is the same as that shown in FIG. 71 described in the fifth embodiment.

FIG. 120 shows an example of the configuration of a contents display window according to the third modification of the fifth embodiment. Referring to FIG. 120, reference numeral 12001 denotes a thumbnail indicating a representative image of still image contents classified based on a category "Date" in the horizontal direction. Reference numeral 12002 denotes thumbnails of still images other than the representative image, which are classified based on the category "Date".

Unlike in the second modification of the fifth embodiment, the category "Date" does not form any groups, and forms a array of still images.

The state of the animation operations and the flowcharts are the same as those of the second modification of the fifth embodiment, and a repetitive description thereof will be avoided.

Fourth Modification of Fifth Embodiment

The fourth modification of the fifth embodiment according to the present invention will be described in detail hereinafter with reference to the accompanying drawings. Note that the arrangement of a contents display apparatus in the fourth modification of the fifth embodiment is the same as that shown in FIG. 71 described in the fifth embodiment.

FIG. 121 shows an example of the configuration of a contents display window according to the fourth modification of the fifth embodiment. Referring to FIG. 121, reference numeral 12101 denotes a moving image frame icon which indicates a representative moving image frame. Reference numeral 12102 denotes moving image frame icons indicating moving image frames other than the representative moving image frame. Reference numeral 12111 denotes a moving image icon indicating the representative moving image frame. Reference numeral 12112 denotes moving image frame icons other than the representative moving image content.

Note that the state of the animation operations and the flowcharts are the same as those of the fifth embodiment, and a repetitive description thereof will be avoided.

According to the aforementioned embodiments, by arranging contents icon arrays sorted in different sort orders, the user can easily and intuitively reach a desired content. Since contents related to a content of interest are laid out on the single window, the user can visually recognize the contents related to the content of interest, and can easily access the related contents.

A list of contents groups which are grouped under various conditions can be displayed to have relevance, and the user can recognize the overviews of these groups. The user can conduct a simple visual search, and can clearly recognize the reference contents group icon array, contents group icons, and contents, thus allowing the user to recognize the overview of the list and to conduct a simple visual search.

A contents array sorted under a given order condition, and contents group arrays sorted under identical order conditions are laid out on the single window, so that a contents icon indicating a certain content and contents group icons of contents groups including that content line up. In this way, the user can visually recognize contents groups and contents, which are collected based on different granularity, and can understand whole contents near a desired content.

By expressing the identity of contents icons which are displayed in a plurality of arrays and indicate an identical content using animations that are sequentially animated and displayed, an intuitive and simple display can be presented to the user.

When contents are moving images, the user can select a moving image content while confirming scenes, and can select and play back a scene by the same operation as that for contents, thus improving the operability for scenes of moving image contents.

By expressing the fact that moving image frames indicated by moving frame icons are included in a moving image content indicated by a moving image content icon using animations that are sequentially animated and displayed, an intuitive and simple display can be presented to the user.

Note that the present invention may be applied to either a system constituted by a plurality of devices (e.g., a host computer, interface device, reader, printer, and the like), or an apparatus consisting of a single device (e.g., a copying machine, facsimile apparatus, or the like).

A recording medium, which records a program code of software that can implement the functions of the aforementioned embodiments, is supplied to the system or apparatus, and a computer (or a CPU or MPU) of the system or apparatus reads out and executes the program code stored in the recording medium. In this way, the objects of the present invention can be achieved.

In this case, the program code itself read out from the recording medium implements the functions of the aforementioned embodiments, and the recording medium which stores the program code constitutes the present invention.

As the recording medium used to supply the program code, for example, a flexible disk, hard disk, optical disk, magnetooptical disk, CD-ROM, CD-R, magnetic tape, nonvolatile memory card, ROM, and the like can be used.

The functions of the aforementioned embodiments can be implemented not only when the computer executes the read-out program code but also by the following case. That is, this is the case wherein an OS (operating system) or the like which runs on the computer executes some or all of actual processing operations based on instructions of the program code to implement the functions of the aforementioned embodiments.

Furthermore, the present invention also includes the following case. That is, the program code read out from the recording medium is written in a memory equipped on a function expansion board or function expansion unit, which is inserted in or connected to the computer. After that, a CPU or the like equipped on the function expansion board or unit executes some or all of actual processing operations based on instructions of the program code to implement the functions of the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2006-340572 filed on Dec. 18, 2006 and 2006-340573 filed on Dec. 18, 2006, which are hereby incorporated by reference herein in their entirety.

What is claimed is:

1. A display image control apparatus, which generates a content array in which items of content are sorted and content group arrays in each of which the items of content are grouped and sorted in groups, wherein the respective arrays form a hierarchical structure with the content array on the bottom, and which displays the respective arrays as icon arrays on a display screen, comprising:
   a display screen generation unit configured to sort and display on the display screen each icon array of content group icons representing the groups in one of the content group arrays and the icon array of content icons representing the items of content in the content array,
   wherein said display screen generation unit displays a content icon in the icon array of content icons as a reference icon which represents reference content and content group icons in the icon arrays of content group icons which represent contents including the reference content in accordance with the hierarchical structure.

2. The apparatus according to claim 1, further comprising:
   a reception unit configured to receive an operation instruction that the icon arrays on the display screen are scrolled and displayed; and
   a scroll display unit configured to scroll and display the icon arrays on the display screen such that a display position of the reference icon corresponds to the display positions of the content group icons in the icon arrays of content group icons which represent contents including the reference content.

3. The apparatus according to claim 1, wherein said display screen generation unit generates the display screen which allows a user to apparently distinguish a content group icon which represents content including the reference content from other content group icons.

4. The apparatus according to claim 1, wherein the items and the groups of items in each of the respective arrays are sorted based on information on at least one of date, person, location, and event.

5. A display method for a display image control apparatus, which generates a content array in which items of content are sorted and content group arrays in each of which the items of content are grouped and sorted in groups, wherein the respective arrays form a hierarchical structure with the content array on the bottom, and which displays the respective arrays as icon arrays on a display screen, the method comprising:
   sorting and displaying on the display screen each icon array of content group icons representing the groups in one of the content group arrays and an icon array of content icons representing the items of content in the content array,
   wherein a content icon in the icon array of content icons as a reference icon which represents reference content and content group icons in the icon arrays of content group icons which represent contents including the reference content are displayed in accordance with the hierarchical structure.

6. A non-transitory computer-readable storage medium storing a program for causing a computer to execute a display method for a display image control apparatus according to claim 5.

7. A display image control apparatus, which generates content arrays in which items of content corresponding to still and moving images are sorted under a plurality of order conditions, and which displays the content arrays as icon arrays on a display screen, comprising:
   a display screen generation unit configured to sort and display on the display screen each icon array of icons including frame icons representing a plurality of frames of a moving image and icon arrays of icons including a moving image icon representing a moving image,
   wherein said display screen generation unit aligns an icon in an icon array of icons as a reference icon which represents reference content with other icons in other icon arrays of icons which represent contents including the reference content.

8. The apparatus according to claim 7, further comprising:
   a reception unit configured to receive an operation instruction that the icon arrays on the display screen are scrolled and displayed; and
   a scroll display unit configured to scroll and display the icon arrays on the display screen such that a display position of the reference icon corresponds to the display positions of the other icons in the other icon arrays which represent contents including the reference content.

9. The apparatus according to claim 7, wherein said display screen generation unit generates the display screen which allows a user to apparently identify the reference icon.

10. The apparatus according to claim 7, wherein processing for each icon includes at least one of playback, deletion, and addition to a playlist.

11. The apparatus according to claim 7, wherein processing is executed for a range before and after a selected point in the moving image.

12. A display method for a display image control apparatus, which generates content arrays in which items of content corresponding to still and moving images are sorted under a plurality of order conditions, and displays the content arrays as icon arrays on a display screen, the method comprising:

sorting and displaying on the display screen each icon array of icons including frame icons representing a plurality of frames of a moving image and icon arrays of icons including a moving image icon representing a moving image, wherein an icon in an icon array of icons as a reference icon which represents reference content is aligned with other icons in other arrays of icons which represent contents including the reference content.

13. A non-transitory computer-readable storage medium storing a program for causing a computer to execute a display method for a display image control apparatus according to claim 7.

* * * * *